(12) United States Patent  
Cox et al.

(10) Patent No.: US 9,576,040 B1
(45) Date of Patent: *Feb. 21, 2017

(54) N-SITE ASYNCHRONOUS REPLICATION

(71) Applicant: EMC IP Holding Company LLC, Hopkinton, MA (US)

(72) Inventors: Gary H. Cox, Forestdale, MA (US); Douglas E. Lecrone, Hopkinton, MA (US); Brett A. Quinn, Lincoln, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 143 days.

This patent is subject to a terminal disclaimer.

(21) Appl. No.: 14/487,159

(22) Filed: Sep. 16, 2014

Related U.S. Application Data

(63) Continuation of application No. 13/726,912, filed on Dec. 26, 2012, now Pat. No. 8,862,541.

(51) Int. Cl.
  *G06F 17/00* (2006.01)
  *G06F 17/30* (2006.01)
  *G06F 11/14* (2006.01)

(52) U.S. Cl.
  CPC .... *G06F 17/30578* (2013.01); *G06F 11/1435* (2013.01); *G06F 17/3038* (2013.01); *G06F 2201/80* (2013.01)

(58) Field of Classification Search
  None
  See application file for complete search history.

(56) References Cited

U.S. PATENT DOCUMENTS

| 7,177,866 B2* | 2/2007 | Holenstein | G06F 11/2064 707/615 |
| 7,734,884 B1* | 6/2010 | Marshak | H04L 67/1095 711/162 |
| 9,251,021 B2* | 2/2016 | Calder | G06F 11/2074 |
| 2007/0233980 A1* | 10/2007 | Cox | G06F 11/2058 711/162 |
| 2007/0234105 A1* | 10/2007 | Quinn | G06F 11/2058 714/6.12 |
| 2007/0234106 A1* | 10/2007 | Lecrone | G06F 11/2058 714/6.12 |
| 2007/0234108 A1* | 10/2007 | Cox | G06F 11/2058 714/6.12 |

(Continued)

*Primary Examiner* — Hung Le
(74) *Attorney, Agent, or Firm* — Muirhead and Saturnelli, LLC

(57) ABSTRACT

A computing system includes at least one source data center that generates data and a plurality of recovery groups, coupled to the at least one source data center, where each of the recovery groups includes a synchronous data center that receives synchronous data from the at least one source data center and includes an asynchronous data center that receives asynchronous data from the at least one source data center. Cycle switching for asynchronous data transfer is coordinated by the at least one source data center for a first subset of recovery groups containing at least two of the recovery groups. The computing system may also include a second subset of the recovery groups, different from the first subset, where cycle switching for asynchronous data transfer is coordinated by the at least one source data center for the second subset.

17 Claims, 69 Drawing Sheets

(56) References Cited

U.S. PATENT DOCUMENTS

| | | | | |
|---|---|---|---|---|
| 2008/0162844 A1* | 7/2008 | Yoder | ............... | G06F 11/2058 |
| | | | | 711/162 |
| 2008/0162845 A1* | 7/2008 | Cox | ................. | G06F 11/2058 |
| | | | | 711/162 |
| 2011/0083138 A1* | 4/2011 | Sivasubramanian | | G06F 17/30306 |
| | | | | 719/328 |
| 2011/0234786 A1* | 9/2011 | Yuasa | .................. | A61B 3/102 |
| | | | | 348/78 |
| 2012/0323850 A1* | 12/2012 | Hildebrand | ....... | G06F 17/30578 |
| | | | | 707/624 |

* cited by examiner

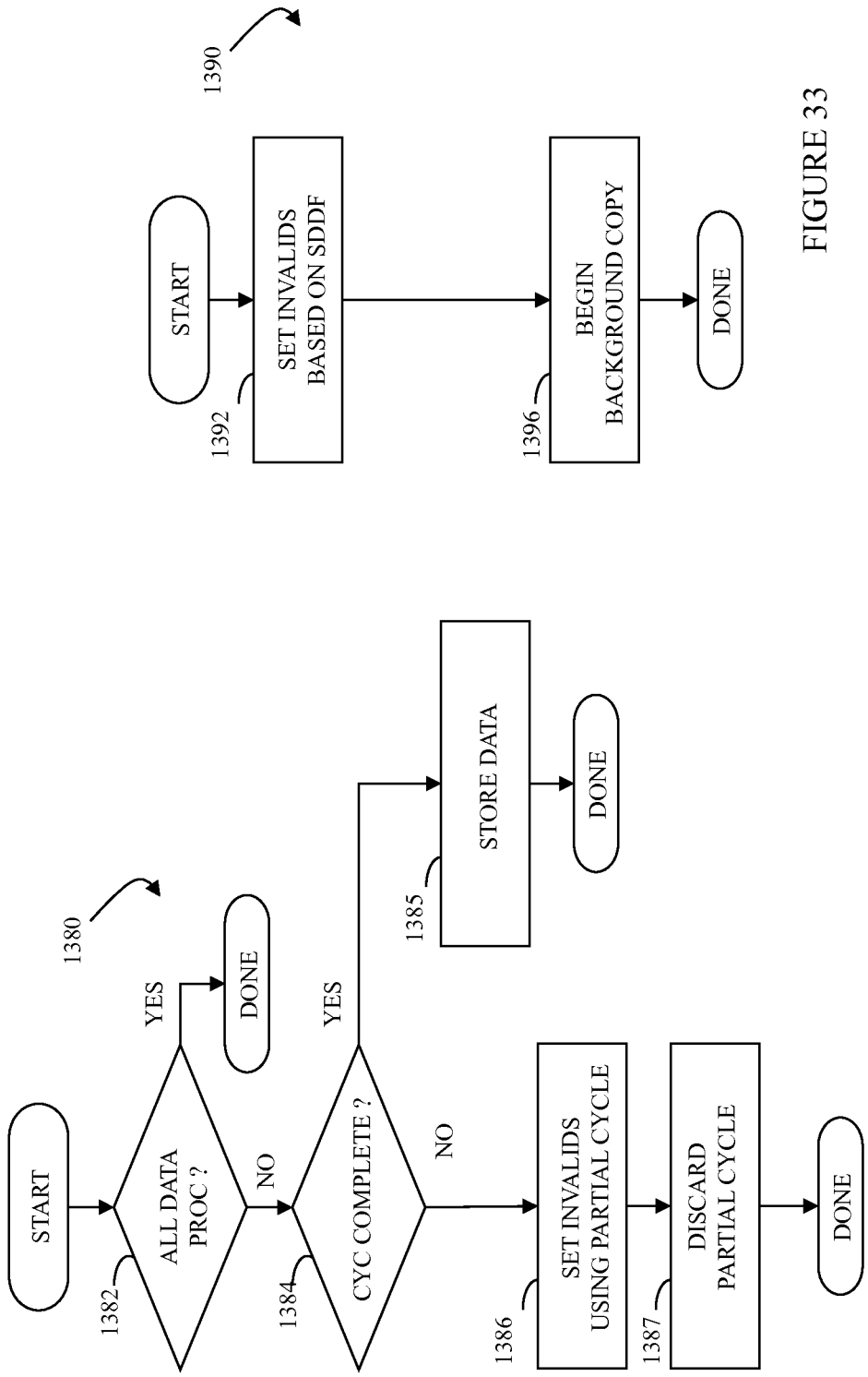

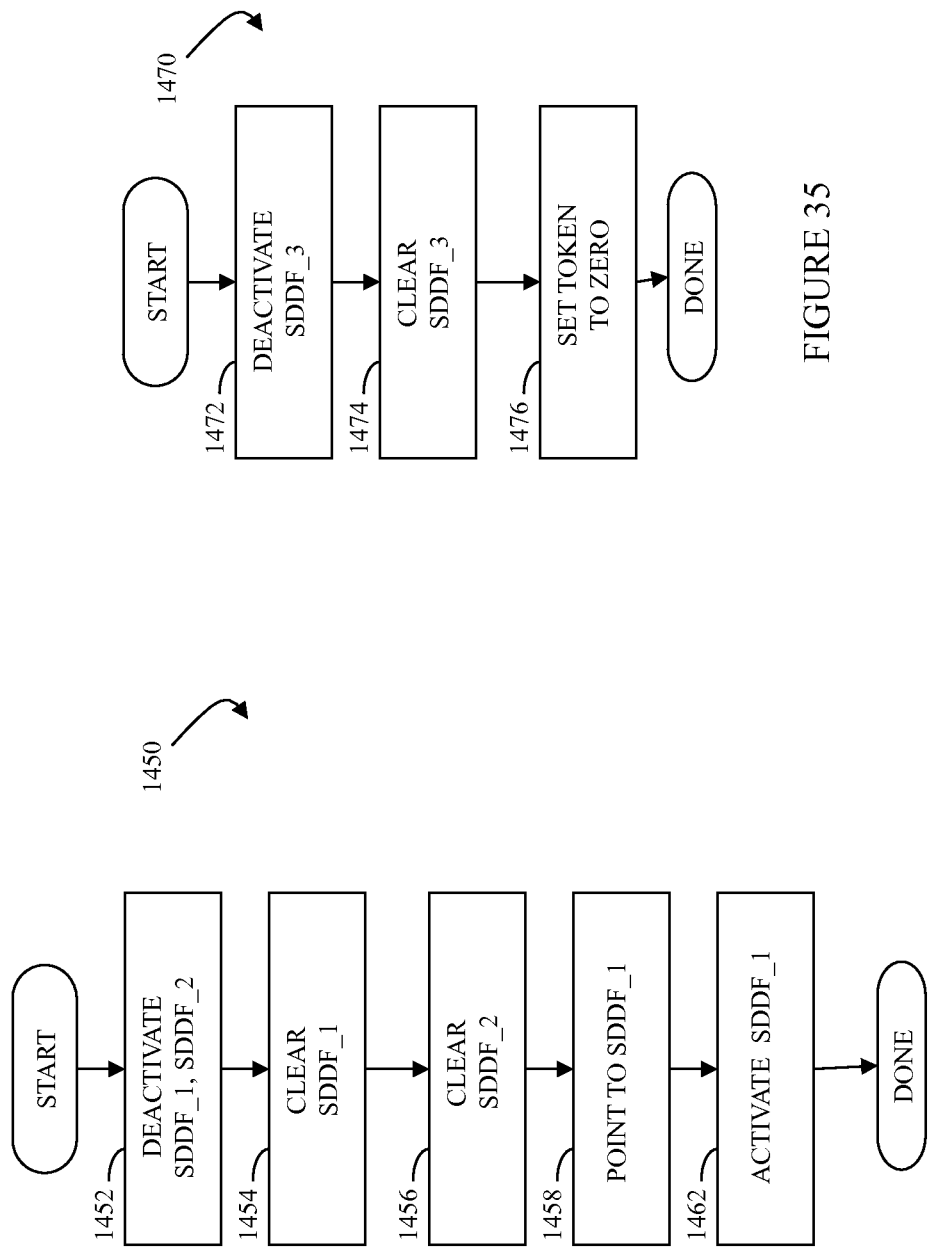

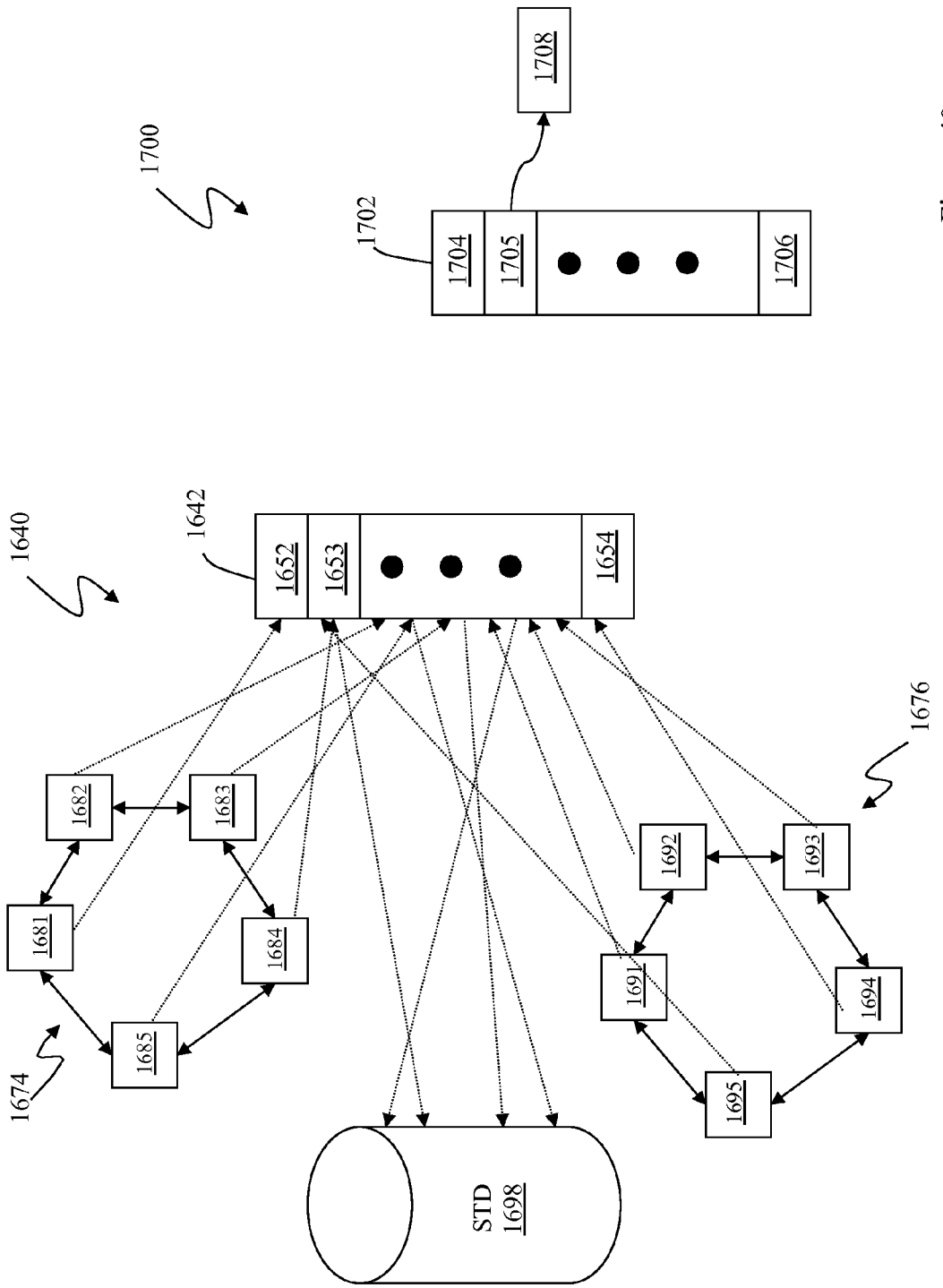

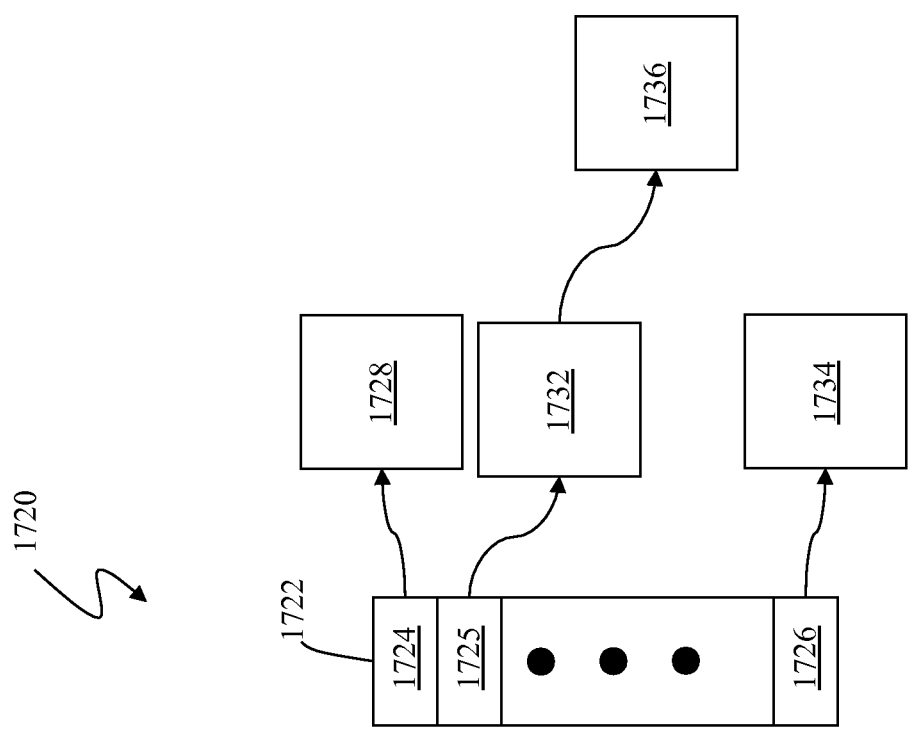

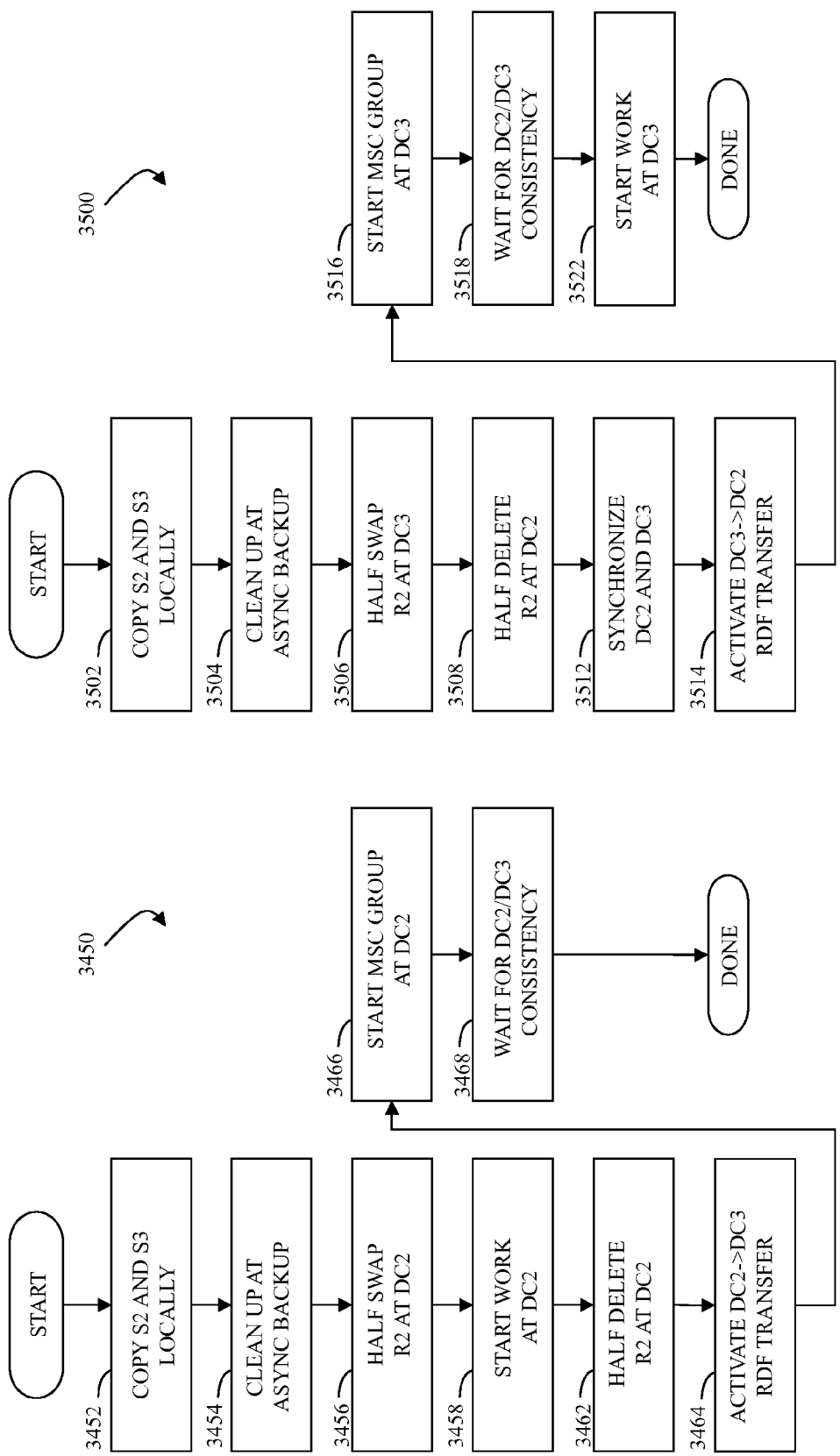

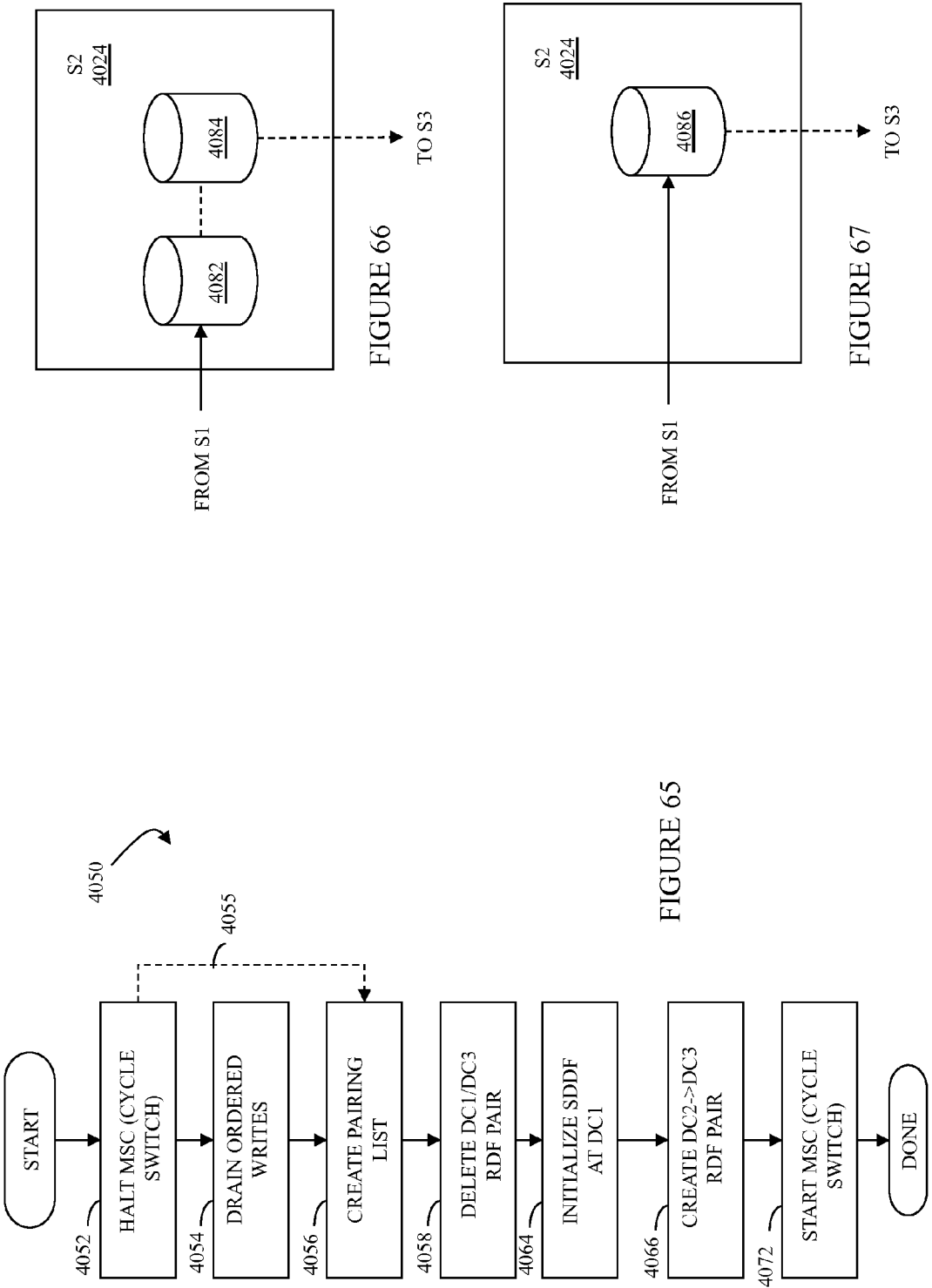

N-SITE ASYNCHRONOUS REPLICATION

RELATED APPLICATIONS

This application is a continuation of U.S. application Ser. No. 13/726,912 filed Dec. 26, 2012 (pending), which is hereby incorporated by reference.

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

RDF allows synchronous data transfer where, after data written from a host to a primary storage device is transferred from the primary storage device to a secondary storage device using RDF, receipt is acknowledged by the secondary storage device to the primary storage device which then provides a write acknowledge back to the host. Thus, in synchronous mode, the host does not receive a write acknowledge from the primary storage device until the RDF transfer to the secondary storage device has been completed and acknowledged by the secondary storage device.

A drawback to the synchronous RDF system is that the latency of each of the write operations is increased by waiting for the acknowledgement of the RDF transfer. This problem is worse when there is a long distance between the primary storage device and the secondary storage device; because of transmission delays, the time delay required for making the RDF transfer and then waiting for an acknowledgement back after the transfer is complete may be unacceptable.

It is also possible to use RDF in an a semi-synchronous mode, in which case the data is written from the host to the primary storage device which acknowledges the write immediately and then, at the same time, begins the process of transferring the data to the secondary storage device. Thus, for a single transfer of data, this scheme overcomes some of the disadvantages of using RDF in the synchronous mode. However, for data integrity purposes, the semi-synchronous transfer mode does not allow the primary storage device to transfer data to the secondary storage device until a previous transfer is acknowledged by the secondary storage device. Thus, the bottlenecks associated with using RDF in the synchronous mode are simply delayed by one iteration because transfer of a second amount of data cannot occur until transfer of previous data has been acknowledged by the secondary storage device.

Another possibility is to have the host write data to the primary storage device in asynchronous mode and have the primary storage device copy data to the secondary storage device in the background. The background copy involves cycling through each of the tracks of the primary storage device sequentially and, when it is determined that a particular block has been modified since the last time that block was copied, the block is transferred from the primary storage device to the secondary storage device. Although this mechanism may attenuate the latency problem associated with synchronous and semi-synchronous data transfer modes, a difficulty still exists because there can not be a guarantee of data consistency between the primary and secondary storage devices. If there are problems, such as a failure of the primary system, the secondary system may end up with out-of-order changes that make the data unusable.

A proposed solution to this problem is the Symmetrix Automated Replication (SAR) process, which is described in U.S. Pat. Nos. 7,117,386 and 7,024,528, both of which are incorporated by reference herein. The SAR uses devices (BCV's) that can mirror standard logical devices. A BCV device can also be split from its standard logical device after being mirrored and can be resynced (i.e., reestablished as a mirror) to the standard logical devices after being split. In addition, a BCV can be remotely mirrored using RDF, in which case the BCV may propagate data changes made thereto (while the BCV is acting as a mirror) to the BCV remote mirror when the BCV is split from the corresponding standard logical device.

However, using the SAR process requires the significant overhead of continuously splitting and resyncing the BCV's. The SAR process also uses host control and management, which relies on the controlling host being operational. In addition, the cycle time for a practical implementation of a SAR process is on the order of twenty to thirty minutes, and thus the amount of data that may be lost when an RDF link and/or primary device fails could be twenty to thirty minutes worth of data.

Thus, it would be desirable to have an RDF system that exhibits some of the beneficial qualities of each of the different techniques discussed above while reducing the drawbacks. Such a system would exhibit low latency for each host write regardless of the distance between the primary device and the secondary device and would provide consistency (recoverability) of the secondary device in case of failure.

It would also be desirable to be able to combine the benefits obtained from synchronous RDF transfers and asynchronous RDF transfers so that up-to-date backup data may be provided on a JO remote device that is relatively close (geographically) to a source device while, at the same time, backup data may also be provided to a backup device that is relatively far from the source device. It would also be desirable if such a system provided for appropriate data recovery among the backup devices.

SUMMARY OF THE INVENTION

According to the system described herein, a computing system includes at least one source data center that generates data and a plurality of recovery groups, coupled to the at least one source data center, where each of the recovery groups includes a synchronous data center that receives synchronous data from the at least one source data center and includes an asynchronous data center that receives asynchronous data from the at least one source data center and where cycle switching for asynchronous data transfer is coordinated by the at least one source data center for a first subset of recovery groups containing at least two of the recovery groups. The computing system may also include a second subset of the recovery groups, different from the first subset, where cycle switching for asynchronous data transfer is coordinated by the at least one source data center for the second subset. Cycle switching for the second subset may be independent of cycle switching for the first subset. Coordinating cycle switching for each of the recovery groups may include waiting until all of the recovery groups are ready to switch cycles. A recovery group may be removed from the subset in response to the recovery group taking too long to be ready to switch cycles. Data written after a first time and before a second time at the at least one source data center may be associated with a first chunk of data and data written after the second time at the at least one source data center may be associated with a second chunk of data different than the first chunk of data. The at least one source data center may provide the first chunk of data to the asynchronous data center while accumulating writes for the second chunk of data. The at least one source data center may send a message to the asynchronous data center and, in response to receiving a reply to the message, the at least one source data center may transmit the second chunk of data to the asynchronous data center. The at least one source data center may provide an indicator to the synchronous data center in connection with receiving the reply from the asynchronous data center.

According further to the system described herein, maintaining recovery data includes generating data at a source data center, synchronously transferring data to a plurality of synchronous data centers that are each part of one of a plurality of a first subset of recovery groups coupled to the at least one source data center, where the first subset contains at least two of the recovery groups, and asynchronously transferring data to a plurality of asynchronous data centers that are each part of one of the plurality of the first subset of recovery groups coupled to the at least one source data center, where each of the recovery groups includes at least one of the synchronous data centers and includes at least one of the asynchronous data centers and where cycle switching for asynchronous data transfer is coordinated by the at least one source data center for the first subset of the recovery groups. Maintaining recovery data may also include providing a second subset of the recovery groups, different from the first subset, where cycle switching for asynchronous data transfer is coordinated by the at least one source data center for the second subset. Cycle switching for the second subset may be independent of cycle switching for the first subset. Data written after a first time and before a second time at the at least one source data center may be associated with a first chunk of data and data written after the second time at the at least one source data center may be associated with a second chunk of data different than the first chunk of data. The at least one source data center may provide the first chunk of data to the asynchronous data center while accumulating writes for the second chunk of data. The at least one source data center may send a message to the asynchronous data center and, in response to receiving a reply to the message, the at least one source data center may transmit the second chunk of data to the asynchronous data center. The at least one source data center may provide an indicator to the synchronous data center in connection with receiving the reply from the asynchronous data center.

According further to the system described herein, computer software provided in a non-transitory computer-readable medium maintains recovery data. The software includes executable code that generates data at a source data center, executable code that synchronously transfers data to a plurality of synchronous data centers that are each part of one of a plurality of a first subset of recovery groups coupled to the at least one source data center, wherein the first subset contains at least two of the recovery groups, and executable code that asynchronously transfers data to a plurality of asynchronous data centers that are each part of one of the plurality of the first subset of recovery groups coupled to the at least one source data center, where each of the recovery groups includes at least one of the synchronous data centers and includes at least one of the asynchronous data centers and where cycle switching for asynchronous data transfer is coordinated by the at least one source data center for the first subset of the recovery groups. The computer software may also include executable code that provides a second subset of the recovery groups, different from the first subset, where cycle switching for asynchronous data transfer is coordinated by the at least one source data center for the second subset. Cycle switching for the second subset may be independent of cycle switching for the first subset. Data written after a first time and before a second time at the at least one source data center may be associated with a first chunk of data and data written after the second time at the at least one source data center may be associated with a second chunk of data different than the first chunk of data. The at least one source data center may provide the first chunk of data to the asynchronous data center while accumulating writes for the second chunk of data. The at least one source data center may send a message to the asynchronous data center and, in response to receiving a reply to the message, the at least one source data center may transmit the second chunk of data to the asynchronous data center. The at least one source data center may provide an indicator to the synchronous data center in connection with receiving the reply from the asynchronous data center.

BRIEF DESCRIPTION OF DRAWINGS

FIG. 32 is a flow chart illustrating processing performed in connection with terminating ordered writes according to an embodiment of the system described herein.

FIG. 33 is a flow chart illustrating processing performed in connection with sending data from a local destination to a remote destination according to an embodiment of the system described herein.

FIG. 34 is a flow chart illustrating a process performed by a local destination in connection with resetting error recovery parameters according to an embodiment of the system described herein.

FIG. 35 is a flow chart illustrating a process performed by a remote destination in connection with resetting error recovery parameters according to an embodiment of the system described herein.

FIG. 39 is a schematic diagram illustrating items for constructing and manipulating chunks of data on a remote storage device according to an embodiment of the system described herein.

FIG. 40 is a diagram showing a table used to map logical device locations to slots containing data received by a remote storage device according to an embodiment of the system described herein.

FIG. 41 is a diagram showing another embodiment of a table used to map logical device locations to slots containing data received by a remote storage device according to an embodiment of the system described herein.

FIG. 59 is a flow chart illustrating a failover where work is restarted at a synchronous backup site before resynchronization of the synchronous and asynchronous backup sites according to an embodiment of the system described herein.

FIG. 60 is a flow chart illustrating a failover where work is restarted at an asynchronous backup site according to an embodiment of the system described herein.

FIG. 65 is a flowchart illustrating steps performed in connection with transitioning from a concurrent triangular asynchronous replication system to a cascaded triangular asynchronous replication system according to an embodiment of the system described herein.

FIG. 66 illustrates a storage device used for cascaded triangular asynchronous replication according to an embodiment of the system described herein.

FIG. 67 illustrates a storage device used for cascaded triangular asynchronous replication according an alternative embodiment of the system described herein.

DETAILED DESCRIPTION OF VARIOUS EMBODIMENTS

Figure 1:
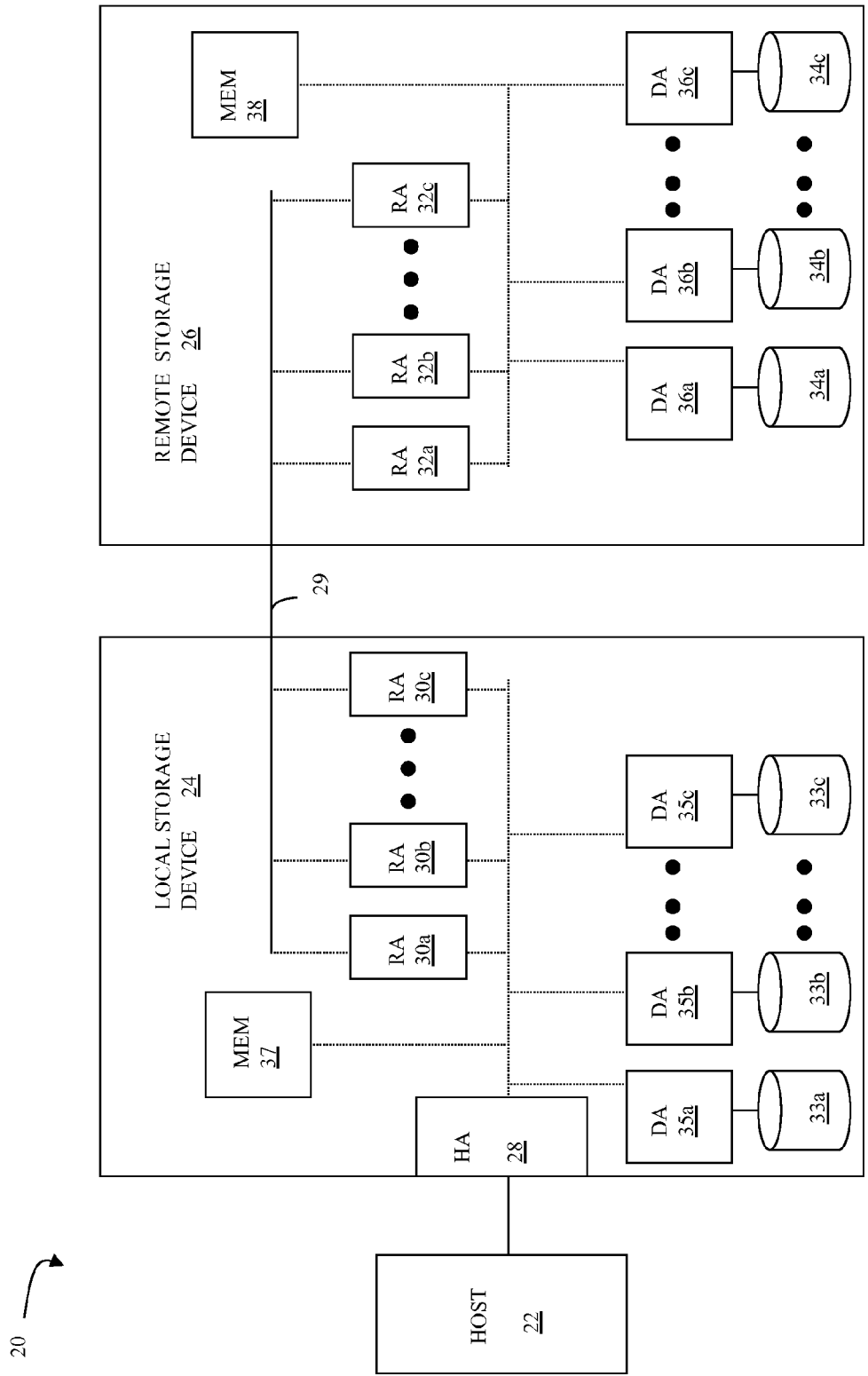
FIG. 1 is a schematic diagram showing a host, a local storage device, and a remote data storage device used in connection with the system described herein.

Referring to FIG. 1, a diagram 20 shows a relationship between a host 22, a local storage device 24 and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via an RDF link 29 to cause the data on the remote storage device 26 to be identical to the data on the local storage device 24. Although only the one link 29 is shown, it is possible to have additional links between the storage devices 24, 26 and to have links between one or both of the storage devices 24, 26 and other storage devices (not shown). In addition, the link 29 may be provided using a direct connection (wired, over-the-air, or some combination thereof), a network (such as the Internet), or any other appropriate means for conveying data. Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. No. 5,742,792, which is incorporated by reference herein.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail hereinafter.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30a-30c, 32a-32c and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

Figure 2:
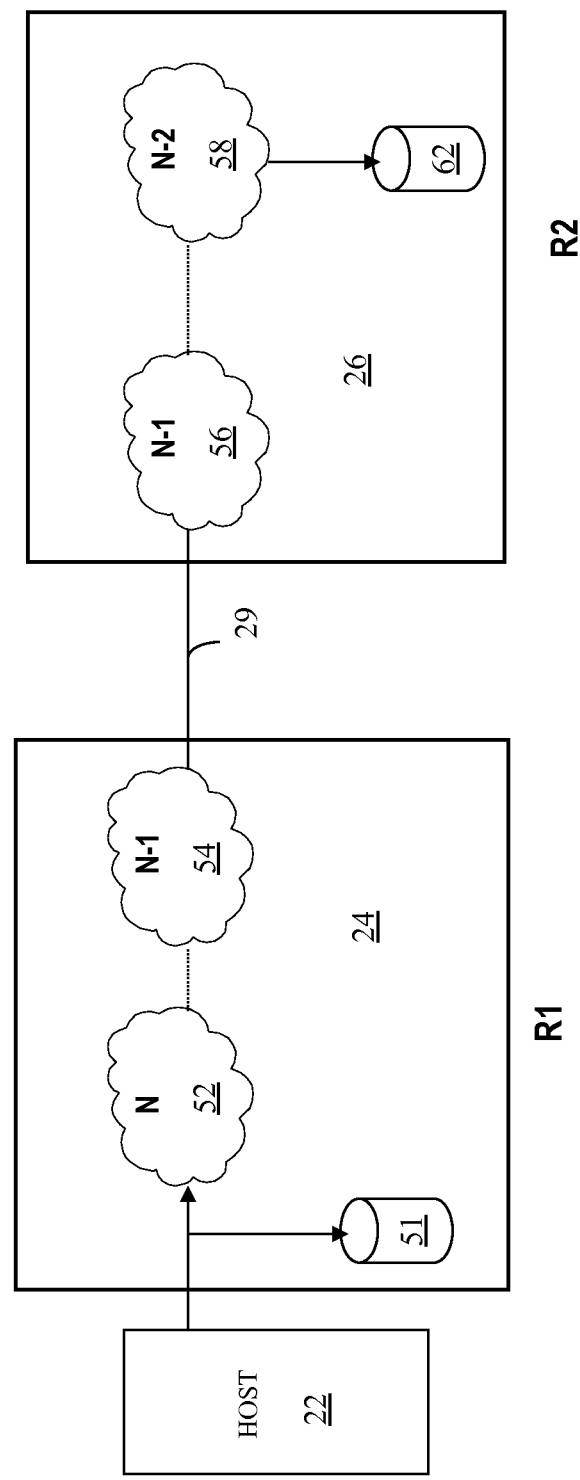
FIG. 2 is a schematic diagram showing a flow of data between a host, a local storage device, and a remote data storage device used in connection with the system described herein.

Referring to FIG. 2, a path of data is illustrated from the host 22 to the local storage device 24 and the remote storage device 26. Data written from the host 22 to the local storage device 24 is stored locally, as illustrated by the data element 51 of the local storage device 24. The data that is written by the host 22 to the local storage device 24 is also maintained by the local storage device 24 in connection with being sent by the local storage device 24 to the remote storage device 26 via the link 29.

In the system described herein, each data write by the host 22 (of, for example a record, a plurality of records, a track, etc.) is assigned a sequence number. The sequence number may be provided in an appropriate data field associated with the write. In FIG. 2, the writes by the host 22 are shown as being assigned sequence number N. All of the writes performed by the host 22 that are assigned sequence number N are collected in a single chunk of data 52. The chunk 52 represents a plurality of separate writes by the host 22 that occur at approximately the same time.

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N−1) are transmitted by the local storage device 24 to the remote storage device 26 via the link 29. A chunk 54 represents writes from the host 22 that were assigned the sequence number N−1 that have not been transmitted yet to the remote storage device 26.

The remote storage device 26 receives the data from the chunk 54 corresponding to writes assigned a sequence number N−1 and constructs a new chunk 56 of host writes having sequence number N−1. The data may be transmitted using appropriate RDF protocol that acknowledges data sent across the link 29. When the remote storage device 26 has received all of the data from the chunk 54, the local storage device 24 sends a commit message to the remote storage device 26 to commit all the data assigned the N−1 sequence number corresponding to the chunk 56. Generally, once a chunk corresponding to a particular sequence number is committed, that chunk may be written to the logical storage device. This is illustrated in FIG. 2 with a chunk 58 corresponding to writes assigned sequence number N−2 (i.e., two before the current sequence number being used in connection with writes by the host 22 to the local storage device 26). In FIG. 2, the chunk 58 is shown as being written to a data element 62 representing disk storage for the remote storage device 26. Thus, the remote storage device 26 is receiving and accumulating the chunk 56 corresponding to sequence number N−1 while the chunk 58 corresponding to the previous sequence number (N−2) is being written to disk storage of the remote storage device 26 illustrated by the data element 62. In some embodiments, the data for the chunk 58 is marked for write (but not necessarily written immediately), while the data for the chunk 56 is not.

Thus, in operation, the host 22 writes data to the local storage device 24 that is stored locally in the data element 51 and is accumulated in the chunk 52. Once all of the data for a particular sequence number has been accumulated (described elsewhere herein), the local storage device 24 increments the sequence number. Data from the chunk 54 corresponding to one less than the current sequence number is transferred from the local storage device 24 to the remote storage device 26 via the link 29. The chunk 58 corresponds to data for a sequence number that was committed by the local storage device 24 sending a message to the remote storage device 26. Data from the chunk 58 is written to disk storage of the remote storage device 26.

Note that the writes within a particular one of the chunks 52, 54, 56, 58 are not necessarily ordered. However, as described in more detail elsewhere herein, every write for the chunk 58 corresponding to sequence number N−2 was begun prior to beginning any of the writes for the chunks 54, 56 corresponding to sequence number N−1. In addition, every write for the chunks 54, 56 corresponding to sequence number N−1 was begun prior to beginning any of the writes for the chunk 52 corresponding to sequence number N. Thus, in the event of a communication failure between the local storage device 24 and the remote storage device 26, the remote storage device 26 may simply finish writing the last committed chunk of data (the chunk 58 in the example of FIG. 2) and can be assured that the state of the data at the remote storage device 26 is ordered in the sense that the data element 62 contains all of the writes that were begun prior to a certain point in time and contains no writes that were begun after that point in time. Thus, R2 always contains a point in time copy of R1 and it is possible to reestablish a consistent image from the R2 device.

Figure 3:
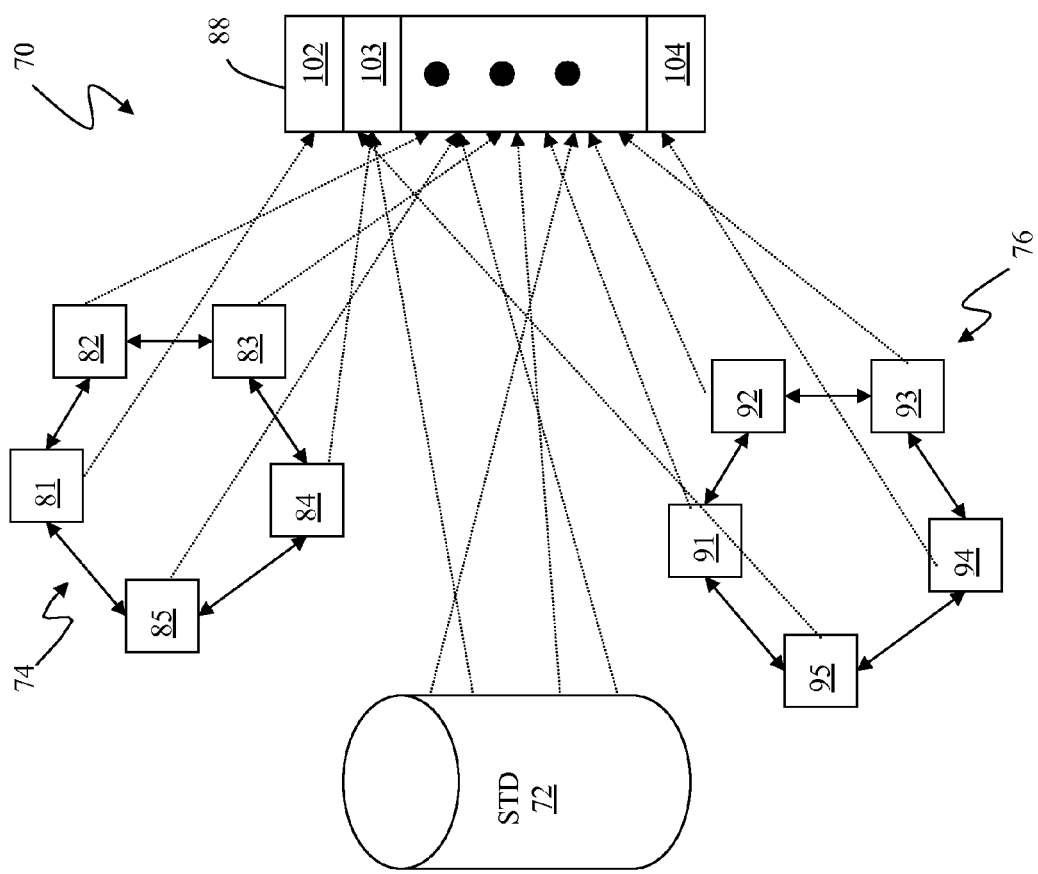
FIG. 3 is a schematic diagram illustrating items for constructing and manipulating chunks of data on a local storage device za.

Referring to FIG. 3, a diagram 70 illustrates items used to construct and maintain the chunks 52, 54. A standard logical device 72 contains data written by the host 22 and corresponds to the data element 51 of FIG. 2 and the disks 33a-33c of FIG. 1. The standard logical device 72 contains data written by the host 22 to the local storage device 24.

Two linked lists of pointers 74, 76 are used in connection with the standard logical device 72. The linked lists 74, 76 correspond to data that may be stored, for example, in the memory 37 of the local storage device 24. The linked list 74 contains a plurality of pointers 81-85, each of which points to a slot of a cache 88 used in connection with the local storage device 24. Similarly, the linked list 76 contains a plurality of pointers 91-95, each of which points to a slot of the cache 88. In some embodiments, the cache 88 may be provided in the memory 37 of the local storage device 24. The cache 88 contains a plurality of cache slots 102-104 that may be used in connection to writes to the standard logical device 72 and, at the same time, used in connection with the linked lists 74, 76.

Each of the linked lists 74, 76 may be used for one of the chunks of data 52, 54 so that, for example, the linked list 74 may correspond to the chunk of data 52 for sequence number N while the linked list 76 may correspond to the chunk of data 54 for sequence number N−1. Thus, when data is written by the host 22 to the local storage device 24, the data is provided to the cache 88 and, in some cases (described elsewhere herein), an appropriate pointer of the linked list 74 is created. Note that the data will not be removed from the cache 88 until the data is destaged to the standard logical device 72 and the data is also no longer pointed to by one of the pointers 81-85 of the linked list 74, as described elsewhere herein.

In an embodiment herein, one of the linked lists 74, 76 is deemed "active" while the other is deemed "inactive". Thus, for example, when the sequence number N is even, the linked list 74 may be active while the linked list 76 is inactive. The active one of the linked lists 74, 76 handles writes from the host 22 while the inactive one of the linked lists 74, 76 corresponds to the data that is being transmitted from the local storage device 24 to the remote storage device 26.

While the data that is written by the host 22 is accumulated using the active one of the linked lists 74, 76 (for the sequence number N), the data corresponding to the inactive one of the linked lists 74, 76 (for previous sequence number N−1) is transmitted from the local storage device 24 to the remote storage device 26. The RA's 30a-30c use the linked lists 74, 76 to determine the data to transmit from the local storage device 24 to the remote storage device 26.

Once data corresponding to a particular one of the pointers in one of the linked lists 74, 76 has been transmitted to the remote storage device 26, the particular one of the pointers may be removed from the appropriate one of the linked lists 74, 76. In addition, the data may also be marked for removal from the cache 88 (i.e., the slot may be returned to a pool of slots for later, unrelated, use) provided that the data in the slot is not otherwise needed for another purpose (e.g., to be destaged to the standard logical device 72). A mechanism may be used to ensure that data is not removed from the cache 88 until all devices are no longer using the data. Such a mechanism is described, for example, in U.S. Pat. No. 5,537,568 issued on Jul. 16, 1996 and in U.S. Pat. No. 6,594,742 issued on Jul. 15, 2003, both of which are incorporated by reference herein.

Figure 4:
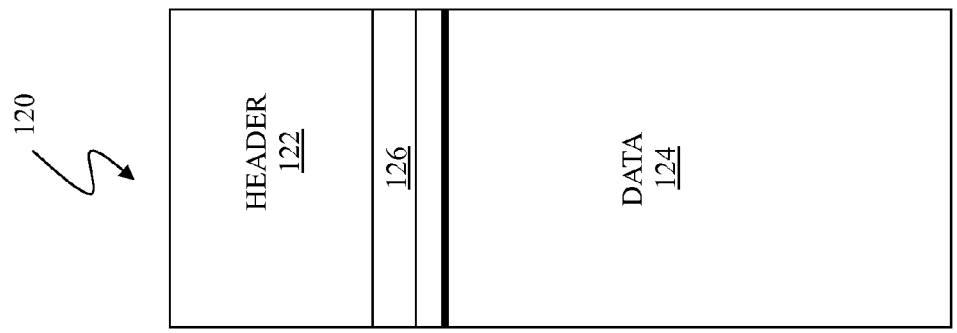
FIG. 4 is a diagram illustrating a data structure for a slot used in connection with the system described herein.

Referring to FIG. 4, a slot 120, like one of the slots 102-104 of the cache 88, includes a header 122 and data 124. The header 122 corresponds to overhead information used by the system to manage the slot 120. The data 124 is the corresponding data from the disk that is being (temporarily) stored in the slot 120. Information in the header 122 includes pointers back to the disk, time stamp(s), etc.

The header 122 also includes a cache stamp 126 used in connection with the system described herein. In an embodiment herein, the cache stamp 126 is eight bytes. Two of the bytes are a "password" that indicates whether the slot 120 is being used by the system described herein. In other embodiments, the password may be one byte while the following byte is used for a pad. As described elsewhere herein, the two bytes of the password (or one byte, as the case may be) being equal to a particular value indicates that the slot 120 is pointed to by at least one entry of the linked lists 74, 76. The password not being equal to the particular value indicates that the slot 120 is not pointed to by an entry of the linked lists 74, 76. Use of the password is described elsewhere herein.

The cache stamp 126 also includes a two byte field indicating the sequence number (e.g., N, N−1, N−2, etc.) of the data 124 of the slot 120. As described elsewhere herein, the sequence number field of the cache stamp 126 may be used to facilitate the processing described herein. The remaining four bytes of the cache stamp 126 may be used for a pointer, as described elsewhere herein. Of course, the two bytes of the sequence number and the four bytes of the pointer are only valid when the password equals the particular value that indicates that the slot 120 is pointed to by at least one entry in one of the lists 74, 76.

Figure 5:
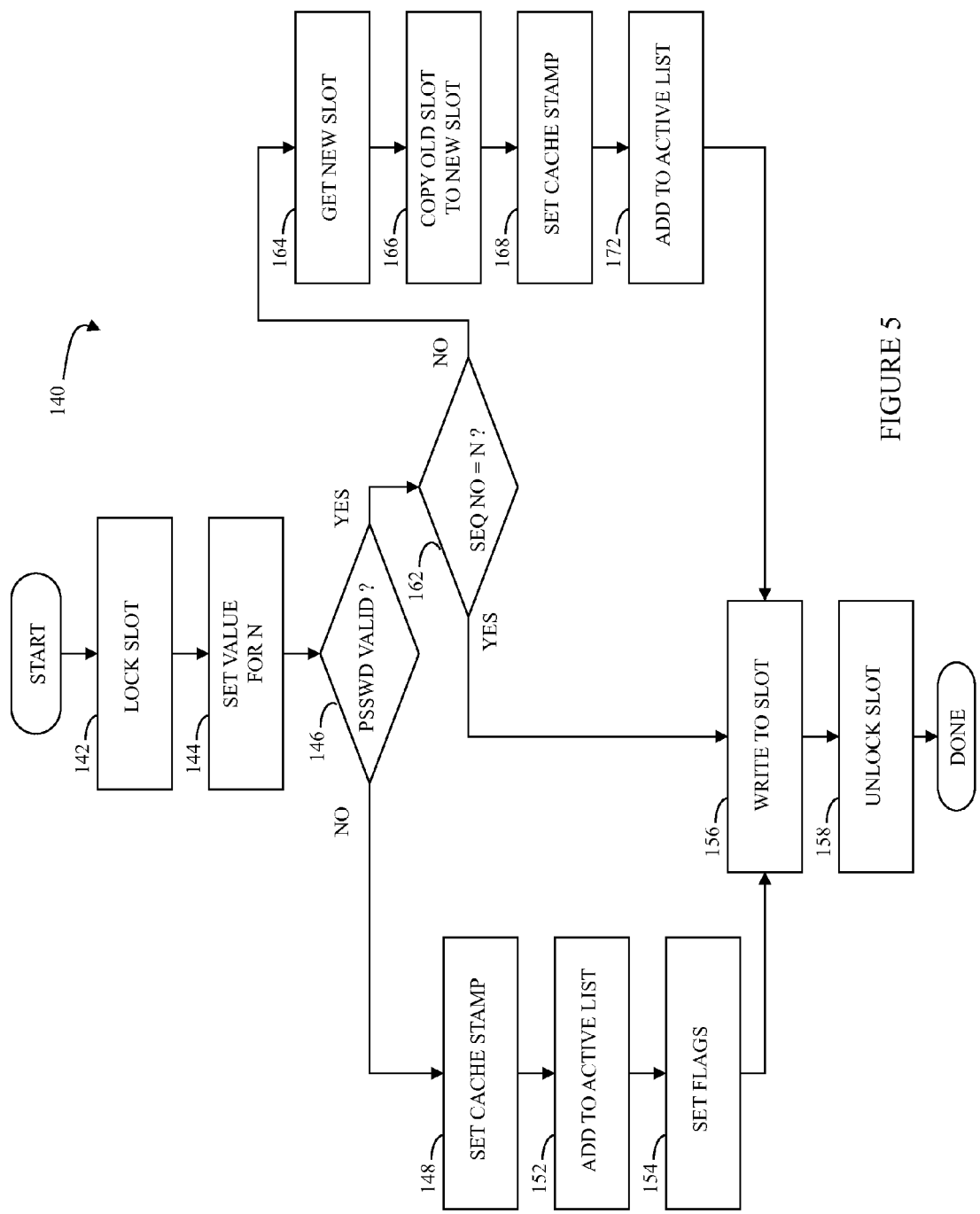
FIG. 5 is a flow chart illustrating operation of a host adaptor (HA) in response to a write by a host according to an embodiment of the system described herein.

Referring to FIG. 5, a flow chart 140 illustrates steps performed by the HA 28 in connection with a host 22 performing a write operation. Of course, when the host 22 performs a write, processing occurs for handling the write in a normal fashion irrespective of whether the data is part of an R1/R2 RDF group. For example, when the host 22 writes data for a portion of the disk, the write occurs to a cache slot which is eventually destaged to the disk. The cache slot may either be a new cache slot or may be an already existing cache slot created in connection with a previous read and/or write operation to the same track.

Processing begins at a first step 142 where a slot corresponding to the write is locked. In an embodiment herein, each of the slots 102-104 of the cache 88 corresponds to a track of data on the standard logical device 72. Locking the slot at the step 142 prevents additional processes from operating on the relevant slot during the processing performed by the HA 28 corresponding to the steps of the flow chart 140.

Following step 142 is a step 144 where a value for N, the sequence number, is set. As discussed elsewhere herein, the value for the sequence number obtained at the step 144 is maintained during the entire write operation performed by the HA 28 while the slot is locked. As discussed elsewhere herein, the sequence number is assigned to each write to set the one of the chunks of data 52, 54 to which the write belongs. Writes performed by the host 22 are assigned the current sequence number. It is useful that a single write operation maintain the same sequence number throughout.

Following the step 144 is a test step 146 which determines if the password field of the cache slot is valid. As discussed above, the system described herein sets the password field to a predetermined value to indicate that the cache slot is already in one of the linked lists of pointers 74, 76. If it is determined at the test step 146 that the password field is not valid (indicating that the slot is new and that no pointers from the lists 74, 76 point to the slot), then control passes from the step 146 to a step 148, where the cache stamp of the new slot is set by setting the password to the predetermined value, setting the sequence number field to N, and setting the pointer field to Null. In other embodiments, the pointer field may be set to point to the slot itself.

Following the step 148 is a step 152 where a pointer to the new slot is added to the active one of the pointer lists 74, 76. In an embodiment herein, the lists 74, 76 are circular doubly linked lists, and the new pointer is added to the circular doubly linked list in a conventional fashion. Of course, other appropriate data structures could be used to manage the lists 74, 76. Following the step 152 is a step 154 where flags are set. At the step 154, the RDF_WP flag (RDF write pending flag) is set to indicate that the slot needs to be transmitted to the remote storage device 26 using RDF. In addition, at the step 154, the IN_CACHE flag is set to indicate that the slot needs to be destaged to the standard logical device 72. Following the step 154 is a step 156 where the data being written by the host 22 and the HA 28 is written to the slot. Following the step 156 is a step 158 where the slot is unlocked. Following step 158, processing is complete.

If it is determined at the test step 146 that the password field of the slot is valid (indicating that the slot is already pointed to by at least one pointer of the lists 74, 76), then control transfers from the step 146 to a test step 162, where it is determined whether the sequence number field of the slot is equal to the current sequence number, N. Note that there are two valid possibilities for the sequence number field of a slot with a valid password. It is possible for the sequence number field to be equal to N, the current sequence number. This occurs when the slot corresponds to a previous write with sequence number N. The other possibility is for the sequence number field to equal N−1. This occurs when the slot corresponds to a previous write with sequence number N−1. Any other value for the sequence number field is invalid. Thus, for some embodiments, it may be possible to include error/validity checking in the step 162 or possibly make error/validity checking a separate step. Such an error may be handled in any appropriate fashion, which may include providing a message to a user.

If it is determined at the step 162 that the value in the sequence number field of the slot equals the current sequence number N, then no special processing is required and control transfers from the step 162 to the step 156, discussed above, where the data is written to the slot. Otherwise, if the value of the sequence number field is N−1 (the only other valid value), then control transfers from the step 162 to a step 164 where a new slot is obtained. The new slot obtained at the step 164 may be used to store the data being written.

Following the step 164 is a step 166 where the data from the old slot is copied to the new slot that was obtained at the step 164. Note that that the copied data includes the RDF_WP flag, which should have been set at the step 154 on a previous write when the slot was first created. Following the step 166 is a step 168 where the cache stamp for the new slot is set by setting the password field to the appropriate value, setting the sequence number field to the current sequence number, N, and setting the pointer field to point to the old slot. Following the step 168 is a step 172 where a pointer to the new slot is added to the active one of the linked lists 74, 76. Following the step 172 is the step 156, discussed above, where the data is written to the slot which, in this case, is the new slot.

Figure 6:
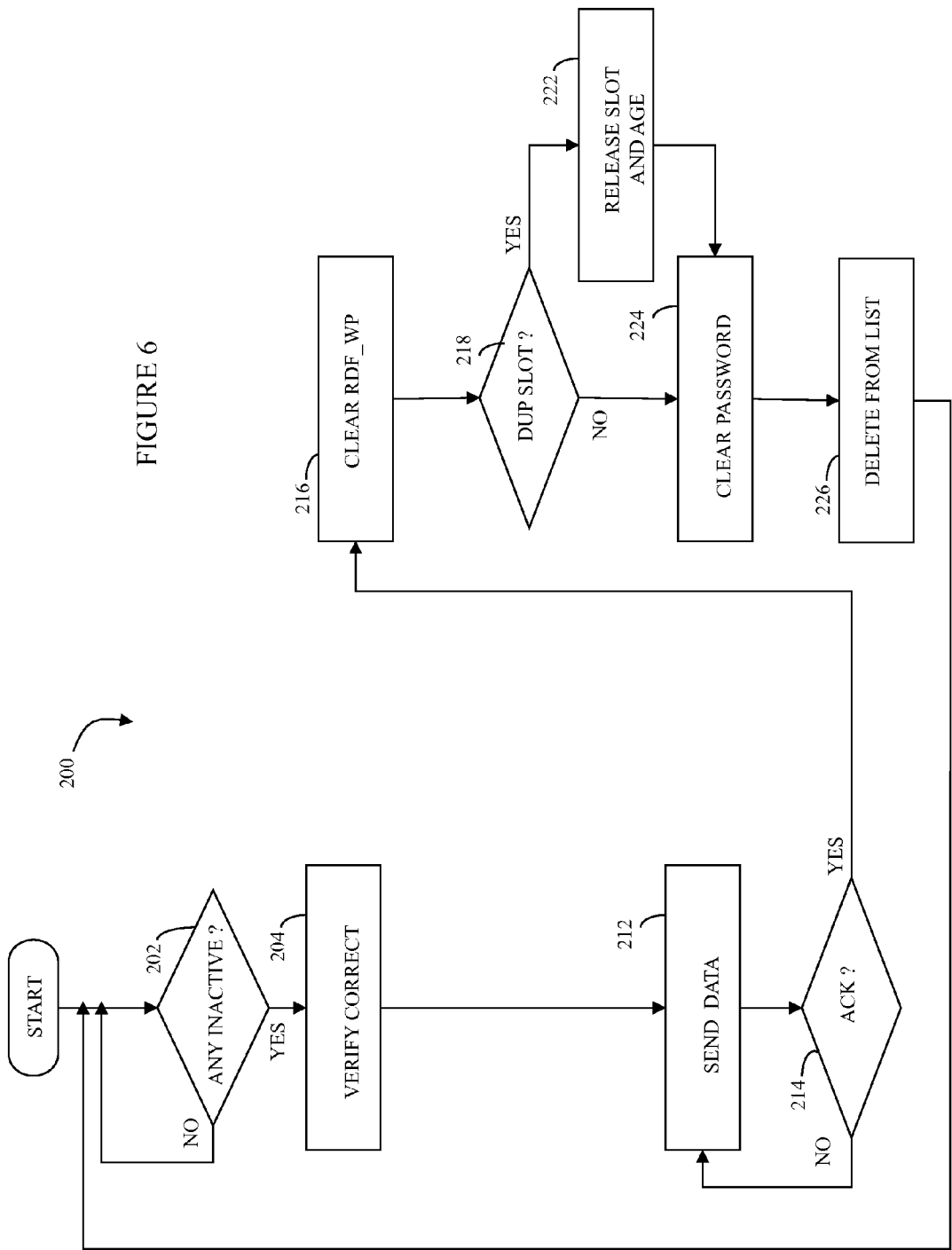
FIG. 6 is a flow chart illustrating transferring data from a local storage device to a remote storage device according to an embodiment of the system described herein.

Referring to FIG. 6, a flow chart 200 illustrates steps performed in connection with the RA's 30a-30c scanning the inactive one of the lists 72, 74 to transmit RDF data from the local storage device 24 to the remote storage device 26. As discussed above, the inactive one of the lists 72, 74 points to slots corresponding to the N−1 cycle for the R1 device when the N cycle is being written to the R1 device by the host using the active one of the lists 72, 74.

Processing begins at a first step 202 where it is determined if there are any entries in the inactive one of the lists 72, 74. As data is transmitted, the corresponding entries are removed from the inactive one of the lists 72, 74. In addition, new writes are provided to the active one of the lists 72, 74 and not generally to the inactive one of the lists 72, 74. Thus, it is possible (and desirable, as described elsewhere herein) for the inactive one of the lists 72, 74 to contain no data at certain times. If it is determined at the step 202 that there is no data to be transmitted, then the inactive one of the lists 72, 74 is continuously polled until data becomes available. Data for sending becomes available in connection with a cycle switch (discussed elsewhere herein) where the inactive one of the lists 72, 74 becomes the active one of the lists 72, 74, and vice versa.

If it is determined at the step 202 that there is data available for sending, control transfers from the step 202 to a step 204, where the slot is verified as being correct. The processing performed at the step 204 is an optional "sanity check" that may include verifying that the password field is correct and verifying that the sequence number field is correct. If there is incorrect (unexpected) data in the slot, error processing may be performed, which may include notifying a user of the error and possibly error recovery processing.

Following the step 204 is a step 212, where the data is sent via RDF in a conventional fashion. In an embodiment herein, the entire slot is not transmitted. Rather, only records within the slot that have the appropriate mirror bits set (indicating the records have changed) are transmitted to the remote storage device 26. However, in other embodiments, it may be possible to transmit the entire slot, provided that the remote storage device 26 only writes data corresponding to records having appropriate mirror bits set and ignores other data for the track, which may or may not be valid. Following the step 212 is a test step 214 where it is determined if the data that was transmitted has been acknowledged by the R2 device. If not, the data is resent, as indicated by the flow from the step 214 back to the step 212. In other embodiments, different and more involved processing may used to send data and acknowledge receipt thereof. Such processing may include error reporting and alternative processing that is performed after a certain number of attempts to send the data have failed.

Once it is determined at the test step 214 that the data has been successfully sent, control passes from the step 214 to a step 216 to clear the RDF_WP flag (since the data has been successfully sent via RDF). Following the step 216 is a test step 218 where it is determined if the slot is a duplicate slot created in connection with a write to a slot already having an existing entry in the inactive one of the lists 72, 74. This possibility is discussed above in connection with the steps 162, 164, 166, 168, 172. If it is determined at the step 218 that the slot is a duplicate slot, then control passes from the step 218 to a step 222 where the slot is returned to the pool of available slots (to be reused). In addition, the slot may also be aged (or have some other appropriate mechanism applied thereto) to provide for immediate reuse ahead of other slots since the data provided in the slot is not valid for any other purpose. Following the step 222 or the step 218 if the slot is not a duplicate slot is a step 224 where the password field of the slot header is cleared so that when the slot is reused, the test at the step 146 of FIG. 5 properly classifies the slot as a new slot.

Following the step 224 is a step 226 where the entry in the inactive one of the lists 72, 74 is removed. Following the step 226, control transfers back to the step 202, discussed above, where it is determined if there are additional entries on the inactive one of the lists 72, 74 corresponding to data needing to be transferred.

Figure 7:
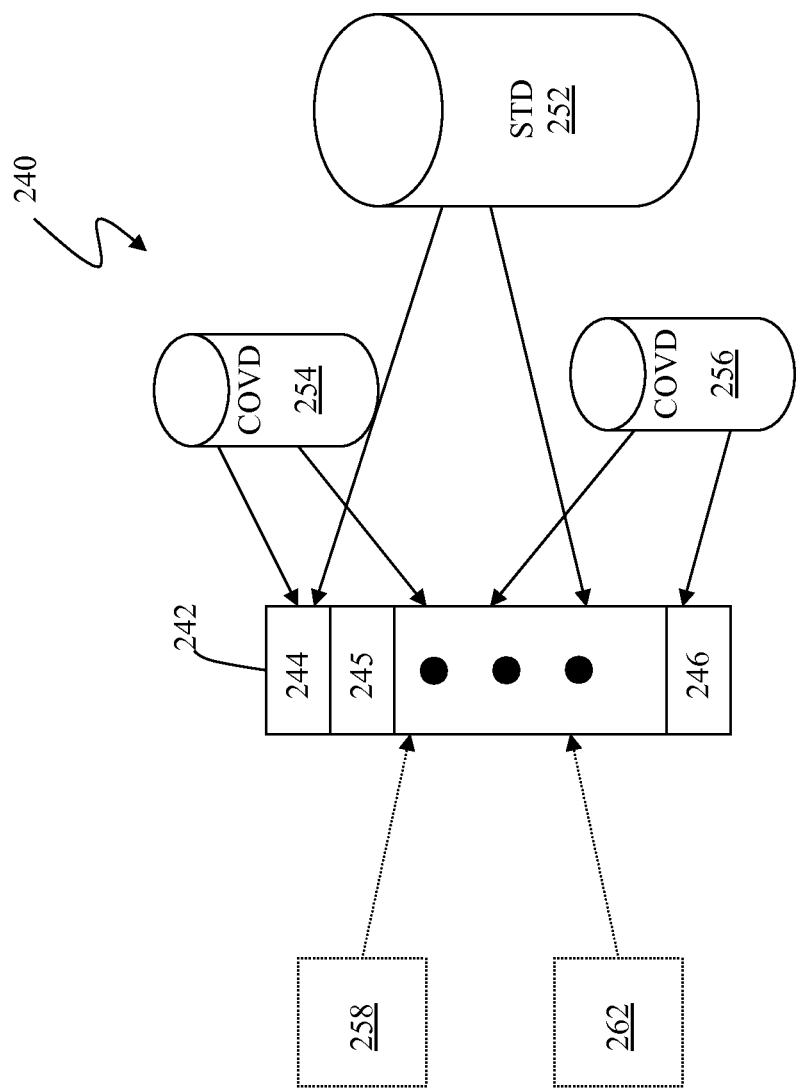
FIG. 7 is a schematic diagram illustrating items for constructing and manipulating chunks of data on a remote storage device according to an embodiment of the system described herein.

Referring to FIG. 7, a diagram 240 illustrates creation and manipulation of the chunks 56, 58 used by the remote storage device 26. Data that is received by the remote storage device 26, via the link 29, is provided to a cache 242 of the remote storage device 26. The cache 242 may be provided, for example, in the memory 38 of the remote storage device 26. The cache 242 includes a plurality of cache slots 244-246, each of which may be mapped to a track of a standard logical storage device 252. The cache 242 is similar to the cache 88 of FIG. 3 and may contain data that can be destaged to the standard logical storage device 252 of the remote storage device 26. The standard logical storage device 252 corresponds to the data element 62 shown in FIG. 2 and the disks 34a-34c shown in FIG. 1.

The remote storage device 26 also contains a pair of cache only virtual devices 254, 256. The cache only virtual devices 254, 256 corresponded device tables that may be stored, for example, in the memory 38 of the remote storage device 26. Each track entry of the tables of each of the cache only virtual devices (COVD) 254, 256 point to either a track of the standard logical device 252 or point to a slot of the cache 242. Cache only virtual devices are described in U.S. Pat. No. 7,113,945 which is incorporated by reference herein. Note, however, that the functionality described herein in connection with the COVD's may be implemented generally using tables having appropriate pointers that may point to cache slots as described herein.

The plurality of cache slots 244-246 may be used in connection to writes to the standard logical device 252 and, at the same time, used in connection with the cache only virtual devices 254, 256. In an embodiment herein, each of track table entries of the cache only virtual devices 254, 256 contain a null to indicate that the data for that track is stored on a corresponding track of the standard logical device 252. Otherwise, an entry in the track table for each of the cache only virtual devices 254, 256 contains a pointer to one of the slots 244-246 in the cache 242.

Each of the cache only virtual devices 254, 256 corresponds to one of the data chunks 56, 58. Thus, for example, the cache only virtual device 254 may correspond to the data chunk 56 while the cache only virtual device 256 may correspond to the data chunk 58. In an embodiment herein, one of the cache only virtual devices 254, 256 may be deemed "active" while the other one of the cache only virtual devices 254, 256 may be deemed "inactive". The inactive one of the cache only virtual devices 254, 256 may correspond to data being received from the local storage device 24 (i.e., the chunk 56) while the active one of the cache only virtual device 254, 256 corresponds to data being restored (written) to the standard logical device 252.

Data from the local storage device 24 that is received via the link 29 may be placed in one of the slots 244-246 of the cache 242. A corresponding pointer of the inactive one of the cache only virtual devices 254, 256 may be set to point to the received data. Subsequent data having the same sequence number may be processed in a similar manner. At some point, the local storage device 24 provides a message committing all of the data sent using the same sequence number. Once the data for a particular sequence number has been committed, the inactive one of the cache only virtual devices 254, 256 becomes active and vice versa. At that point, data from the now active one of the cache only virtual devices 254, 256 is copied to the standard logical device 252 while the inactive one of the cache only virtual devices 254, 256 is used to receive new data (having a new sequence number) transmitted from the local storage device 24 to the remote storage device 26.

As data is removed from the active one of the cache only virtual devices 254, 256 (discussed elsewhere herein), the corresponding entry in the active one of the cache only virtual devices 254, 256 may be set to null. In addition, the data may also be removed from the cache 244 (i.e., the slot returned to the pool of free slots for later use) provided that the data in the slot is not otherwise needed for another purpose (e.g., to be destaged to the standard logical device 252). A mechanism may be used to ensure that data is not removed from the cache 242 until all mirrors (including the cache only virtual devices 254, 256) are no longer using the data. Such a mechanism is described, for example, in U.S. Pat. No. 5,537,568 issued on Jul. 16, 1996 and in U.S. Pat. No. 6,594,742 issued on Jul. 15, 2003, both of which are incorporated by reference herein.

In some embodiments discussed elsewhere herein, the remote storage device 26 may maintain linked lists 258, 262 like the lists 74, 76 used by the local storage device 24. The lists 258, 262 may contain information that identifies the slots of the corresponding cache only virtual devices 254, 256 that have been modified, where one of the lists 258, 262 corresponds to one of the cache only virtual devices 254, 256 and the other one of the lists 258, 262 corresponds to the other one of the cache only virtual devices 254, 256. As discussed elsewhere herein, the lists 258, 262 may be used to facilitate restoring data from the cache only virtual devices 254, 256 to the standard logical device 252.

Figure 8:
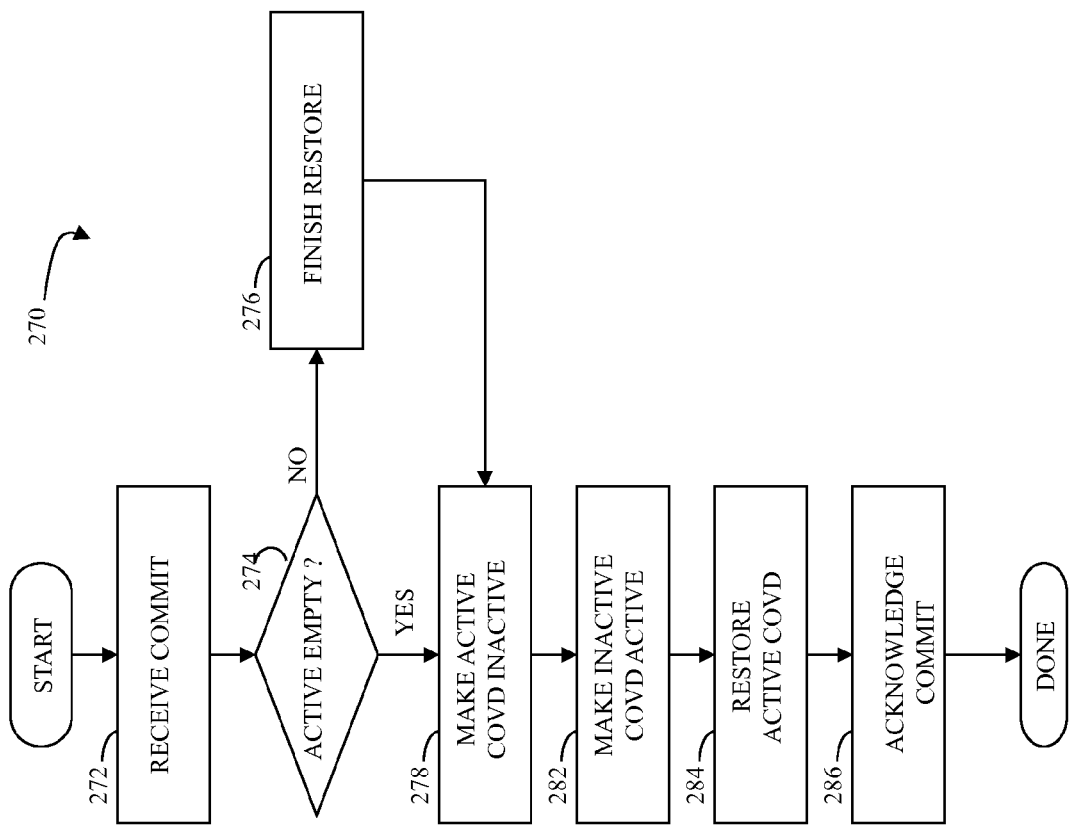
FIG. 8 is a flow chart illustrating steps performed by a remote storage device in connection with receiving 1a commit indicator from a local storage device according to an embodiment of the system described herein.

Referring to FIG. 8, a flow chart 270 illustrates steps performed by the remote storage device 26 in connection with processing data for a sequence number commit transmitted by the local storage device 24 to the remote storage device 26. As discussed elsewhere herein, the local storage device 24 periodically increments sequence numbers. When this occurs, the local storage device 24 finishes transmitting all of the data for the previous sequence number and then sends a commit message for the previous sequence number.

Processing begins at a first step 272 where the commit is received. Following the step 272 is a test step 274 which determines if the active one of the cache only virtual devices 254, 256 of the remote storage device 26 is empty. As discussed elsewhere herein, the inactive one of the cache only virtual devices 254, 256 of the remote storage device 26 is used to accumulate data from the local storage device 24 sent using RDF while the active one of the cache only virtual devices 254, 256 is restored to the standard logical device 252.

If it is determined at the test step 274 that the active one of the cache only virtual devices 254, 256 is not empty, then control transfers from the test step 274 to a step 276 where the restore for the active one of the cache only virtual devices 254, 256 is completed prior to further processing being performed. Restoring data from the active one of the cache only virtual devices 254, 256 is described in more detail elsewhere herein. It is useful that the active one of the cache only virtual devices 254, 256 is empty prior to handling the commit and beginning to restore data for the next sequence number.

Following the step 276 or following the step 274 if the active one of the cache only virtual devices 254, 256 is determined to be empty, is a step 278 where the active one of the cache only virtual devices 254, 256 is made inactive. Following the step 278 is a step 282 where the previously inactive one of the cache only virtual devices 254, 256 (i.e., the one that was inactive prior to execution of the step 278) is made active. Swapping the active and inactive cache only virtual devices 254, 256 at the steps 278, 282 prepares the now inactive (and empty) one of the cache only virtual devices 254, 256 to begin to receive data from the local storage device 24 for the next sequence number.

Following the step 282 is a step 284 where the active one of the cache only virtual devices 254, 256 is restored to the standard logical device 252 of the remote storage device 26. Restoring the active one of the cache only virtual devices 254, 256 to the standard logical device 252 is described in more detail hereinafter. However, note that, in some embodiments, the restore process is begun, but not necessarily completed, at the step 284. Following the step 284 is a step 286 where the commit that was sent from the local storage device 24 to the remote storage device 26 is acknowledged back to the local storage device 24 so that the local storage device 24 is informed that the commit was successful. Following the step 286, processing is complete.

Figure 9:
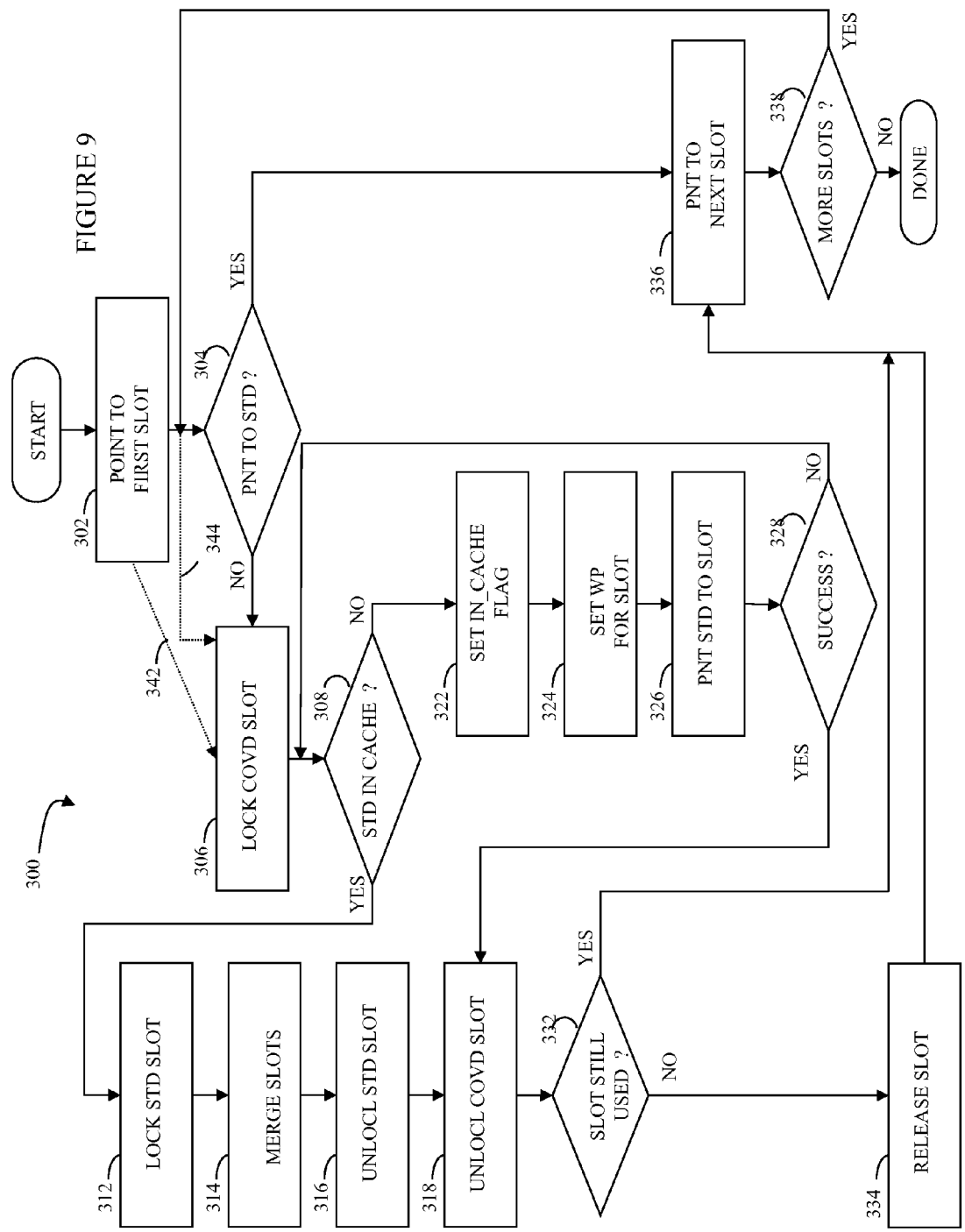
FIG. 9 is a flow chart illustrating storing transmitted data at a remote storage device according to an embodiment of the system described herein.

Referring to FIG. 9, a flow chart 300 illustrates in more detail the steps 276, 284 of FIG. 8 where the remote storage device 26 restores the active one of the cache only virtual devices 254, 256. Processing begins at a first step 302 where a pointer is set to point to the first slot of the active one of the cache only virtual devices 254, 256. The pointer is used to iterate through each track table entry of the active one of the cache only virtual devices 254, 256, each of which is processed individually. Following the step 302 is a test step 304 where it is determined if the track of the active one of the cache only virtual devices 254, 256 that is being processed points to the standard logical device 252. If so, then there is nothing to restore. Otherwise, control transfers from the step 304 to a step a 306 where the corresponding slot of the active one of the cache only virtual devices 254, 256 is locked.

Following the step 306 is a test step 308 which determines if the corresponding slot of the standard logical device 252 is already in the cache of the remote storage device 26. If so, then control transfers from the test step 308 to a step 312 where the slot of the standard logical device is locked. Following step 312 is a step 314 where the data from the active one of the cache only virtual devices 254, 256 is merged with the data in the cache for the standard logical device 252. Merging the data at the step 314 involves overwriting the data for the standard logical device with the new data of the active one of the cache only virtual devices 254, 256. Note that, in embodiments that provide for record level flags, it may be possible to simply OR the new records from the active one of the cache only virtual devices 254, 256 to the records of the standard logical device 252 in the cache. That is, if the records are interleaved, then it is only necessary to use the records from the active one of the cache only virtual devices 254, 256 that have changed and provide the records to the cache slot of the standard logical device 252. Following step 314 is a step 316 where the slot of the standard logical device 252 is unlocked. Following step 316 is a step 318 where the slot of the active one of the cache only virtual devices 254, 256 that is being processed is also unlocked.

If it is determined at the test step 308 that the corresponding slot of the standard logical device 252 is not in cache, then control transfers from the test step 308 to a step 322 where the track entry for the slot of the standard logical device 252 is changed to indicate that the slot of the standard logical device 252 is in cache (e.g., an IN_CACHE flag may be set) and needs to be destaged. As discussed elsewhere herein, in some embodiments, only records of the track having appropriate mirror bits set may need to be destaged. Following the step 322 is a step 324 where a flag for the track may be set to indicate that the data for the track is in the cache.

Following the step 324 is a step 326 where the slot pointer for the standard logical device 252 is changed to point to the slot in the cache. Following the step 326 is a test step 328 which determines if the operations performed at the steps 322, 324, 326 have been successful. In some instances, a single operation called a "compare and swap" operation may be used to perform the steps 322, 324, 326. If these operations are not successful for any reason, then control transfers from the step 328 back to the step 308 to reexamine if the corresponding track of the standard logical device 252 is in the cache. Otherwise, if it is determined at the test step 328 that the previous operations have been successful, then control transfers from the test step 328 to the step 318, discussed above.

Following the step 318 is a test step 332 which determines if the cache slot of the active one of the cache only virtual devices 254, 256 (which is being restored) is still being used. In some cases, it is possible that the slot for the active one of the cache only virtual devices 254, 256 is still being used by another mirror. If it is determined at the test step 332 that the slot of the cache only virtual device is not being used by another mirror, then control transfers from the test step 332 to a step 334 where the slot is released for use by other processes (e.g., restored to pool of available slots, as discussed elsewhere herein). Following the step 334 is a step 336 to point to the next slot to process the next slot of the active one of the cache only virtual devices 254, 256. Note that the step 336 is also reached from the test step 332 if it is determined at the step 332 that the active one of the cache only virtual devices 254, 256 is still being used by another mirror. Note also that the step 336 is reached from the test step 304 if it is determined at the step 304 that, for the slot being processed, the active one of the cache only virtual devices 254, 256 points to the standard logical device 252. Following the step 336 is a test step 338 which determines if there are more slots of the active one of the cache only virtual devices 254, 256 to be processed. If not, processing is complete. Otherwise, control transfers from the test step 338 back to the step 304.

In another embodiment, it is possible to construct lists of modified slots for the received chunk of data 56 corresponding to the N−1 cycle on the remote storage device 26, such as the lists 258, 262 shown in FIG. 7. As the data is received, the remote storage device 26 constructs a linked list of modified slots. The lists that are constructed may be circular, linear (with a NULL termination), or any other appropriate design. The lists may then be used to restore the active one of the cache only virtual devices 254, 256.

The flow chart 300 of FIG. 9 shows two alternative paths 342, 344 that illustrate operation of embodiments where a list of modified slots is used. At the step 302, a pointer (used for iterating through the list of modified slots) is made to point to the first element of the list. Following the step 302 is the step 306, which is reached by the alternative path 342. In embodiments that use lists of modified slots, the test step 304 is not needed since no slots on the list should point to the standard logical device 252.

Following the step 306, processing continues as discussed above with the previous embodiment, except that the step 336 refers to traversing the list of modified slots rather than pointing to the next slot in the COVD. Similarly, the test at the step 338 determines if the pointer is at the end of the list (or back to the beginning in the case of a circular linked list). Also, if it is determined at the step 338 that there are more slots to process, then control transfers from the step 338 to the step 306, as illustrated by the alternative path 344. As discussed above, for embodiments that use a list of modified slots, the step 304 may be eliminated.

Figure 10:
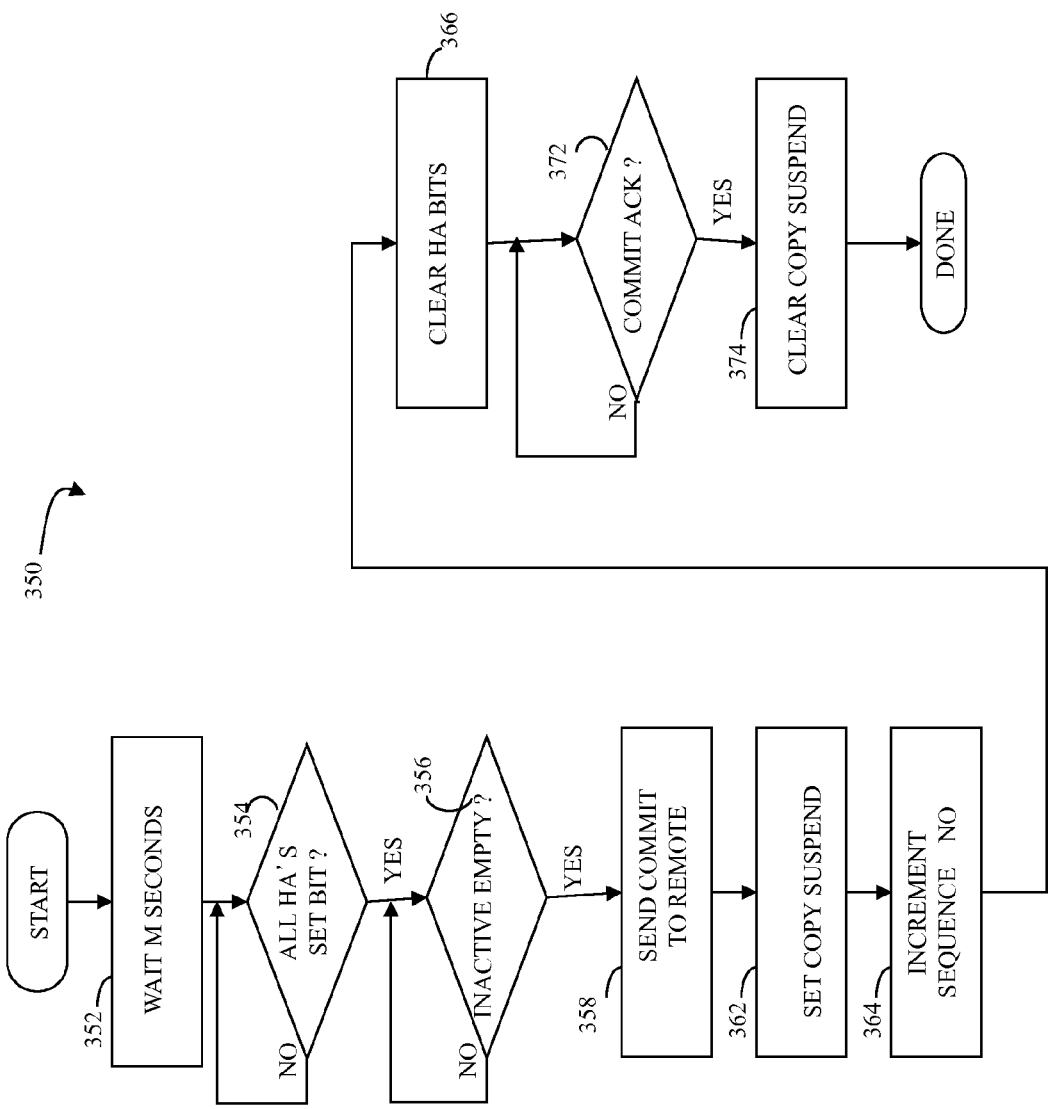
FIG. 10 is a flow chart illustrating steps performed in connection with a local storage device incrementing a sequence number according to a system described herein.

Referring to FIG. 10, a flow chart 350 illustrates steps performed in connection with the local storage device 24 increasing the sequence number. Processing begins at a first step 352 where the local storage device 24 waits at least M seconds prior to increasing the sequence number. In an embodiment herein, M is thirty, but of course M could be any number. Larger values for M increase the amount of data that may be lost if communication between the storage devices 24, 26 is disrupted. However, smaller values for M increase the total amount of overhead caused by incrementing the sequence number more frequently.

Following the step 352 is a test step 354 which determines if all of the HA's of the local storage device 24 have set a bit indicating that the HA's have completed all of the I/O's for a previous sequence number. When the sequence number changes, each of the HA's notices the change and sets a bit indicating that all I/O's of the previous sequence number are completed. For example, if the sequence number changes from N−1 to N, an HA will set the bit when the HA has completed all I/O's for sequence number N−1. Note that, in some instances, a single I/O for an HA may take a long time and may still be in progress even after the sequence number has changed. Note also that, for some systems, a different mechanism may be used to determine if all of the HA's have completed their N−1 I/O's. The different mechanism may include examining device tables in the memory 37.

If it is determined at the test step 354 that I/O's from the previous sequence number have been completed, then control transfers from the step 354 to a test step 356 which determines if the inactive one of the lists 74, 76 is empty. Note that a sequence number switch may not be made unless and until all of the data corresponding to the inactive one of the lists 74, 76 has been completely transmitted from the local storage device 24 to the remote storage device 26 using the RDF protocol. Once the inactive one of the lists 74, 76 is determined to be empty, then control transfers from the step 356 to a step 358 where the commit for the previous sequence number is sent from the local storage device 24 to the remote storage device 26. As discussed above, the remote storage device 26 receiving a commit message for a particular sequence number will cause the remote storage device 26 to begin restoring the data corresponding to the sequence number.

Following the step 358 is a step 362 where the copying of data for the inactive one of the lists 74, 76 is suspended. As discussed elsewhere herein, the inactive one of the lists is scanned to send corresponding data from the local storage device 24 to the remote storage device 26. It is useful to suspend copying data until the sequence number switch is completed. In an embodiment herein, the suspension is provided by sending a message to the RA's 30a-30c. However, it will be appreciated by one of ordinary skill in the art that for embodiments that use other components to facilitate sending data using the system described herein, suspending copying may be provided by sending appropriate messages/commands to the other components.

Following step 362 is a step 364 where the sequence number is incremented. Following step 364 is a step 366 where the bits for the HA's that are used in the test step 354 are all cleared so that the bits may be set again in connection with the increment of the sequence number. Following step 366 is a test step 372 which determines if the remote storage device 26 has acknowledged the commit message sent at the step 358. Acknowledging the commit message is discussed above in connection with FIG. 8. Once it is determined that the remote storage device 26 has acknowledged the commit message sent at the step 358, control transfers from the step 372 to a step 374 where the suspension of copying, which was provided at the step 362, is cleared so that copying may resume. Following step 374, processing is complete. Note that it is possible to go from the step 374 back to the step 352 to begin a new cycle to continuously increment the sequence number.

It is also possible to use COVD's on the R1 device to collect slots associated with active data and inactive chunks of data. In that case, just as with the R2 device, one COVD could be associated with the inactive sequence number and another COVD could be associated with the active sequence number. This is described below.

Figure 11:
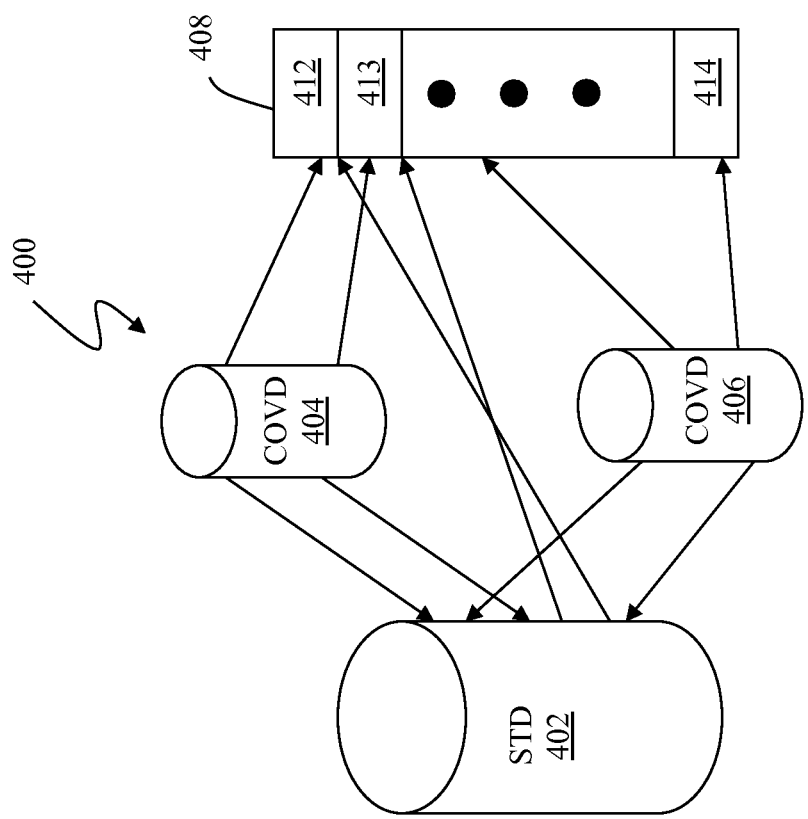
FIG. 11 is a schematic diagram illustrating items for constructing and manipulating chunks of data on a local storage device according to an alternative embodiment of the system described herein.

Referring to FIG. 11, a diagram 400 illustrates items used to construct and maintain the chunks 52, 54. A standard logical device 402 contains data written by the host 22 and corresponds to the data element 51 of FIG. 2 and the disks 33a-33c of FIG. 1. The standard logical device 402 contains data written by the host 22 to the local storage device 24.

Two cache only virtual devices 404, 406 are used in connection with the standard logical device 402. The cache only virtual devices 404, 406 corresponded device tables that may be stored, for example, in the memory 37 of the local storage device 24. Each track entry of the tables of each of the cache only virtual devices 404, 406 point to either a track of the standard logical device 402 or point to a slot of a cache 408 used in connection with the local storage device 24. In some embodiments, the cache 408 may be provided in the memory 37 of the local storage device 24.

The cache 408 contains a plurality of cache slots 412-414 that may be used in connection to writes to the standard logical device 402 and, at the same time, used in connection with the cache only virtual devices 404, 406. In an embodiment herein, each track table entry of the cache only virtual devices 404, 406 contains a null to point to a corresponding track of the standard logical device 402. Otherwise, an entry in the track table for each of the cache only virtual devices 404, 406 contains a pointer to one of the slots 412-414 in the cache 408.

Each of the cache only virtual devices 404, 406 may be used for one of the chunks of data 52, 54 so that, for example, the cache only virtual device 404 may correspond to the chunk of data 52 for sequence number N while the cache only virtual device 406 may correspond to the chunk of data 54 for sequence number N−1. Thus, when data is written by the host 22 to the local storage device 24, the data is provided to the cache 408 and an appropriate pointer of the cache only virtual device 404 is adjusted. Note that the data will not be removed from the cache 408 until the data is destaged to the standard logical device 402 and the data is also released by the cache only virtual device 404, as described elsewhere herein.

In an embodiment herein, one of the cache only virtual devices 404, 406 is deemed "active" while the other is deemed "inactive". Thus, for example, when the sequence number N is even, the cache only virtual device 404 may be active while the cache only virtual device 406 is inactive. The active one of the cache only virtual devices 404, 406 handles writes from the host 22 while the inactive one of the cache only virtual devices 404, 406 corresponds to the data that is being transmitted from the local storage device 24 to the remote storage device 26.

While the data that is written by the host 22 is accumulated using the active one of the cache only virtual devices 404, 406 (for the sequence number N), the data corresponding to the inactive one of the cache only virtual devices 404, 406 (for previous sequence number N−1) is transmitted from the local storage device 24 to the remote storage device 26. For this and related embodiments, the DA's 35a-35c of the local storage device handle scanning the inactive one of the cache only virtual devices 404, 406 to send copy requests to one or more of the RA's 30a-30c to transmit the data from the local storage device 24 to the remote storage device 26. Thus, the steps 362, 374, discussed above in connection with suspending and resuming copying, may include providing messages/commands to the DA's 35a-35c.

Once the data has been transmitted to the remote storage device 26, the corresponding entry in the inactive one of the cache only virtual devices 404, 406 may be set to null. In addition, the data may also be removed from the cache 408 (i.e., the slot returned to the pool of slots for later use) if the data in the slot is not otherwise needed for another purpose (e.g., to be destaged to the standard logical device 402). A mechanism may be used to ensure that data is not removed from the cache 408 until all mirrors (including the cache only virtual devices 404, 406) are no longer using the data. Such a mechanism is described, for example, in U.S. Pat. No. 5,537,568 issued on Jul. 16, 1996 and in U.S. Pat. No. 6,594,742 issued on Jul. 15, 2003, both of which are incorporated by reference herein.

Figure 12:
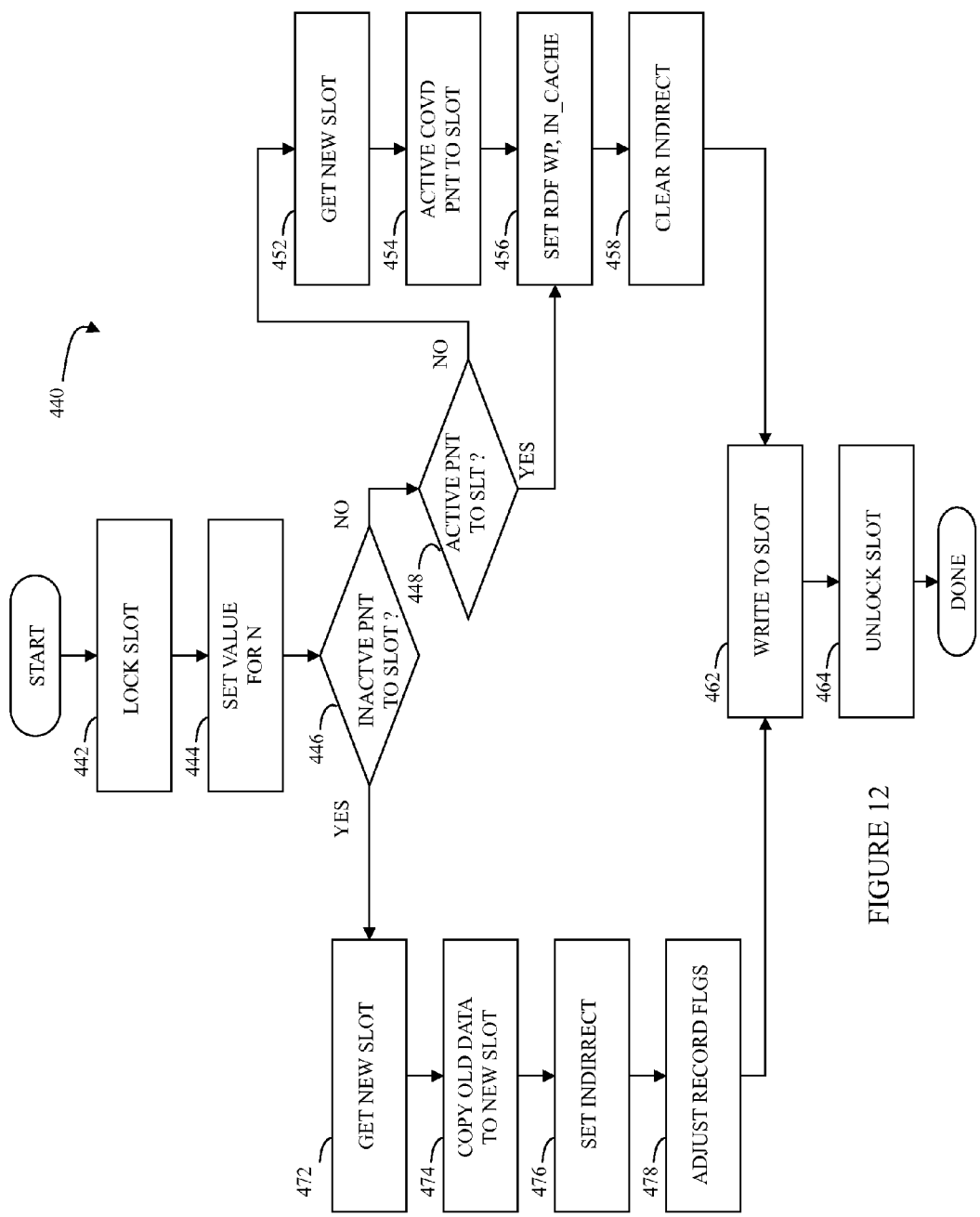
FIG. 12 is a flow chart illustrating operation of a host adaptor (HA) in response to a write by a host according to an alternative embodiment of the system described herein.

Referring to FIG. 12, a flow chart 440 illustrates steps performed by the HA 28 in connection with a host 22 performing a write operation for embodiments where two COVD's are used by the R1 device to provide the system described herein. Processing begins at a first step 442 where a slot corresponding to the write is locked. In an embodiment herein, each of the slots 412-414 of the cache 408 corresponds to a track of data on the standard logical device 402. Locking the slot at the step 442 prevents additional processes from operating on the relevant slot during the processing performed by the HA 28 corresponding to the steps of the flow chart 440.

Following the step 442 is a step 444 where a value for N, the sequence number, is set. Just as with the embodiment that uses lists rather than COVD's on the R1 side, the value for the sequence number obtained at the step 444 is maintained during the entire write operation performed by the HA 28 while the slot is locked. As discussed elsewhere herein, the sequence number is assigned to each write to set the one of the chunks of data 52, 54 to which the write belongs. Writes performed by the host 22 are assigned the current sequence number. It is useful that a single write operation maintain the same sequence number throughout.

Following the step 444 is a test step 446, which determines if the inactive one of the cache only virtual devices 404, 406 already points to the slot that was locked at the step 442 (the slot being operated upon). This may occur if a write to the same slot was provided when the sequence number was one less than the current sequence number. The data corresponding to the write for the previous sequence number may not yet have been transmitted to the remote storage device 26.

If it is determined at the test step 446 that the inactive one of the cache only virtual devices 404, 406 does not point to the slot, then control transfers from the test step 446 to another test step 448, where it is determined if the active one of the cache only virtual devices 404, 406 points to the slot. It is possible for the active one of the cache only virtual devices 404, 406 to point to the slot if there had been a previous write to the slot while the sequence number was the same as the current sequence number. If it is determined at the test step 448 that the active one of the cache only virtual devices 404, 406 does not point to the slot, then control transfers from the test step 448 to a step 452 where a new slot is obtained for the data. Following the step 452 is a step 454 where the active one of the cache only virtual devices 404, 406 is made to point to the slot.

Following the step 454, or following the step 448 if the active one of the cache only virtual devices 404, 406 points to the slot, is a step 456 where flags are set. At the step 456, the RDF_WP flag (RDF write pending flag) is set to indicate that the slot needs to be transmitted to the remote storage device 26 using RDF. In addition, at the step 456, the IN_CACHE flag is set to indicate that the slot needs to be destaged to the standard logical device 402. Note that, in some instances, if the active one of the cache only virtual devices 404, 406 already points to the slot (as determined at the step 448) it is possible that the RDF_WP and IN_CACHE flags were already set prior to execution of the step 456. However, setting the flags at the step 456 ensures that the flags are set properly no matter what the previous state.

Following the step 456 is a step 458 where an indirect flag in the track table that points to the slot is cleared, indicating that the relevant data is provided in the slot and not in a different slot indirectly pointed to. Following the step 458 is a step 462 where the data being written by the host 22 and the HA 28 is written to the slot. Following the step 462 is a step 464 where the slot is unlocked. Following step 464, processing is complete.

If it is determined at the test step 446 that the inactive one of the cache only virtual devices 404, 406 points to the slot, then control transfers from the step 446 to a step 472, where a new slot is obtained. The new slot obtained at the step 472 may be used for the inactive one of the cache only virtual devices 404, 406 to effect the RDF transfer while the old slot may be associated with the active one of the cache only virtual devices 404, 406, as described below.

Following the step 472 is a step 474 where the data from the old slot is copied to the new slot that was obtained at the step 472. Following the step 474 is a step 476 where the indirect flag (discussed above) is set to indicate that the track table entry for the inactive one of the cache only virtual devices 404, 406 points to the old slot but that the data is in the new slot which is pointed to by the old slot. Thus, setting indirect flag at the step 476 affects the track table of the inactive one of the cache only virtual devices 404, 406 to cause the track table entry to indicate that the data is in the new slot.

Following the step 476 is a step 478 where the mirror bits for the records in the new slot are adjusted. Any local mirror bits that were copied when the data was copied from the old slot to the new slot at the step 474 are cleared since the purpose of the new slot is to simply effect the RDF transfer for the inactive one of the cache only virtual devices. The old slot will be used to handle any local mirrors. Following the step 478 is the step 462 where the data is written to the slot. Following step 462 is the step 464 where the slot is unlocked. Following the step 464, processing is complete.

Figure 13:
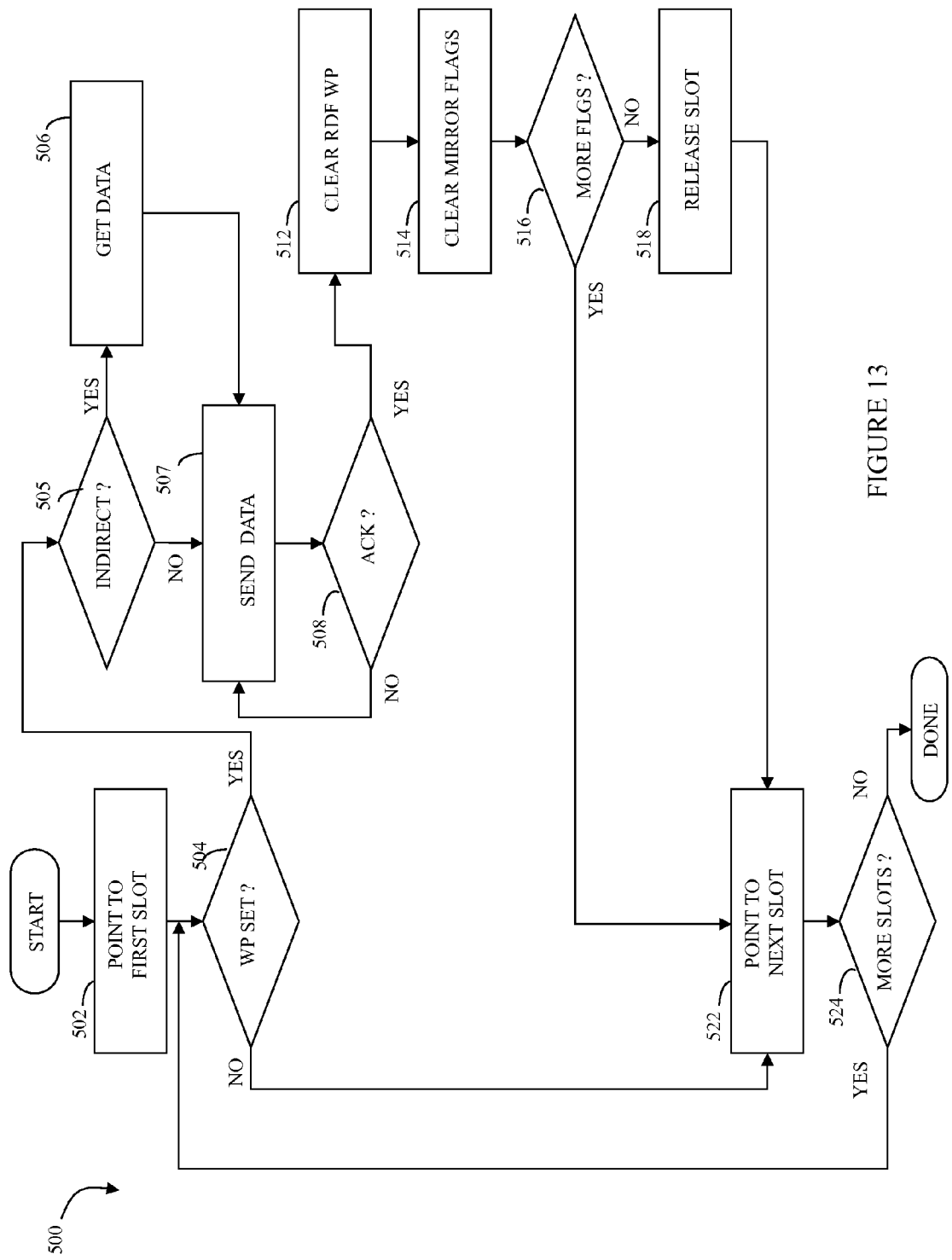
FIG. 13 is a flow chart illustrating transferring data from a local storage device to a remote storage device according to an alternative embodiment of the system described herein.

Referring to FIG. 13, a flow chart 500 illustrates steps performed in connection with the local storage device 24 transmitting the chunk of data 54 to the remote storage device 26. The transmission essentially involves scanning the inactive one of the cache only virtual devices 404, 406 for tracks that have been written thereto during a previous iteration when the inactive one of the cache only virtual devices 404, 406 was active. In this embodiment, the DA's 35a-35c of the local storage device 24 scan the inactive one of the cache only virtual devices 404, 406 to copy the data for transmission to the remote storage device 26 by one or more of the RA's 30a-30c using the RDF protocol.

Processing begins at a first step 502 where the first track of the inactive one of the cache only virtual devices 404, 406 is pointed to in order to begin the process of iterating through all of the tracks. Following the first step 502 is a test step 504 where it is determined if the RDF_WP flag is set. As discussed elsewhere herein, the RDF_WP flag is used to indicate that a slot (track) contains data that needs to be transmitted via the RDF link. The RDF_WP flag being set indicates that at least some data for the slot (track) is to be transmitted using RDF. In an embodiment herein, the entire slot is not transmitted. Rather, only records within the slot that have the appropriate mirror bits set (indicating the records have changed) are transmitted to the remote storage device 26. However, in other embodiments, it may be possible to transmit the entire slot, provided that the remote storage device 26 only writes data corresponding to records having appropriate mirror bits set and ignores other data for the track, which may or may not be valid.

If it is determined at the test step 504 that the cache slot being processed has the RDF_WP flag set, then control transfers from the step 504 to a test step 505, where it is determined if the slot contains the data or if the slot is an indirect slot that points to another slot that contains the relevant data. In some instances, a slot may not contain the data for the portion of the disk that corresponds to the slot. Instead, the slot may be an indirect slot that points to another slot that contains the data. If it is determined at the step 505 that the slot is an indirect slot, then control transfers from the step 505 to a step 506, where the data (from the slot pointed to by the indirect slot) is obtained. Thus, if the slot is a direct slot, the data for being sent by RDF is stored in the slot while if the slot is an indirect slot, the data for being sent by RDF is in another slot pointed to by the indirect slot.

Following the step 506 or the step 505 if the slot is a direct slot is a step 507 where data being sent (directly or indirectly from the slot) is copied by one of the DA's 35a-35c to be sent from the local storage device 24 to the remote storage device 26 using the RDF protocol. Following the step 507 is a test step 508 where it is determined if the remote storage device 26 has acknowledged receipt of the data. If not, then control transfers from the step 508 back to the step 507 to resend the data. In other embodiments, different and more involved processing may used to send data and acknowledge receipt thereof. Such processing may include error reporting and alternative processing that is performed after a certain number of attempts to send the data have failed.

Once it is determined at the test step 508 that the data has been successfully sent, control passes from the step 508 to a step 512 to clear the RDF_WP flag (since the data has been successfully sent via RDF). Following the step 512 is a step 514 where appropriate mirror flags are cleared to indicate that at least the RDF mirror (R2) no longer needs the data. In an embodiment herein, each record that is part of a slot (track) has individual mirror flags indicating which mirrors use the particular record. The R2 device is one of the mirrors for each of the records and it is the flags corresponding to the R2 device that are cleared at the step 514.

Following the step 514 is a test step 516 which determines if any of the records of the track being processed have any other mirror flags set (for other mirror devices). If not, then control passes from the step 516 to a step 518 where the slot is released (i.e., no longer being used). In some embodiments, unused slots are maintained in a pool of slots available for use. Note that if additional flags are still set for some of the records of the slot, it may mean that the records need to be destaged to the standard logical device 402 or are being used by some other mirror (including another R2 device). Following the step 518, or following the step 516 if more mirror flags are present, is a step 522 where the pointer that is used to iterate through each track entry of the inactive one of the cache only virtual devices 404, 406 is made to point to the next track. Following the step 522 is a test step 524 which determines if there are more tracks of the inactive one of the cache only virtual devices 404, 406 to be processed. If not, then processing is complete. Otherwise, control transfers back to the test step 504, discussed above. Note that the step 522 is also reached from the test step 504 if it is determined that the RDF_WP flag is not set for the track being processed.

Figure 14:
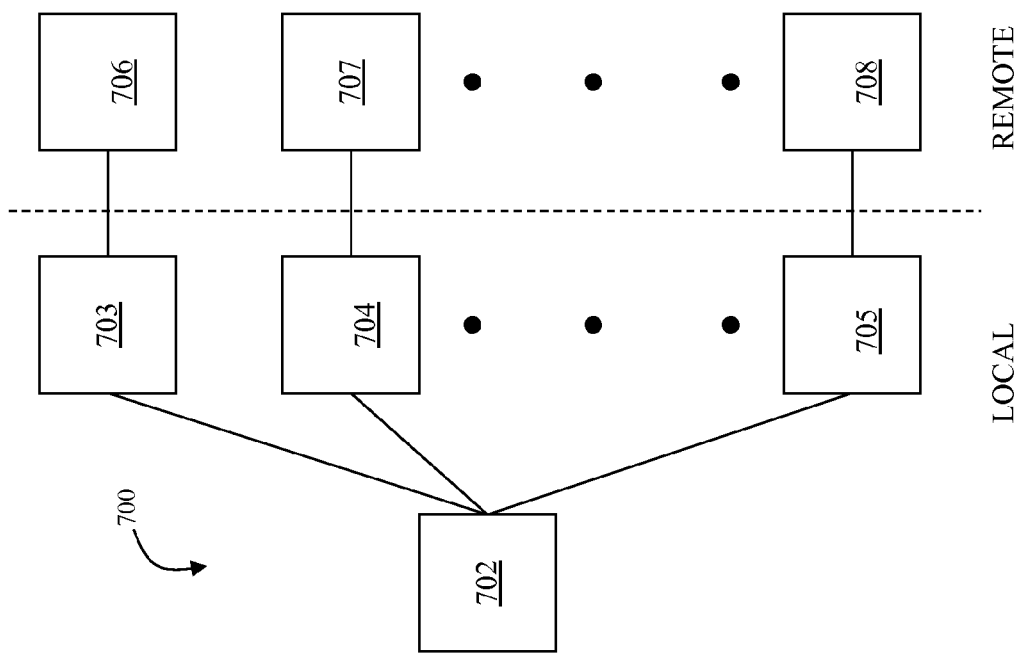
FIG. 14 is a schematic diagram illustrating a plurality of local and remote storage devices with a host according to an embodiment of the system described herein.

Referring to FIG. 14, a diagram 700 illustrates a host 702 coupled to a plurality of local storage devices 703-705. The diagram 700 also shows a plurality of remote storage devices 706-708. Although only three local storage devices 703-705 and three remote storage devices 706-708 are shown in the diagram 700, the system described herein may be expanded to use any number of local and remote storage devices.

Each of the local storage devices 703-705 is coupled to a corresponding one of the remote storage devices 706-708 so that, for example, the local storage device 703 is coupled to the remote storage device 706, the local storage device 704 is coupled to the remote storage device 707 and the local storage device 705 is coupled to the remote storage device 708. The local storage device is 703-705 and remote storage device is 706-708 may be coupled using the ordered writes mechanism described herein so that, for example, the local storage device 703 may be coupled to the remote storage device 706 using the ordered writes mechanism. As discussed elsewhere herein, the ordered writes mechanism allows data recovery using the remote storage device in instances where the local storage device and/or host stops working and/or loses data.

In some instances, the host 702 may run a single application that simultaneously uses more than one of the local storage devices 703-705. In such a case, the application may be configured to insure that application data is consistent (recoverable) at the local storage devices 703-705 if the host 702 were to cease working at any time and/or if one of the local storage devices 703-705 were to fail. However, since each of the ordered write connections between the local storage devices 703-705 and the remote storage devices 706-708 is asynchronous from the other connections, then there is no assurance that data for the application will be consistent (and thus recoverable) at the remote storage devices 706-708. That is, for example, even though the data connection between the local storage device 703 and the remote storage device 706 (a first local/remote pair) is consistent and the data connection between the local storage device 704 and the remote storage device 707 (a second local/remote pair) is consistent, it is not necessarily the case that the data on the remote storage devices 706, 707 is always consistent if there is no synchronization between the first and second local/remote pairs.

For applications on the host 702 that simultaneously use a plurality of local storage devices 703-705, it is desirable to have the data be consistent and recoverable at the remote storage devices 706-708. This may be provided by a mechanism whereby the host 702 controls cycle switching at each of the local storage devices 703-705 so that the data from the application running on the host 702 is consistent and recoverable at the remote storage devices 706-708. This functionality is provided by a special application that runs on the host 702 that switches a plurality of the local storage devices 703-705 into multi-box mode, as described in more detail below.

Figure 15:
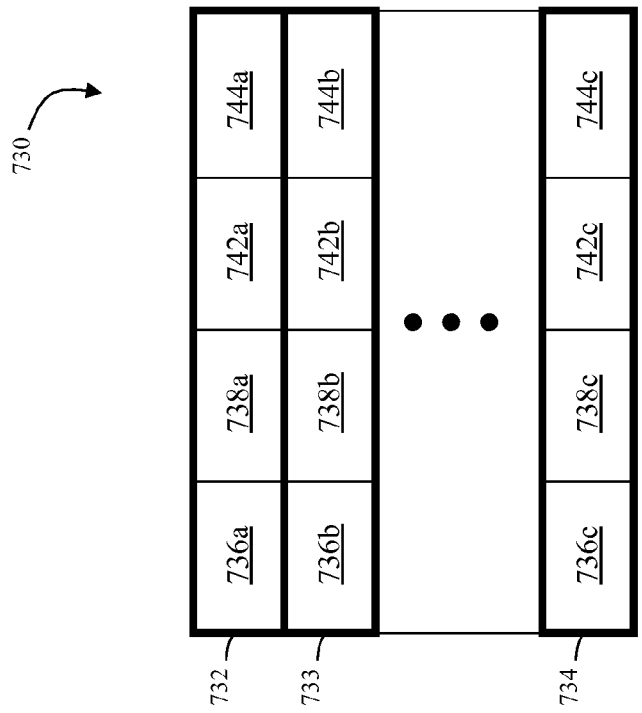
FIG. 15 is a diagram showing a multi-box mode table used in connection with the system described herein.

Referring to FIG. 15, a table 730 has a plurality of entries 732-734. Each of the entries 732-734 correspond to a single local/remote pair of storage devices so that, for example, the entry 732 may correspond to pair of the local storage device 703 and the remote storage device 706, the entry 733 may correspond to pair of the local storage device 704 and the remote storage device 707 and the entry 734 may correspond to the pair of local storage device 705 and the remote storage device 708. Each of the entries 732-734 has a plurality of fields where a first field 736a-736c represents a serial number of the corresponding local storage device, a second field 738a-738c represents a session number used by the multi-box group, a third field 742a-742c represents the serial number of the corresponding remote storage device of the local/remote pair, and a fourth field 744a-744c represents the session number for the multi-box group. The table 730 is constructed and maintained by the host 702 in connection with operating in multi-box mode. In addition, the table 730 is propagated to each of the local storage devices and the remote storage devices that are part of the multi-box group. The table 730 may be used to facilitate recovery, as discussed in more detail below.

Different local/remote pairs may enter and exit multi-box mode independently in any sequence and at any time. The host 702 manages entry and exit of local storage device/remote storage device pairs into and out of multi-box mode. This is described in more detail below.

Figure 16:
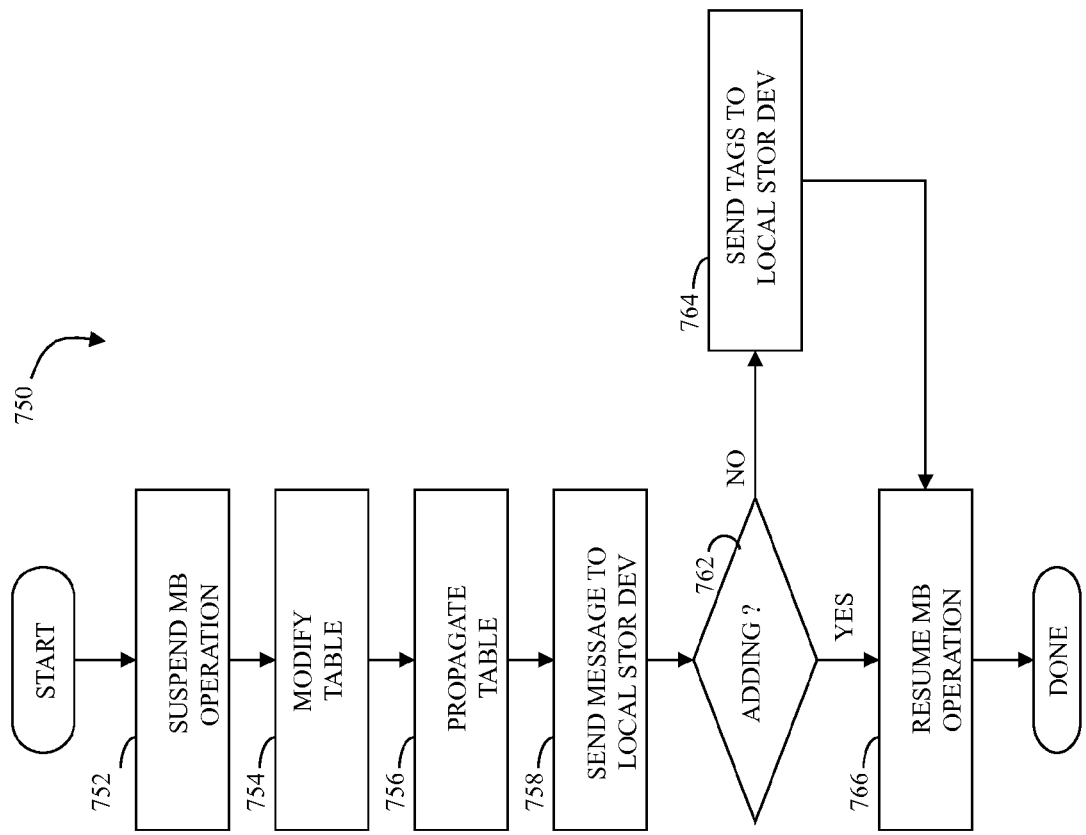
FIG. 16 is a flow chart illustrating modifying a multi-box mode table according to an embodiment of the system described herein.

Referring to FIG. 16, a flowchart 750 illustrates steps performed by the host 702 in connection with entry or exit of a local/remote pair in to or out of multi-box mode. Processing begins at a first step 752 where multi-box mode operation is temporarily suspended. Temporarily suspending multi-box operation at the step 752 is useful to facilitate the changes that are made in connection with entry or exit of a remote/local pair in to or out of multi-box mode. Following the step 752, is a step 754 where a table like the table 730 of FIG. 15 is modified to either add or delete an entry, as appropriate. Following the step 754 is a step 756 where the modified table is propagated to the local storage devices and remote storage devices of the multi-box group. Propagating the table at the step 756 facilitates recovery, as discussed in more detail elsewhere herein.

Following the step 756 is a step 758 where a message is sent to the affected local storage device to provide the change. The local storage device may configure itself to run in multi-box mode or not, as described in more detail elsewhere herein. As discussed in more detail below, a local storage device handling ordered writes operates differently depending upon whether it is operating as part of a multi-box group or not. If the local storage device is being added to a multi-box group, the message sent at the step 758 indicates to the local storage device that it is being added to a multi-box group so that the local storage device should configure itself to run in multi-box mode. Alternatively, if a local storage device is being removed from a multi-box group, the message sent at the step 758 indicates to the local storage device that it is being removed from the multi-box group so that the local storage device should configure itself to not run in multi-box mode.

Following step 758 is a test step 762 where it is determined if a local/remote pair is being added to the multi-box group (as opposed to being removed). If so, then control transfers from the test step 762 to a step 764 where tag values are sent to the local storage device that is being added. The tag values are provided with the data transmitted from the local storage device to the remote storage device in a manner similar to providing the sequence numbers with the data. The tag values are controlled by the host and set so that all of the local/remote pairs send data having the same tag value during the same cycle. Use of the tag values is discussed in more detail below. Following the step 764, or following the step 762 if a new local/remote pair is not being added, is a step 766 where multi-box operation is resumed. Following the step 766, processing is complete.

Figure 17:
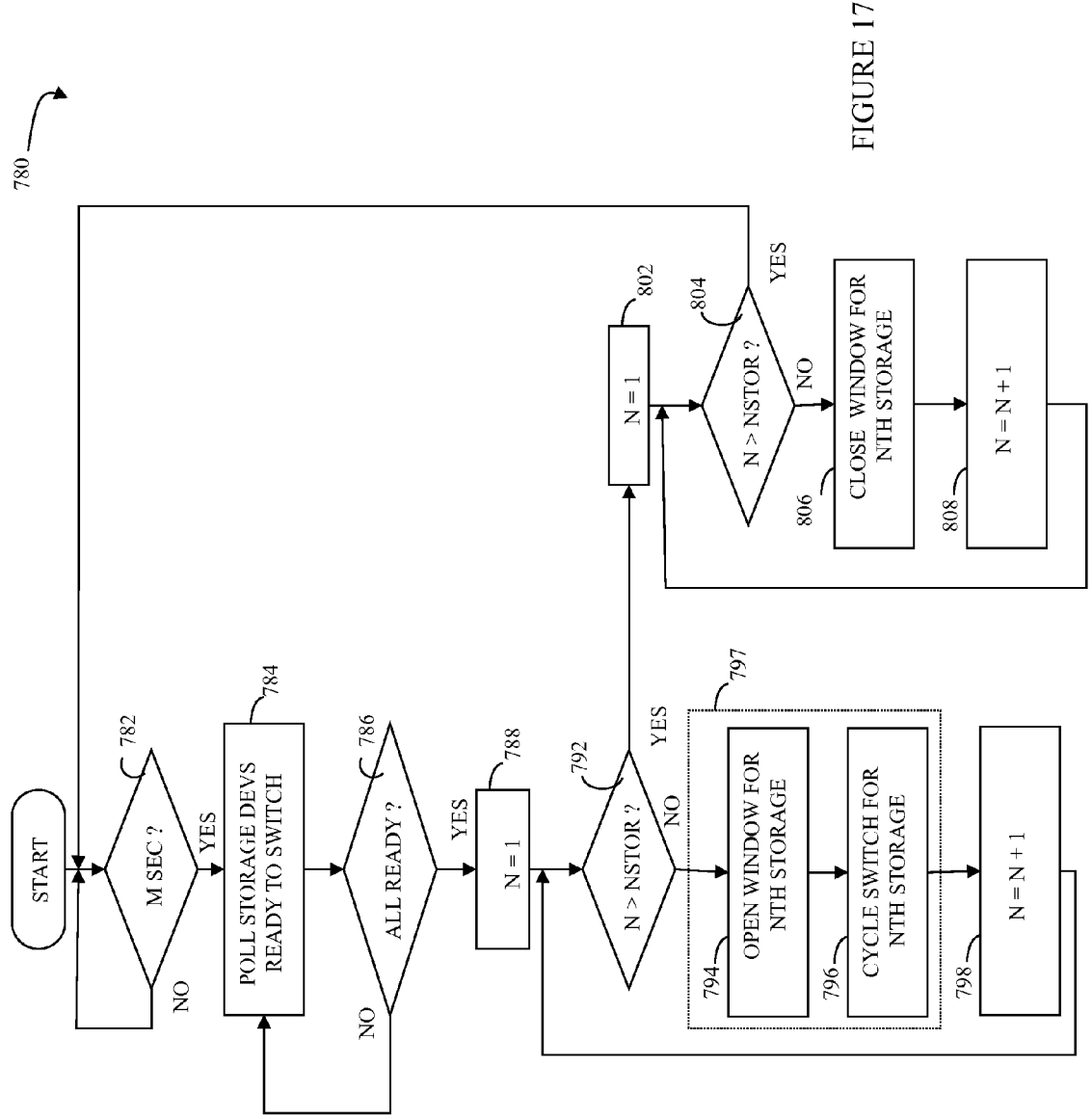
FIG. 17 is a flow chart illustrating cycle switching by the host according to an embodiment of the system described herein.

Referring to FIG. 17, a flow chart 780 illustrates steps performed in connection with the host managing cycle switching for multiple local/remote pairs running as a group in multi-box mode. As discussed elsewhere herein, multi-box mode involves having the host synchronize cycle switches for more than one remote/local pair to maintain data consistency among the remote storage devices. Cycle switching is coordinated by the host rather than being generated internally by the local storage devices. This is discussed in more detail below.

Processing for the flow chart 780 begins at a test step 782 which determines if M seconds have passed. Just as with non-multi-box operation, cycle switches occur no sooner than every M seconds where M is a number chosen to optimize various performance parameters. As the number M is increased, the amount of overhead associated with switching decreases. However, increasing M also causes the amount of data that may be potentially lost in connection with a failure to also increase. In an embodiment herein, M is chosen to be thirty seconds, although, obviously other values for M may be used.

If it is determined at the test step 782 that M seconds have not passed, then control transfers back to the step 782 to continue waiting until M seconds have passed. Once it is determined at the test step 782 that M seconds have passed, control transfers from the step 782 to a step 784 where the host queries all of the local storage devices in the multi-box group to determine if all of the local/remote pairs are ready to switch. The local/remote pairs being ready to switch is discussed in more detail hereinafter.

Following the step 784 is a test step 786 which determines if all of the local/remote pairs are ready to switch. If not, control transfers back to the step 784 to resume the query. In an embodiment herein, it is only necessary to query local/remote pairs that were previously not ready to switch since, once a local/remote pair is ready to switch, the pair remains so until the switch occurs.

Once it is determined at the test step 786 that all of the local/remote pairs in the multi-box group are ready to switch, control transfers from the step 786 to a step 788 where an index variable, N, is set equal to one. The index variable N is used to iterate through all the local/remote pairs (i.e., all of the entries 732-734 of the table 730 of FIG. 15). Following the step 788 is a test step 792 which determines if the index variable, N, is greater than the number of local/remote pairs in the multi-box group. If not, then control transfers from the step 792 to a step 794 where an open window is performed for the Nth local storage device of the Nth pair by the host sending a command (e.g., an appropriate system command) to the Nth local storage device. Opening the window for the Nth local storage device at the step 794 causes the Nth local storage device to suspend writes so that any write by a host that is not begun prior to opening the window at the step 794 will not be completed until the window is closed (described below). Not completing a write operation prevents a second dependant write from occurring prior to completion of the cycle switch.

Any writes in progress that were begun before opening the window may complete prior to the window being closed.

Following the step 794 is a step 796 where a cycle switch is performed for the Nth local storage device. Performing the cycle switch at the step 796 involves sending a command from the host 702 to the Nth local storage device. Processing the command from the host by the Nth local storage device is discussed in more detail below. Part of the processing performed at the step 796 may include having the host provide new values for the tags that are assigned to the data. The tags are discussed in more detail elsewhere herein. In an alternative embodiment, the operations performed at the steps 794, 796 may be performed as a single integrated step 797, which is illustrated by the box drawn around the steps 794, 796.

Following the step 796 is a step 798 where the index variable, N, is incremented. Following step 798, control transfers back to the test step 792 to determine if the index variable, N, is greater than the number of local/remote pairs.

If it is determined at the test step 792 that the index variable, N, is greater than the number of local/remote pairs, then control transfers from the test step 792 to a step 802 where the index variable, N, is set equal to one. Following the step 802 is a test step 804 which determines if the index variable, N, is greater than the number of local/remote pairs. If not, then control transfers from the step 804 to a step 806 where the window for the Nth local storage device is closed. Closing the window of the step 806 is performed by the host sending a command to the Nth local storage device to cause the Nth local storage device to resume write operations. Thus, any writes in process that were suspended by opening the window at the step 794 may now be completed after execution of the step 806. Following the step 806, control transfers to a step 808 where the index variable, N, is incremented. Following the step 808, control transfers back to the test step 804 to determine if the index variable, N, is greater than the number of local/remote pairs. If so, then control transfers from the test step 804 back to the step 782 to begin processing for the next cycle switch.

Figure 18:
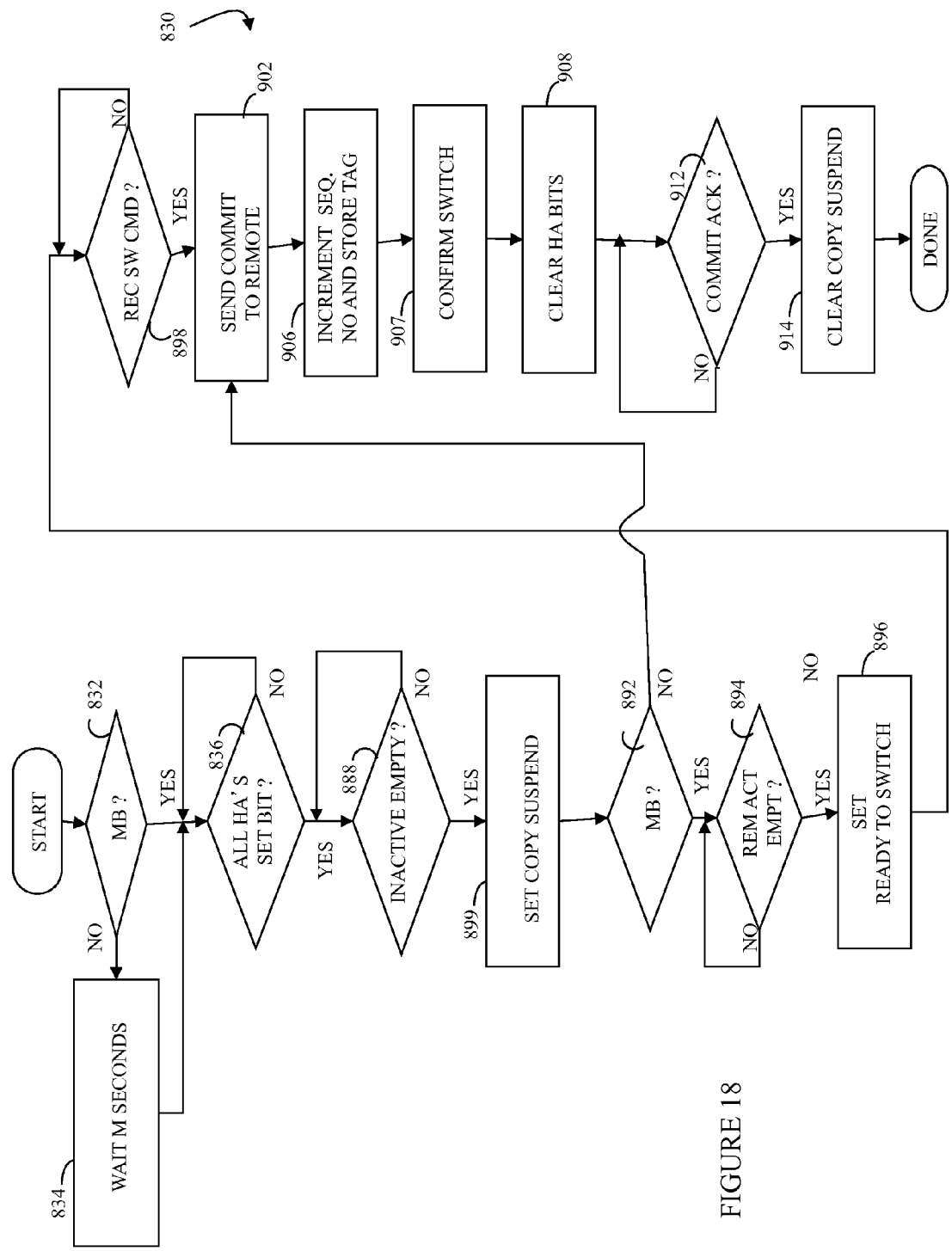
FIG. 18 is a flow chart illustrating steps performed in connection with a local storage device incrementing a sequence number according to a system described herein.

Referring to FIG. 18, a flow chart 830 illustrates steps performed by a local storage device in connection with cycle switching. The flow chart 830 of FIG. 18 replaces the flow chart 350 of FIG. 10 in instances where the local storage device supports both multi-box mode and non-multi-box mode. That is, the flow chart 830 shows steps performed like those of the flow chart 350 of FIG. 10 to support non-multi-box mode and, in addition, includes steps for supporting multi-box mode.

Processing begins at a first test step 832 which determines if the local storage device is operating in multi-box mode. Note that the flow chart 750 of FIG. 16 shows the step 758 where the host sends a message to the local storage device. The message sent at the step 758 indicates to the local storage device whether the local storage device is in multi-box mode or not. Upon receipt of the message sent by the host at the step 758, the local storage device sets an internal variable to indicate whether the local storage device is operating in multi-box mode or not. The internal variable may be examined at the test step 832.

If it is determined at the test step 832 that the local storage device is not in multi-box mode, then control transfers from the test step 832 to a step 834 to wait M seconds for the cycle switch. If the local storage device is not operating in multi-box mode, then the local storage device controls its own cycle switching and thus executes the step 834 to wait M seconds before initiating the next cycle switch.

Following the step 834, or following the step 832 if the local storage device is in multi-box mode, is a test step 836 which determines if all of the HA's of the local storage device have set a bit indicating that the HA's have completed all of the I/O's for a previous sequence number. When the sequence number changes, each of the HA's notices the change and sets a bit indicating that all I/O's of the previous sequence number are completed. For example, if the sequence number changes from N−1 to N, an HA will set the bit when the HA has completed all I/O's for sequence number N−1. Note that, in some instances, a single I/O for an HA may take a long time and may still be in progress even after the sequence number has changed. Note also that, for some systems, a different mechanism may be used to determine if all HA's have completed their N−1 I/O's. The different mechanism may include examining device tables. Once it is determined at the test step 836 that all HA's have set the appropriate bit, control transfers from the test step 836 to a step 888 which determines if the inactive chunk for the local storage device is empty. Once it is determined at the test step 888 that the inactive chunk is empty, control transfers from the step 888 to a step 899, where copying of data from the local storage device to the remote storage device is suspended. It is useful to suspend copying data until the sequence number switch is complete.

Following the step 899 is a test step 892 to determine if the local storage device is in multi-box mode. If it is determined at the test step 892 that the local storage device is in multi-box mode, then control transfers from the test step 892 to a test step 894 to determine if the active chunk of the corresponding remote storage device is empty. As discussed in more detail below, the remote storage device sends a message to the local storage device once it has emptied its active chunk. In response to the message, the local storage device sets an internal variable that is examined at the test step 894.

Once it is determined at the test step 894 that the active chunk of the remote storage device is empty, control transfers from the test step 894 to a step 896 where an internal variable is set on a local storage device indicating that the local storage device is ready to switch cycles. As discussed above in connection with the flow chart 780 of FIG. 17, the host queries each of the local storage devices to determine if each of the local storage devices are ready to switch. In response to the query provided by the host, the local storage device examines the internal variable set at the step 896 and returns the result to the host.

Following step 896 is a test step 898 where the local storage device waits to receive the command from the host to perform the cycle switch. As discussed above in connection with the flow chart 780 of FIG. 17, the host provides a command to switch cycles to the local storage device when the local storage device is operating in multi-box mode. Thus, the local storage device waits for the command at the step 898, which is only reached when the local storage device is operating in multi-box mode.

Once the local storage device has received the switch command from the host, control transfers from the step 898 to a step 902 to send a commit message to the remote storage device. Note that the step 902 is also reached from the test step 892 if it is determined at the step test 892 that the local storage device is not in multi-box mode. At the step 902, the local storage device sends a commit message to the remote storage device. In response to receiving a commit message for a particular sequence number, the remote storage device will begin restoring the data corresponding to the sequence number, as discussed above.

Following the step 902 is a step 906 where the sequence number is incremented and a new value for the tag (from the host) is stored. The sequence number is as discussed above. The tag is the tag provided to the local storage device at the step 764 and at the step 796, as discussed above. The tag is used to facilitate data recovery, as discussed elsewhere herein.

Following the step 906 is a step 907 where completion of the cycle switch is confirmed from the local storage device to the host by sending a message from the local storage device to the host. In some embodiments, it is possible to condition performing the step 907 on whether the local storage device is in multi-box mode or not, since, if the local storage device is not in multi-box mode, the host is not necessarily interested in when cycle switches occur.

Following the step 907 is a step 908 where the bits for the HA's that are used in the test step 836 are all cleared so that the bits may be set again in connection with the increment of the sequence number. Following the step 908 is a test step 912 which determines if the remote storage device has acknowledged the commit message. Note that if the local/remote pair is operating in multi-box mode and the remote storage device active chunk was determined to be empty at the step 894, then the remote storage device should acknowledge the commit message nearly immediately since the remote storage device will be ready for the cycle switch immediately because the active chunk thereof is already empty.

Once it is determined at the test step 912 that the commit message has been acknowledged by the remote storage device, control transfers from the step 912 to a step 914 where the suspension of copying, which was provided at the step 899, is cleared so that copying from the local storage device to the remote storage device may resume. Following the step 914, processing is complete.

Figure 19:
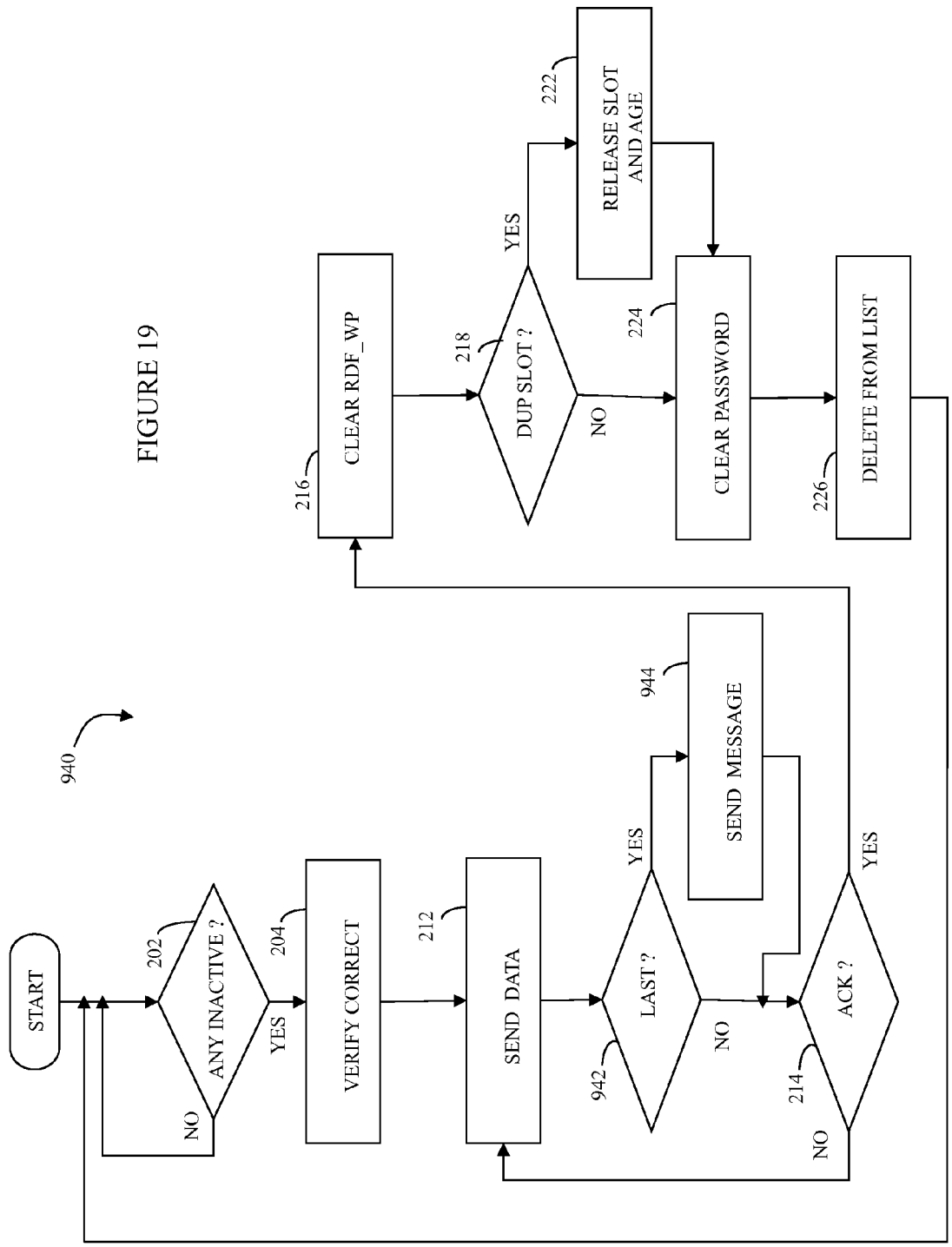
FIG. 19 is a flow chart illustrating transferring data from a local storage device to a remote storage device according to an embodiment of the system described herein.

Referring to FIG. 19, a flow chart 940 illustrates steps performed in connection with RA's scanning the inactive buffers to transmit RDF data from the local storage device to the remote storage device. The flow chart 940 of FIG. 19 is similar to the flow chart 200 of FIG. 6 and similar steps are given the same reference number. However, the flow chart 940 includes two additional steps 942, 944 which are not found in the flow chart 200 of FIG. 6. The additional steps 942, 944 are used to facilitate multi-box processing. After data has been sent at the step 212, control transfers from the step 212 to a test step 942 which determines if the data being sent is the last data in the inactive chunk of the local storage device. If not, then control transfers from the step 942 to the step 214 and processing continues as discussed above in connection with the flow chart 200 of FIG. 6. Otherwise, if it is determined at the test step 942 that the data being sent is the last data of the chunk, then control transfers from the step 942 to the step 944 to send a special message from the local storage device to the remote storage device indicating that the last data has been sent. Following the step 944, control transfers to the step 214 and processing continues as discussed above in connection with the flow chart 200 of FIG. 6. In some embodiments, the steps 942, 944 may be performed by a separate process (and/or separate hardware device) that is different from the process and/or hardware device that transfers the data.

Figure 20:
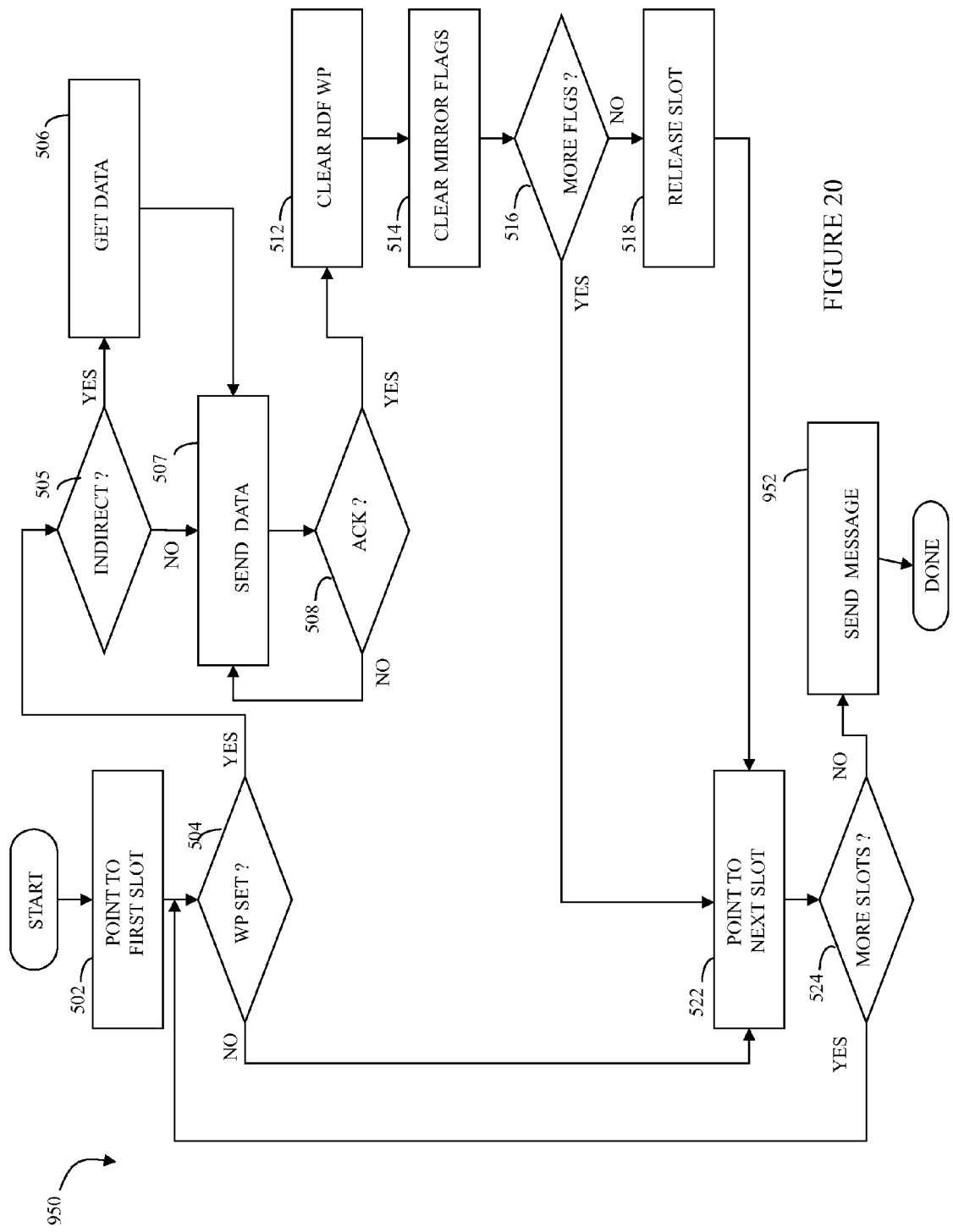
FIG. 20 is a flow chart illustrating transferring data from a local storage device to a remote storage device according to an alternative embodiment of the system described herein.

Referring to FIG. 20, a flow chart 950 illustrates steps performed in connection with RA's scanning the inactive buffers to transmit RDF data from the local storage device to the remote storage device. The flow chart 950 of FIG. 20 is similar to the flow chart 500 of FIG. 13 and similar steps are given the same reference number. However, the flow chart 950 includes an additional step 952, which is not found in the flow chart 500 of FIG. 13. The additional steps 952 is used to facilitate multi-box processing and is like the additional step 944 of the flowchart 940 of FIG. 19. After it is determined at the test step 524 that no more slots remain to be sent from the local storage device to the remote storage device, control transfers from the step 524 to the step 952 to send a special message from the local storage device to the remote storage device indicating that the last data for the chunk has been sent. Following the step 952, processing is complete.

Figure 21:
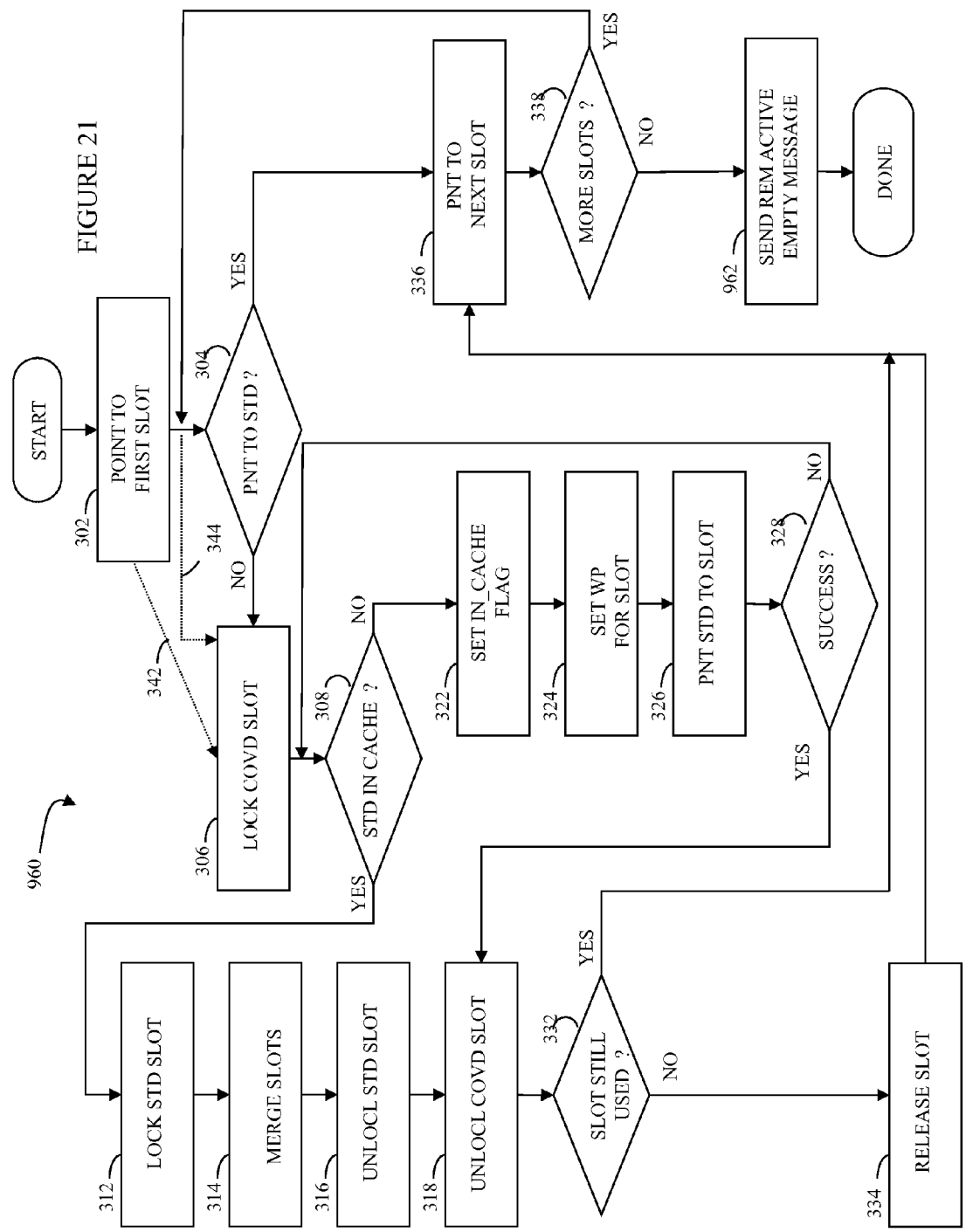
FIG. 21 is a flow chart illustrating providing an active empty indicator message from a remote storage device to a corresponding local storage device according to an embodiment of the system described herein.

Referring to FIG. 21, a flow chart 960 illustrates steps performed at the remote storage device in connection with providing an indication that the active chunk of the remote storage device is empty. The flow chart 960 is like the flow chart 300 of FIG. 9 except that the flow chart 960 shows a new step 962 that is performed after the active chunk of the remote storage device has been restored. At the step 962, the remote storage device sends a message to the local storage device indicating that the active chunk of the remote storage device is empty. Upon receipt of the message sent at the step 962, the local storage device sets an internal variable indicating that the inactive buffer of the remote storage device is empty. The local variable is examined in connection with the test step 894 of the flow chart 830 of FIG. 18, discussed above.

Figure 22:
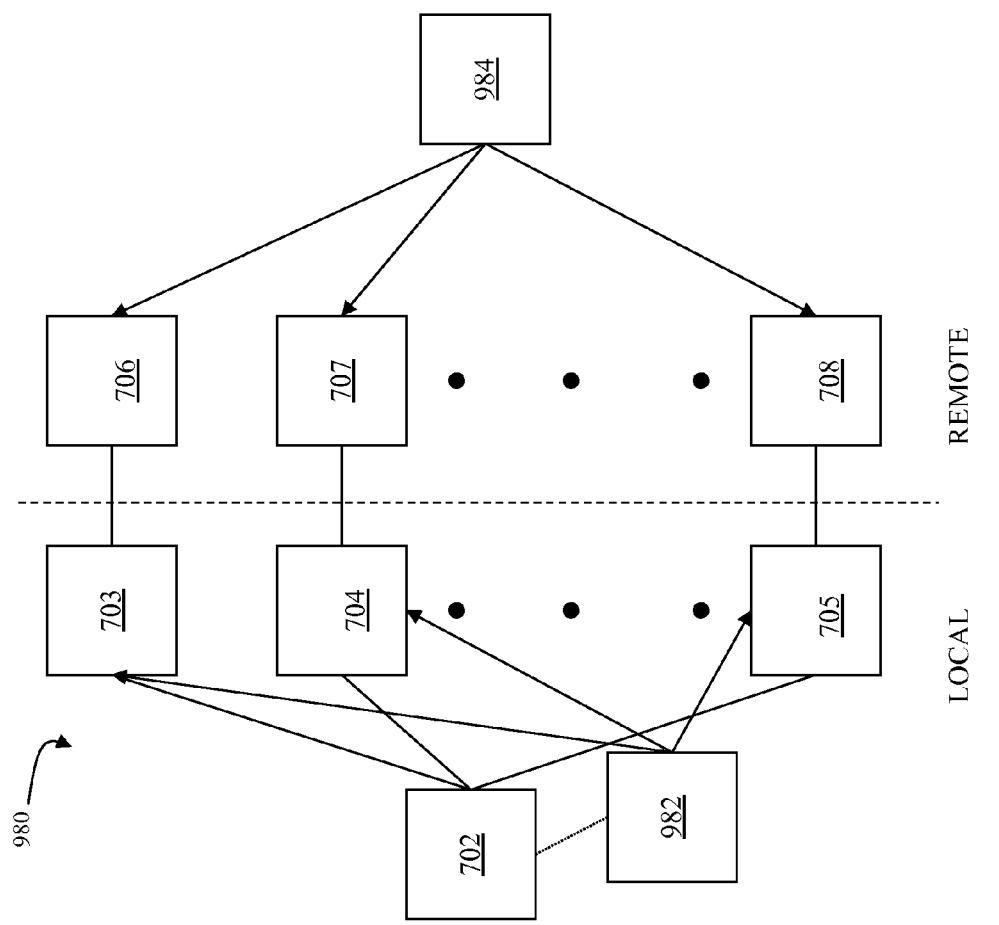
FIG. 22 is a schematic diagram illustrating a plurality of local and remote storage devices with a plurality of hosts according to an embodiment of the system described herein.

Referring to FIG. 22, a diagram 980 illustrates the host 702, local storage devices 703-705 and remote storage devices 706-708, that are shown in the diagram 700 of FIG. 14. The Diagram 980 also includes a first alternative host 982 that is coupled to the host 702 and the local storage devices 703-705. The diagram 980 also includes a second alternative host 984 that is coupled to the remote storage devices 706-708. The alternative hosts 982, 984 may be used for data recovery, as described in more detail below.

When recovery of data at the remote site is necessary, the recovery may be performed by the host 702 or, by the host 982 provided that the links between the local storage devices 703-705 and the remote storage devices 706-708 are still operational. If the links are not operational, then data recovery may be performed by the second alternative host 984 that is coupled to the remote storage devices 706-708. The second alternative host 984 may be provided in the same location as one or more of the remote storage devices 706-708. Alternatively, the second alternative host 984 may be remote from all of the remote storage devices 706-708. The table 730 that is propagated throughout the system is accessed in connection with data recovery to determine the members of the multi-box group.

Figure 23:
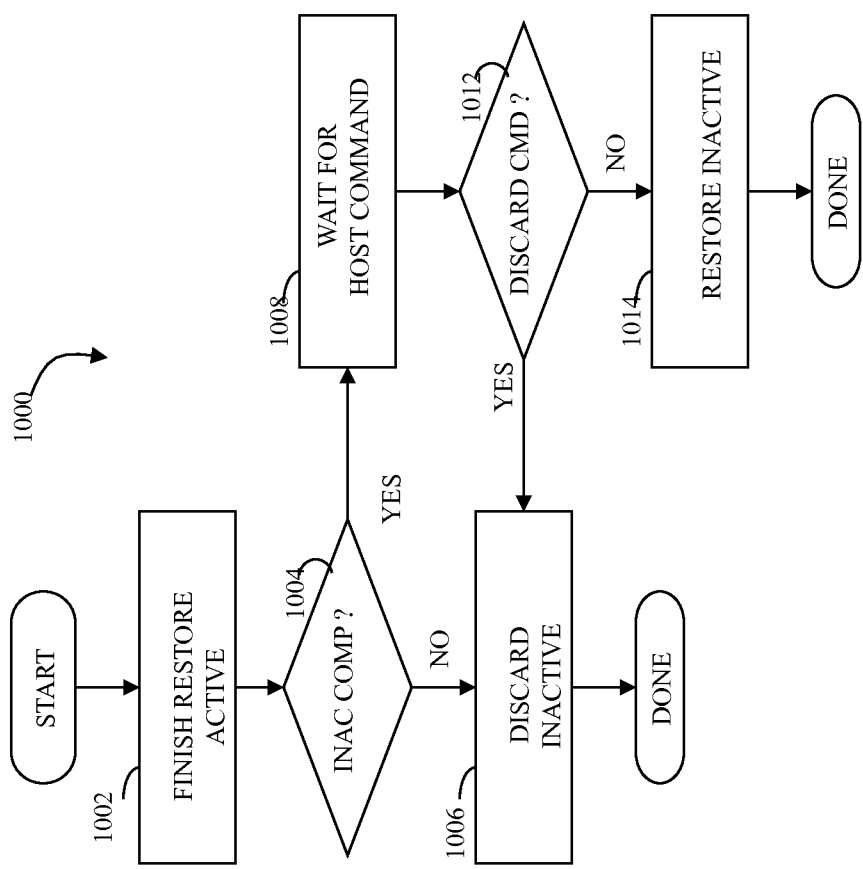
FIG. 23 is a flow chart illustrating a processing performed by a remote storage device in connection with data recovery according to an embodiment of the system described herein.

Referring to FIG. 23, a flow chart 1000 illustrates steps performed by each of the remote storage devices 706-708 in connection with the data recovery operation. The steps of the flowchart 1000 may be executed by each of the remote storage devices 706-708 upon receipt of a signal or a message indicating that data recovery is necessary. In some embodiments, it may be possible for a remote storage device to automatically sense that data recovery is necessary using, for example, conventional criteria such as length of time since last write.

Processing begins at a first step 1002 where the remote storage device finishes restoring the active chunk in a manner discussed elsewhere herein. Following the step 1002 is a test step 1004 which determines if the inactive chunk of the remote storage device is complete (i.e., all of the data has been written thereto). Note that a remote storage device may determine if the inactive chunk is complete using the message sent by the local storage device at the steps 944, 952, discussed above. That is, if the local storage device has sent the message at the step 944 or the step 952, then the remote storage device may use receipt of that message to confirm that the inactive chunk is complete.

If it is determined at the test step 1004 that the inactive chunk of the remote storage device is not complete, then control transfers from the test step 1004 to a step 1006 where the data from the inactive chunk is discarded. No data recovery is performed using incomplete inactive chunks since the data therein may be inconsistent with the corresponding active chunks. Accordingly, data recovery is performed using active chunks and, in some cases, inactive chunks that are complete. Following the step 1006, processing is complete.

If it is determined at the test step 1004 that the inactive chunk is complete, then control transfers from the step 1004 to the step 1008 where the remote storage device waits for intervention by the host. If an inactive chunk, one of the hosts 702, 982, 984, as appropriate, needs to examine the state of all of the remote storage devices in the multi-box group to determine how to perform the recovery. This is discussed in more detail below.

Following step 1008 is a test step 1012 where it is determined if the host has provided a command to all storage device to discard the inactive chunk. If so, then control transfers from the step 1012 to the step 1006 to discard the inactive chunk. Following the step 1006, processing is complete.

If it is determined at the test step 1002 that the host has provided a command to restore the complete inactive chunk, then control transfers from the step 1012 to a step 1014 where the inactive chunk is restored to the remote storage device. Restoring the inactive chunk in the remote storage device involves making the inactive chunk an active chunk and then writing the active chunk to the disk as described elsewhere herein. Following the step 1014, processing is complete.

Figure 24:
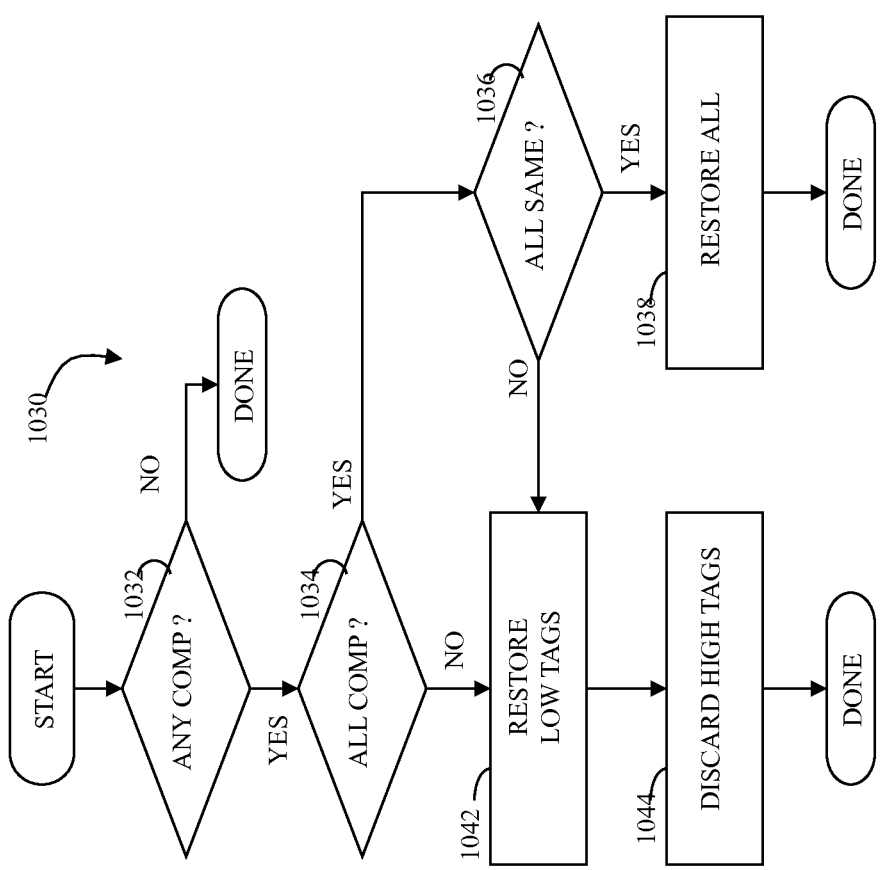
FIG. 24 is a flow chart illustrating a processing performed by a host in connection with data recovery according to an embodiment of the system described herein.

Referring to FIG. 24, a flow chart 1030 illustrates steps performed in connection with one of the hosts 702, 982, 984 determining whether to discard or restore each of the inactive chunks of each of the remote storage devices. The one of the hosts 702, 982, 984 that is performing the restoration communicates with the remote storage devices 706-708 to provide commands thereto and to receive information therefrom using the tags that are assigned by the host as discussed elsewhere herein.

Processing begins at a first step 1032 where it is determined if any of the remote storage devices have a complete inactive chunk. If not, then there is no further processing to be performed and, as discussed above, the remote storage devices will discard the incomplete chunks on their own without host intervention. Otherwise, control transfers from the test step 1032 to a test step 1034 where the host determines if all of the remote storage devices have complete inactive chunks. If so, then control transfers from the test step 1034 to a test step 1036 where it is determined if all of the complete inactive chunks of all of the remote storage devices have the same tag number. As discussed elsewhere herein, tags are assigned by the host and used by the system to identify data in a manner similar to the sequence number except that tags are controlled by the host to have the same value for the same cycle.

If it is determined at the test step 1036 that all of the remote storage devices have the same tag for the inactive chunks, then control transfers from the step 1036 to a step 1038 where all of the inactive chunks are restored. Performing the step 1038 ensures that all of the remote storage devices have data from the same cycle. Following the step 1038, processing is complete.

If it is determined at the test step 1034 that all of the inactive chunks are not complete, or if it is determined that at the step 1036 that all of the complete inactive chunks do not have the same tag, then control transfers to a step 1042 where the host provides a command to the remote storage devices to restore the complete inactive chunks having the lower tag number. For purposes of explanation, it is assumed that the tag numbers are incremented so that a lower tag number represents older data. By way of example, if a first remote storage device had a complete inactive chunk with a tag value of three and a second remote storage device had a complete inactive chunk with a tag value of four, the step 1042 would cause the first remote storage device (but not the second) to restore its inactive chunk. Following the step 1042 is a step 1044 where the host provides commands to the remote storage devices to discard the complete inactive buffers having a higher tag number (e.g., the second remote storage device in the previous example). Following step 1044, processing is complete.

Following execution of the step 1044, each of the remote storage devices contains data associated with the same tag value as data for the other ones of the remote storage devices. Accordingly, the recovered data on the remote storage devices 706-708 should be consistent.

Figure 25:
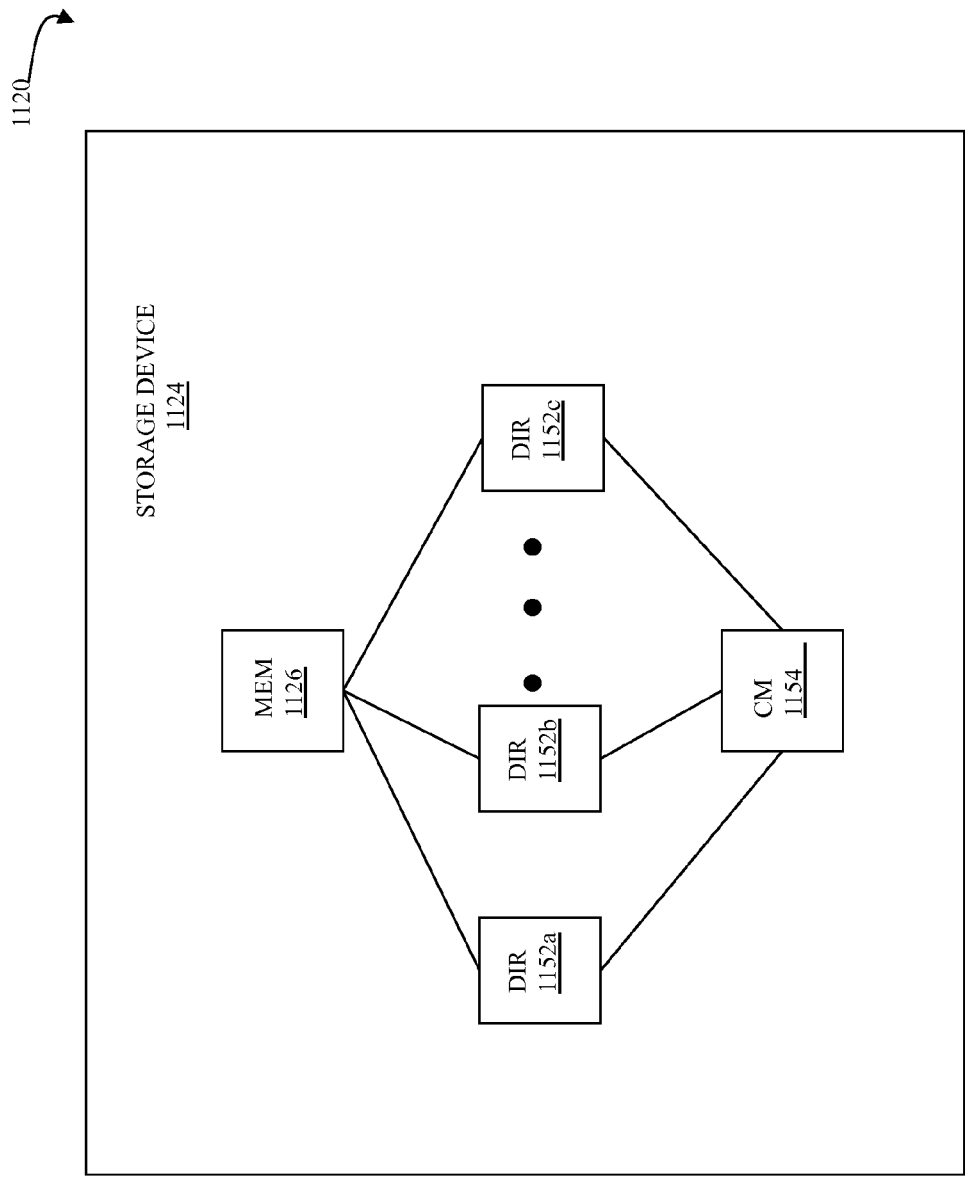
FIG. 25 is a schematic diagram showing a storage device, memory, a plurality of directors, and a communication module according to an embodiment of the system described herein.

Referring to FIG. 25, a diagram 1120 illustrates an embodiment where a storage device 1124, which is like the storage device 24 and/or the storage device 26, includes a plurality of directors 1152a-1152c that are coupled to a memory 1126, like the memory 37 and/or the memory 38 of the storage devices 24, 26. Each of the directors 1152a-1152c represents an HA, DA, and/or RA like the HA 28, the DA's 35a-35c, 36a-36c, and/or the RA's 30a-30c, 32a-32c of the storage devices. In an embodiment disclosed herein, there may be up to sixteen directors coupled to the memory 1126. Of course, for other embodiments, there may be a higher or lower maximum number of directors that may be used.

The diagram 1120 also shows an optional communication module (CM) 1154 that provides an alternative communication path between the directors 1152a-1152c. Each of the directors 1152a-1152c may be coupled to the CM 1154 so that any one of the directors 1152a-1152c may send a message and/or data to any other one of the directors 1152a-1152c without needing to go through the memory 1126. The CM 1154 may be implemented using conventional MUX/router technology where a sending one of the directors 1152a-1152c provides an appropriate address to cause a message and/or data to be received by an intended receiving one of the directors 1152a-1152c. In addition, a sending one of the directors 1152a-1152c may be able to broadcast a message to all of the other directors 1152a-1152c at the same time.

In some embodiments, one or more of the directors 1152a-1152c may have multiple processor systems thereon and thus may be able to perform functions for multiple directors. In some embodiments, at least one of the directors 1152a-1152c having multiple processor systems thereon may simultaneously perform the functions of at least two different types of directors (e.g., an HA and a DA). Furthermore, in some embodiments, at least one of the directors 1152a-1152c having multiple processor systems thereon may simultaneously perform the functions of at one types of director and perform other processing with the other processing system.

Figure 26:
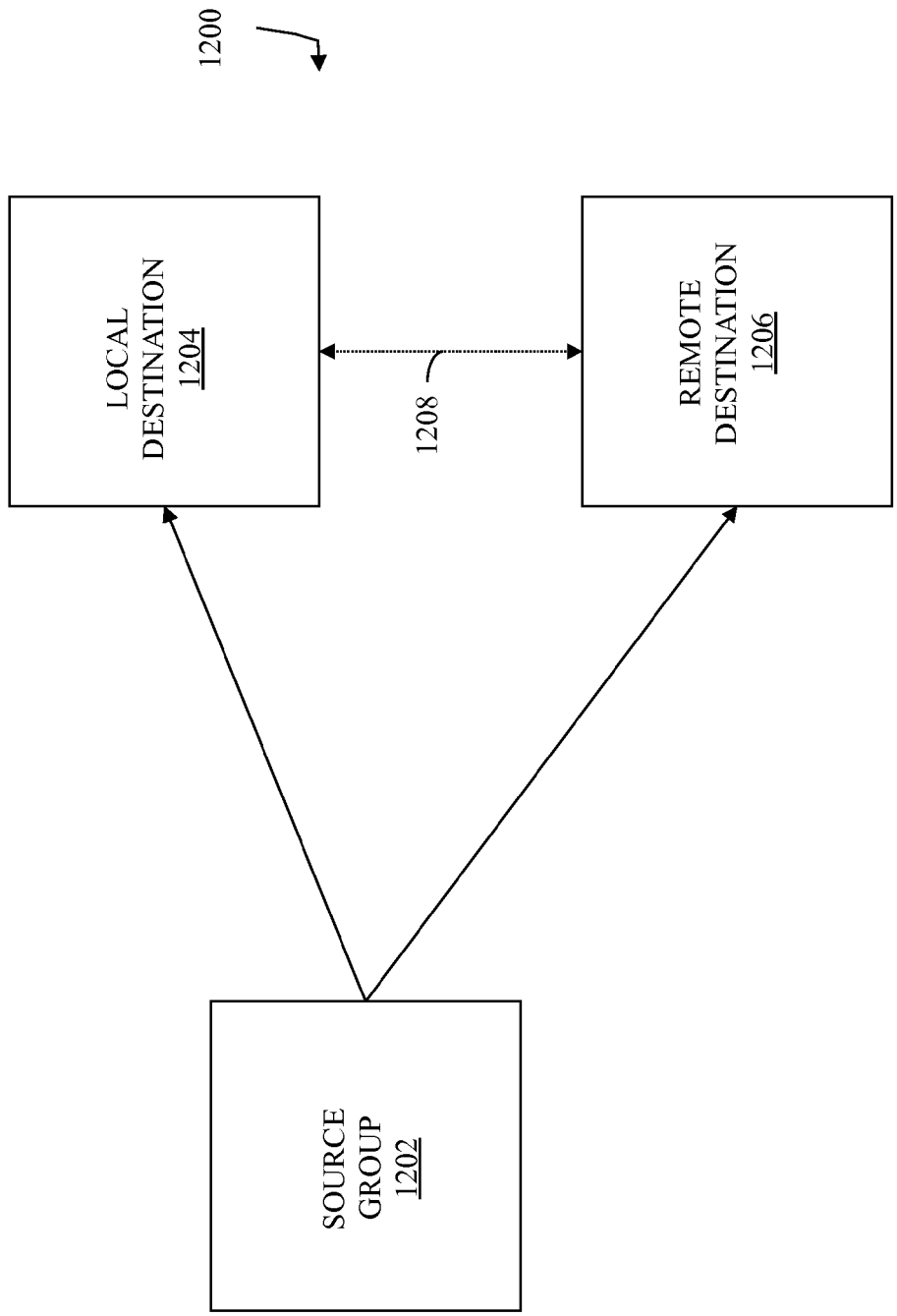
FIG. 26 is a schematic diagram showing a source group, a local destination, and a remote destination according to an embodiment of the system described herein.

Refer to FIG. 26, a diagram 1200 illustrates a system that includes a source group 1202, a local destination 1204, and a remote destination 1206. The source group 1202 communicates with both the local destination 1204 and the remote destination 1206. The source group 1202 may represent a single storage device, a plurality of storage devices, a single or plurality of storage devices with a single host, or a single or plurality of storage devices with multiple hosts. Data is generated at the source group 1202 and stored at the source group 1202 and transmitted to the local destination 1204 and the remote destination 1206. In some embodiments, the local group may operate in some ways as discussed above in connection with the embodiment described above in connection with FIG. 14.

In an embodiment herein, the local destination 1204 represents a single or plurality of storage devices that are in relatively close proximity to the source group 1202 to allow for synchronous data mirroring from the source group 1202 to the local destination 1204. In an embodiment herein, the local destination 1204 is located in the same building, at the same facility, and/or at the same corporate location as the source group 1202. Thus, for example, the local destination 1204 may represent a backup storage device (or plurality of storage devices) managed by the same group of individuals that manages the source group 1202.

The remote destination 1206 represents a storage device and/or a plurality of storage devices at a location that is geographically distant from the source group 1202. For example, the remote destination 1206 may represent a storage device or group of storage devices on the west coast of the United States while the source group 1202 is located on the east coast of the United States. Because of the relatively large geographic distance between the source group 1202 and the remote destination 1206, it may be impractical to use a synchronous or semi-synchronous data transfer mode to mirror data on the remote destination 1206 from the source group 1202. That is, because of the long round trip time from the source group 1202 to the remote destination 1206 and back to the source group 1202, it may not be feasible to use synchronous or semi-synchronous data mirroring which provides for acknowledgment of data at the remote destination 1206 prior to acknowledging a write to a host of the local group 1202. In such case, it may be possible to use ordered writes between the source group 1202 and the remote destination 1206 so that the remote destination 1206 is a consistent, although somewhat time delayed, mirror of the source group 1202. In such an arrangement, the related group of storage devices may be deemed a "consistency group" or "con group".

A communication path 1208 may also exist between the local destination 1204 and the remote destination 1206. As long as the source group 1202 is operational, the communication path 1208 may not be used. However, in instances where the source group 1202 becomes non-operational and/or in instances where the communication links between the source group 1202 and one or both of the local destination 1204 and the remote destination 1206 become non-operational, then the communication path 1208 may be used to synchronize the data between the local destination 1204 and the remote destination 1206, as described in more detail elsewhere herein. In addition, a host may be provided to one of the local destination 1204 or the remote destination 1206 to resume operation of the system after synchronization, as described in more detail elsewhere herein. Note that if the operation is resumed with a host coupled to the local destination 1204, then the communication link 1208 may be used so that the remote destination 1206 is a mirror of the local destination 1204. Conversely, if operation is resumed by providing a host to the remote destination 1206, then the communication link 1208 may be used so that the local destination 1204 is a mirror of the remote destination 1206.

Figure 27:
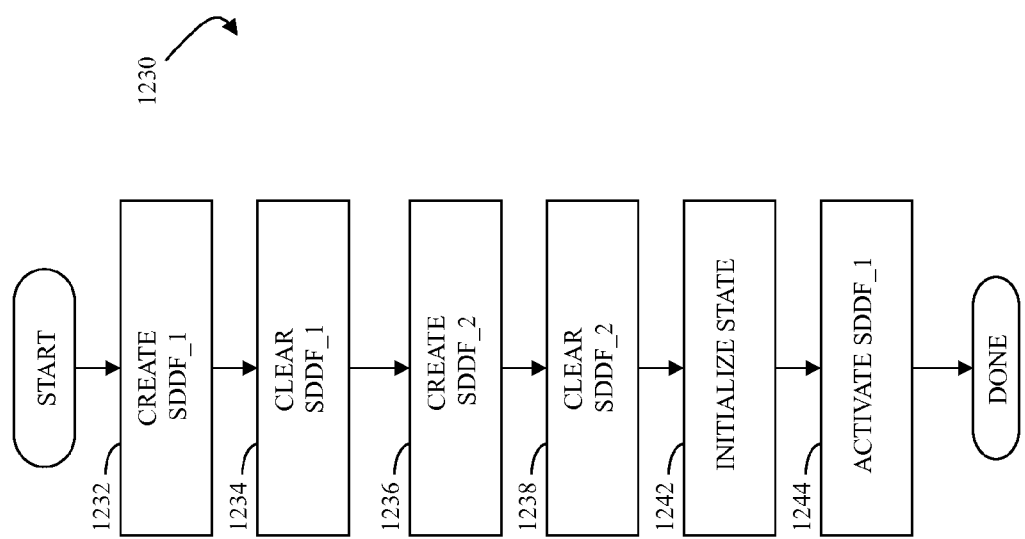
FIG. 27 is a flow chart illustrating a process performed by a local destination to initialize data recovery parameters according to an embodiment of the system described herein.

Referring to FIG. 27, a flow chart 1230 illustrates steps performed in connection with initializing parameters at the local destination 1204 to provide the recovery mechanism discussed herein. The recovery mechanism described herein uses the Symmetrix Differential Data Facility (SDDF), which allows for a plurality sessions, each having a bitmap associated therewith with bits that are set to one whenever there is a write to a corresponding data location during a particular time period. If no write occurs to a particular location, the corresponding bit remains cleared (i.e., remains zero). In an embodiment herein, each bit may correspond to a track of data. However, for other embodiments, it is possible to have each bit correspond to larger or smaller increments of data and it is also possible that different bits and/or different sets of bits correspond to different amounts of data.

Operations associated with an SDDF session include creating an SDDF session, activating an SDDF session, clearing bits of the bitmap for an SDDF session, deactivating an SDDF session, and terminating an SDDF session. Creating an SDDF session, clearing the bits thereof, and terminating an SDDF session are fairly self-explanatory. Activating an SDDF session causes a bit of the SDDF session bitmap to be set whenever a corresponding track (or other appropriate data increment) is written. Deactivating an SDDF session suspends the setting of bits. The SDDF mechanism discussed herein may be implemented using the description provided in U.S. Pat. No. 6,366,986, which is incorporated by reference herein.

Processing for the flow chart 1230 begins at a first step 1232 where a first SDDF session, SDDF_1, is created. In an embodiment described herein, creation of an SDDF session does not cause automatic activation of the session. Following step 1232 is a step 1234 where the bits of the bitmap of the SDDF session created at the step 1232 are cleared. Following step 1234 is a step 1236 where a second SDDF session, SDDF_2, is created. Following step 1236 is a step 1238 where the bits of the bitmap of the SDDF session created at the step 1236 are cleared.

Following the step 1238 is a step 1242 where a state is initialized. The state initialized at the step 1242 may be used to determine which of the SDDF sessions, SDDF_1 or SDDF_2, will be activated. As described in more detail elsewhere herein, there may be two possible states and the state set at the step 1242 may be toggled to cause the SDDF_1 session and the SDDF_2 session to be alternatively activated. In other embodiments, a token or some other type of variable may be used to indicate the selection of either SDDF_1 or SDDF_2. Following the step 1242 is a step 1244 where SDDF_1 is activated. Activating SDDF_1 at the step 1244 causes the bits of the bit map of the SDDF_1 session to be set whenever a track (or other data increment) of the local destination 1204 is modified.

The SDDF_1 and SDDF_2 sessions are used by the local destination 1204 to keep track of the active and inactive buffers used by the source group 1202 in connection with ordered writes by the source group 1202 to the remote destination 1206. As discussed in more detail elsewhere herein, each time the source group 1202 makes a cycle switch in connection with ordered writes from the source group 1202 to the remote destination 1206, the source group 1202 sends a message to the local destination 1204 indicating that a cycle switch has been performed so that the local destination 1204 may toggle the state (initialized in the step 1242, discussed above). Use of the cycle switch information by the local destination 1204 is discussed in more detail elsewhere herein.

Figure 28A:
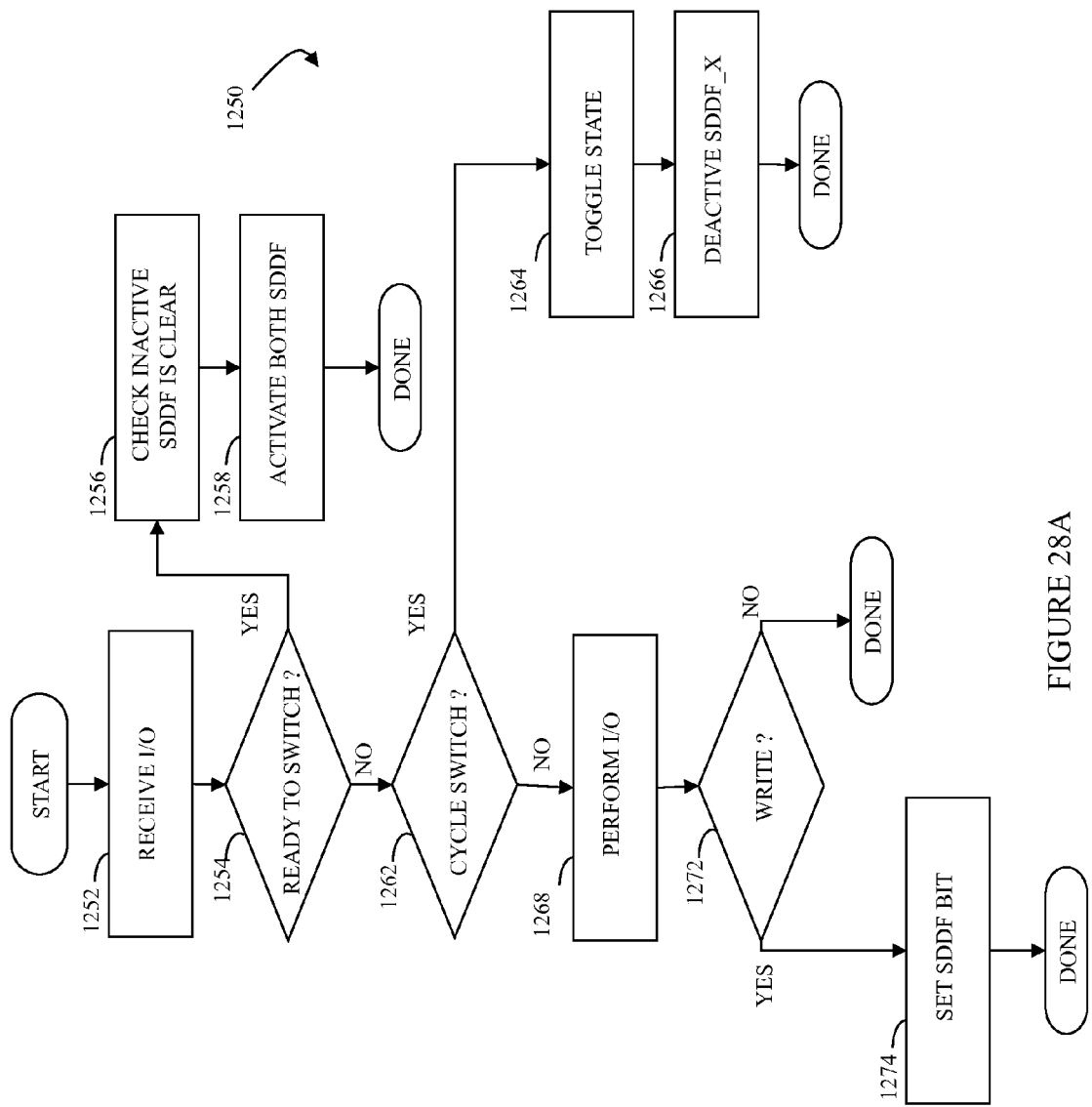
FIG. 28A is a flow chart illustrating a process performed by a local destination in connection with receiving data during non-failure mode according to an embodiment of the system described herein.

Referring to FIG. 28A, a flow chart 1250 illustrates steps performed by the local destination 1204 in connection with receiving an I/O from the source group 1202 during normal (i.e., non-failure) operation. Processing begins at a first step 1252 where the I/O is received by the local destination 1204. Following the step 1252 is a test step 1254 which determines if the I/O received from the source group 1202 indicates that the local group 1202 is ready to switch in connection with ordered writes between the local group 1202 and the remote destination 1206. The local group 1202 being ready to switch is described in more detail elsewhere herein.

If the received data indicates that the local group 1202 is ready to switch, then control transfers from the step 1254 to a step 1256, where it is determined if the inactive one of the SDDF sessions (SDDF_1 or SDDF_2) is clear. In some embodiments, the SDDF sessions may be cleared at the step 1256. In other instances, the amount of time needed to clear an SDDF session at the step 1256 would be unacceptable, in which case more than two SDDF sessions may be used for SDDF_1 and SDDF_2 and may be rotated so that an SDDF session that is about to be activated is always cleared asynchronously. In any event, the processing performed at the step 1256 relates to clearing the inactive one of SDDF_1 and SDDF_2 so that, after performing the step 1256, the inactive session is clear.

Following the step 1256 is a step 1258 where the inactive one of the SDDF sessions is activated so that both SDDF_1 and SDDF_2 are activated after performing the processing at the step 1258. Thus, subsequent writes reflected in the bitmaps for both SDDF_1 and SDDF_2. Following the step 1258, processing is complete.

If it is determined at the step 1254 that the received data does not correspond to a ready to switch signal, then control transfers from the step 1254 to a test step 1262 where it is determined if the received data corresponds to a cycle switch being performed. If so, then control transfers from the step 1262 to a step 1264 where the state, initialized at the step 1242 of the flow chart 1230 of FIG. 27, is toggled. As discussed elsewhere herein, the state is used to determine which one of SDDF_1 and SDDF_2 will be activated and deactivated. Following the step 1264 is a step 1266, where one of the SDDF sessions, SDDF_1 or SDDF_2, is deactivated, depending on the particular value of the state set at the step 1264. Note that even though an SDDF session is deactivated at the step 1266, that SDDF session is not cleared until the next ready to switch signal is received. Of course, if more than two SDDF sessions are used for SDDF_1 and SDDF_2, as discussed above, then the SDDF session deactivated at the step 1266 may be maintained while another SDDF session is cleared to prepare for being activated at the step 1258, discussed above.

If it is determined at the step 1262 that the received data does not correspond to a cycle switch, then control transfers from the test step 1262 to a step 1268 where the I/O is performed. For example, if the I/O is a write operation, then, at the step 1268, data is written to the storage area of the local destination 1204. Following step 1268 is a step 1272 where it is determined if the I/O operation is a write operation. If not (e.g., the I/O operation is a read operation), then processing is complete. Otherwise, control transfers from the step 1272 to a step 1274 where a bit is set in the appropriate one of the SDDF sessions, SDDF_1, SDDF_2, or both depending upon which one of the SDDF sessions is activated. Following step 1274, processing is complete.

In some instances, it may not be desirable to wait to clear an SDDF bitmap just prior to pointing the same SDDF bitmap. In those cases, it may be useful to have more than two SDDF bitmaps where two at a time are used like SDDF_1 and SDDF_2 while the remainder of the SDDF bitmaps are already clear and waiting to be used or are being cleared using a background process. For example, using three bitmaps SDDF_A, SDDF_B, and SDDF_C, SDDF_1 may correspond to SDDF_A while SDDF_2 may correspond to SDDF_C. In such a case, SDDF_B may be cleared while processing is being performed on SDDF_A and SDDF_C. When the cycle switches, SDDF_B (which is already clear) may be used while SDDF_C is cleared using a background process that may run even after the cycle switch is complete and new data is being logged to SDDF_B.

Figure 28B:
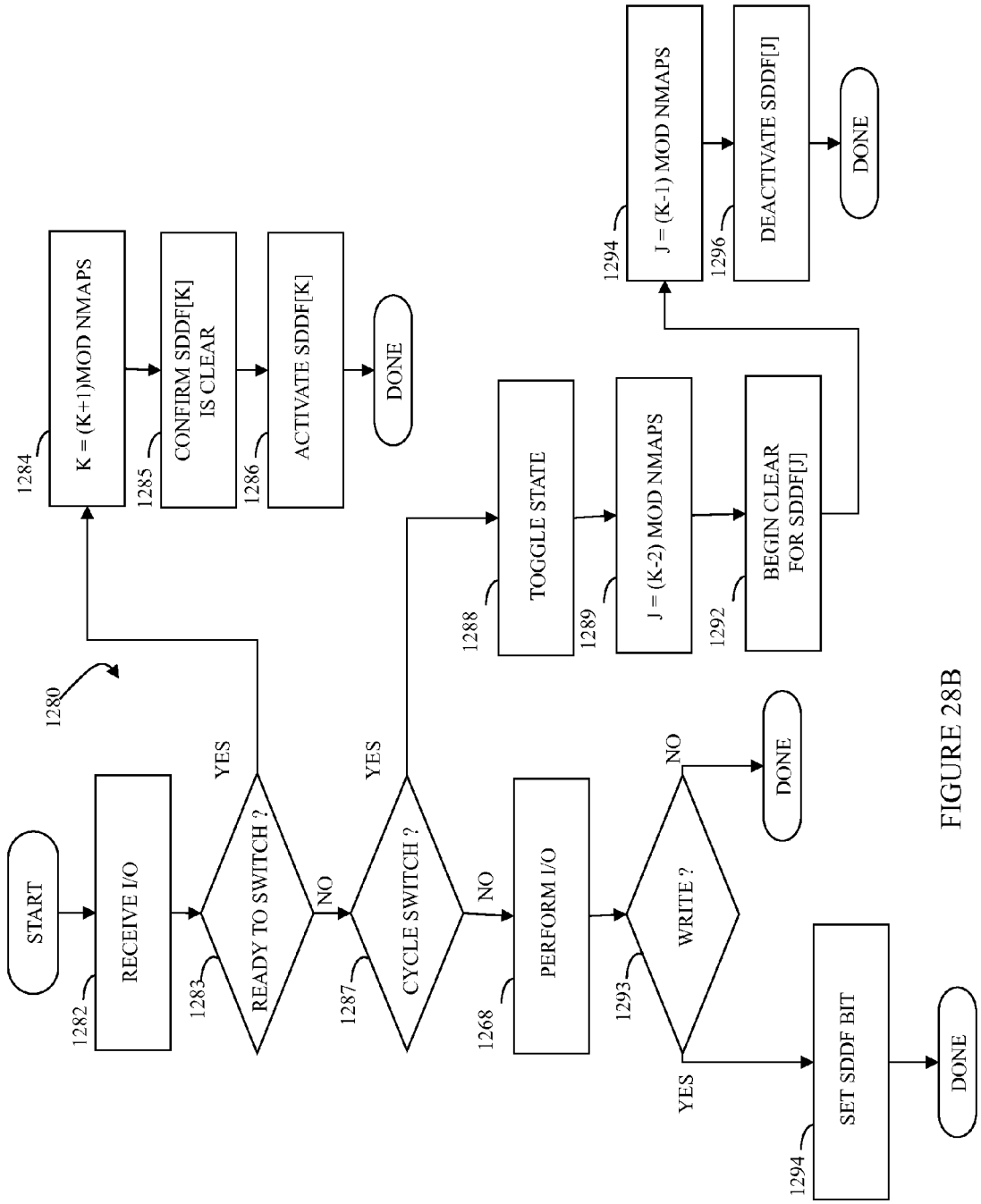
FIG. 28B is a flow chart illustrating an alternative process that may be performed by a local destination in connection with receiving data during non-failure mode according to an embodiment of the system described herein.

Referring to FIG. 28B, a flow chart 1280 illustrates an alternative embodiment that uses a plurality of SDDF bitmaps, SDDF[0], SDDF[1], . . . SDDF[NMAPS−1], where NMAPS is the number of SDDF maps. In an embodiment herein, NMAPS is greater than two (e.g., three). Many of the step of the flow chart 1280 are like steps of the flow chart 1250 of FIG. 28A.

Processing begins at a first step 1282 where the I/O is received by the local destination 1204. Following the step 1282 is a test step 1283 which determines if the I/O received from the source group 1202 indicates that the local group 1202 is ready to switch in connection with ordered writes between the local group 1202 and the remote destination 1206. The local group 1202 being ready to switch is described in more detail elsewhere herein.

If the received data indicates that the local group 1202 is ready to switch, then control transfers from the step 1283 to a step 1284 where an index, K, is incremented and the result thereof is set to modulo NMAPS. Following the step 1284 is a step 1285, where it is confirmed that SDDF[K] is clear. Following the step 1285 is a step 1286 where SDDF[K] is activated so that both SDDF[K] and SDDF[K−1] are activated after performing the processing at the step 1286. Thus, subsequent writes reflected in the bitmaps for both SDDF[K] and SDDF[K−1]. Following the step 1286, processing is complete. Note that, if K is zero, then SDDF[K−1] actually refers to SDDF[NMAPS−1].

If it is determined at the step 1283 that the received data does not correspond to a ready to switch signal, then control transfers from the step 1283 to a test step 1287, where it is determined if the received data corresponds to a cycle switch. If it is determined at the step 1287 that the received data corresponds to a cycle switch (see discussion above in connection with the flow chart 1250 of FIG. 28A), then control transfers from the step 1287 to a step 1288 where the state (discussed above) is toggled. Following the step 1288 is a step 1289 where a variable J is set equal to (K−2) modulo NMAPS. Since K is an index variable used to keep track of the most recently activated SDDF bitmap, setting J at the step 1289 causes J to point to the third most recently activated SDDF bitmap. Following the step 1289 is a step 1292 where a process is started to clear the SDDF[J] bitmap. As discussed elsewhere herein, it is not necessary for the process begun at the step 1292 to be completed in order to complete the cycle switch and to begin accumulating new data.

Following the step 1292 is a step 1294 where a variable J is set equal to (K−1) modulo NMAPS. Since K is an index variable used to keep track of the most recently activated SDDF bitmap, setting J at the step 1294 causes J to point to the second most recently activated SDDF bitmap. Following the step 1294 is a step 1296 where SDDF[J] is deactivated. However, even though SDDF[J] is deactivated at the step 1296, the data is maintained for restoration purposes until the next cycle switch. Following the step 1296, processing is complete.

Figure 28C:
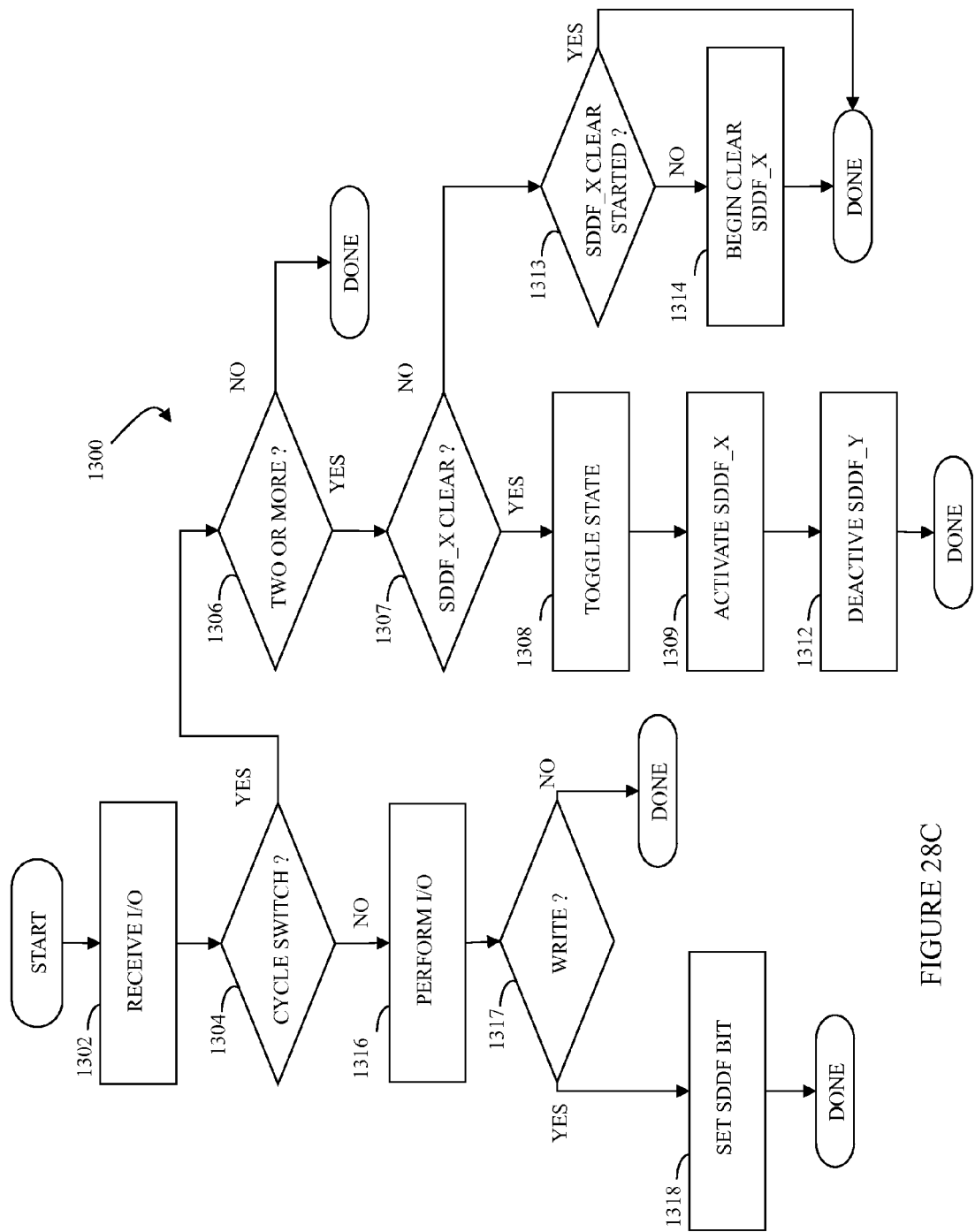
FIG. 28C is a flow chart illustrating an alternative process that may be performed by a local destination in connection with receiving data during non-failure mode according to an embodiment of the system described herein.

Referring to FIG. 28C, a flow chart 1300 illustrates yet another embodiment for processing related to the local destination 1204 receiving an I/O from the source group 1202 during normal (i.e., non-failure) operation. Processing begins at a first step 1302 where the I/O is received by the local destination 1204. Following the step 1302 is a test step 1304 where it is determined if the received data corresponds to a cycle switch being performed. If so, then control transfers from the step 1304 to a test step 1306 where it is determined if two or more cycle switches have occurred since the last time the state was toggled. If not, then processing is complete. Otherwise, control transfers from the step 1306 to a step 1307 where it is determined if the currently inactive SDDF session, SDDF_X, is clear. If so, then control transfers from the step 1307 to a step 1308 where the state, initialized at the step 1242 of the flow chart 1230 of FIG. 27, is toggled. As discussed elsewhere herein, the state is used to determine which one of SDDF_1 and SDDF_2 will be activated and deactivated.

Following the step 1308 is a step 1309 where one of the SDDF sessions, SDDF_1 or SDDF_2, as indicated by the state, is activated. Following the step 1309 is a step 1312 where the other one of the SDDF sessions is deactivated. Following the step 1312, processing is complete.

If it is determined at the test step 1307 that SDDF_X is not clear, then control transfers from the step 1307 to a step 1313, where it is determined if clearing SDDF_X has already been started (i.e., in a previous iteration). If so, then processing is complete. Otherwise, control transfers from the step 1313 to a step 1314, where a process to clear SDDF_X is begun. Following the step 1314, processing is complete.

If it is determined at the step 1304 that the received data does not correspond to a cycle switch, then control transfers from the test step 1304 to a step 1316 where the I/O is performed. For example, if the I/O is a write operation, then, at the step 1316 data is written to the storage area of the local destination 1204. Following step 1316 is a step 1317 where it is determined if the I/O operation is a write operation. If not (e.g., the I/O operation is a read operation), then processing is complete. Otherwise, control transfers from the step 1317 to a step 1318 where a bit is set in the appropriate one of the SDDF sessions, SDDF_1 or SDDF_2, (SDDF_X or SDDF_Y) depending upon which one of the SDDF sessions is activated. Following step 1318, processing is complete.

Figures 29, 30:
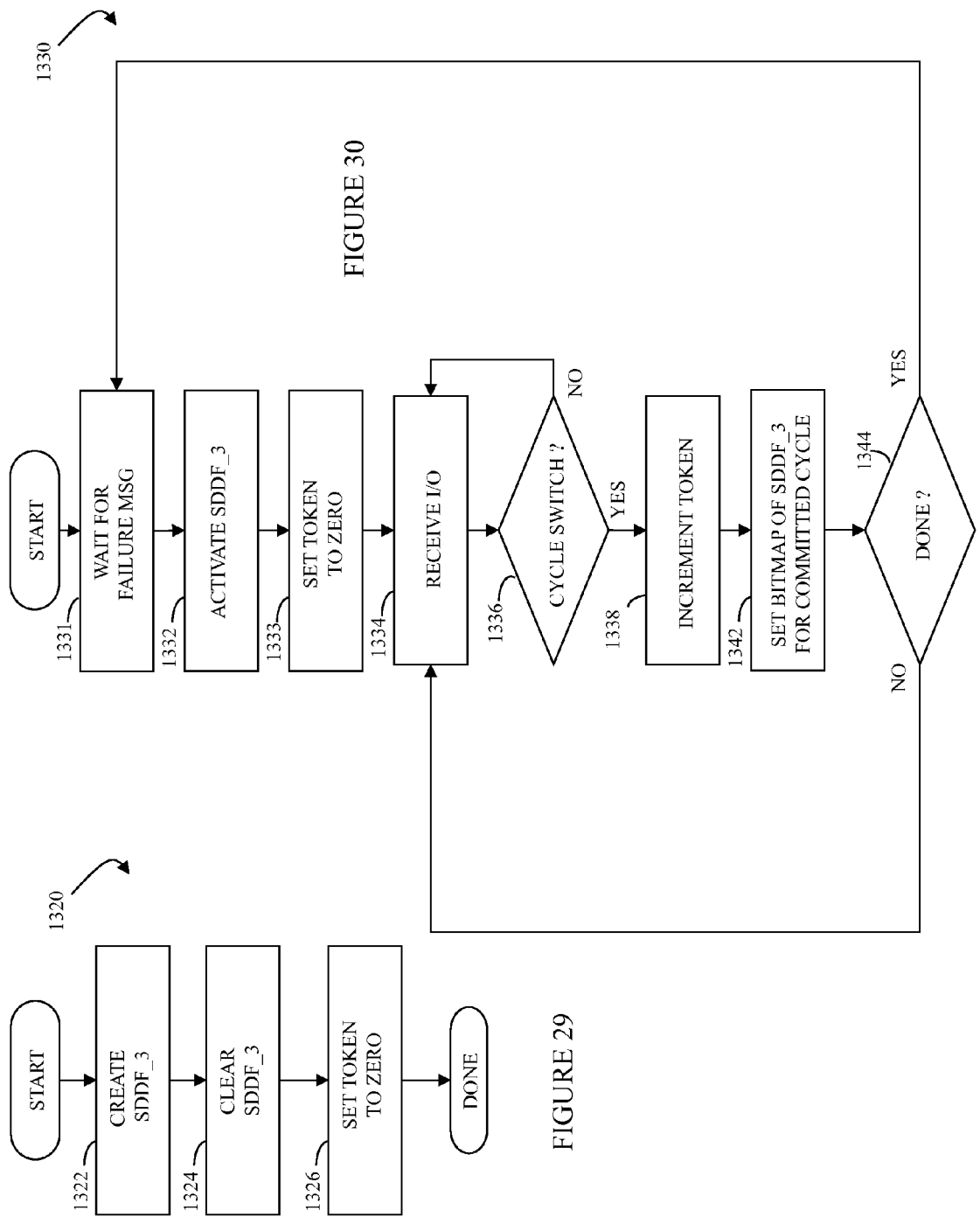
FIG. 29 is a flow chart illustrating a process performed by a local destination to initialize data recovery parameters according to an embodiment of the system described herein.
FIG. 30 is a flow chart illustrating a process performed by a remote destination in connection with collecting failure recovery data according to an embodiment of the system described herein.

Referring to FIG. 29, a flow chart 1320 illustrates steps performed in connection with collecting recovery data at the remote destination 1206. Unlike the local destination 1204, which is always collecting recovery data during steady state operation, the remote destination 1206 may not collect recovery data unless and until it receives a signal to do so. In an embodiment herein, the source group 1202 may provide such a signal to the remote destination 1206 when, for example, the source group 1202 detects that the link(s) between the source group 1202 and the local destination 1204 are not working and/or when the source group 1202 detects that the local destination 1204 is not appropriately receiving or processing data. In other embodiments or in other situations, the remote destination 1206 may receive an appropriate signal from a location or element other than the source group 1202.

Processing begins at a first step 1322 where a third SDDF session, SDDF_3 is created. Following the step 1322 is a step 1324 where the bitmap of the SDDF session created at the step 1322 is cleared. Following step 1324 is a step 1326 where a token value (described in more detail elsewhere herein) is set to zero. Following the step 1326, processing is complete.

Referring to FIG. 30, a flow chart 1330 illustrates steps performed by the remote destination 1206 in connection with collection of recovery data. Processing begins at a first step 1331 where the remote destination 1206 waits for a failure message from the source group 1202 or from some other source, as appropriate. Once a failure message has been received, control transfers from the step 1331 to a step 1332 where the SDDF_3 session is activated to begin collecting data regarding the tracks (or other appropriate data increments) of the remote destination 1206 to which a write has been performed. Note, however, that SDDF_3 reflects writes that have been committed (i.e., are one behind the current cycle being received).

Following the step 1332 is a step 1333 where a token value (described below) is initialized to zero. Following the step 1333 is a step 1334 where the remote destination 1206 receives an I/O from the source group 1202. Note that the I/O received at the step 1334 may represent ordered writes data that the local group 1202 sends to the remote destination 1206 in non-failure mode.

Following the step 1334 is a test step 1336 which determines if the I/O received from the source group 1202 at the step 1334 indicates a cycle switch by the source group 1202. If not (i.e., the data is conventional ordered writes data to be written to the remote destination 1206 or some other type of data), then control transfers from the test step 1336 back to the step 1334 to receive the next I/O.

If it is determined at the test step 1336 that the data from the source group 1202 indicates a cycle switch, then control transfers from the test step 1336 to a step 1338 to increment the token, which keeps track of the number of cycle switches since beginning collection of recovery data. Following the step 1338 is a step 1342 where the bitmap of the SDDF_3 is set to reflect data of the committed cycle that had been written. Note that the processing at the step 1342 may be performed automatically in connection with operation of the activated SDDF sessions, in which case in may not be necessary to make the step 1342 part of the recovery process shown in FIG. 30.

Note that the committed cycle is the cycle used to collect data prior to the cycle switch. Following the step 1342 is a test step 1344 which determines if processing is complete (i.e., collection of error recovery data is complete). Processing may be complete if the error situation (e.g., failed link from the local group 1202 to the local destination 1204) has been rectified or, for example, if the local destination 1204 and the remote destination 1206 are being synchronized (discussed below). If it is determined at the step 1344 that processing is not complete, then control transfers from the test step 1344 back to the step 1334 to receive another I/O. Otherwise, control transfers from the step 1344 back to the step 1331 to wait for a new failure message. Note that, in some embodiments, processing being complete at the step 1344 may also cause certain recovery parameters to be reset, as discussed in more detail below.

Figure 31:
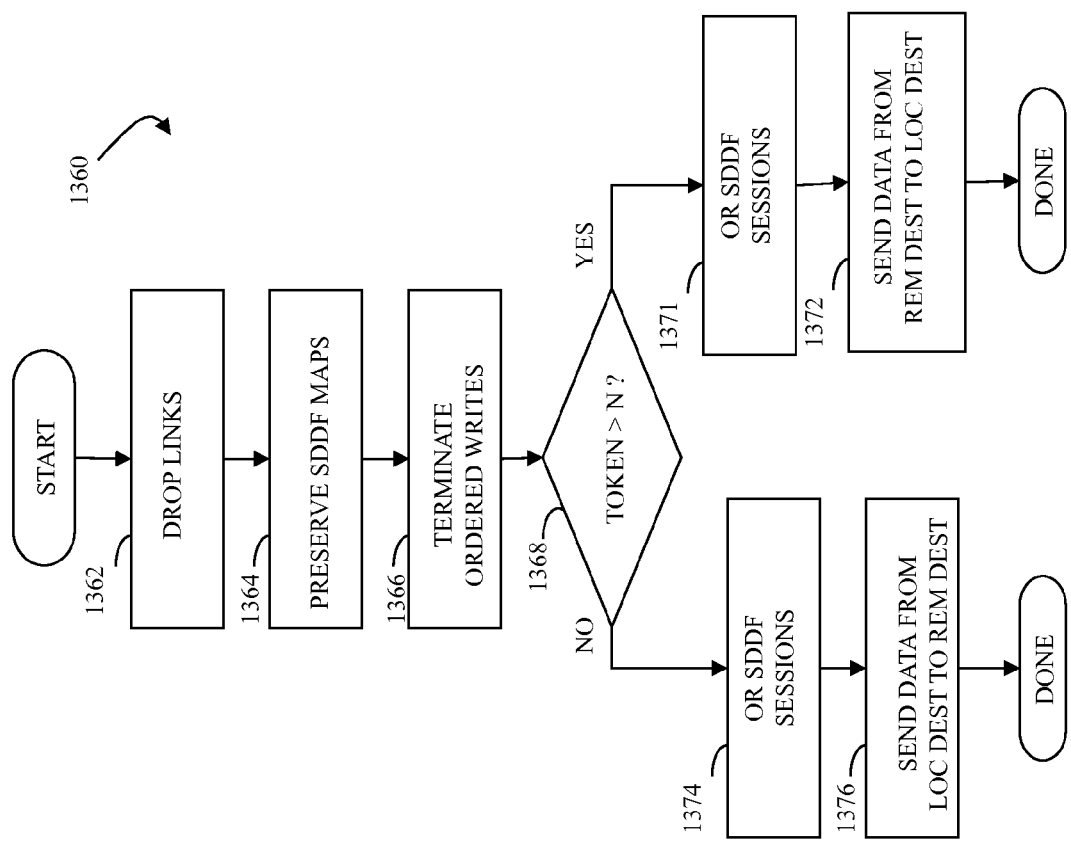
FIG. 31 is a flow chart illustrating a process performed in connection with failure recovery according to an embodiment of the system described herein.

Referring to FIG. 31, a flow chart 1360 indicates steps performed in connection with synchronizing the local destination 1204 and the remote destination 1206. As discussed above, the local destination 1204 and the remote destination 1206 may be synchronized by transferring data therebetween using the communication link 1208. After synchronization, the system may be restarted at the local destination 1204 or at the remote destination 1206 using the other as a mirror.

In connection with the synchronization, it may be useful to decide which of the local destination 1204 and remote destination 1206 has the latest (i.e., the most up-to-date) data so that the data is transferred from the one of the remote destination 1206 and local destination 1204 that has the most up-to-date data to the other.

Processing for the flow chart 1360 begins at a first step 1362, where the links are dropped between the source group 1202 and the local destination 1204 and the links are dropped between the source group 1202 and the remote destination 1206. Dropping the links at the step 1362 helps ensure that the synchronization process will not be corrupted. Following the step 1362 is a step 1364 where the SDDF maps, created while recovery information was being collected, is preserved. Following the step 1364 is a step 1366 where ordered writes between the source group 1202 and the local destination 1204 is terminated, for reasons similar to dropping the links at the step 1362.

Following the step 1366 is a test step 1368 where it is determined if the token value (discussed above) is greater than a predetermined value N. Note that the token value indicates the number of cycle switches that have occurred since collection of error recovery data began at the remote destination 1206. If the link between the source group 1202 and the local destination 1204 has not been working and the remote destination 1206 has begun collection of recovery data, then the remote destination 1206 may contain more up-to-date data than the local destination 1204. This will be determined by looking at the value of the token, which indicates the number of cycle switches that have occurred since the remote destination 1206 received a signal to begin collecting recovery data. Thus, if it is determined at the test step 1368 that the token is greater than some predetermined value N (e.g., two), then control transfers from the test step 1368 to a step 1371, where the bitmaps for all of the SDDF sessions (SDDF_1, SDDF_2, and SDDF_3) are ORed (using an inclusive OR) to determine the tracks (or other data amounts) of the remote destination 1206 and possibly of the local destination 1204 that correspond to data for the active and inactive buffers sent or in transit between the source group 1202 and the remote destination 1206 prior to failure of the source group as well as possible data that may be different on the local destination 1204.

Following the step 1371 is a step 1372 where the remote destination 1206 sends data from the tracks corresponding to the set bits of the bitmap that was the result or ORing the three bitmaps for SDDF_1, SDDF_2, and SDDF_3. The data from these tracks may be copied to the local destination 1204 so that the remote destination 1206 and the local destination 1204 may be synchronized. Following the step 1372, processing is complete. In an embodiment herein, N may be set to be no lower than two. Also, note that it may be possible to resume operation with a host coupled to an appropriate one of the local destination 1204 or the remote destination 1206 prior to completion of the copies initiated at the step 1376 or at the step 1372.

If it is determined at the test step 1368 that the token does not have a value greater than N (e.g., the token is zero), then control transfers from the test step 1368 to a step 1374 where the bitmaps for all of the SDDF sessions (SDDF_1, SDDF_2, and, if it exists, SDDF_3) are ORed (using an inclusive OR) to determine the tracks (or other data amounts) of the local destination 1204 that correspond to data for the active and inactive buffers sent or in transit between the source group 1202 and the remote destination 1206 prior to failure of the source group 1202. Following the step 1374 is a step 1376 where the data corresponding to the ORing of the bitmaps is sent from the local destination 1204 to the remote destination 1206 via the communication link 1208. Once the data is sent from the local destination 1204 to the remote destination 1206, then the local destination 1204 and the remote destination 1206 will be synchronized. Following the step 1376, processing is complete.

The step 1372, 1374, 1376 may be accomplished using any number of appropriate techniques. For example, a background copy may be initiated to copy the data using bits indicated by the result of ORing the bitmaps of the SDDF sessions. In an embodiment herein, the steps 1372, 1374, 1376 are performed using RDF, where an R1/R2 pair is first established using, for example, the dynamic RDF mechanism disclosed in U.S. Pat. No. 6,862,632, which is incorporated by reference herein. Following that, the bitmaps may be used to modify device table maps in one or both of the local destination 1204 and the remote destination 1206 to cause the RDF mechanism to perform a background copy.

Referring to FIG. 32, a flow chart 1380 illustrates in more detail steps performed in connection with the terminate ordered writes step 1366 of the flow chart 1360 of FIG. 31. Note that the processing of FIG. 32 illustrates clean up when the source group 1202 uses a single storage device. In instances where the source group 1202 includes more than one storage device, then the processing illustrated by the FIG. 23 may be used instead.

Processing begins at a first test step 1382 where it is determined if all of the ordered writes data received by the remote destination 1206 from the source group 1202 has been completely processed (saved by the remote destination). That is, at the test step 1382, it is determined if there is any data at the remote destination 1206 corresponding to ordered writes cycles that have not been stored on the disk space of the remote destination 1206 or at least in the cache and marked for write to the disk space. If it is determined at the test step 1382 that all ordered writes data has been processed at the remote destination 1206, then processing is complete.

If it is determined at the test step 1382 that some of the ordered writes data from the source group 1202 has not been processed, then control transfers from the test step 1382 to a test step 1384 which determines if the received, but unprocessed, ordered writes data at the remote destination 1206 corresponds to a complete ordered writes cycle. Note that, as the source group 1202 sends data corresponding to a particular cycle to the remote destination 1206, the cycle at the remote destination 1206 is not complete unless and until a commit message is sent from the source group 1202 to the remote destination 1206. If it is determined at the test step 1384 that the unprocessed data corresponds to a complete ordered write cycle, then control transfers from the test step 1384 to a step 1385 where the data for the cycle is stored by saving the data to the disk of the remote destination 1206 and/or marking the data in the cache of the remote storage device 1206 for write to the disk thereof. Following the step 1385, processing is complete.

If it is determined at the test step 1384 that the unprocessed ordered writes data from the source group 1202 does not correspond to a complete cycle, then control transfers from the test step 1384 to a step 1386 where invalid bits are set on the device table of the remote destination 1206. The invalid bits set at the step 1386 indicate that tracks (or some other data increment) of the remote destination 1206 contain invalid data and thus need to be copied from another device to be brought up-to-date. In this instance, the other device may be the local destination 1204, depending upon which of the local destination 1204 and the remote destination 1206 contains the most up-to-date information. The particular tracks (or other data elements) that are set to invalid in the device table of the remote destination 1206 correspond to the tracks indicated by the unprocessed ordered writes data received from the source group 1202. Following step 1386 is a step 1387 where the unprocessed ordered writes data for the incomplete cycle is discarded. Following step 1387, processing is complete.

Referring to FIG. 33, a flow chart 1390 illustrates in more detail steps performed in connection with the step 1376 where data is copied from the local destination 1204 to the remote destination 1206 or the step 1372 where data is copied from the remote destination 1206 to the local destination 1204. Processing begins at a first step 1392 where the OR of SDDF_1, SDDF_2, and SDDF_3 (from the step 1374) is used to set a device table at whichever one of the local destination 1204 and the remote destination 1206 will be the R1 device after recovery. If data is to be copied from the R1 device to the R2 device, then the device table locations corresponding to remote tracks are set at the step 1392. Otherwise, if data is to be copied from the R2 device to the R1 device, then the device table locations corresponding to local tracks are set at the step 1392. In many instances, the tracks corresponding to the modification of the table at the step 1392 will be the same or a superset of the modification to the table from the step 1386, discussed above.

Following step 1392 is a step 1396 where the background copy process is begun. The background copy process begun at the step 1396 causes data to copied in a background process. Following step 1396, processing is complete.

Referring to FIG. 34, a flow chart 1450 illustrates steps performed in connection with reinitializing the recovery parameters once normal operation is restored between the source group 1202, the local destination 1204, and the remote destination 1206. Processing begins at a first step 1452 where both of the SDDF sessions, SDDF_1 and SDDF_2, are deactivated. Following the step 1452 is a step 1454 where SDDF_1 is cleared. Following step 1454 is a step 1456 where SDDF_2 is cleared. Following the step 1456 is a step 1458 with a pointer that points to one of the SDDF sessions is made to point SDDF_1. Following step 1458 is a step 1462 where SDDF_1 is activated. Following step 1462, processing is complete.

Referring to FIG. 35, a flow chart 1470 illustrates steps performed in connection with resetting recovery parameters used by the remote destination 1206. Processing begins at a first step 1472 where SDDF_3 is deactivated. Following the step 1472 is a step 1474 where SDDF_3 is cleared. Following the step 1474 is a step 1476 where the token used by the remote destination 1206 is cleared (set to zero). Following the step 1476, processing is complete. Note that, in some embodiments, it is possible to also terminate SDDF_3 at or after the step 1472 so that SDDF_3 may be recreated at the step 1322 of the flow chart 1320 of FIG. 29, discussed above.

Figure 36:
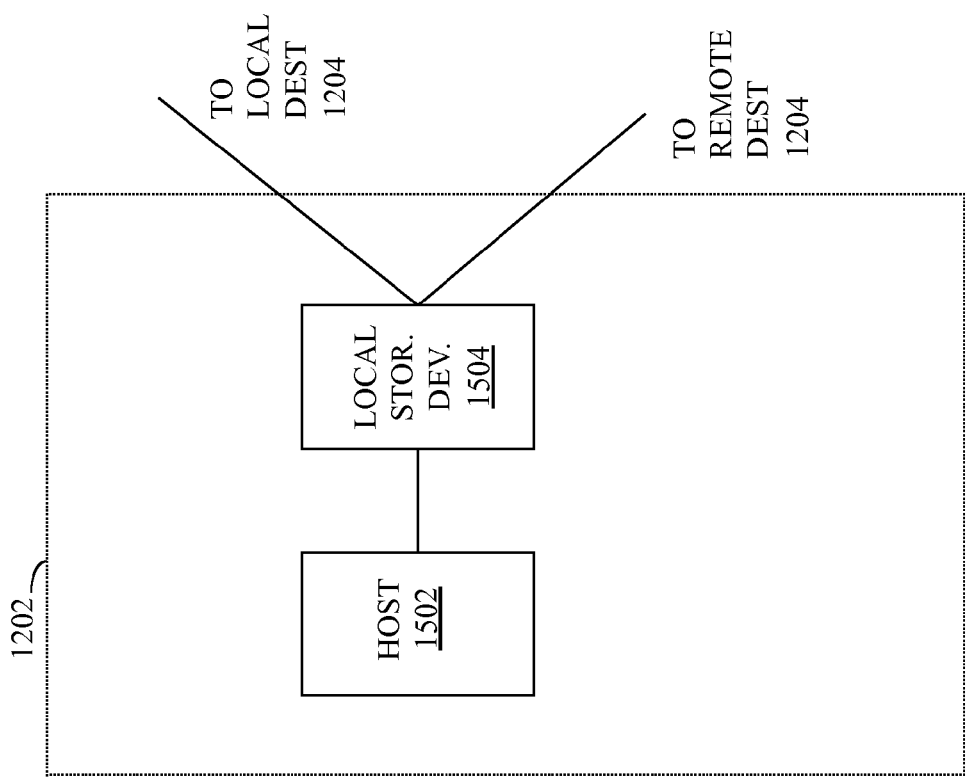
FIG. 36 is a diagram illustrating a configuration of a source group according to an embodiment of the system described herein.

Referring to FIG. 36, a diagram shows a possible configuration of the source group 1202. In the diagram of FIG. 36, the source group 1202 includes a host 1502 coupled to a single local storage device 1504. The local storage device 1202 is coupled to both the local destination 1204 and the remote destination 1206. In the configuration shown in FIG. 36, all of the processing described herein may be performed by the local storage device 1504 or, alternatively, some of the processing may be performed by the host 1502, as appropriate.

Figure 37:
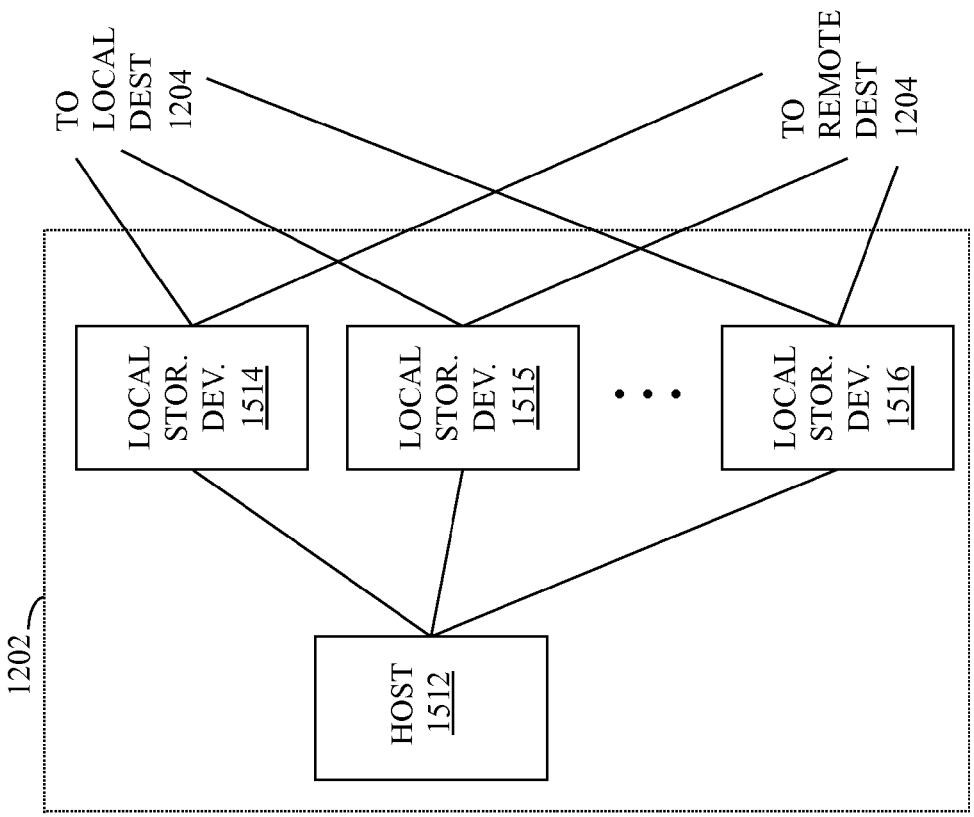
FIG. 37 is a diagram illustrating another configuration of a source group according to an embodiment of the system described herein.

Referring to FIG. 37, a diagram shows another configuration of the source group 1202 where a host 1512 is coupled to a plurality of local storage devices 1514-1516. Each of the local storage devices 1514-1516 is coupled to both the local destination 1204 and the remote destination 1206. In the configuration shown in FIG. 37, the host 1512 may handle some of the processing described herein such as, for example, cycle switching for all of the local storage devices 1514-1516 in connection with ordered writes.

In some instances, it may be desirable to prevent cycle switching if there is difficulty with data transfers between the source group 1202 and the local destination 1204. Of course, in instances of complete failure of the local destination 1204 or complete failure of links between the source group 1202 and the local destination 1204, the system may stop working completely and recovery will proceed as described above. However, in other cases where there may be intermittent failure (e.g., transient connectivity loss for the links between the source group 1202 and the local destination 1204), it may be desirable to simply not cycle switch on the source group 1202 in connection with communication between the source group 1202 and remote destination 1206, unless and until corresponding data is first successfully transferred from the source group 1202 to the local destination 1204. This enhancement is described below.

Figure 38:
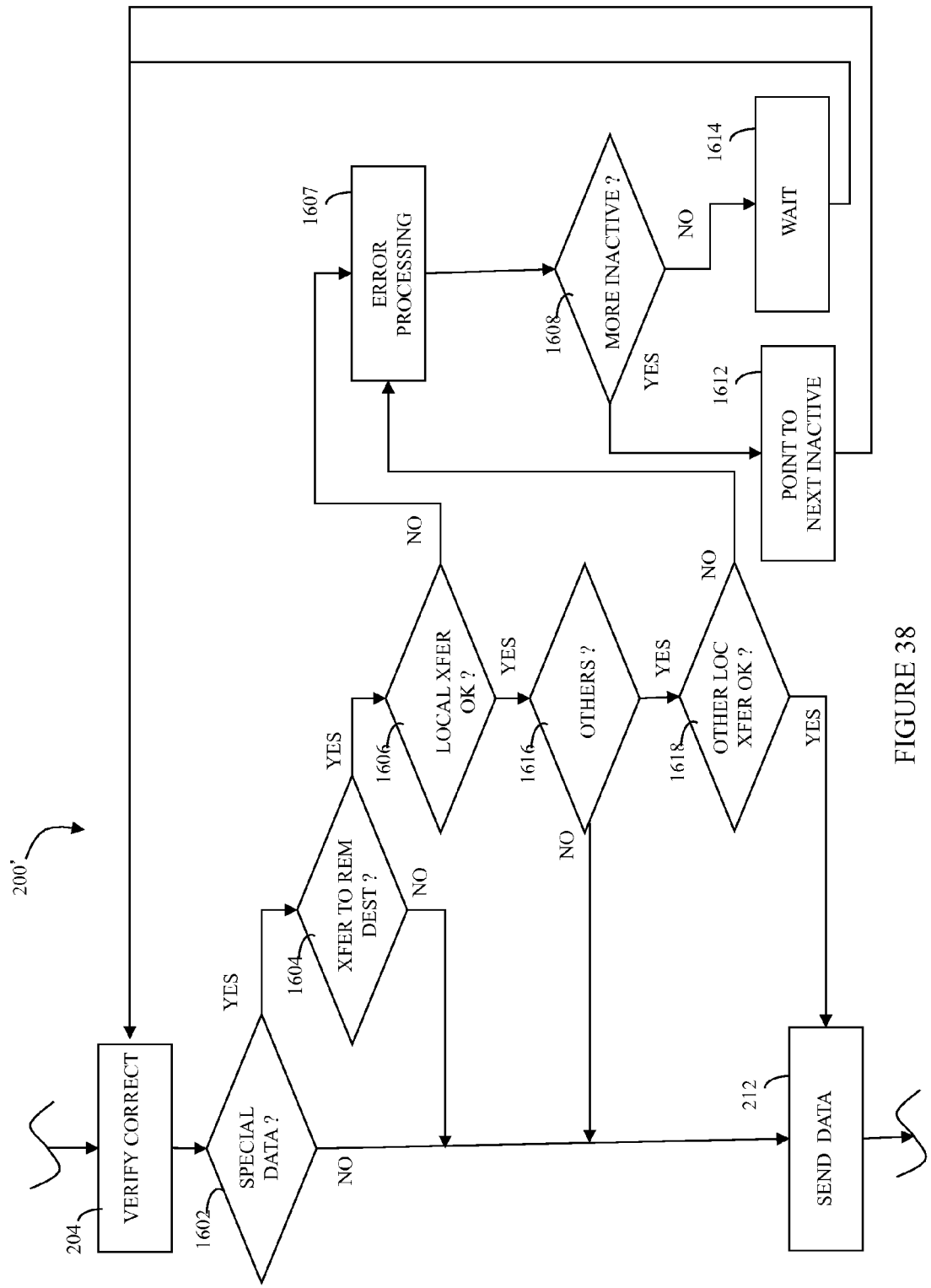
FIG. 38 is a flow chart illustrating an alternative embodiment for transferring data from a local storage device to a remote storage device according to an embodiment of the system described herein.

Referring FIG. 38, a flow chart 200' illustrates a modified portion of the flow 200 of FIG. 6, which shows steps performed in connection with transferring data from an inactive one of the lists 72, 74 (shown in FIG. 3) to another storage device. The flow chart 200' shows the step 204 and the step 212 which are also in the flow chart 200 and described above in connection with the text that explains FIG. 6. However, as set forth in more detail below, the flow chart 200' contains additional new steps that are not provided in the flow chart 200 of FIG. 6.

Following the step 204 is a test step 1602 which determines if the data being transferred to another storage device is special data. As used in connection with the flow chart 200', special data at the step 1602 refers to data being transmitted from the source group 1202 to both the local destination 1204 and to the remote destination 1206. In an embodiment herein, special data may be identified using built in mechanisms to determine if the data is queued for transfer to both the local destination 1204 and the remote destination 1206. Of course, other mechanisms for identifying and testing for special data may be used.

If it is determined at the test step 1602 that the data is not special data, then control transfers from the step 1602 to the step 212 to send the data as described above in connection with the flow chart 200 of FIG. 6. Following the step 212, processing continues as shown in the flow chart 200 of FIG. 6 and described elsewhere herein. If it is determined that the test step 1602 that the data being sent is special data (is being transferred from the source group 1202 to both the local storage device 1204 and the remote storage device 1206), then control transfers from the test step 1602 to a test step 1604 where it is determined if the particular transfer being examined is a transfer of the special data from the source group 1202 to the remote destination 1206. As discussed elsewhere herein, it is desirable to avoid sending data from the source group 1202 to the remote destination 1206 unless and until the data has first been successfully transferred from the source group 1202 to the local destination 1204. Thus, the test at the step 1604 determines if the specific data transfer being examined is a transfer from the source group 1202 to the remote destination 1206. If not, then control transfers from the test step 1604 to the step 212 to continue processing, as described elsewhere herein. Otherwise, if it is determined at the test step 1604 that the data being examined corresponds to a transfer from the source group 1202 to the remote destination 1206, then control transfers from the test step 1604 to a test step 1606, which determines if the corresponding transfer of the data from the source group 1202 to the local destination 1204 had previously completed successfully. That is, for a given slot or portion of data being transferred to both the remote destination 1206 and the local destination 1204, the test at the step 1606 determines if the transfer from the source group 1202 to the local destination 1204 was performed successfully. If not, control transfers from the test step 1606 to a step 1607, where error processing/testing are performed.

In some cases, the inability to transfer data from the source group 1202 to the local destination 1204 causes the system to begin accumulating data at the remote destination 1206 by, for example, causing a failure message to be sent to the remote destination (see the flow chart 1330 of FIG. 30 and corresponding description) and by exiting from the processing illustrated by the flow chart 200' of FIG. 38 so that data is sent from the source group 1202 to the remote destination 1206 irrespective of whether the data was ever successfully sent from the source group 1202 to the local destination 1204. Other processing may occur such as, for example, setting invalid bits in a device table for data that is not transferred from the source group 1202 to the local destination 1204. Note that if the connection between the source group 1202 and the local destination 1204 is reestablished, it is possible to synchronize the remote destination 1204 and then resume steady state operation as described herein (e.g., the steps of the flow chart 200').

The criteria for determining whether or not to perform the above-described error processing may be set according to a number of functional factors discernable by one of ordinary skill in the art. In an embodiment herein, the criteria is set according to the likelihood that there is a failure of the link between the source group 1202 and the local destination 1204 and/or a failure of the local destination 1204. For example, the error processing at the step 1607 may determine that a failure has occurred if a certain amount of time has passed without data being successfully transferred from the source group 1202 to the local destination 1204. If the error processing at the step 1607 determines that a failure has not occurred (and thus processing should continue), then control transfers from the step 1607 to a test step 1608, which determines if there is more inactive data to be sent from the source group 1202 to the remote destination 1206. If so, then control transfers from the test step 1608 to a step 1612 where a pointer that iterates through the data (e.g., iterates through elements of the inactive one of the lists 74, 76) is adjusted to point to the next inactive block of data to be sent. Following the step 1612, control transfers back to the step 204, to continue processing as discussed elsewhere herein.

If it is determined at the test step 1608 that there is not more inactive data to be sent, then control transfers from the test step 1608 to a step 1614 where the process waits. Since it has already been determined that the data being sent corresponds to a transfer from the source group 1202 to the remote destination 1206 (at the test step 1604), and it has been established that the corresponding transfer from the source group 1202 to the local destination 1204 has not completed yet (according to the test at the step 1606), then if it is determined at the test step 1608 that there is no more data to be sent, then it is appropriate to wait at the step 1614 so that either more inactive data will be made available to send or until another process successfully transfers corresponding data from the source group 1202 to the local destination 1204, thus altering the result at the test step 1606 for the next iteration. Following the step 1614, control transfers back to the step 204 to continue processing as described elsewhere herein.

If it is determined at the test step 1606 that the corresponding transfer to the local destination 1204 had previously completed successfully, then control transfers from the test step 1606 to another test step 1616 to determine if the data being transferred has more than one slot associated therewith in connection with the transfer (e.g., an active slot and an inactive slot). As discussed elsewhere herein, under certain conditions, it is possible for there to be more than one slot associated with what would otherwise be a single slot. See, for example, the discussion above in connection with the flow chart 440 of FIG. 12 and the steps 446, 472, 474, 476, 478. Thus, if it is determined at the test step 1616 that there is not more than one slot, then control transfers from the test step 1616 to the step 212, to continue processing as described elsewhere herein. Otherwise, if it is determined at the test step 1616 that there is more than one corresponding slot, then control transfers from the test step 1616 to a test step 1618, which determines if the transfer of the other slots to the local storage device 1204 had been successful, like the test for the slot at the step 1606. If it is determined at the test step 1618 that all of the other corresponding slots were transferred properly to the local storage device 1204, then control transfers from the test step 1618 to the step 212 to continue processing as described elsewhere herein. Otherwise, control transfers from the test step 1618 to the step 1608, also described elsewhere herein.

In another embodiment of the system described herein, it is possible to not use COVD's for the R2 device like those shown in the diagram 240 of FIG. 7. That is, it is possible to implement the R2 receipt of asynchronous data without using COVD's at the R2 device.

Referring to FIG. 39, a diagram 1640 shows a cache 1642 that is provided in the remote storage device 26 that receives data. The cache 1642 includes a plurality of slots 1652-1654 in which asynchronous data that is received from the local storage device 24 is placed. Also shown is a first circularly linked list 1674 and a second circularly linked list 1676 which contain pointers to the slots 1652-1654 of the cache 1642. Thus, for example, the circularly linked list 1674 includes a plurality of pointers 1681-1685, each of which points to one of the slots 1652-1654 in the cache 1642. Similarly, the circularly linked list 1676 includes a plurality of pointers 1691-1695, each of which points to one of the slots 1652-1654 of the cache 1642. A standard logical device 1698 is also mapped to portions of the cache 1642.

In an embodiment herein, one of the lists 1674, 1676 corresponds to an inactive data chunk (e.g., like the chunk 56 shown in FIG. 2), while the other one of the lists 1674, 1676 corresponds to an active data chunk (e.g., like the chunk 58 of FIG. 2). Received data is accumulated using an inactive one of the data chunks while the active one of the data chunks is used for storing data at the standard logical device 1698 as described elsewhere herein in connection with the diagram 240 of FIG. 7 and the corresponding text. Thus, as new data arrives, it is placed in the cache 1642 and a new pointer is added to which one of the circularly linked lists 1674, 1676 corresponds to the inactive data chunk when the data is received.

In some instances, it may be useful to be able to determine whether a portion of the standard logical device 1698 (or any other logical device) has a slot associated therewith in the cache 1642 corresponding to received data. Of course, it is always possible to traverse both of the lists 1674, 1676 to determine if there is a corresponding slot in the cache 1642. However, it would be more useful if there were a way of using particular device, cylinder, and head values of a logical device to determine whether there is a corresponding one of the slots 1652-1654 in the cache 1642 waiting to be destaged to the device.

Referring to FIG. 40, a diagram 1700 shows a hash table 1702 which contain a plurality of entries 1704-1706. In an embodiment herein, each of the entries 1704-1706 either contains a null pointer or points to one of the cache slots 1652-1654 that correspond to data that has been received but not yet stored on the standard logical device 1698 (or another standard logical device). The table 1702 is indexed using a hash function that performs a mathematical operation using the particular values of the device, cylinder, and head to generate an index into the table 1702 to find the corresponding entry. Thus, when data is received by the R2 device, the hash function is applied to the device, cylinder, and head to find its index value into the table 1702 and then a pointer is written to the corresponding one of the entries 1704-1706 that points to the particular slot 1652-1654 in the cache 1642. Once the received data is appropriately destaged to the standard logical device 1698 (or another device), the corresponding one of the entries 1704-1706 is set to null. In this way, the hash table 1702 allows quickly determining whether a particular portion of a standard logical device corresponds to received data that has not yet been destaged. For the system described herein, any appropriate hash function may be used to generate the index into the table 1702.

In some instances, it may possible for a particular device, cylinder, and head values to generate an index into the table 1702 that is the same as an index generated by different values for the device, cylinder, and head. This is called a "collision". In instances where collisions occur, a second entry into the table 1702 corresponding to the same index as provided and the second entry is linked to the first entry so that a particular index would correspond to more than one entry. This is illustrated by an element 1708 that is linked to the element 1705 of the table 1702. Thus, a first device, cylinder, and head are hashed to generate and index to the entry 1705 while different device, cylinder, and head are input to the hash function to generate the same value for the index. In an embodiment herein, the entry 1705 is used to point to the data in the cache 1642 corresponding to the first device, cylinder, and head while the entry 1708 is used to point to data in the cache 1642 corresponding to the second device, cylinder and head. Of course, as data is destaged to an appropriate device, the corresponding one of the entries 1705, 1708 may be eliminated from the table 1700.

Note that any number of entries may correspond to a single index so that, for example, if collisions occur that cause three separate sets of values for device, cylinder, and head to generate the same index, then there would be three (or more) entries linked together at a particular index into the table 1702. Note also that other appropriate techniques may be used to handle collisions, including providing additional tables (e.g., a second table, a third table, a fourth table, etc.).

Referring to FIG. 41, a diagram 1720 shows an alternative embodiment of a hash table 1722 which contain a plurality of entries 1724-1726. The embodiment of FIG. 41 is like the embodiment of FIG. 40, with a few differences, as described herein. Each of the entries 1724-1726 either contains a null pointer or points to one of the cache slots 1728, 1732, 1734, shown in the diagram 1720, that correspond to data that has been received but not yet stored on the standard logical device 1698 (or another standard logical device). The table 1722 is indexed using a hash function that performs a mathematical operation using the particular values of the device, cylinder, and head to generate an index into the table 1722 to find the corresponding entry. Thus, when data is received by the R2 device, the hash function is applied to the device, cylinder, and head to find its index value into the table 1722 and then a pointer is written to the corresponding one of the entries 1724-1726 that points to the particular slot 1728, 1732, 1734. Once the received data is appropriately destaged to the standard logical device 1698 (or another device), the corresponding one of the entries 1724-1726 is adjusted appropriately. In this way, the hash table 1722 allows quickly determining whether a particular portion of a standard logical device corresponds to received data that has not yet been destaged. For the system described herein, any appropriate hash function may be used to generate the index into the table 1722.

For the embodiment shown in FIG. 41, in instances where collisions occur, the first slot pointed to by a table entry points to the second slot that caused the collision. Thus, for example, if the slot 1732 and a slot 1736 cause a collision at the table entry 1725, the table entry 1725 points to the slot 1732 while the slot 1732 points to the slot 1736. Thus, a collision does not cause any change in the table 1722 when the subsequent slot is added, since adding the subsequent slot simply involves changing the pointer value for a previous slot. Of course, any number of slots may correspond to a single table entry.

Note that any number of entries may correspond to a single index so that, for example, if collisions occur that cause three separate sets of values for device, cylinder, and head to generate the same index, then there would be three (or more) entries linked together at a particular index into the table 1702. Note also that other appropriate techniques may be used to handle collisions, including providing additional tables (e.g., a second table, a third table, a fourth table, etc.).

In some instances, it may be advantageous to be able to use something other than the local destination 1204 shown in the diagram 1200 of FIG. 26. Of course, if the local destination 1204 is not a full mirror of the source group, then recovery would be performed at the remote destination 1206. However, the remote destination 1206 may not contain data that is as up-to-date as data that was synchronously written from the source group 1202 to the local destination 1204. Accordingly, it is desirable to be able to recover at the remote destination 1206 but have data that is as up-to-date as data synchronously written from the source group 1202 to the local destination 1204.

Figure 42:
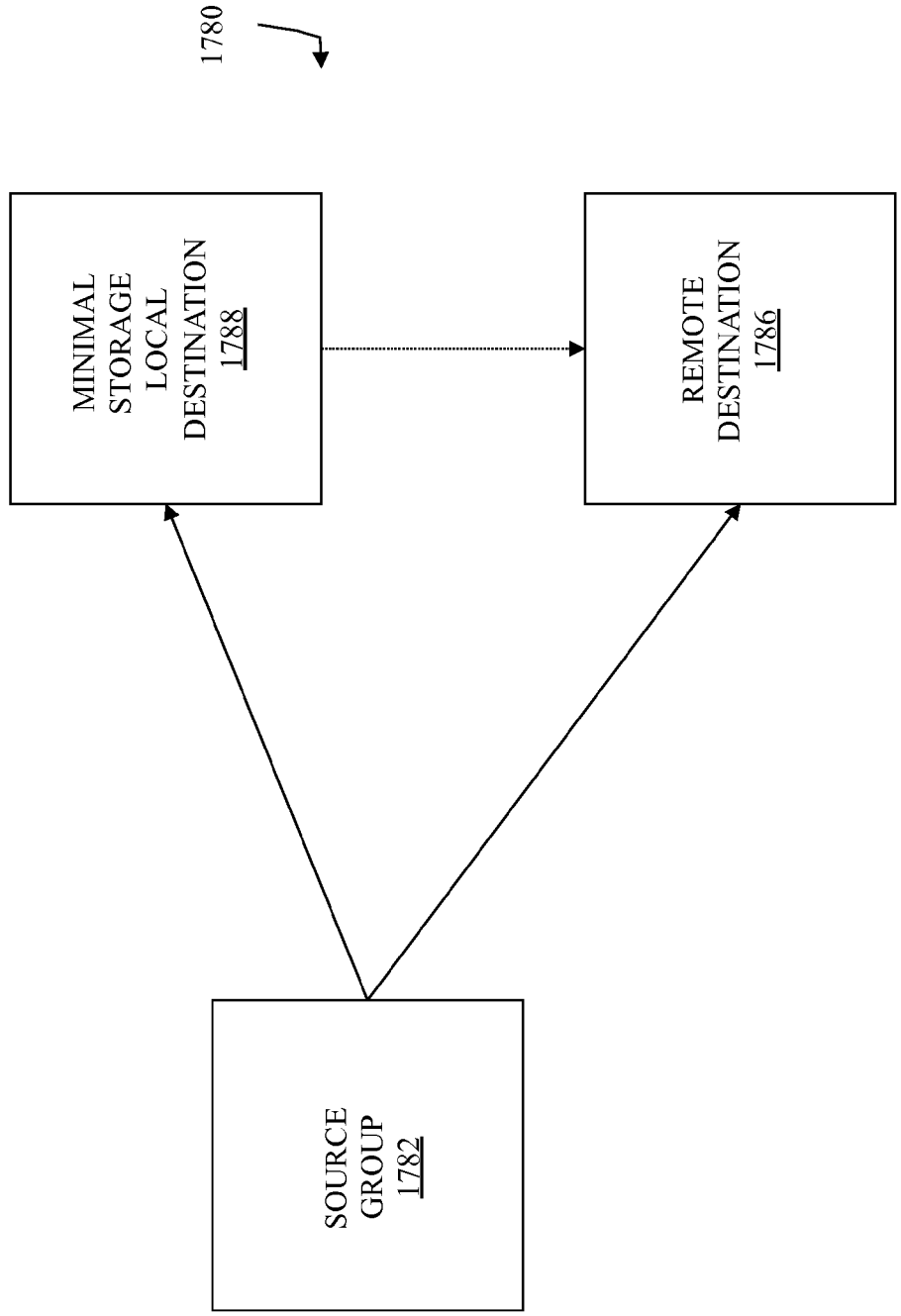
FIG. 42 is a schematic diagram showing a source group, a minimal storage local destination, and a remote destination according to an embodiment of the system described herein.

Referring to FIG. 42, a diagram 1780 shows a system containing a source group 1782 like the source group 1202 of the diagram 1200 of FIG. 26. The diagram 1780 also shows a remote destination 1786 like the remote destination 1206 of the diagram 1200 of FIG. 26.

The diagram 1780 also shows a minimal storage local destination 1788, which is used to receive synchronous data writes from the source group 1782. In an embodiment herein, the minimal storage local destination 1788 appears to the source group 1782 to be a storage device like the local destination 1204 of the diagram 1200 of FIG. 26. However, in an embodiment herein, the minimal storage local destination 1788 is not a mirror of the source group 1782. Instead, the minimal storage local destination 1788 is used to store data that will be transferred to the remote destination 1786 in the event that a recovery becomes necessary. In an embodiment herein, all recoveries are performed at the remote destination 1786. In other embodiments, it is possible for the source group 1782 to know that it is connected to the minimal storage local destination 1788.

The source group 1782 may operate like the source group 1202 of the diagram 1200 of FIG. 26. Thus, the source group 1782 provides synchronous writes to the minimal storage local destination 1788 and provides ordered writes to the remote destination 1786. The minimal storage local destination 1788, instead of being a mirror for the source group 1782, stores only the most recent synchronous writes from the source group 1782 so that, in the event a recovery becomes necessary, the minimal storage local destination 1788 may transfer the most recent writes to the remote destination 1786. As data is transferred from the source group 1782 to the remote destination 1786, corresponding data is removed from the minimal storage local destination 1788 so that the minimal storage local destination 1788 retains, for example, only the most recent two cycles of ordered writes data because any cycles older than the two most recent cycles are already stored on the remote storage device 1786.

Figure 43:
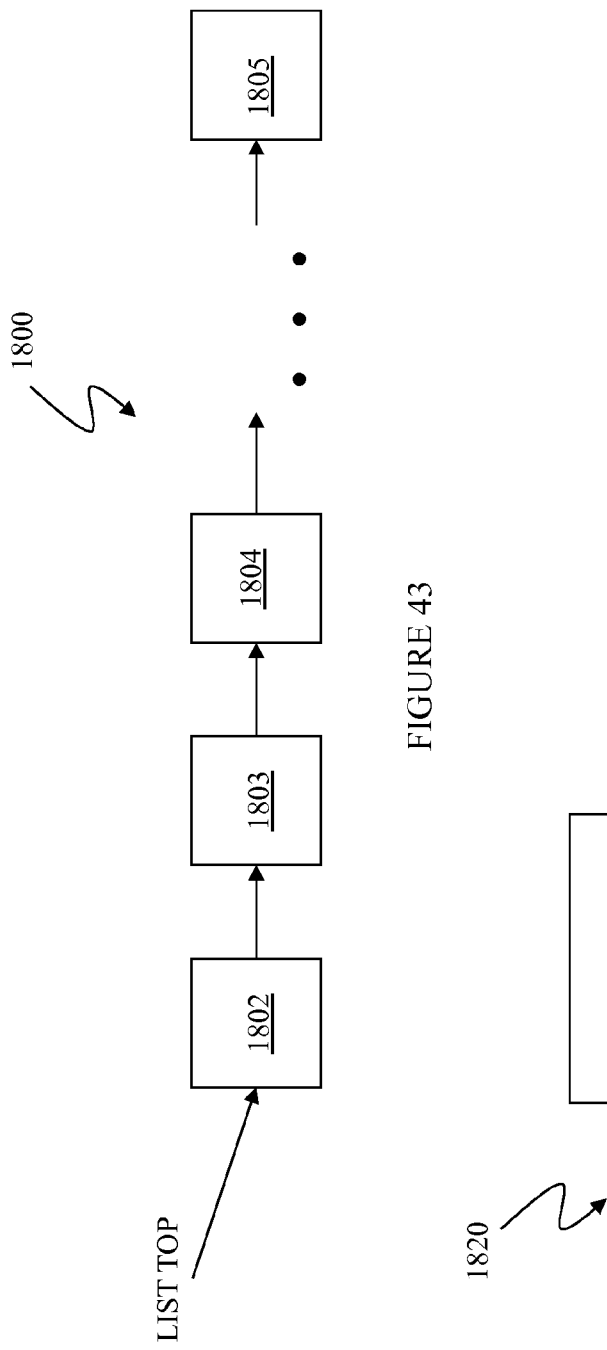
FIG. 43 is a schematic diagram showing data storage at a minimal storage local destination according to an embodiment of the system described herein.

Referring to FIG. 43, a data structure 1800 illustrates storage of data at the minimal storage local destination 1788. In an embodiment herein, the data structure 1800 is a linked list having a plurality of elements 1802-1805. A list top pointer points to the first element 1802. The first element points to the second element 1803, the second element points to the third element 1804, etc. The linked list 1800 also has a last element 1805 that points to a null pointer as a next element to indicate the end of the list. Of course, other appropriate data structures may be used.

In one embodiment herein, the list 1800 is sorted according to the track and head location on a standard logical device so that, for example, the element 1802 would be the first element in a sequence of elements on the standard logical device, the second element 1803 would follow the first element 1802, etc. In another embodiment, the list 1800 would be sorted according to the order that the data writes are provided from the source group 1782 to the minimal storage local destination 1788. Both embodiments are described in more detail below.

Figure 44:
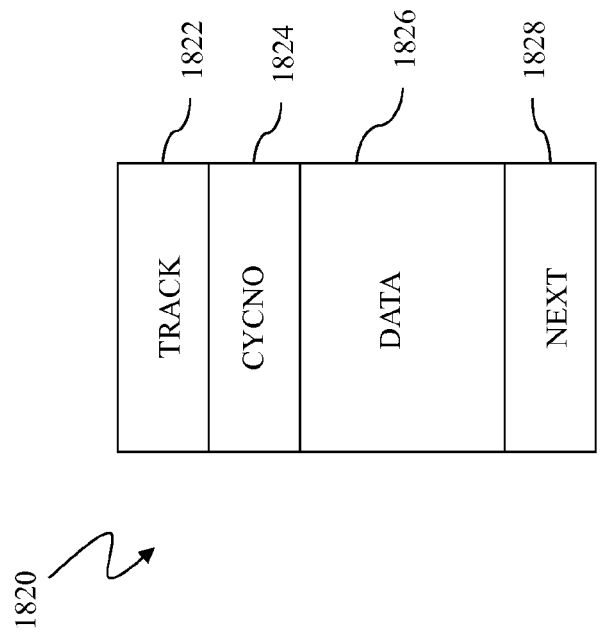
FIG. 44 is a diagram illustrating a data element used for data storage at a minimal storage local destination according to an embodiment of the system described herein.

Referring to FIG. 44, a diagram shows in more detail a data element 1820 of the linked list 1800. The data element 1820 includes a TRACK field 1822 that indicates a track number used to store the data on the corresponding standard logical device. Other data storage locations may be used in lieu of track number, such as sector number, offset from beginning of the standard logical device, or any other appropriate indicator.

The data element 1820 also includes a cycle number 1824 (CYCNO) which indicates the cycles used for transferring data from the source group 1782 to the remote destination 1786, as described elsewhere herein. When data is transferred from the source group 1782 to the minimal storage local destination 1788, the minimal storage local destination 1788 keeps track of cycle changes corresponding to transfers between the source group 1782 and the remote destination 1786 and assigns an appropriate cycle number to the data element 1820, as described in more detail elsewhere herein.

The data element 1820 also includes a data field 1826 (DATA) that corresponds to the data that has been transferred from the source group 1782 to the minimal storage local destination 1788. The data element 1820 also includes a next field 1828 (NEXT) that is used to point to the next data element in the linked list 1800.

Figure 45:
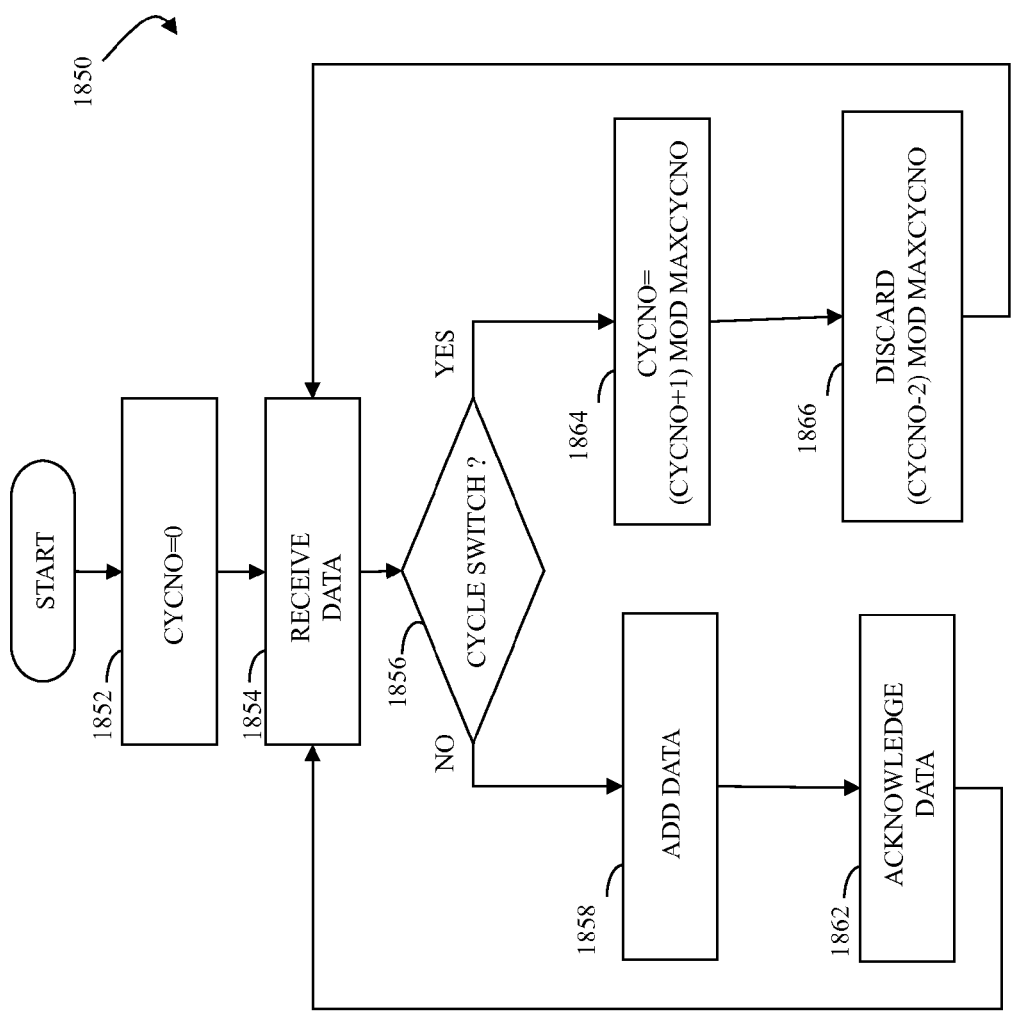
FIG. 45 is a flow chart illustrating steps performed in connection with a minimal storage local destination receiving data according to an embodiment of the system described herein.

Referring to FIG. 45, a flow chart 1850 illustrates steps performed by the minimal storage local destination 1788 in connection with receiving data provided by the source group 1782 to the minimal storage local destination 1788. As discussed elsewhere herein, the minimal storage local destination 1788 may appear to the source group 1782 to be a mirror of the source group 1782. However, as described herein, the minimal storage local destination 1788 is not necessarily a mirror of the source group 1782 but, instead, contains the most recent data from the source group 1782. In the event a recovery is necessary, the minimal storage local destination 1788 transfers the data stored thereon to the remote destination 1786 to facilitate recovery.

Processing for the flow chart 1850 begins at a step 1852 where a local cycle number, CYCNO, is set to zero. The local cycle number set at the step 1852 is used to keep track of the cycle changes at the source group 1782. Note that it is not necessary that the local cycle number correspond exactly to the particular cycle number used at the source group 1782. Rather, it is sufficient that the cycle number set at the step 1852 keep track of the cycle switches by the source group 1782.

Following the step 1852 is a step 1854 where data is received from the source group 1782. Following the step 1854 is a test step 1856 which determines if the received data corresponds to a cycle switch provided by the source group 1782. The test step 1856 is like the test step 1262 of FIG. 28A, discussed above.

If it is determined at the test step 1856 that the received data does not correspond to a cycle switch, then control transfers from the test step 1856 to a step 1858 where the received data is added to the storage of the minimal storage local destination 1788. Adding the data to the storage of the minimal storage local destination 1788 at the step 1858 is discussed in more detail elsewhere herein. Following step 1858 is a step 1862 where the received data is acknowledged to the source group 1782 by the minimal storage local destination 1788. Acknowledging the data at the step 1862 may be used to make the minimal storage local destination 1788 appear to the source group 1782 as a full synchronous mirror (i.e., the acknowledge provided at the step 1862 is the same acknowledge provided by a full synchronous mirror). Following the step 1862, control transfers back to the step 1854 to receive more data.

If it is determined at the test step 1856 that the data received at the step 1854 corresponds to a cycle switch, then control transfers from the step 1856 to a step 1864 where the internal cycle number, CYCNO, that is used with the minimal storage local destination 1788, is incremented. In an embodiment herein, there is a maximum cycle number, MAXCYCNO, so that the cycle number is incremented at the step 1864 by adding one to CYCNO and then taking the result thereof modulo MAXCYCNO.

Following the step 1864 is a step 1866 where data corresponding to previous cycle numbers is discarded. As discussed elsewhere herein, the minimal storage local destination 1788 stores the data corresponding to the two most recent cycle numbers. Any data older than two cycle numbers should have already been successfully transferred from the source group 172 to the remote destination 1786. Accordingly, since recovery will be provided at the remote destination 1786, then the minimal storage local destination 1788 need only store data corresponding to the current cycle number and data corresponding to the previous cycle number. In other embodiments, it may be possible to retain different data (e.g., the three or four most recent cycles). Discarding data at the step 1866 is discussed in more detail elsewhere herein. Following the step 1866, control transfers back to the step 1854, discussed above, to receive additional data.

Figure 46:
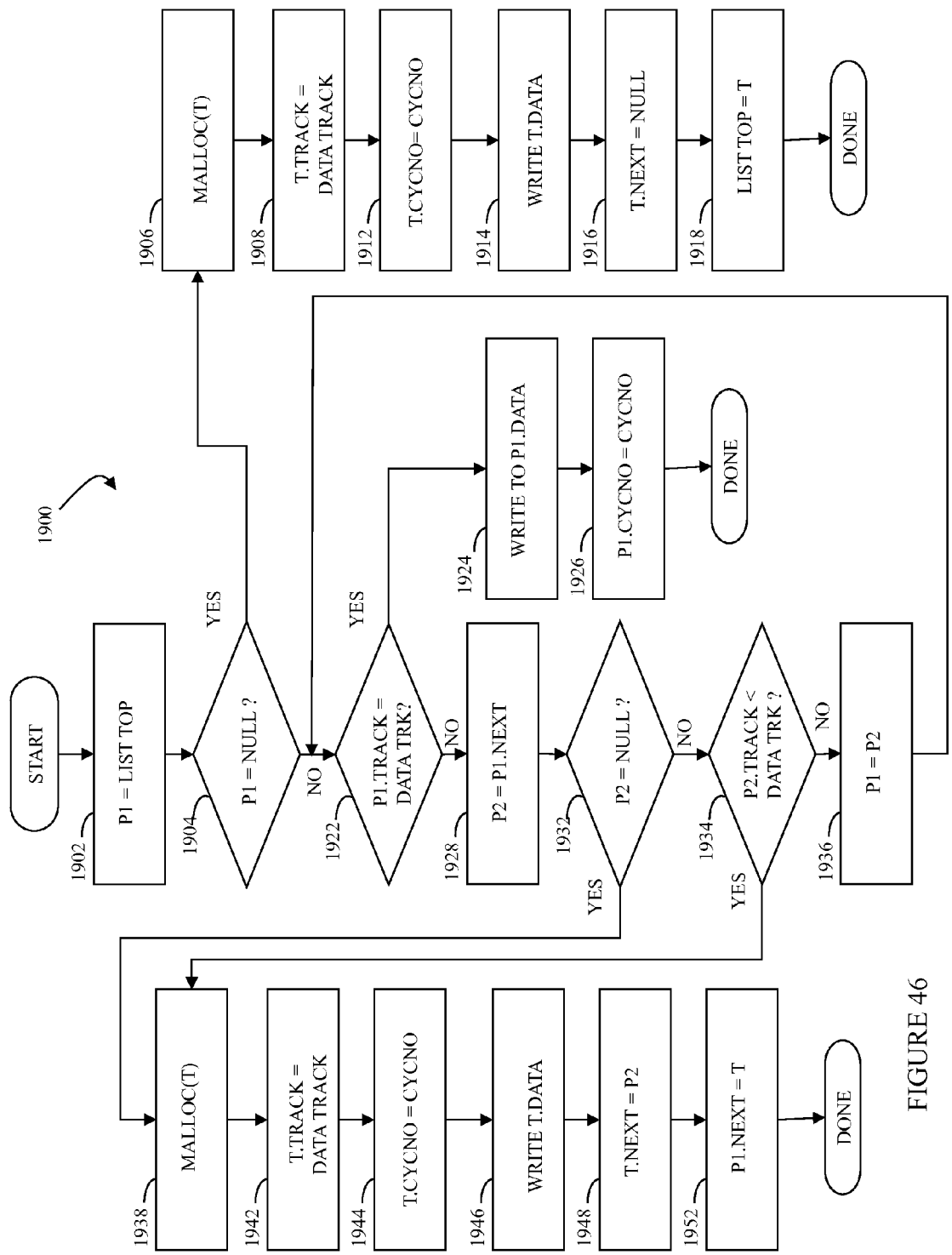
FIG. 46 is a flow chart illustrating steps performed in connection with a minimal storage local destination adding data according to an embodiment of the system described herein.

Referring to FIG. 46, a flowchart 1900 illustrates in more detail steps performed by the minimal storage local destination 1788 in connection with the step 1858 where received data is added to the data stored at the minimal storage local destination 1788. Processing begins at a first step 1902 where a temporary variable, P1, is set equal to list top, the pointer that points to the linked list 1800 of the data stored at the minimal storage local destination 1788.

Following the step 1902 is a test step 1904 where it is determined if the temporary variable, P1, equals null. If so, then there is no data stored in the linked list 1800 and the data being stored by the steps of the flowchart 1900 corresponds to the first data being stored at the minimal storage local destination 1788. If it is determined at the test step 1904 that P1 equals null, then control transfers from the test step 1904 to a step 1906 where memory is obtained from a heap (or something appropriate similar) using a malloc command (or something appropriately similar) for a temporary variable, T, used to temporarily store data. Following the step 1906 is a step 1908 where a track number field of the data record T (T.TRACK) is set equal to the track of the standard logical device on which the data is stored at the source group 1782. Following the step 1908 is a step 1912 where T.CYCNO is set equal to the current local cycle number at the minimal storage local destination 1778.

Following the step 1912 is a step 1914 where the received data is copied to the data field of T (i.e., T.DATA). Following the step 1914 is a step 1916 where the next field (T.NEXT) is set equal to null. Following the step 1916 is a step 1918 where the list top is set equal to T. Following the step 1918, processing is complete.

If it is determined at the test step 1904 that the variable P1 does not equal null, then control transfers from the test step 1904 to a test step 1922 where it is determined if the track number corresponding to the data that has been received equals the track number of the data element pointed to by P1. If so, then control transfers from the test step 1922 to a step 1924 where the received data is written to the data field at P1.DATA (perhaps overwriting existing data). Following the step 1924 is a step 1926 where the cycle number field of the element pointed to by P1 (P1.CYCNO) is overwritten with the current local cycle number (CYCNO) stored at the minimal storage local destination 1778. Following the step 1926, processing is complete.

If it is determined at the test step 1922 that the track number of the element pointed to by P1 does not equal the track number corresponding to the received data, then control transfers from the test step 1922 to a step 1928 where another temporary variable, P2, is set equal to P1.NEXT. Following the step 1928 is a test step 1932 where it is determined if P2 equals null (i.e., P1 points to an element at the end of the linked list 1800). If not, then control transfers from the test step 1932 to a test step 1934 where it is determined if the track number corresponding to the element pointed to by P2 is less than the track number corresponding to the data that has been received. The test at the step 1934 determines if the received data is to be a new element that is interposed between P1 and P2. If it is determined at the test step 1934 that the track number of the element pointed to by P2 is not less than a track number corresponding to the received data, then control transfers from the test step 1934 to a step 1936 where the temporary variable P1 is set equal to P2 in order to prepare for the next iteration. Following the step 1936, control transfers back to the test at 1922, discussed above.

If it is determined at the test step 1932 that P2 points to null, or if it is determined at the test step 1934 that the track number of the data element pointed to by P2 is less than the track number corresponding to the received data, then control transfers to the step 1938 where a new element (for the list 1800) is allocated using a temporary variable, T. Following the step 1938 is a step 1942 where the track number of T (T.TRACK) is set equal to the track number corresponding to the received data. Following the step 1942 is a step 1944 where the cycle number field of T (T.CYCNO) is set equal to the local cycle number at the minimal storage local destination 1788.

Following the step 1944 is a step 1946 where the received data is written to the data field of the temporary storage area (T.DATA). Following the step 1946 is a step 1948 where the next field of T (T.NEXT) is set equal to P2. Following the step 1948 is a step 1952 where the next field of the element pointed to by P1 (P1.NEXT) is set to point to T T. Following the step 1952, processing is complete.

The flowchart 1900 of FIG. 46 illustrates an embodiment where the linked list 1800 at the minimal storage local destination 1788 is sorted according to the track number corresponding to the received data. It is also possible to sort the received data according to the order of receipt of the data at the minimal storage local destination 1788.

Figure 47:
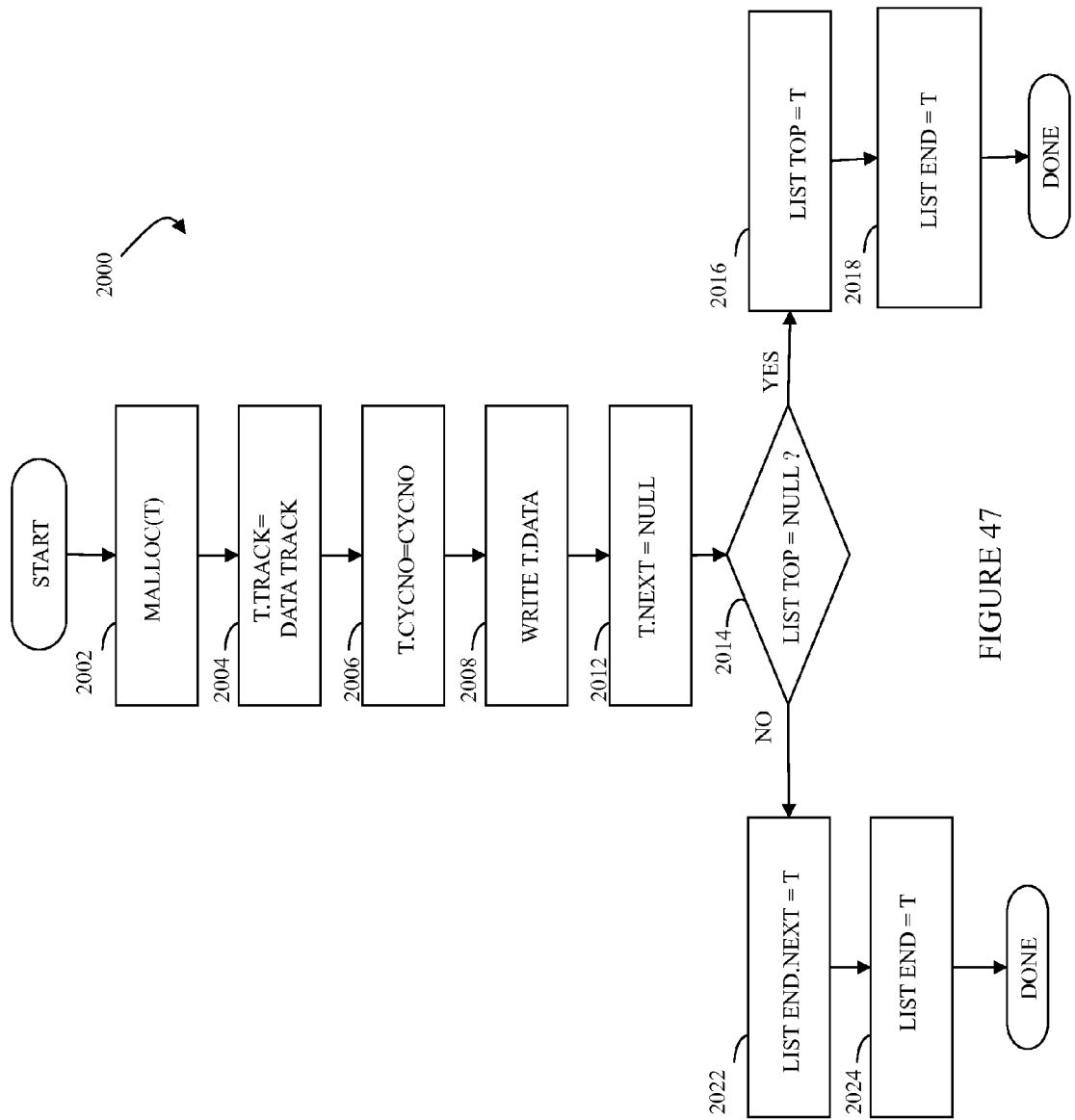
FIG. 47 is a flow chart illustrating steps performed in connection with a minimal storage local destination adding data according to another embodiment of the system described herein.

Referring to FIG. 47, a flowchart 2000 illustrates steps performed by the minimal storage local destination 1788 at the step 1858 where data is added. In the alternative embodiment illustrated by the flowchart 2000, the data in the linked list 1800 is stored according to the order of receipt of the data at the minimal storage local destination 1788.

Processing begins at first step 2002 where a new data element, T, is allocated. Following the step 2002 is a step 2004 where the track number field of the allocated element (T.TRACK) is set equal to the track number corresponding to the received data. Following the step 2004 is a step 2006 where the cycle number field of the allocated element (T.CYCNO) is set equal to the local cycle number provided at the minimal storage local destination 1788 (CYCNO).

Following the step 2006 is a step 2008 where the received data is written to the data field of the allocated element (T.DATA). Following the step 2008 is a step 2012 where the next field of the allocated element (T.NEXT) is set equal to null. In an embodiment herein, the most recently received data is added at the end of the linked list 1800. Following the step 2012 is a test step 2014 which determines if the list top (the pointer to the head of the linked list 1800) equals null. Note that when the first data is written to the linked list 1800, or if all data has been removed from the list 1800, the list top may equal null. If it is determined at the test step 2014 that the list top equals null, then control transfers from the test step 2014 to a step 2016 where the list top is set to point to the newly allocated data element, T. Following the step 2016 is a step 2018 where a list end element, LE, which keeps track of the end of the list 1800, is also set to point to the newly allocated data element, T. Following the step 2018, processing is complete.

If it is determined at the test step 2014 that the list top does not equal null, then control transfers from the test step 2014 to a step 2022 where the next field of the data element pointed to by the list end pointer (LE.NEXT) is set to point to the newly allocated data element, T. Following the step 2022 is a step 2024 where the list end pointer, LE, is set equal to the newly allocated data element, T. Following the step 2024, processing is complete.

Figure 48:
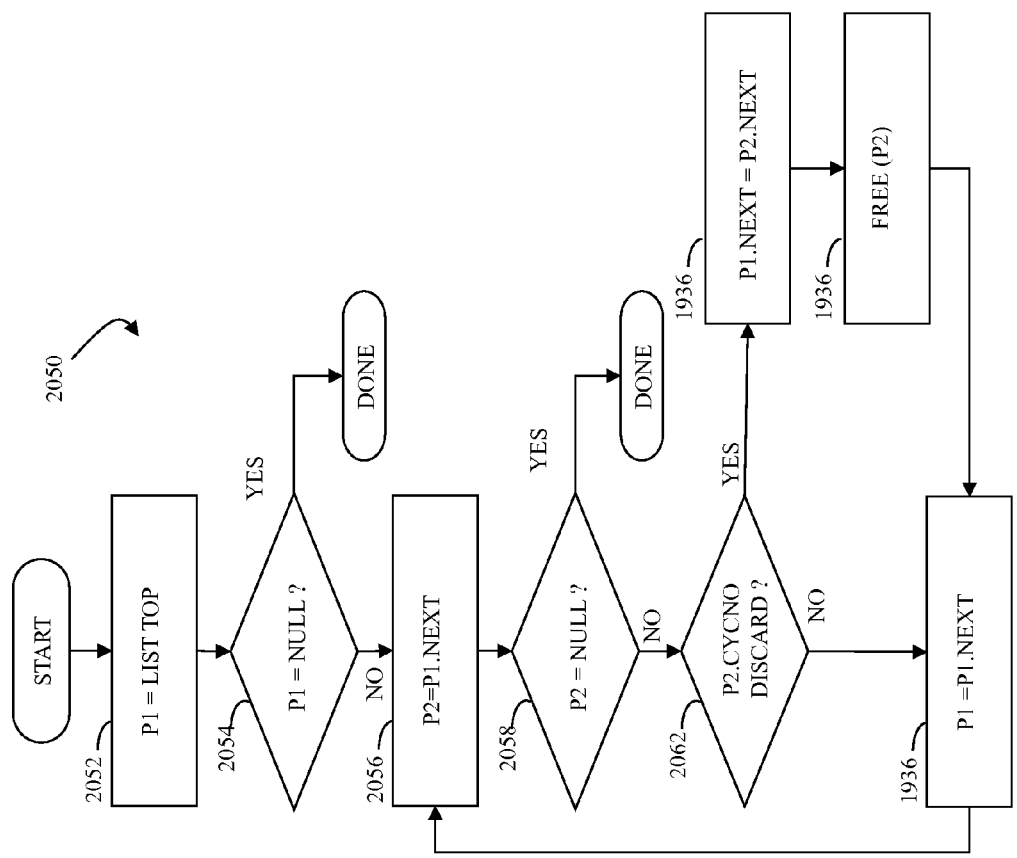
FIG. 48 is a flow chart illustrating steps performed in connection with a minimal storage local destination removing data according to an embodiment of the system described herein.

Referring to FIG. 48, a flow chart 2050 illustrate steps performed by the minimal storage local destination 1788 in connection with the discard step 1866 of the flow chart 1850 of FIG. 45. In an embodiment herein, the same processing may be used for discarding irrespective of whether the data is stored on the linked list 1800 according to the track number (embodiment of FIG. 46) or according to the order of receipt (embodiment of FIG. 47). Note that a technique used for discarding the data may be independent of a technique used to add data.

Processing for the flow chart 2050 begins at a first step 2052 where a temporary variable, P1, is set equal to the list top variable that points to the first element of the linked list 1800. Following the step 2052 is a test step 2054 where it is determined if P1 equals null. If so, then processing is complete. Otherwise, control transfers from the test step 2054 to a step 2056 where another temporary variable, P2, is set equal to the next field of the data element pointed to by P1 (i.e., is set equal to P1.NEXT). Following the step 2056 is a test step 2058 where it is determined if P2 points to null. If so, then processing is complete. Otherwise, control transfers from the test step 2058 to a test step 2062 which determines if the cycle number of field of the data element pointed to by P2 (P2.CYCNO) equals the cycle number for data being discarded (e.g., (CYCNO-2) modulo MAXCY-CNO). If so, then control transfers from the test step 2062 to a step 2064 where the next field of the element pointed to by P1 (P1.NEXT) is set equal to the next field of the element pointed to by P2 (P2.NEXT), thus removing the element pointed to by P2 from the linked list 1800. Following the step 2064 is a step 2066 where the element pointed to by P2 is freed (i.e., returned to a heap). Following the step 2066 is a step 2068 where P1 is set equal to the next field pointed to by P1 (i.e., P1=P1.NEXT). Following the step 2068, control transfers back to the step 2056 for the next iteration. Note that if it is determined at the test step 2062 that the cycle number field of the element pointed to by P1 does not equal a cycle number of data being discarded, then control transfers from the test step 2062 to the step 2068, discussed above.

Note that for the embodiments discussed in connection with FIGS. 42-48, it is not necessary to maintain the SDDF maps since recovery is always performed at the remote destination 1786 and all of the stored data is transferred from the minimal storage local destination 1788 to the remote destination 1786 recovery. Thus, it is not necessary to keep track of specific data that needs to be transferred. In addition, it is not necessary to have a token or any other mechanism for keeping track of which device will be used for recovery since the remote destination 1786 is always used for recovery in connection with the embodiments of FIGS. 42-48. Furthermore, it is not necessary to perform the processing of FIGS. 29 and 30 at the remote destination since there are no tokens or SDDF maps.

Figure 49:
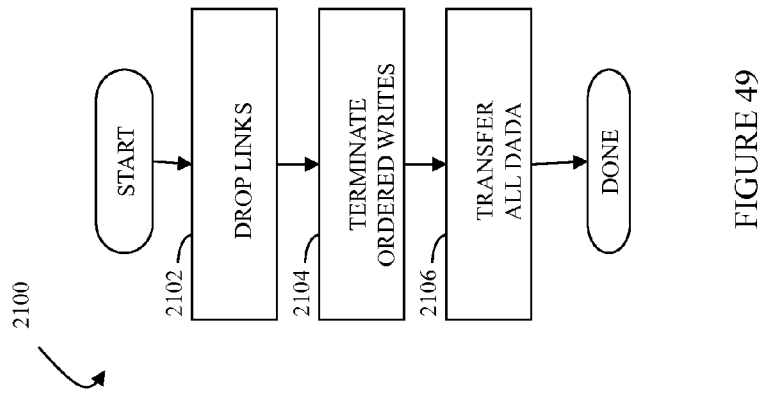
FIG. 49 is a flow chart illustrating steps performed in connection with data recovery according to an embodiment of the system described herein.

Referring to FIG. 49, a flow chart 2100 illustrates steps performed in connection with recovering at the remote destination 1786 when, for example, the source group 1782 ceases to be operational. Processing begins at a first step 2102 where the links between the source group 1782, the remote destination 1786 and the minimal storage local destination 1788 are dropped. Dropping the links at the step 2102 is like dropping the links at the step 1362 of the flow chart 1360 of FIG. 31. Following the step 2102 is a step 2104 where ordered writes are terminated. Terminating ordered writes at the step 2104 is like terminating ordered writes at the step 1366 of the flow chart 1360 of FIG. 31.

Following the step 2104 is a step 2106 where all data is transferred from the minimal storage local destination 1788 to the remote destination 1786. The data may be transferred according to the order of data elements on the linked list 1800. Thus, for example, if the linked list 1800 is stored according to the time sequence of writes to the minimal storage local destination 1788 (embodiment shown in FIG. 47), then the data will be transferred from the minimal storage local destination 1788 to the remote destination 1786 according to the time sequence of writes. Alternatively, if data is stored in the linked list 1800 in order of storage locations on the corresponding standard logical device (embodiment in FIG. 46), then data may be transferred in that order from the minimal storage local destination 1788 to the remote destination 1786. Following the step 2106, processing is complete and operation may resume using the remote storage device 1786, which has the most up-to-date data.

Figure 50:
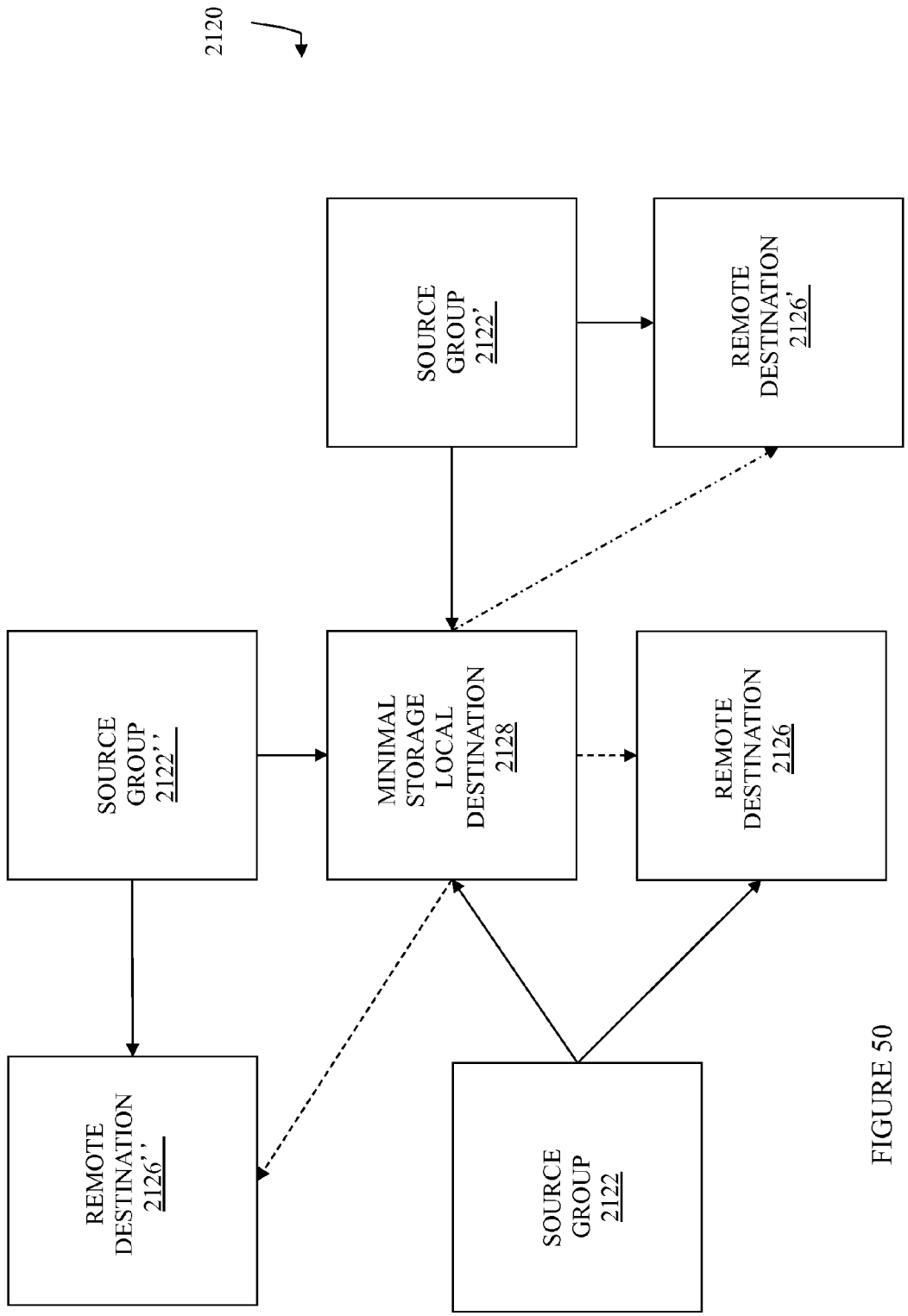
FIG. 50 is a schematic diagram showing a plurality of source groups and remote destinations coupled to a minimal storage local destination according to another embodiment of the system described herein.

Referring to FIG. 50, a diagram 2120 illustrates sharing of resources. The diagram 2120 includes a source group 2122 and a remote destination 2126 which are like the source group 1782 and the remote destination 1786 of FIG. 42. The diagram 2120 also shows a minimal storage local destination 2128 which is like the minimal storage local destination 1788 of FIG. 42, except that the minimal storage local destination 2128 may be shared by unrelated storage systems. Note that the minimal storage local destination 2128 may be any type of storage device including a Symmetries device provided by EMC Corporation, a personal computer, or any other device capable of storing data and providing the functionality described herein.

The diagram also shows a second source group 2126' and a second remote destination 2122'. However, the source group 2122' transfers data to the minimal storage local destination 2128 that is also used by the source group 2122. Should recovery become necessary for either or both of the source groups 2122, 2122', recovery data will be provided by the minimal storage local destination 2128 to one or both of the remote destinations 2126, 2126'. In an embodiment herein, the minimal storage local destination 2128 stores data from the source group 2122 in a separate location from data stored for the source group 2122'.

The diagram 2120 also shows a third source group 2122" and a third remote destination 2126". The third source group 2122" also transfers data to the minimal storage local destination 2128. In addition, should recovery become necessary, the minimal storage local destination 2128 may transfer recovery data to the remote destination 2126".

The number of source groups and remote destinations coupled to a minimal storage local destination may be bounded by the storage and processing capability of the minimal storage local destination. Note also that a single storage device may be used as the remote destination for multiple source groups.

An advantage of the system described herein is the ability to switch operations from the source group to either the local destination or the remote destination. This switching may be performed either as part of a planned operation (e.g., for maintenance purposes) or as an unplanned operation when the source group fails. It is also possible for one or more of the links to fail, which may or may not require switching operations.

Figure 51:
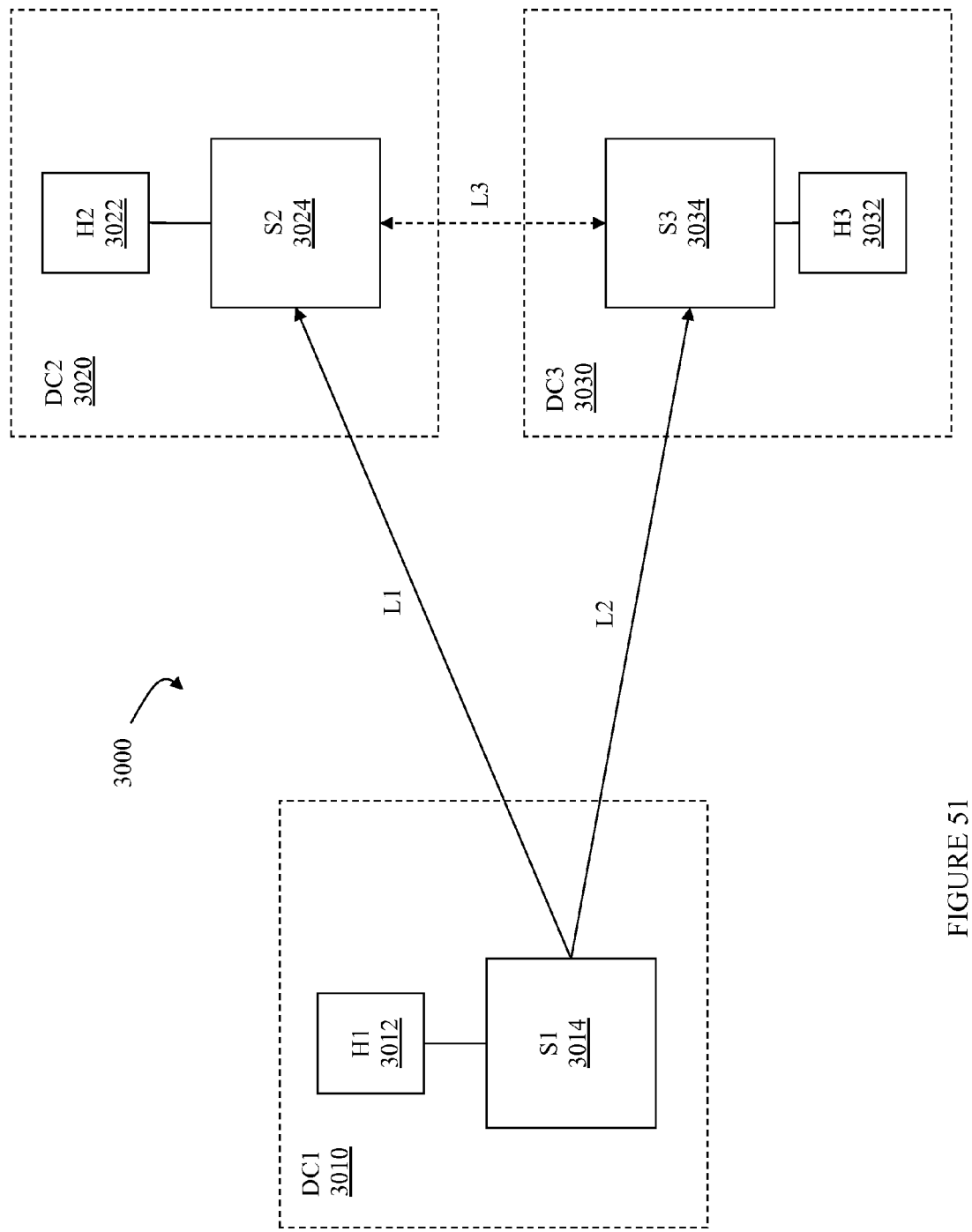
FIG. 51 is a diagram illustrating a system having a primary group, a synchronous backup group, and an asynchronous backup group according to an embodiment of the system described herein.

Referring to FIG. 51, a system 3000 includes a first data center 3010 (DC1) having a first host 3012 coupled to a first storage device 3014. The diagram 3000 also shows a second data center 3020 (DC2) having a second host 3022 coupled to a second storage device 3024 and a third data center 3030 (DC3) having a third host 3032 coupled to a third source device 3034. The data centers 3010, 3020, 3030, may be geographically dispersed or in the same location. The first storage device 3014 may be coupled to the second storage device 3024 via a link L1 and may be coupled to the third storage device 3034 via a link L2. The second storage device 3024 may also be coupled to the third storage device 3034 via a link L3.

In an embodiment herein, the first data center 3010 may correspond (at least initially) to the source group 1202 of FIG. 26 and/or the source group 1782 of FIG. 42. Thus, the data center 3010 may contain a plurality of hosts and a plurality of storage devices, all or some of which may work together as a single consistency group or not. Similarly, the second data center 3020 may (initially) correspond to the local destination 1204 of FIG. 26. In some cases where significant storage capability is not needed at the data center 3020, the data center 3020 may also (initially) correspond to the minimal storage local destination 1788 of FIG. 42. The data center 3030 may (initially) correspond to the remote destination 1206 of FIG. 26 and/or the remote destination 1786 of FIG. 42.

Thus, some or all of the data centers 3010, 3020, 3030 may each contain a plurality of hosts and/or a plurality of storage devices, all or some of which may work together as a single consistency group. Accordingly, each of the hosts 3012, 3022, 3032 may represent a plurality of hosts while each of the storage devices 3014, 3024, 3034 may represent a plurality of storage devices (storage group). Note also that a storage device may include one or more logical volumes so that, for the discussion herein, references to a storage device or a storage group may be understood, in appropriate context, to include one or more individual storage devices and/or one or more logical volumes provided in connection with a storage device.

In an initial configuration, the link L1 may be used for synchronous transfer of data from the first storage device 3014 to the second storage device 3024 while the link L2 may be used for asynchronous transfer of data from the first storage device 3014 to the third storage device 3034. In some embodiments, the link L3 between the second storage device 3024 and the third storage device 3034 may not be used initially, but may be activated when necessary (e.g., in connection with a failover and/or switchover).

For the discussion that follows, the term "primary group" may be used to refer to the combination of hosts and storage devices (and/or volumes at the storage devices) at a location (i.e., one of the data centers 3010, 3020, 3030) that is used for the primary work load being done by the computing system. The term "synchronous backup group" may refer to the combination of hosts and storage devices (and/or volumes at the storage devices) at a single one of the data centers 3010, 3020, 3030 used to maintain a synchronous mirror of the data generated and stored at the primary group site. Similarly, the term "asynchronous backup group" may refer to the combination of hosts and storage devices at a single one of the data centers 3010, 3020, 3030 used to maintain an asynchronous mirror of the data generated at the primary group site. When all three of the data centers 3010, 3020, 3030 are operational, the primary group may establish concurrent RDF relationships with both the synchronous backup group and the asynchronous backup group as described elsewhere herein.

For the discussion herein, it may be assumed that the primary group is initially provided at the data center 3010, the synchronous backup group at the data center 3020, and the asynchronous backup group at the data center 3030. Note that it is possible for the asynchronous backup group to be located physically farther from the data source (e.g., the primary group) than the synchronous backup group. Note also that the hosts 3022, 3032 at the synchronous backup group and the asynchronous backup group may not necessarily be initially operational and may only be used when and if either of the backup groups becomes the primary group due to a switchover or failover.

Figure 52:
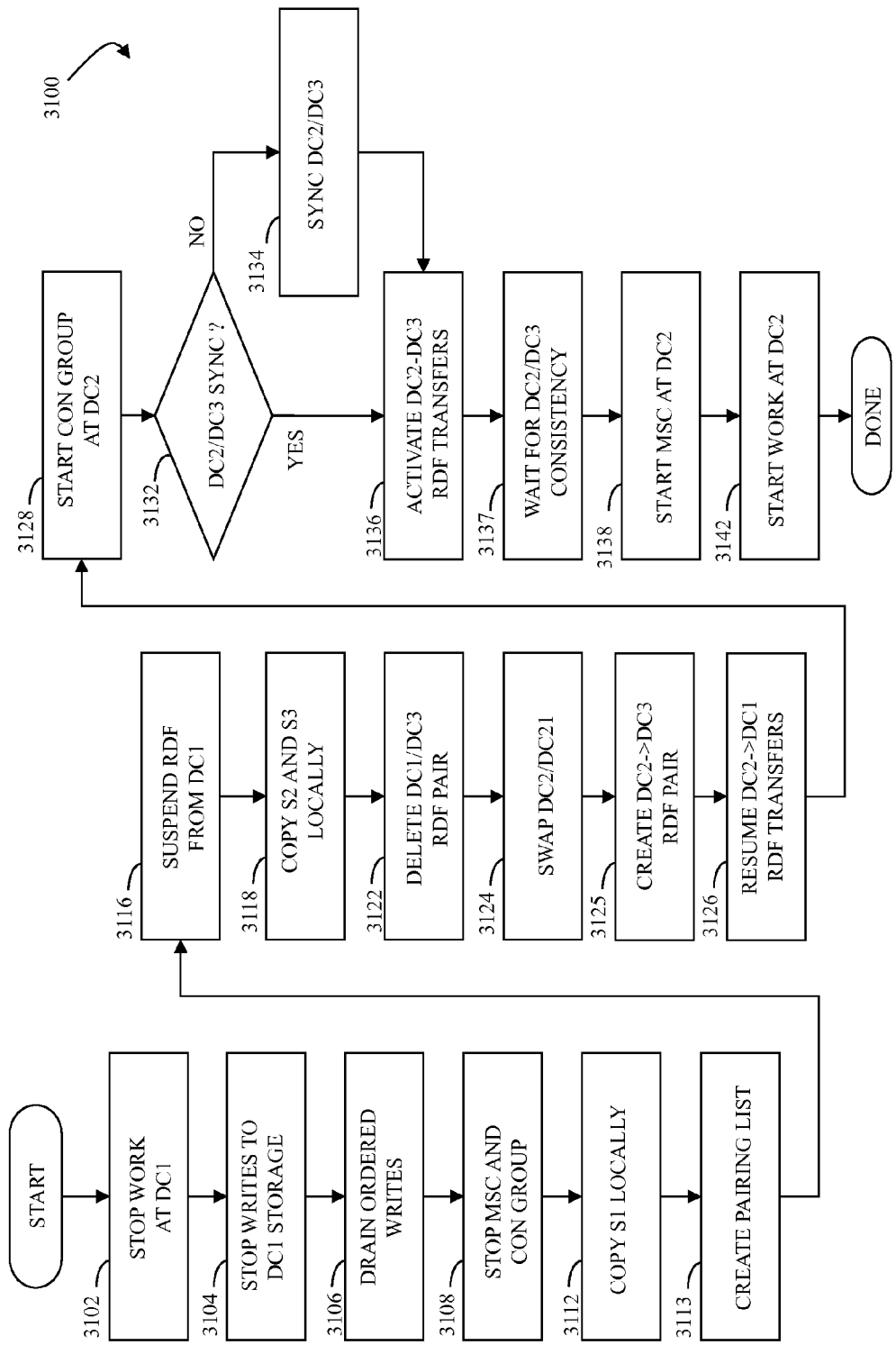
FIG. 52 is a flow chart illustrating steps performed in connection with a switchover of a primary group and a synchronous backup group after synchronization of the synchronous backup group with the asynchronous backup group according to an embodiment of the system described herein.

Referring to FIG. 52, a flowchart 3100 illustrates steps performed in connection with a switchover that exchanges the primary group with the synchronous backup group. The processing illustrated by the flowchart 3100 is an example where the primary group is initially located at the data center 3010 and the synchronous backup group is initially located the data center 3020 so that performing the steps illustrated by the flowchart 3100 causes the primary group to be located at the data center 3020 and the synchronous backup group to be located at the data center 3010. Of course, other initial configurations are possible so that, for example, the steps of the flowchart 3100 may be adapted to swap the primary group and the synchronous backup group when the primary group is initially located at the data center 3020 and the synchronous backup group is initially located at the data center 3010.

Processing begins at a first step 3102 where the work being performed at the primary group by the host 3012 (or, as discussed elsewhere herein, a group of hosts) is stopped. Following the step 3102 is a step 3104 where writes being performed to the storage device 3014 (affected volume(s) of the storage device 3014 or, as discussed elsewhere herein, a group of storage devices) are stopped by, for example, making the volume(s) not ready to the host 3012 and/or to any other hosts and/or to any other devices that might perform writes thereto.

Following the step 3104 is a step 3106 where the ordered writes generated by the storage device 3014 in connection with transferring data to the storage device 3034 are drained. Draining the ordered writes at the step 3106 involves allowing cycle switching to occur (as discussed elsewhere herein) for a number of cycles (e.g., two or more) even though no new data is being written to the storage device 3014. Eventually, all of the data that was previously written at the storage device 3014 will have been transferred from the storage device 3014 to the storage device 3034 at the data center 3030.

Following the step 3106 is a step 3108 where multisession control (if any) and consistency group processing (if any) are stopped at the host 3012. Stopping multisession control (MSC) and/or consistency group processing at the host 3012 involves halting the processing that facilitates, for example, synchronization of cycle switching among multiple storage devices, as described in elsewhere herein. MSC is used to facilitate the initial configuration of FIG. 51 where the primary group is provided with both a synchronous backup group and an asynchronous backup group. Note that once the ordered writes have been drained at the step 3106, there is no longer a need to provide cycle switching.

Following the step 3108 is a step 3112 where a local copy is made of the data (volumes) on the storage device 3014. The local copy created at the step 3112 may be used to preserve the state of the data at the storage device 3014 at the time of the swap of the primary group and the synchronous backup group. The local copy may be useful, for example, in instances where there is an error in connection with performing the swap. There may be other uses for the local copy. The local copy may be created using any appropriate technology, including using conventional snap or other copy-related technology to make a copy or by maintaining a mirror of the storage device 3014 (or volumes thereof) prior to performing the processing at the step 3112 and then splitting the mirror (halting copying) at the step 3112.

Following the step 3112 is a step 3113 where a pairing list is created for existing R1/R2 RDF pairs. This is useful because, for example, significant initialization can be avoided by choosing new R1/R2 volumes from among R2 volumes having a common R1 volume. This may be illustrated by the following example:

Suppose that prior to the swap, there is an R1/R2 pair, Ra (at the storage device 3014) and Rb (at the storage device 3024) that are used for the synchronous data transfer from the storage device 3014 to the storage device 3024. Also assume that there is another R1/R2 pair, Ra and Rc (at the storage device 3034) that is used for the ordered writes transfer (asynchronous data transfer) from the storage device 3014 to the storage device 3034. In such a case, the R1/R2 pair created at the step 3113 would include Rb (R1 volume) at the storage device 3024 and Rc (R2 volume) at the storage device 3034. Since both Rb and Rc are the former R2 volumes for the R1 volume at the storage device 3014, then the data on Rb and Rc should be identical or, in some cases discussed elsewhere herein, nearly identical. Note that, in some instances, there may be multiple volumes and/or storage devices (consistency groups) that are paired up in this way so that the step 3125 (and other similar steps throughout this discussion) represents creating as many R1/R2 pairings as appropriate.

The processing performed at the step 3113 is described in more detail elsewhere herein. Note that the processing performed at the step 3113 may be performed at any time, including prior to initiating the swap, in which case data describing the R1/R2 RDF pairings may be provided to each of the data centers 3010, 3020, 3030 and used later in connection with any (unplanned) failover that occurs. Note also that, in instances where the advantages of differential resynchronization are desired (or necessary), then it is necessary to perform the processing at the step 3113.

Following the step 3113 is a step 3116 where RDF data transfer operations from the storage device 3014 to both the storage device 3024 and to the storage device 3034 are suspended. Following the step 3116 is a step 3118 where copies of the data at the storage devices 3024, 3034 are made locally at the data center 3020 and/or the data center 3030, respectively. The local copies may be provided in a manner similar to providing the local copy of the storage device 3014 discussed above in connection with the step 3112. Note that, in some instances, the local copies made at the steps 3112, 3118 are optional and, although useful, may not be not necessary. However, in other instances, it may be possible to use the local copies as part of the operation(s) being performed.

Following the step 3118 is a step 3122 where the RDF relationships between the R1 volume(s) at the storage device 3014 and the R2 volume(s) at the storage device 3034 are deleted, using, for example, the dynamic RDF mechanism. Following the step 3122 is a step 3124 where the R1 and R2 for the RDF connection between the storage device 3014 and the storage device 3024 are swapped using, for example, the dynamic RDF mechanism discussed elsewhere herein.

Following the step 3124 is a step 3125 where an RDF pair is created to transfer data from the storage device 3024 to the storage device 3034 via the link L3 using ordered writes as discussed elsewhere herein. The RDF pair may be created using, for example, the dynamic RDF mechanism disclosed in U.S. Pat. No. 6,862,632, which is incorporated by reference herein. Note, however, that the volumes chosen for the RDF pair at the step 3125 correspond to the R2 volumes from the previous RDF pairings between the storage device 3014 and the storage devices 3024, 3034 in order to minimize the amount of initialization that needs to be performed. The R2 volumes may be chosen using information obtained at the step 3113, described above. Following the step 3126 where RDF transfers between the storage device 3024 and the storage device 3014 are resumed. Note that after the R1 and R2 devices between the storage device 3014 and the storage device 3024 are swapped, data saved locally at the storage device 3024 may be synchronously transferred to the storage device 3014.

Following the step 3126 is a step 3128 where a consistency group is started at the data center 3020. As discussed elsewhere herein, a consistency group may be used in cases where the data center 3020 contains multiple storage devices that store coordinated ordered data for a single application and/or group of related applications. Following the step 3128 is a test step 3132 where it is determined if the data at the storage device 3024 is synchronized with (is identical to) data at the storage device 3034 (and thus also at the storage device 3014). Note that in instances where the drain operates properly at the step 3106 and the data had been synchronously transferred from the storage device 3014 to the storage device 3024 prior to initiating the swap, then the data at the storage device 3024 should already be synchronized with data at the storage device 3034. However, as discussed elsewhere herein, there may be instances where the data is not already synchronized.

If it is determined at the test step 3132 that the data at the storage device 3024 is not synchronized with data at the storage device 3034, then control transfers from the step 3132 to a step 3134 where the data synchronization is performed. Synchronizing the data at the step 3134 may use any appropriate mechanism, including mechanisms discussed elsewhere herein such as the SDDF mechanism, background copy, etc. Note that the synchronization may be performed at the step 3134 by simply indicating (e.g., in a table) which tracks (or other portions of data) are invalid (less up-to-date) and then starting a background copy process to transfer the more recent data corresponding to those tracks. Thus, it is possible that the processing performed at the step 3134 simply starts the synchronization of the storage devices 3024, 3034 without necessarily completing the synchronization.

Note that, generally, initiation of a new RDF relationship causes a full synchronization where an entire R1 volume to be copied to a corresponding R2 volume to initially synchronize the volumes. However, when the R1/R2 volumes are chosen based on the information obtained at the step 3113, then a full synchronization may not be necessary. Instead, a differential synchronization may be performed where, for example, as described elsewhere herein, SDDF maps may be used to determine what is "owed" from one volume to another to synchronize the volumes. Following whatever synchronization is performed using SDDF maps (or another appropriate mechanism), it may be useful to wait for two ordered write cycles to occur (e.g., the drain operation discussed elsewhere herein) before determining that the R1/R2 pair is synchronized.

Following the step 3134, or following the step 3132 if the data is already synchronized, is a step 3136 where the RDF link (created at the step 3125) between the storage device 3024 and storage device 3034 is activated. Following step 3136 is a step 3137 where the system waits for the storage devices to be consistent (synchronized). As discussed above, it is possible for the step 3134 to initiate synchronization without necessarily waiting for the system to complete the synchronization at the step 3134. Thus, the processing at the step 3137 waits for the synchronization to be complete. In an embodiment herein, synchronization is deemed to be complete after all invalid track (data portion) indicators have been cleared and, following that, two ordered write cycle switches have occurred. Following the step 3137 is a step 3138 where multisession control and/or consistency group processing are begun at the host 3022 at the data center 3020.

Following the step 3138 is a step 3142 where work is begun at the data center 3020. The work begun at the data center 3020 may be identical to or related to (a continuation of) the work that was previously performed at the data center 3010. Following the step 3142, processing is complete. Note that the new configuration of the system is a mirror of the prior configuration with the primary group now being provided at the data center 3020 and the synchronous backup group being provided the data center 3010.

Figure 53:
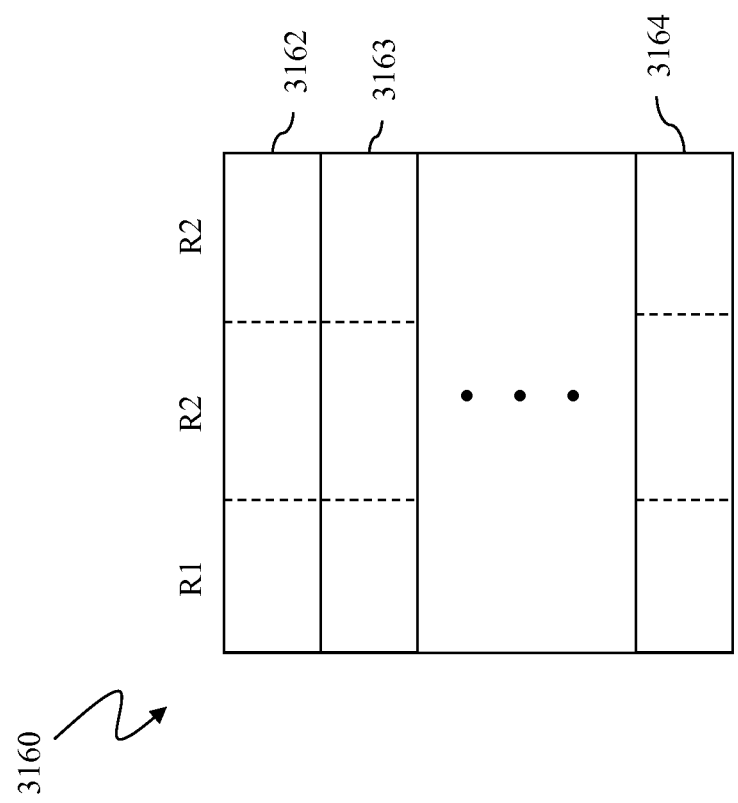
FIG. 53 is a table illustrating correlation of R2 volumes having a common R1 volume according to an embodiment of the system described herein.

Referring to FIG. 53, a pairing list table 3160 includes a plurality of entries 3162-3164 corresponding to RDF R1/R2 pairs that are used in the system 3000. The table 3160 may be constructed at the step 3113 in a manner discussed in more detail below. The table 3160 may be used in connection with determining which volumes to use in connection with the step 3125 of the flowchart 3100 of FIG. 52 where an RDF pair is created between the data center 3020 and the data center 3030. Each of the entries 3162-3164 includes an identifier (e.g., unique device numbers) for an R1 volume, an identifier for a corresponding R2 volume at the synchronous backup group, and an identifier for a corresponding R2 volume at the asynchronous backup group.

Figure 54:
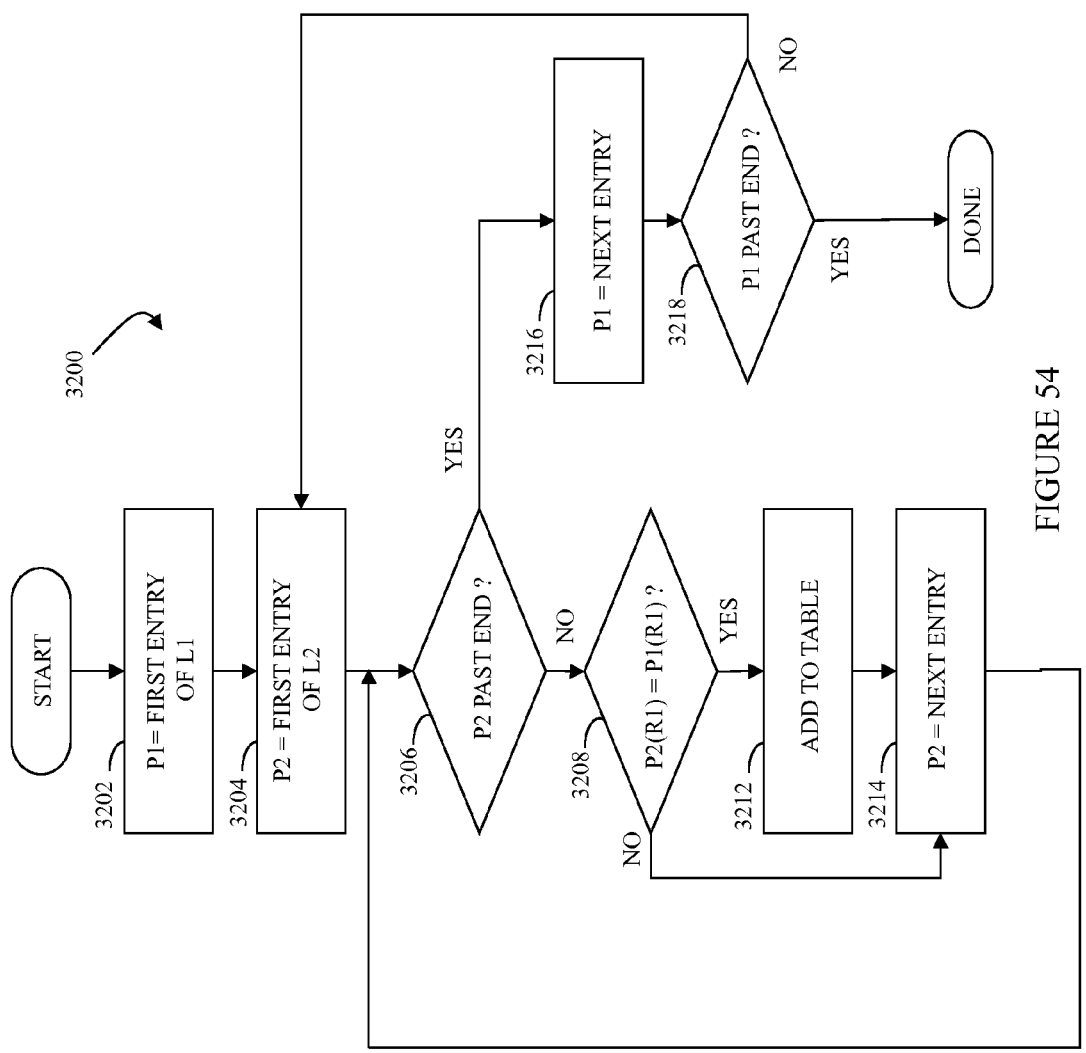
FIG. 54 is a flow chart illustrating correlating R2 volumes having a common R1 volume according to an embodiment of the system described herein.

Referring to FIG. 54, a flowchart 3200 illustrates steps performed in connection with using the table 3160 of existing R1/R2 RDF relationships to construct the table 3160. The processing illustrated by the flow chart 3200 uses as input two lists: a list, L1, of R1/R2 relationships between the primary group and the synchronous backup group and a list, L2, of R1/R2 relationships between the primary group and the asynchronous backup group.

Processing begins at a first step 3202 where a first pointer, P1, is made to point to the first entry of the list L1. Following the first step 3202 is a second step 3204 where a second pointer, P2, is made to point to the first entry in the list L2. Following step 3204 is a test step 3206 which determines if P2 points past the end of the list L2. If not, then control transfers from the test step 3206 to a test step 3208 where it is determined if the R1 value of the L1 entry to by P1 equals the R1 value of the L2 entry pointed to by P2 (i.e., if both R1 volumes are the same). If so, then control transfers from the test step 3208 to a step 3212 where the common R1 volume, the R2 volume at the L1 entry pointed to by P1, and the R2 volume at the L2 entry pointed to by P2 are all recorded as a new entry in the table 3160. Following the step 3212, or following the step 3208 if the R1 volumes are not the same, is a step 3214 where P2 is made to point to the next entry in the L2 list. Following the step 3214, control transfers back to the test step 3206, discussed above.

If it is determined at the test step 3206 that P2 points past the end of the L2 list, then control transfers from the test step 3206 to a step 3216 where P1 is made to point to the next entry in the L1 list. Following the step 3216 is a test step 3218 where it is determined if P1 points past the end of the L1 list. If so, then processing is complete. Otherwise, control transfers from the test step 3218 back to the step 3204, discussed above.

Figure 55:
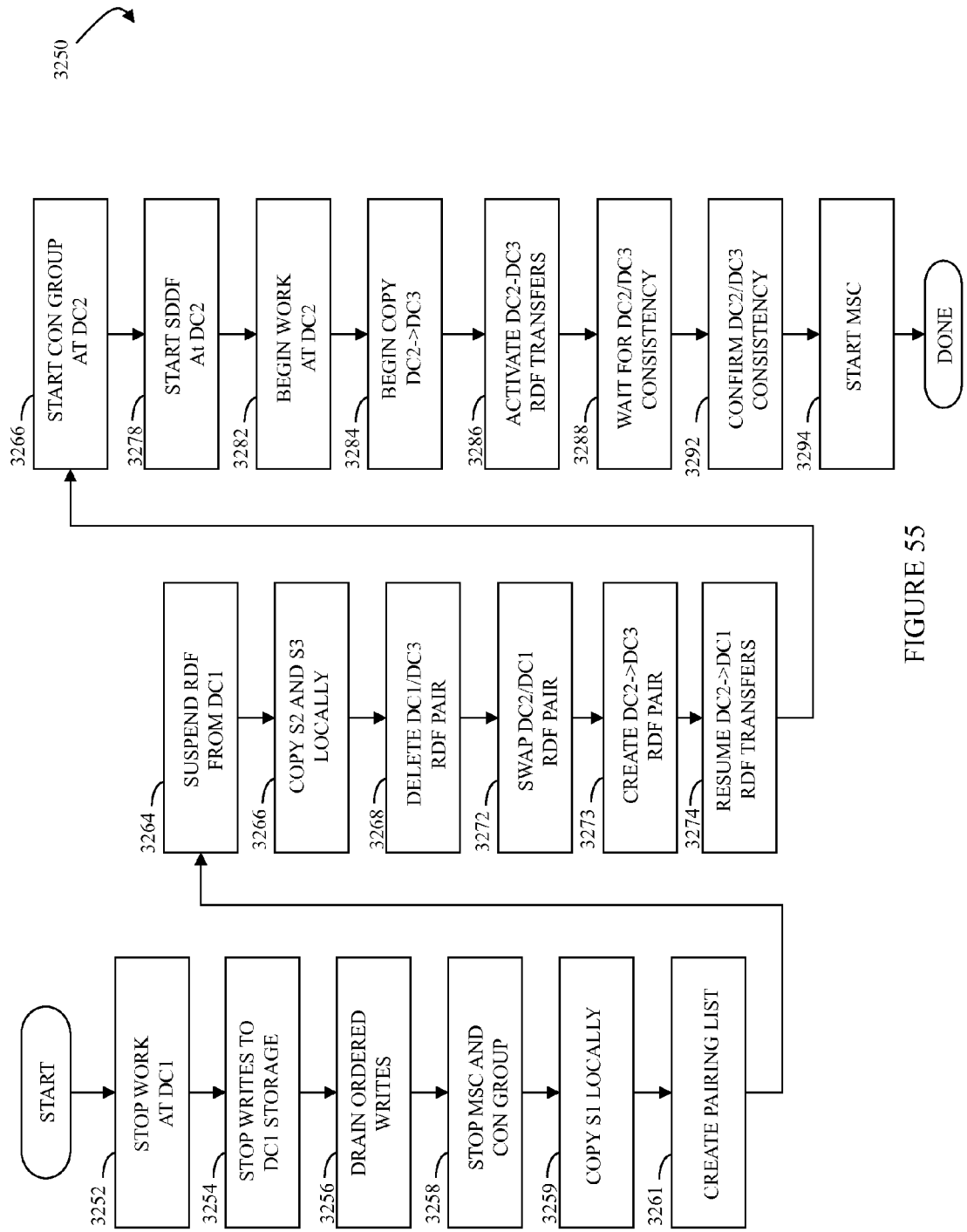
FIG. 55 is a flow chart illustrating steps performed in connection with a switchover of a primary group and a synchronous backup group before synchronization of the synchronous backup group with the asynchronous backup group according to an embodiment of the system described herein.

Referring to FIG. 55, a flowchart 3250 illustrates steps performed in connection with a switchover that exchanges the primary group with the synchronous backup group. The processing illustrated by the flowchart 3250 is like the processing illustrated by the flowchart 3100 in that it assumes that the primary group is initially located at the data center 3010 and the synchronous backup group is initially located the data center 3020. However, as with the processing illustrated by the flow chart 3100, other initial configurations are possible.

Performing the steps illustrated by the flowchart 3250 causes the primary group to be located at the data center 3020 and the synchronous backup group to be located at the data center 3010. However, in the case of the processing illustrated by the flow chart 3250, the work may be started by the host 3022 at the data center 3020 prior to beginning the ordered writes transfer from the storage device 3024 to the storage device 3034. An advantage of the processing illustrated by the flow chart 3250 is that the work may be started sooner. A disadvantage is that it may take longer to get to steady state and the processing may be a little more complex.

Processing begins at a first step 3252 where the work being performed at the primary group by the host 3012 is stopped. Following the step 3252 is a step 3254 where writes being performed to the storage device 3014 are stopped. Following the step 3254 is a step 3256 where the ordered writes generated by the storage device 3014 in connection with transferring data to the storage device 3034 are drained. Following the step 3256 is a step 3258 where MSC (if any) and consistency group processing (if any) are stopped at the host 3012. Following the step 3258 is a step 3259 where a local copy is made of the data at the storage device 3014. Following the step 3259 is a step 3261 where RDF pairing lists are constructed in a manner similar to that discussed above in connection with the step 3113 of the flow chart 3100 of FIG. 52.

Following the step 3161 is a step 3264 where RDF transfers from the storage device 3014 to both the storage device 3024 and to the storage device 3034 are suspended. Following the step 3264 is a step 3266 where copies of the data at the storage devices 3024, 3034 are made locally at the data center 3020 and/or the data center 3030, respectively. Following the step 3266 is a step 3268 where the RDF relationships between the R1 volume(s) at the storage device 3014 and the R2 volume(s) at the storage device 3034 are deleted, using, for example, the dynamic RDF mechanism. Following the step 3268 is a step 3272 where the R1 and R2 volumes for the RDF connection between the storage device 3014 and the storage device 3024 are swapped using, for example, the dynamic RDF mechanism discussed elsewhere herein. Following the step 3272 is a step 3273 where an RDF pair is created to transfer data from the storage device 3024 to the storage device 3034 via the link L3 using ordered writes as discussed elsewhere herein. As with the step 3125 of the flowchart 3100, discussed above, the volumes chosen for the RDF pair at the step 3273 correspond to the R2 volumes from the previous RDF pairings between the storage device 3014 and the storage devices 3024, 3034 in order to minimize the amount of initialization that needs to be performed.

Following the step 3273 is a step 3274 where RDF transfers between the storage device 3024 and the storage device 3014 are resumed. Note that after the R1 and R2 volumes between the storage device 3014 and the storage device 3024 are swapped, data saved locally at the storage device 3024 is synchronously transferred to the storage device 3014. Following the step 3274 is a step 3276 where a consistency group is started at the data center 3020. As discussed elsewhere herein, a consistency group may be used in cases where the data center 3020 contains multiple storage devices that store coordinated ordered data for a single application and/or a group of related applications.

Following the step 3276 is a step 3278 where an SDDF session (described elsewhere herein) is begun at the storage device 3024 (or group of storage devices) at the data center 3020. The SDDF session keeps track of data written to the storage device 3024 that is "owed" to the storage device 3034. Following the step 3278 is a step 3282 where work is begun at the data center 3020. The work begun at the data center 3020 may be identical to or related to (a continuation of) the work that was previously performed at the data center 3010. Following the step 3282 is a step 3284 where a background copy operation is started to copy data from the storage device 3024 to the storage device 3034 corresponding to bits set in connection with the SDDF session started at the step 3278. As particular data is successfully copied from the storage device 3024 to the storage device 3034, the corresponding bits in the SDDF session data structure are cleared indicating that the particular data is no longer owed from the storage device 3024 to the storage device 3034.

Following the step 3284 is a step 3286 where the RDF link (created at the step 3273) between the storage device 3024 and storage device 3034 is activated. Following step 3286 is a step 3288 where processing waits for any SDDF bits set in connection with the SDDF session to be cleared, thus indicating that the background copying is completed. Note that, after the RDF link between the storage device 3024 and the storage device 3034 is activated at the step 3286, no new SDDF bits will be set since data written to the storage device will be transferred to the storage device 3034 via the RDF link. Thus, it is expected that the SDDF bits indicating data owed from the storage device 3024 to the storage device 3034 will be cleared (i.e., all data will be copied by the background copy process started at the step 3284) in a finite amount of time.

Following the step 3288 is a step 3292 where the system confirms the consistency of the ordered writes from the storage device 3024 to the storage device 3034. In an embodiment herein, consistency is assumed when at least two cycles have passed after all SDDF bits are cleared. Following the step 3292 is a step 3294 where, if used, multisession control is begun at the data center 3020. Following the step 3294, processing is complete. Note that the new configuration of the system is a mirror of the prior configuration with the primary group now being provided at the data center 3020 and the synchronous backup group being provided the data center 3010.

Figure 56:
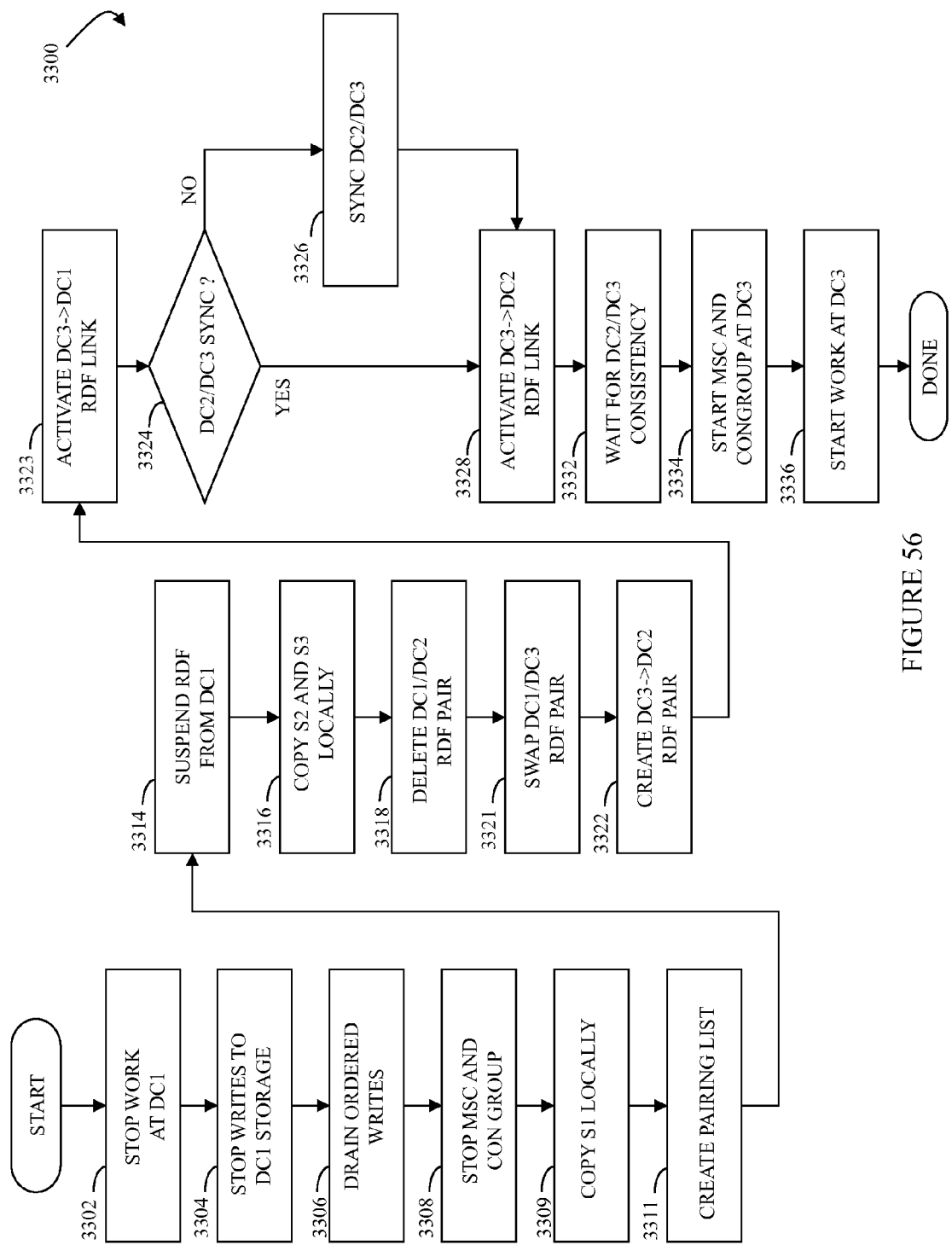
FIG. 56 is a flow chart illustrating steps performed in connection with switching a primary group to a data center that previously hosted an asynchronous backup group according to an embodiment of the system described herein.

Referring to FIG. 56, a flowchart 3300 illustrates steps performed in connection with a switchover that locates the primary group at the data center 3030. Note that, as discussed elsewhere herein, it may be assumed that the data center 3030 is geographically distant from both the data center 3010 and the data center 3020 so that a synchronous RDF connection from the storage device 3034 to either the storage device 3014 or the storage device 3024 would be impractical. Thus, the example provided herein places the primary group at the data center 3030 with an asynchronous backup therefor being placed at the data center 3020. Of course, other initial and final configurations are possible and, if the data center 3030 is located close enough to an other data center to allow for synchronous backup, then it is possible to provide synchronous backup from the data center 3030 to the other data center.

Processing begins at a first step 3302 where the work being performed at the primary group by the host 3012 is stopped. Following the step 3302 is a step 3304 where writes being performed to the storage device 3014 are stopped. Following the step 3304 is a step 3306 where the ordered writes generated by the storage device 3014 in connection with transferring data to the storage device 3034 are drained. Following the step 3306 is a step 3308 where MSC (if any) and consistency group processing (if any) are stopped at the data center 3010. Following the step 3308 is a step 3309 where a local copy is made of the data at the storage device 3013. Following the step 3309 is a step 3311 where RDF pairing lists are constructed in a manner similar to that discussed above in connection with the step 3113 of the flow chart 3100 of FIG. 52.

Following the step 3311 is a step 3314 where RDF transfers from the storage device 3014 to both the storage device 3024 and to the storage device 3034 are suspended. Following the step 3314 is a step 3316 where copies of the data at the storage devices 3024, 3034 are made locally at the data center 3020 and/or the data center 3030, respectively. Following the step 3316 is a step 3318 where the RDF relationships between the R1 volume(s) at the storage device 3014 and the R2 volume(s) at the storage device 3034 are deleted, using, for example, the dynamic RDF mechanism. Following the step 3318 is a step 3321 where the R1 and R2 for the RDF connection between the storage device 3024 and the storage device 3034 are swapped using, for example, the dynamic RDF mechanism discussed elsewhere herein. Following the step 3321 is a step 3322 where an RDF pair is created to transfer data from the storage device 3034 to the storage device 3024 via the link L3 using ordered writes as discussed elsewhere herein. As with the step 3125 of the flowchart 3100, discussed above, the volumes chosen for the RDF pair(s) at the step 3322 correspond to the R2 volumes from the previous RDF pairings between the storage device 3014 and the storage devices 3024, 3034 in order to minimize the amount of initialization that needs to be performed.

Following the step 3322 is a step 3323 where the RDF link between the storage device 3034 and the storage device 3014 is activated. Note that the data accumulated at the storage device 3014 through the RDF link from the storage device 3034 to the storage device 3014 facilitates restoring the initial configuration at a later point in time by maintaining the storage device 3014 at a state that mirrors the storage device 3034. If it is not desirable to facilitate restoring the initial configuration, then the step 3321-3323 may be omitted.

Following the step 3323 is a test step 3324 where it is determined if the data at the storage device 3024 is synchronized with (is identical to) data at the storage device 3034 (and thus also at the storage device 3014). If not, then control transfers from the step 3324 to a step 3326 where the data is synchronized. Synchronizing the data at the step 3326 may use any appropriate mechanism, including mechanisms discussed elsewhere herein such as the SDDF mechanism. Note that the synchronization may be performed at the step 3326 by simply indicating which tracks (or other portions of data) are invalid (less up-to-date) and then starting a background copy process to transfer the more recent data corresponding to those tracks. Thus, it is possible that the processing performed at the step 3326 simply starts the synchronization of the storage devices 3024, 3034 without necessarily completing the synchronization.

Following the step 3326, or following the step 3324 if the data is already synchronized, is a step 3328 where the RDF link (created at the step 3322) between the storage device 3034 and storage device 3024 is activated. Following step 3328 is a step 3332 where the system waits for the storage devices 3024, 3034 to be consistent (synchronized). As discussed above, it is possible for the step 3326 to initiate synchronization without necessarily waiting for the system to complete the synchronization at the step 3326. Thus, the processing at the step 3332 waits for the synchronization to be complete. In an embodiment herein, synchronization is deemed to be complete after all invalid track (data portion) indicators have been cleared and, following that, two ordered write cycle switches have occurred. Following the step 3332 is a step 3334 where, if used, multisession control and/or con group processing are begun at the data center 3030. Following the step 3334, is a step 3336 where work is begun at the host 3032 at the data center 3030. Following the step 3336, processing is complete.

Note that the switchover scenarios described above may be adapted to provide for just about any other switchover scenarios not specifically discussed above. For example, it is possible to provide for switching the primary group to the data center 3030 while switching the asynchronous backup group to the data center 3010. Such a switchover may be beneficial in instances where the initial configuration is like the configuration 1780 of FIG. 42 in which the synchronous backup group is implemented as a minimal storage local destination 1788.

As discussed elsewhere herein, it is possible to create and/or maintain copies of storage devices or of portions thereof (volumes). In cases where a local mirror is maintained and then "split" from the volume being mirrored, it is possible for a host to operate on the mirrored data without affecting the volume being mirrored. In such a case, it may also be possible to rejoin the mirror with the volume being mirrored by synchronizing the volumes to eliminate the effects of the data operations performed on the local mirror while the volumes were split.

Figure 57:
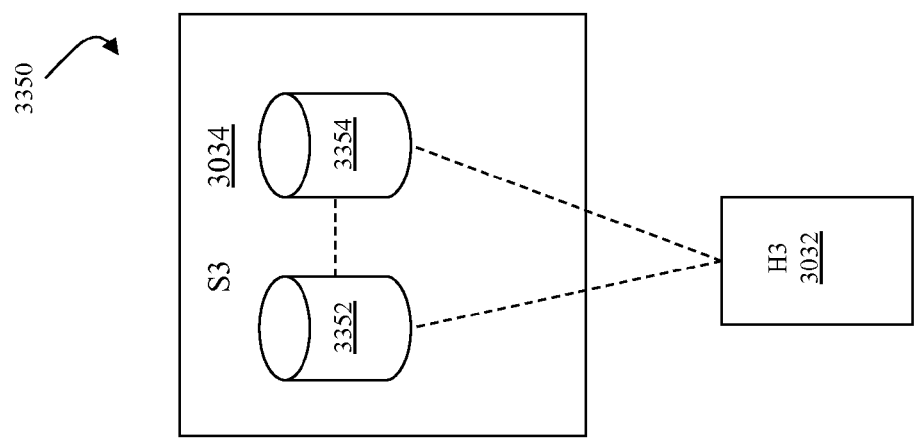
FIG. 57 is a diagram illustrating using a split mirror volume and then rejoining the split mirror volume according to an embodiment of the system described herein.

Referring to FIG. 57, a diagram 3350 shows the storage device 3034 and the host 3032. Other storage devices (groups of storage devices) and/or other hosts (groups of hosts) could be used. The storage device is illustrated as including a first volume 3352 and a second, mirrored, volume 3354 that is a mirror of the first volume 3352. In an embodiment herein, the second volume 3354 may be split from the first volume 3352 so that the host 3032 may perform operations on, and alter, the data of the second volume 3354 without affecting the first volume 3352. Subsequently, it may be possible to rejoin the volumes 3352, 3354 so that the volume is once again a mirror of the volume 3352 where the host 3032 operates on the volume 3352.

The system described herein may be useful in instances where there is an unexpected failure at a data center hosting the primary group, such as the data center 3010, where the failure causes the data center 3010 to be completely off-line. Note that failure includes failure of the link(s) that communicate with the data center hosting the primary group. When a failure occurs, the system may be configured to automatically transfer the work load in an orderly fashion to either the data center 3020 or to the data center 3030. Of course, since by definition such a failure is unplanned, it may be assumed that after the failure no processing may be performed at the data center 3010 that hosted the primary group prior to the failure. Thus, for example, it is not expected that the ordered writes may be drained from the storage device 3014 to the storage device 3034, as is the case in planned switchovers, discussed above. In addition, for any dynamic RDF operations that are performed to handle the failover operations, it is not expected to be able to receive any data or otherwise interact with the failed data center or volumes thereof. As discussed elsewhere herein, after the primary group fails, it is possible to determine which of the synchronous backup group and asynchronous backup group have the most up-to-date data and synchronize the data between the two accordingly.

Figure 58:
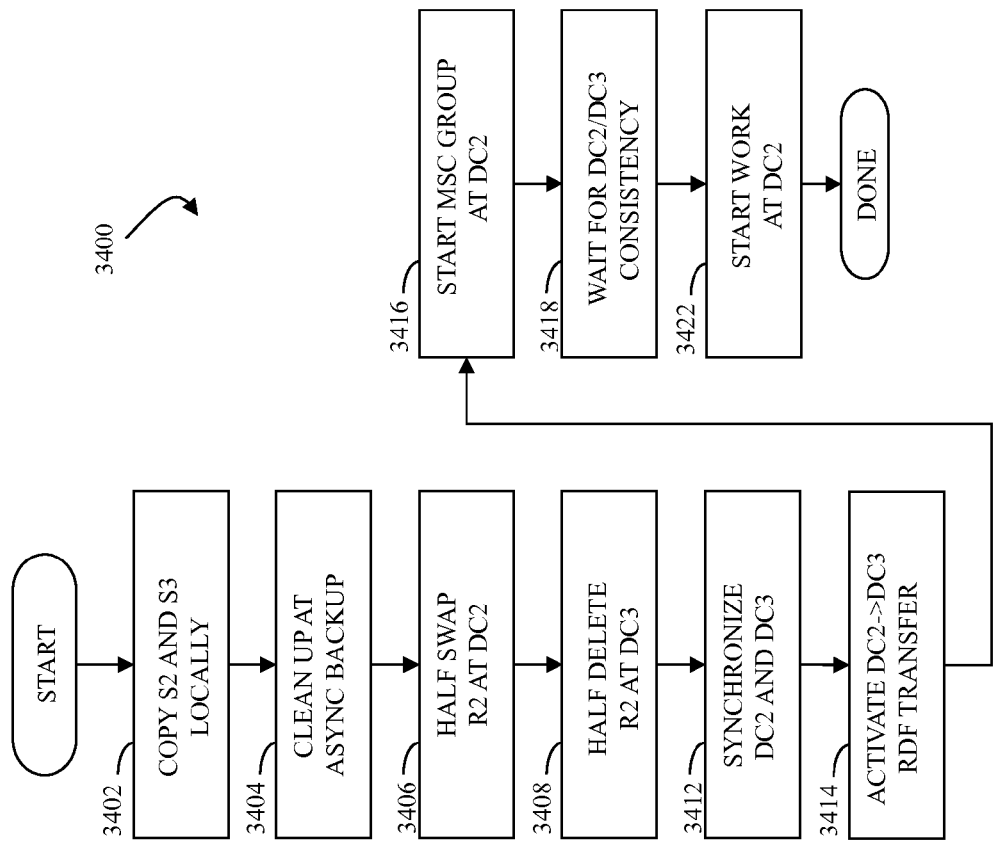
FIG. 58 is a flow chart illustrating a failover where work is restarted at a synchronous backup site after resynchronization of the synchronous and asynchronous backup sites according to an embodiment of the system described herein.

Referring to FIG. 58, a flowchart 3400 illustrates steps performed in connection with a failover where the data center 3010 (or a significant portion thereof) fails and the primary group is restarted at the data center 3020 that had previously hosted the synchronous backup group. Processing begins at a first step 3402 where local copies of data are made at the storage devices 3024, 3034, as discussed elsewhere herein. Following step 3402 is a step 3404 where a cleanup operation is performed at the asynchronous backup group to store data that had been transmitted to the asynchronous backup group prior to the failover but not yet stored. Performing a cleanup operation at the asynchronous backup group is discussed elsewhere herein. See, for example, FIGS. 23 and 32 and the corresponding discussion.

Following the step 3404 is a step 3406 where a half swap operation is performed to change the one or more R2 volumes at the storage device 3024 into R1 volumes, where the volumes that are changed are R2 volumes that were previously part of RDF pairings between the storage device 3014 and the storage device 3024. A half swap is performed rather than a full swap because the data center 3010 may not be capable of receiving and/or processing commands to modify the R1 devices thereon. Thus, the half swap operations swaps the R2 half of the RDF pair (i.e., converts it to an R1 device) between the storage device 3014 and the storage device 3024 without necessarily receiving cooperation from, or even communicating with, the corresponding R1 device at the data center 3010. That is, the storage device 3024 receives and acts on the half swap command independent of the storage device 3014. Note that the resulting R1 volumes may accumulate data that is owed to the storage device 3014 should the data center 3010 and the storage device 3014 become operational again. Thus, one possibility is that after the data center 3010 is brought back on line after failure and the R1 volumes at the data center 3020 are used to resynchronized the storage device 3014. Once the resynchronization is complete, it may be possible to then swap the primary group and the synchronous backup group between the data center 3010 in the data center 3020 to restore the system to its initial configuration.

Following step 3406 is a step 3408 where a half delete operation is performed on the R2 volume of the RDF pair(s) between the storage device 3014 and the storage device 3034. The half delete is performed at the step 3408 for reasons similar to performing the half swap at the step 3406, namely, the unavailability of the data center 3010. Thus, the half delete operation allows the R2 volume at the storage device 3034 to eliminate the RDF relationship with the corresponding R1 volume at the storage device 3014 without cooperation from, or even communication with, the storage device 3014 at the data center 3010. That is, the storage device 3034 receives and acts on the half delete command independent of the storage device 3014.

Following the step 3408 is a step 3412 where the data at the storage device 3024 is synchronized with the data at the storage device 3034. Note that, depending on the nature of the failure, it is possible for the storage device 3034 to have more up-to-date data than the storage device 3024, or vice versa. Determining which of the storage devices 3024, 3034 has more recent data may be performed using any appropriate mechanism, such as the SDDF mechanism described elsewhere herein. Note also that the synchronization may be performed at the step 3412 by simply indicating which tracks (or other portions of data) are invalid (less up-to-date) and then starting a background copy process to transfer the more recent data corresponding to those tracks. Thus, it is possible that the processing performed at the step 3412 simply starts the synchronization of the storage devices 3024, 3034 without necessarily completing the synchronization.

Following the step 3412 is a step 3414 where the ordered writes RDF connection between the storage device 3024 and the storage device 3034 is activated. Following step 3414 is a step 3416 where MSC processing, if used, is started at the host 3022 at the data center 3020. Following the step 3416 is a step 3418 where the system waits for the data to be consistent between the storage device 3024 and the storage device 3034. As discussed above in connection with the step 3412, the synchronization process may be started prior to reaching the step 3418 without necessarily being completed. In an embodiment herein, the system may be deemed consistent after all of the invalid data has been synchronized and two additional cycle switches have occurred in connection with the ordered writes. Following step 3418 is a step 3422 where the work is started at the host 3022 of the data center 3020. Following step 3422, processing is complete.

As discussed elsewhere herein, it is possible for the storage device 3024 to maintain at least the R1 half of one or more RDF pairs between the storage device 3024 and the storage device 3014. Maintaining the R1 volume(s) in this way allows the system to keep track of the data that is owed from the storage device 3024 to the storage device 3014. This information may be used to resynchronize the data center 3010 should the data center 3010 become operational again.

Referring to FIG. 59, a flowchart 3450 illustrates steps performed in connection with a failover where the data center 3010 (or a significant portion thereof) fails and the primary group is restarted at the data center 3020 that had previously hosted the synchronous backup group. The processing illustrated by the flow chart 3450 provides for the work load being started at the data center 3020 prior synchronizing the storage devices 3024, 3034 whereas the processing illustrated by the flow chart 3400 provides for the work load being started at the data center after the synchronization. An advantage of starting the work load before synchronization is, of course, faster start up while a disadvantage is that it may take longer to synchronize than systems that synchronize prior to start up.

Processing begins at a first step 3452 where local copies of data are made at the storage devices 3024, 3034, as discussed elsewhere herein. Following step 3452 is a step 3454 where a cleanup operation is performed at the asynchronous backup group to store data that had been transmitted to the asynchronous backup group prior to the failover but not yet stored. Performing a cleanup operation at the asynchronous backup group is discussed elsewhere herein. See, for example, FIGS. 23 and 32 and the corresponding discussion.

Following the step 3454 is a step 3456 where a half swap operation is performed to change the one or more R2 volumes at the storage device 3024 into R1 volumes, where the volumes that are changed are R2 volumes that were previously part of RDF pairings between the storage device 3014 and the storage device 3024. Note that the resulting R1 volume(s) may accumulate data that is owed to the storage device 3014 should the data center 3010 and the storage device 3014 become operational again. Following step 3456 is a step 3458 where the work load is started at the host 3022. Following the step 3458 is a step 3462 where a half delete operation is performed on the R2 volume of the RDF pair(s) between the storage device 3014 and the storage device 3034. The half delete operation is performed at the step 3462 for reasons similar to performing the half swap at the step 3456, namely, the unavailability of the data center 3010.

Following the step 3462 is a step 3464 where the ordered writes RDF connection between the storage device 3024 and the storage device 3034 is activated. Following step 3464 is a step 3466 where MSC processing, if used, is started at the host 3022 at the data center 3020. Following the step 3466 is a step 3468 where the system synchronizes the storage devices 3024, 3034 and then waits for the data to be consistent between the storage device 3024 and the storage device 3034. In an embodiment herein, the system may be deemed synchronized after all of the invalid data indicators have been resolved and two additional cycle switches have occurred in connection with the ordered writes. Following step 3468, processing is complete.

Referring to FIG. 60, a flowchart 3500 illustrates steps performed in connection with a failover where the data center 3010 (or a significant portion thereof) fails and the primary group is restarted at the data center 3030 that had previously hosted the asynchronous backup group. Processing begins at a first step 3502 where local copies of data are made at the storage devices 3024, 3034, as discussed elsewhere herein. Following step 3502 is a step 3504 where a cleanup operation is performed at the asynchronous backup group to store data that had been transmitted to the asynchronous backup group prior to the failover but not yet stored. Performing a cleanup operation at the asynchronous backup group is discussed elsewhere herein. See, for example, FIGS. 23 and 32 and the corresponding discussion.

Following the step 3504 is a step 3506 where a half swap operation is performed to change the one or more R2 volumes at the storage device 3034 into R1 volumes, where the volumes that are changed are R2 volumes that were previously part of RDF pairings between the storage device 3014 and the storage device 3034. Note that the resulting R1 volumes may accumulate data that is owed to the storage device 3014 should the data center 3010 and the storage device 3014 become operational again. Thus, one possibility is that after the data center 3010 is brought back on line after failure, the R1 volume(s) at the data center 3030 are used to resynchronized the storage device 3014. Once the resynchronization is complete, it may be possible to then swap the primary group and the asynchronous backup group between the data center 3010 in the data center 3030 to restore the system to its initial configuration.

Following step 3506 is a step 3508 where a half delete operation is performed on the R2 volume of the RDF pair(s) between the storage device 3014 and the storage device 3024. The half delete is performed at the step 3508 for reasons similar to performing the half swap at the step 3506, namely, the unavailability of the data center 3010. Following the step 3508 is a step 3512 where the data at the storage device 3024 is synchronized with the data at the storage device 3034. Note that, depending on the nature of the failure, it is possible for the storage device 3034 to have more up-to-date data than the storage device 3024, or vice versa. Determining which of the storage devices 3024, 3034 has more recent data may be performed using any appropriate mechanism, such as the SDDF mechanism described elsewhere herein. Note also that the synchronization may be performed at the step 3512 by simply indicating which tracks (or other portions of data) are invalid (less up-to-date) and then starting a background copy process to transfer the more recent data corresponding to those tracks. Thus, it is possible that the processing performed at the step 3512 simply starts the synchronization of the storage devices 3024, 3034 without necessarily completing the synchronization.

Following the step 3512 is a step 3514 where the ordered writes RDF connection from the storage device 3034 to the storage device 3024 is activated. Following step 3514 is a step 3516 where MSC processing, if used, is started at the host 3032 at the data center 3030. Following the step 3516 is a step 3518 where the system waits for the data to be consistent between the storage device 3024 and the storage device 3034. As discussed above in connection with the step 3512, the synchronization process may be started prior to reaching the step 3518 without necessarily being completed. In an embodiment herein, the system may be deemed consistent after all of the invalid data has been synchronized and two additional cycle switches have occurred in connection with the ordered writes. Following step 3518 is a step 3522 where the work is started at the host 3032 of the data center 3030. Following step 3522, processing is complete.

Just as with the switchover scenarios, the failover scenarios described above may be adapted to provide just about any possible failover scenario not specifically described above. Of course, if either of the backup group sites fails, a failover situation does not necessarily exist since work may continue at the site of the primary group. Similarly, if one of the links L1, L2 fails, a failover situation does not necessarily exist. However, if both of the links L1, L2 fail, then processing at one or both of the backup group sites may begin failover processing as discussed herein. Note that, in some instances, failure at the site of the primary group may be indistinguishable from simultaneous or near simultaneous failure of the links L1, L2. Note also that, as discussed elsewhere herein, failure of the site of the synchronous backup group and/or failure of the link L1 between the primary group and the synchronous backup group may cause an SDDF session to be initiated at the site of the asynchronous backup group.

Figure 61:
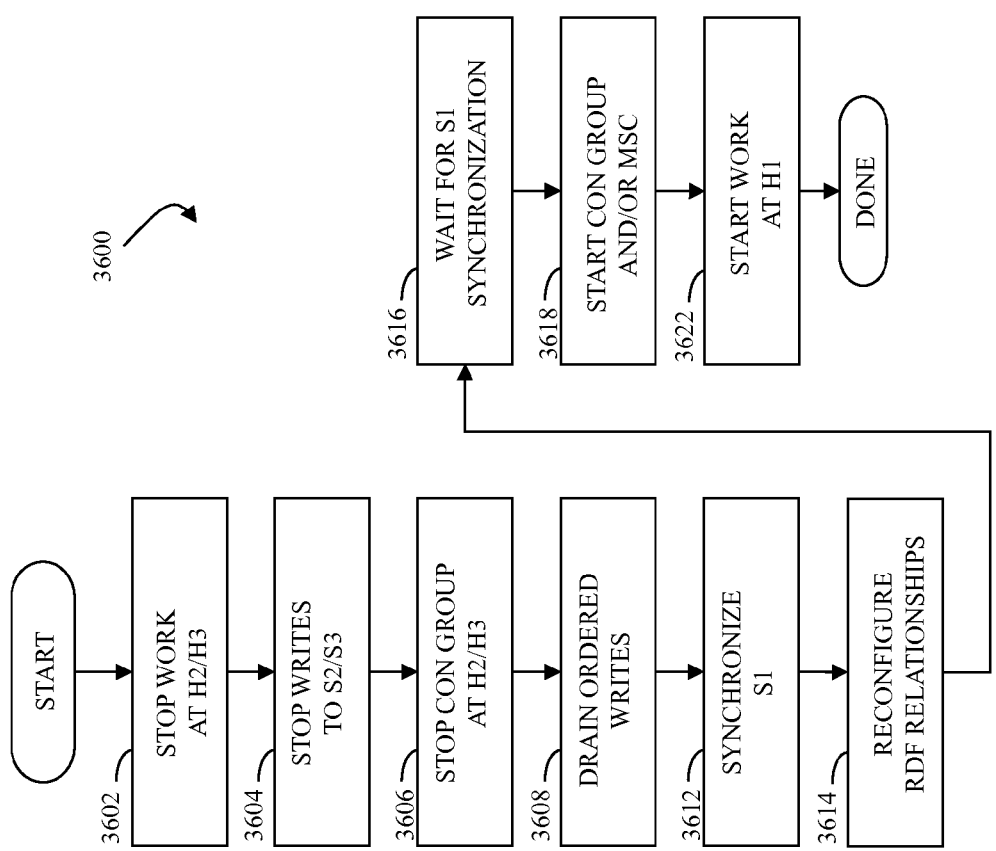
FIG. 61 is a flow chart illustrating resumption of operations after a failover according to an embodiment of the system described herein.

Referring to FIG. 61, a flowchart 3600 illustrates steps performed in connection with resumption of operations following failover when all of the sites and the links have become operational. Processing begins at a first step 3602 where the work is stopped at either the host 3022 or the hosts 3032, depending upon which of the hosts 3022, 3032 was performing the work (i.e., was part of the primary group) after the failover. Following the step 3602 is a step 3604 where writes are stopped to the one of the storage devices 3024, 3034 that corresponds to the one of the hosts 3022, 3032 that was performing the work (i.e., the one of the storage devices 3024, 3034 that was part of the primary group). Following the step 3604 is a step 3606 where con group processing, if any, is stopped at the one of the hosts 3032, 3022 performing the work. Following the step 3606 is a step 3608 where asynchronous writes are drained from the primary group in a manner similar to that discussed elsewhere herein.

Following the step 3608 is a step 3612 where the storage device 3014 is synchronized with whichever one of the storage devices 3024, 3034 was used for performing the work of the primary group. The synchronization performed at the step 3612 may use any appropriate mechanism, including using information from the R1 device created in connection with the half swap operation performed when the failover occurred, to determine which data it needs to be transferred to the storage device 3014 for synchronization. Following the step 3612 is a step 3614 where the RDF relationships that were present at the initial system are reconstructed. The reconstruction of the RDF relationships at the step 3614 is done in a way so as not to interfere with any synchronization started at the step 3612. In an embodiment herein, the synchronization at step 3612 may be performed by using the R1 device (obtained in connection with the previous half swap operation) to construct a table that is used to perform a background copy operation initiated at the step 3612. Once the table has been constructed, then the reconfiguration of the RDF relationships at the step 3614 does not interfere with the synchronization process started at the step 3612.

Following the step 3614 is a step 3616 where the system waits for the resynchronization of the storage device 3014. Waiting for such resynchronization is discussed in more detail elsewhere herein. Following the step 3616 is a step 3618 where con group processing and MSC processing are restarted at the data center 3010. Following the step 3618 is a step 3622 where the work is restarted at the host 3012. Following step 3622, processing is complete. Note that the system is now in its initial state that existed prior to the failover.

Figure 62:
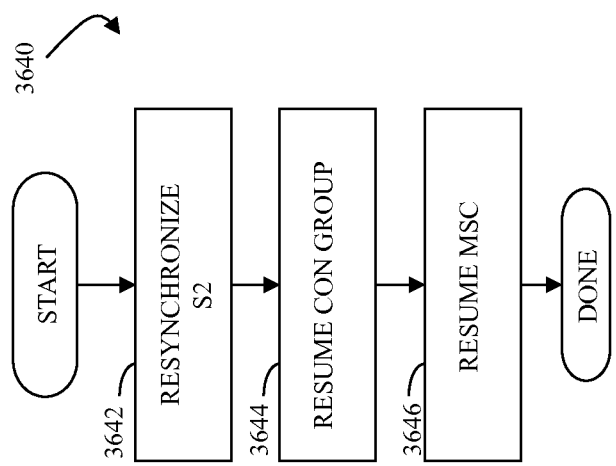
FIG. 62 is a flow chart illustrating recover after failure of a link between a primary group and a synchronous backup group according to an embodiment of the system described herein.

Referring to FIG. 62, a flowchart 3640 illustrates steps performed in connection with recovering from intermittent failure of the link L1. Processing begins at a first step 3642 where data is resynchronized from the storage device 3014 to the storage device 3024. Note that, while the link L1 was in a failed state, the R1 volume(s) at the storage device 3014 accumulated invalid indicators for the R2 volume(s) at the storage device 3024. Thus, the resynchronization performed at the step 3642 involves starting a process to copy the data corresponding to the invalid data indicators (e.g., invalid track indicators) set for the R1 volume(s) at the storage device 3014. Following the step 3642 is a step 3644 where the host 3012 resumes con group processing. Following step the 3644 is a step 3646 where MSC processing is resumed. Following the step 3646, processing is complete.

Figure 63:
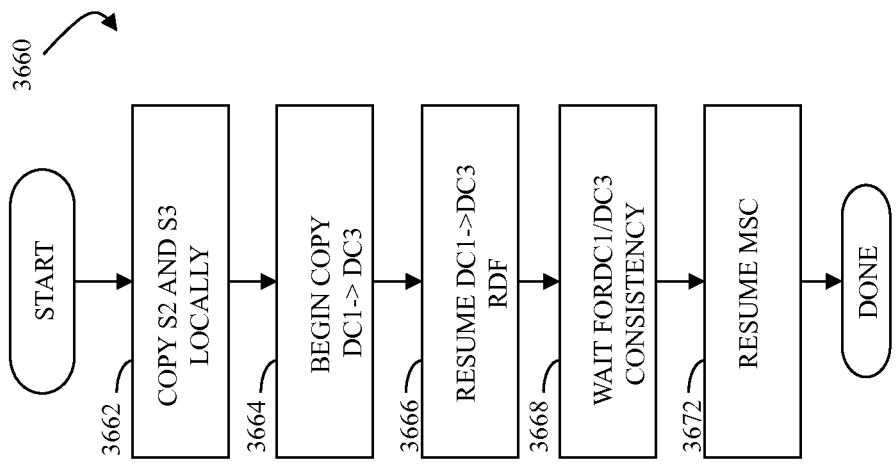
FIG. 63 is a flow chart illustrating recover after failure of a link between a primary group and an asynchronous backup group according to an embodiment of the system described herein.

Referring to FIG. 63, a flowchart 3660 illustrates steps performed in connection with recovering from failure of the link L2. Processing begins a first step 3662 where local copies of the affected volumes of the storage device 3024 and the storage device 3034 are made. Following the step 3662 is a step 3664 where the system begins a background copy process from the storage device 3014 to the storage device 3034. Following the step 3664 is a step 3666 where RDF transfer between the storage device 3014 and the storage device 3034 is reactivated. Following the step 3666 is a step 3668 where the system waits for the storage device 3734 to become consistent with the storage device 3014. Waiting for consistency between storage devices is discussed in more detail elsewhere herein. Following the step 3668 is a step 3672 where MSC processing, if any, is resumed. Following the step 3672, processing is complete.

Figure 64:
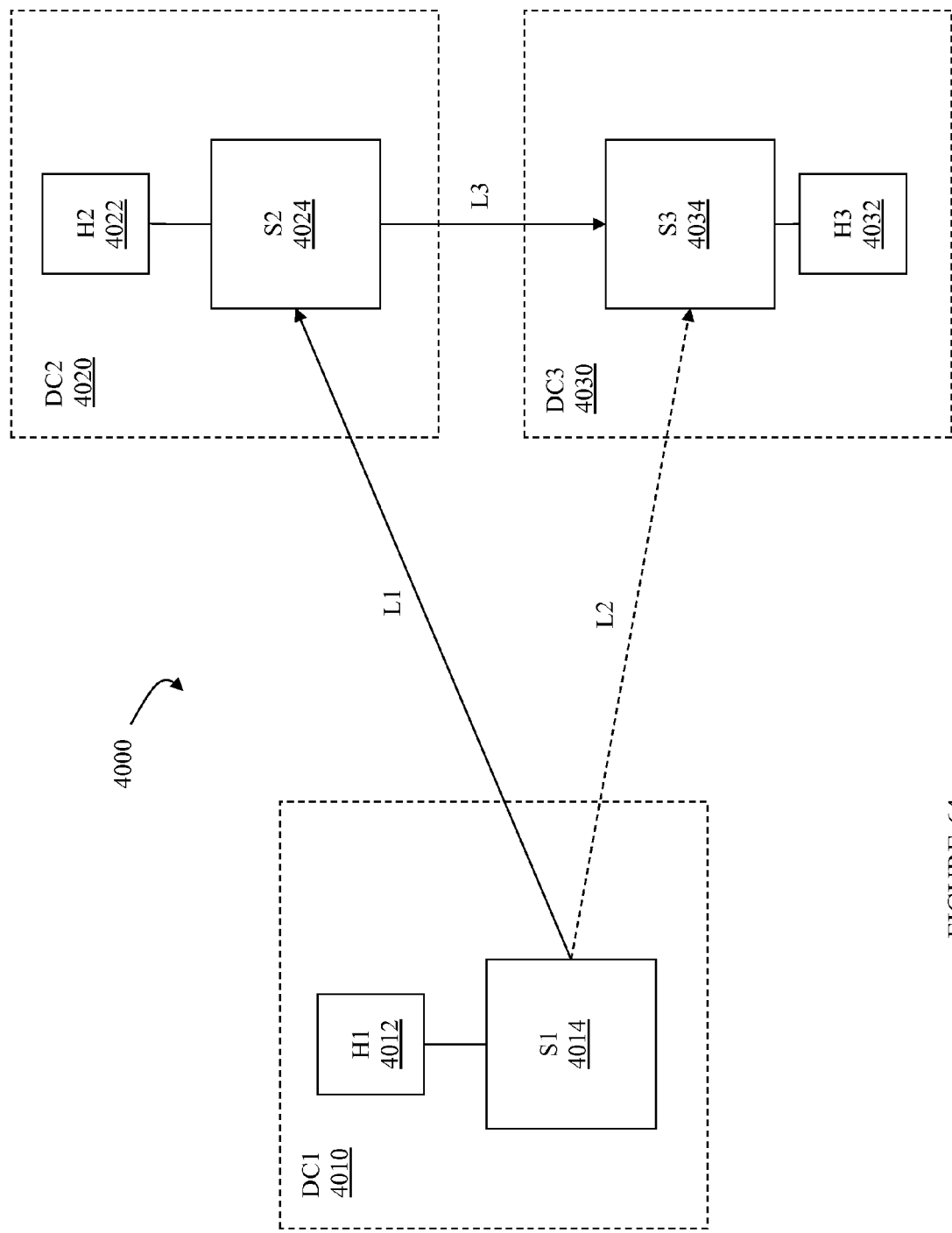
FIG. 64 is a diagram illustrating a system having a primary group, a synchronous backup group, and an asynchronous backup group provided in a cascaded configuration according to an embodiment of the system described herein.

Referring to FIG. 64, a system 4000 is like the system 3000 described above in connection with FIG. 51 and includes a first data center 4010 (DC1) having a first host 4012 coupled to a first storage device 4014. The system 4000 also includes a second data center 4020 (DC2) having a second host 4022 coupled to a second storage device 4024 and a third data center 4030 (DC3) having a third host 4032 coupled to a third source device 4034. The data centers 4010, 4020, 4030, may be geographically dispersed or in the same location. The first storage device 4014 may be coupled to the second storage device 4024 via a link L1 and may be coupled to the third storage device 4034 via a link L2. The second storage device 4024 may also be coupled to the third storage device 4034 via a link L3.

In an embodiment herein, the first data center 4010 may correspond (at least initially) to the source group 1202 of FIG. 26 and/or the source group 1782 of FIG. 42. Thus, the data center 4010 may contain a plurality of hosts and a plurality of storage devices, all or some of which may work together as a single consistency group or not. Similarly, the second data center 4020 may (initially) correspond to the local destination 1204 of FIG. 26. In some cases where significant storage capability is not needed at the data center 4020, the data center 4020 may also (initially) correspond to the minimal storage local destination 1788 of FIG. 42. The data center 4030 may (initially) correspond to the remote destination 1206 of FIG. 26 and/or the remote destination 1786 of FIG. 42.

Thus, some or all of the data centers 4010, 4020, 4030 may each contain a plurality of hosts and/or a plurality of storage devices, all or some of which may work together as a single consistency group. Accordingly, each of the hosts 4012, 4022, 4032 may represent a plurality of hosts while each of the storage devices 4014, 4024, 4034 may represent a plurality of storage devices (storage group). Note also that a storage device may include one or more logical volumes so that, for the discussion herein, references to a storage device or storage group may be understood, in appropriate context, to include one or more storage devices and/or one or more logical volumes provided in connection with a storage device.

In an initial configuration, the link L1 may be used for synchronous transfer of data from the first storage device 4014 to the second storage device 4024 while the link L3 may be used for asynchronous transfer of data (ordered writes) from the second storage device 4024 to the third storage device 4034. The second storage device 4024 may transfer data to the third storage device 4034 corresponding to data received by the second storage device 4024 from the first storage device 4014. In some embodiments, the link L2 between the first storage device 4014 and the third storage device 4034 may not be used initially, but may be activated when necessary or desirable (e.g., in connection with a failover and/or switchover).

For the discussion that follows, the term "primary group" may be used to refer to the combination of hosts and storage devices (and/or volumes at the storage devices) at a location (i.e., one of the data centers 4010, 4020, 4030) that is used for the primary work load being done by the computing system. The term "synchronous backup group" may refer to the combination of hosts and storage devices (and/or volumes at the storage devices) at a single one of the data centers 4010, 4020, 4030 used to maintain a synchronous remote mirror of the data generated and stored at the primary group site. Similarly, the term "asynchronous backup group" may refer to the combination of hosts and storage devices at a single one of the data centers 4010, 4020, 4030 used to maintain an asynchronous remote mirror of the data generated at the primary group site.

For the discussion herein, it may be assumed that the primary group is initially provided at the data center 4010, the synchronous backup group at the data center 4020, and the asynchronous backup group at the data center 4030. Note that it is possible for the asynchronous backup group to be located physically farther from the data source (i.e., the primary group) than is the synchronous backup group. Note also that the hosts 4022, 4032 at the synchronous backup group and the asynchronous backup group may not necessarily be initially operational and may only be used when and if either of the backup groups becomes the primary group due to a switchover or failover.

The data centers 4010, 4020, 4030 may establish a cascaded RDF relationship where data is initially generated at the data center 4010 (e.g., by the host 4012) and then synchronously transferred to the data center 4020. Upon receipt, the data center 4020 asynchronously transfers the data to the data center 4030. Thus, the cascaded configuration illustrated by the system 4000 is like the concurrent configuration illustrated by the system 3000 in that the data center 4020 (like the data center 3020) contains a synchronously-provided copy of the data and the data center 4030 (like the data center 3030) contains an asynchronously-provided copy of the data. However, the system 4000 is unlike the system 3000 in that the data center 4030 receives the asynchronous data from the data center 4020 while the data center 3030 receives the asynchronous data from the data center 3010.

It is possible to provide a mechanism for transitioning from a concurrent triangular asynchronous replication system like the system 3000 of FIG. 51 to a cascaded triangular asynchronous replication system like the system 4000 of FIG. 64. In such a case, it is desirable to minimize or even eliminate the amount of initialization and/or resynchronization that needs to be performed in connection with making the transition. It some instances, it may be unacceptable to need to reinitialize an entire volume. Note, by the way, that the transition may be performed for any number of reasons including, without limitation, loss of the link L2 between DC1 and DC3.

Referring to FIG. 65, a flowchart 4050 illustrates steps performed in connection with transitioning from a concurrent triangular asynchronous replication system to a cascaded triangular asynchronous replication system. For simplicity, steps set forth in connection with other transitions, described above, may be assumed to be present even though not shown explicitly in FIG. 65 or in any follow on flow charts. For example, steps relating to making local copies of logical volumes prior to a transition may not be shown explicitly but may be assumed to still be present, as appropriate. Similarly, steps relating to starting and stopping writes to storage devices in transition may not be explicitly shown.

Processing begins in the first step 4052 where multisession control (at DC1) is halted. Note that if there is no multisession control being performed then, at a minimum, cycle switching is halted at the step 4052. Following the step 4052 is a step 4054 where ordered writes are drained from DC1 to DC3. As discussed in more detail elsewhere herein, in some circumstances, it may be possible to forgo the step 4054 altogether. This is illustrated by an alternative path 4055.

Following the step 4054 (or the step 4052 if the alternative path 4055 is used) is a step 4056 where pairing lists are created as discussed in more detail elsewhere herein. Following step 4056 is a step 4058 where the DC1/DC3 RDF pair is deleted. Following the step 4058 is a step 4064 where SDDF sessions are initialized at DC1. As discussed in more detail elsewhere herein, it may be useful in certain circumstances to provide SDDF sessions at DC1.

Following the step 4064 is a step 4066 where a DC2/DC3 asynchronous RDF pair is created. Following the step 4066 is a step 4072 where multisession control is started. In instances where multisession control is not used, then cycle switching is started at the step 4072. In embodiments where there is a single storage device that controls cycle switching, then the switching may be performed by the second storage device 4024 at the DC2 data center 4020. However, in instances where a host controls cycle switching for one or more storage device, then control is maintained at the DC1 data center 4010. Of course, in instances where it is necessary to obtain information about the cycles, such as whether a particular cycle is empty (i.e., contain no data), then the information may be obtained by having the second storage device 4024 specifically transfer particular status information to the data center 4010 and/or by having the first storage device 4014 issue remote system calls (or similar) to the second storage device to obtain the status information. Note also that information about when to switch cycles or which cycle numbers to associate with particular data may be provided to the second storage device 4024 from the DC1 data center 4010. Following the step 4072, processing is complete.

Referring to FIG. 66, the second storage device 4024 is shown in more detail as including a first volume 4082 and a second volume 4084. The first volume 4082 may be configured as an R2 volume that receives the synchronous data transfers from the first storage device 4014. The second volume 4084 may be a local mirror of the first volume 4082 so that any data written to the first volume 4082 (i.e., synchronous data received from DC1 and written to the first volume 4082) is duplicated at the volume 4084 to cause the second volume 4084 to be identical to the first volume 4082.

The second volume 4084 may be configured as an R1 device for the asynchronous data transfers from DC2 to DC3. Each time new data is provided to the second volume 4084 (written in connection with providing a mirror for the volume 4082), then the data is asynchronously transferred from the second volume 4084 to DC3 using ordered data writes, as described elsewhere herein. Thus, data is synchronously transferred from DC1 to the first volume 4082 (provided at DC2), mirrored from the first volume 4082 to the second volume 4084 (also provided at DC2), and then asynchronously transferred from the second volume 4084 to DC3. As discussed in more detail below, the functionality illustrated by FIG. 66 may be achieved using a single volume at DC2 where the single volume acts as both an R2 device for transfers from DC1 to DC2 and acts as an R1 device for transfers from DC2 to DC3. Such volumes may be referred to as R21 volumes.

Referring to FIG. 67, the second storage device 4024 is shown as including a single R21 volume 4086. The R21 volume is a single logical device that receives and stores thereon synchronous data from DC1 and forwards the received data asynchronously (e.g., using ordered writes) from the second storage device 4024 at DC2 to DC3. Thus, the R21 volume may receive data synchronously transferred thereto from S1 and may act as a source for asynchronous data transferred to S3. As with different embodiments discussed elsewhere herein, there may be more than one R21 volume provided at the storage device 4024. Implementation of the R21 volume is described in more detail elsewhere herein.

Figure 68:
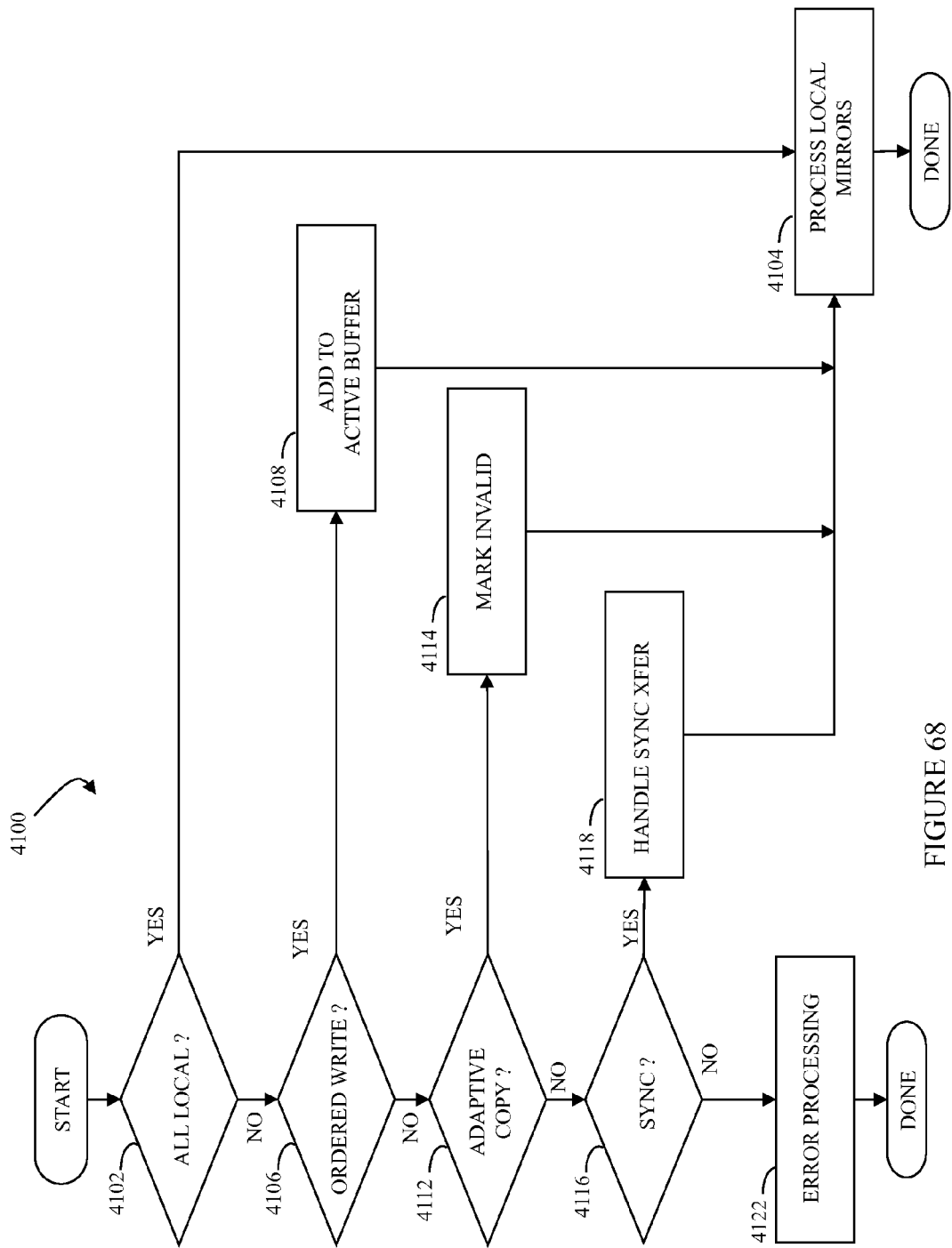
FIG. 68 is a flowchart that illustrates steps performed in connection with handling receiving data for conventional R2 (with local mirrors) and for R21 volumes according to an embodiment of the system described herein.

Referring to FIG. 68, a flowchart 4100 illustrates steps performed in connection with handling receiving data for conventional R2 (with local mirrors) and for R21 volumes. Processing begins at a first test step 4102 where it is determined if all of the mirrors for the volume corresponding to the received data are local mirrors (i.e., whether there are any remote mirrors). If so, then the volume is an R2 volume with no remote mirrors and control transfers from the test step 4102 to a step 4104 where the local mirrors for the volume corresponding to the received data are processed in a conventional fashion (see, for example, U.S. Pat. No. 5,742,794, referenced above). Following the step 4104, processing is complete.

If it is determined at the test step 4102 that not all of the mirrors are local mirrors (i.e., there is at least one remote mirror), then control transfers from the test step 4102 to a test step 4106 wherein is determined if the remote mirror uses the ordered write mechanism. If so, and control transfers from the test step 4106 to a step 4108 were the data that is received at the R21 volume is added to the active buffer for further ordered write transfer. For example, if the second storage device 4024 contains the R21 volume, then at the step 4108, data received by the second storage device 4024 from the first storage device 4014 is added to the active buffer at the second storage device 4024 in order to be eventually transferred to the third storage device 4034. Following the step 4108 is the step 4104, discussed above, where processing for any local mirrors is performed. Following the step 4104, processing is complete.

If it is determined at the step 4106 that the remote mirror does not use the ordered write mechanism, then control transfers from the step 4106 to a test step 4112 where it is determined if the remote mirror is provided using an adaptive copy technique where invalid indication bits are set to indicate that tracks (or some other data increment) of the remote destination (e.g., the third storage device 4034) contain invalid data and thus need to be copied from the second storage device 4024 to the third storage device 4034 to be brought up-to-date. The copying may be performed by another process and/or device that runs in the background and resolves invalid indicators by causing data to be transferred as appropriate. If it is determined at the step 4112 that adaptive copy is being used for the remote mirror, then control transfers from the step 4112 to a step 4114 where appropriate indicator bits are set invalid. Following the step 4114 is the step 4104, discussed above, where processing for any local mirrors is performed. Following the step 4104, processing is complete.

If it is determined at the step 4112 that adaptive copy is not being used for the remote mirror, then control transfers from the step 4112 to a test step 4116 to determine if synchronous data transfer is being used for the remote mirror. If so, then control transfers from the test step 4116 to a step 4118 where the synchronous data transfer to the remote mirror is handled. Processing at the step 4118 is described in more detail elsewhere herein. Following the step 4118 is the step 4104, discussed above, where processing for any local mirrors is performed. Following the step 4104, processing is complete.

If it is determined at the step 4116 that synchronous data transfer is not being used for the remote mirror, then control transfers from the step 4116 to a step 4122 where error processing is performed. In an embodiment herein, only certain types of remote mirrors are allowed for the R21 device so the processing performed at the step 4122 indicates an disallowed type of remote mirror. Of course, the system described herein may be adapted to use any types of mirrors for the R21 mirror, both for the transfer of data to the R21 mirror and for the transfer of data from the R21 mirror. Following the step 4122, processing is complete.

Figure 69:
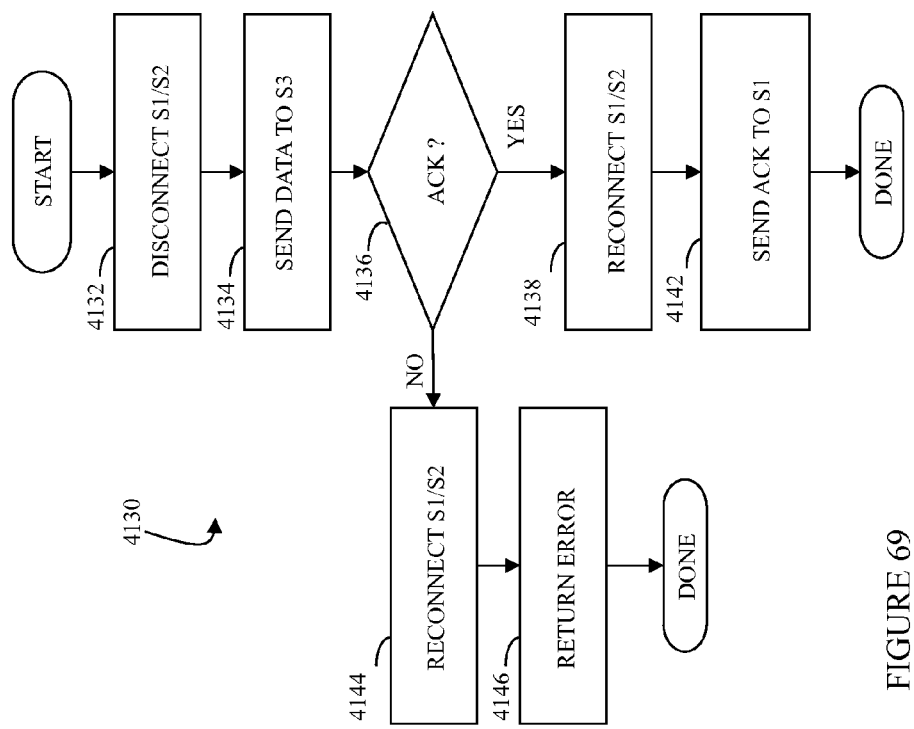
FIG. 69 is a flow chart that illustrates steps performed in connection with handling synchronous data transfer from an R21 device according to an embodiment of the system described herein.

Referring to FIG. 69, a flow chart 4130 illustrates steps performed in connection with handling synchronous data transfer from the R21 device. The processing illustrated by the flow chart 4130 assumes that data is transferred from the first storage device 4014 to the second storage device 4024 (R21) in a synchronous mode and that data is transferred from the second storage device 4024 to the third storage device 4034 also in a synchronous manner. Of course, it is possible to allow certain combinations of transfer modes between the storage devices 4014, 4024, 4034 and disallow others. Thus, in some embodiments, the synchronous/synchronous combination illustrated by the flow chart 4130 may be disallowed.

Processing begins at a first step 4132 where the synchronous connection between S1 and S2 (the storage device 4014 and the storage device 4024) is temporarily disconnected. Following the step 4132 is a step 4134 where the data is synchronously transferred from S2 to S3 (from the storage device 4024 to the storage device 4034). Following the step 4134 is a test step 4136 where it is determined if an acknowledgement is received from S3 in response to data being sent thereto. If so, then control transfers from the step 4136 to a step 4138 where the synchronous connection between S1 and S2 is reconnected. Following the step 4138 is a step 4142 where an acknowledgement is sent back to S1. Following the step 4142, processing is complete.

If it is determined at the test step 4136 that an acknowledgement has not been received from S3 in response to data being sent thereto, then control transfers from the step 4136 to a step 4144 where the synchronous connection between S1 and S2 is reconnected. Following the step 4144 is a step 4146 where an error indicator is sent back to S1. Following the step 4146, processing is complete.

Figure 70:
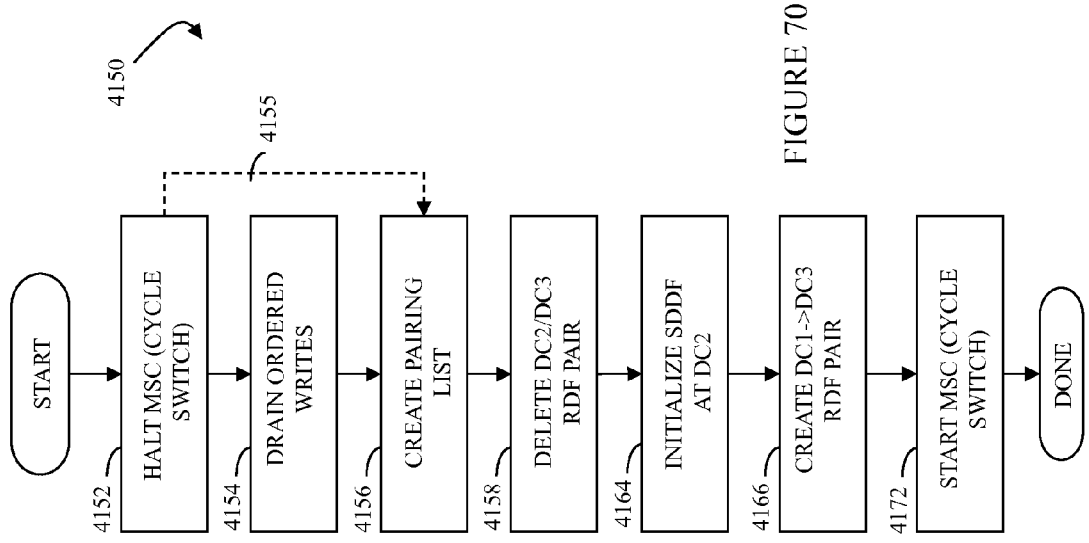
FIG. 70 is a flowchart that illustrates steps performed in connection with transitioning from a cascaded triangular asynchronous replication system to a concurrent triangular asynchronous replication system according to an embodiment of the system described herein.

Referring to FIG. 70, a flowchart 4150 illustrates steps performed in connection with transitioning from a cascaded triangular asynchronous replication system to a concurrent triangular asynchronous replication system. Processing begins in the first step 4152 where multisession control (at DC1) is halted. Note that if there is no multisession control being performed then, at a minimum, cycle switching is halted at the step 4152. Following the step 4152 is a step 4154 where ordered writes are drained from DC2 to DC3. As discussed in more detail elsewhere herein, in some circumstances, it may be possible to forgo the step 4154 altogether. This is illustrated by an alternative path 4155. Following the step 4154 (or the step 4152 if the alternative path 4155 is used) is a step 4156 where pairing lists are created as discussed in more detail elsewhere herein. Following step 4156 is a step 4158 where the DC2/DC3 RDF pair is deleted. Following the step 4158 is a step 4164 where SDDF sessions are initialized at DC2.

Following the step 4164 is a step 4166 where a DC1/DC3 asynchronous RDF pair is created. Following the step 4166 is a step 4172 where multisession control is started. In instances where multisession control is not used, then cycle switching is started at the step 4172. In embodiments where there is a single storage device that controls cycle switching, then the switching may be performed by the first storage device 4014 at the DC1 data center 4010. Following the step 4172, processing is complete.

Note that it may be possible to migrate the work load as discussed elsewhere herein so that the host could be located at any one of the data centers 4010, 4020, 4030. Migrating the work load may be performed in connection with toggling between a cascaded triangular asynchronous replication system and a concurrent triangular asynchronous replication system, or may be performed before or after the toggling. In some cases, moving the work load may result in changing the type of triangular asynchronous replication system. For example, transitioning from a concurrent triangular asynchronous replication system to a cascaded triangular asynchronous replication system like that illustrated in FIG. 64, and then moving the work load from the DC1 data center 4010 to the DC2 data center 4020 results, essentially, in a concurrent triangular asynchronous replication system with the DC2 data center 4020 becoming the primary group, the DC1 data center 4010 becoming the synchronous backup group, and the DC3 data center 4030 remaining the asynchronous backup group throughout.

As discussed above in connection with the flow chart 4050 and the corresponding alternative path 4055 as well as the flow chart 4150 and the corresponding alternative path 4155, it may be possible to toggle between a cascaded triangular asynchronous replication system and a concurrent triangular asynchronous replication system without having to first drain pending ordered writes from the R1 volume to the corresponding R2 (R21) volume. Furthermore, in instances where the toggling occurs as a result of link loss between the primary group and the asynchronous backup group, it may not be possible to drain ordered writes before toggling. In such cases, alternative measures may be used.

Figure 71:
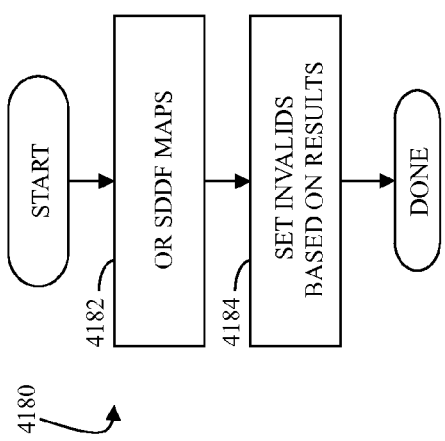
FIG. 71 is a flow chart that illustrates steps that may be performed at a storage device in connection with toggling between a cascaded triangular asynchronous replication system and a concurrent triangular asynchronous replication system according to an embodiment of the system described herein.

Referring to FIG. 71, a flow chart 4180 illustrates steps that may be performed at a storage device in connection with toggling between a cascaded triangular asynchronous replication system and a concurrent triangular asynchronous replication system. In the case of transitioning from a cascaded triangular asynchronous replication system to a concurrent triangular asynchronous replication system, the steps illustrated by the flow chart 4180 may be performed by the first storage device 4014 (the primary group). Conversely, in the case of transitioning from a concurrent triangular asynchronous replication system to a cascaded triangular asynchronous replication system, the steps illustrated by the flow chart 4180 may be performed by the second storage device 4024 (the synchronous backup group).

The processing for the flow chart 4180 uses SDDF maps that indicate tracks for ordered writes that have not yet been sent to the third storage device 4034 (asynchronous backup group). Processing begins at a first step 4182 where the SDDF maps are OR'ed. Following the step 4182 is a step 4184 where track data for the third storage device 4034 corresponding to the OR'ed SDDF maps are set invalid. As discussed elsewhere herein, setting the tracks to invalid causes the track data to be sent to the third storage device 4034. Following the step 4184, processing is complete.

Figure 72:
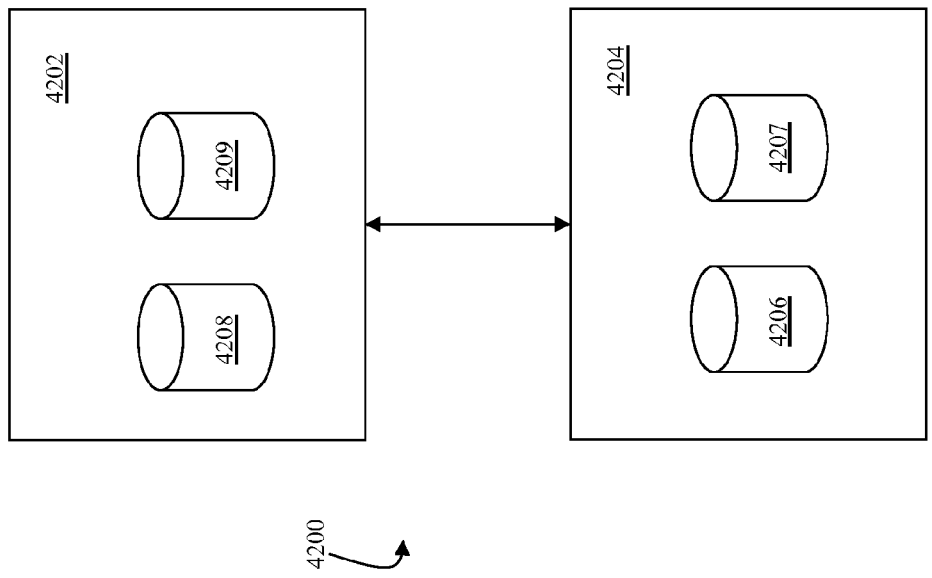
FIG. 72 is a diagram that illustrates sharing SDDF map information between a first storage device and a second storage device according to an embodiment of the system described herein.

Referring to FIG. 72, a diagram 4200 illustrates sharing SDDF map information between a first storage device 4202 and a second storage device 4204. The storage devices are like the storage devices 4014, 4024, 4034 described elsewhere herein. Depending upon whether the system is in a concurrent or cascaded triangular asynchronous replication configuration, one of the storage devices 4202, 4204 may be the R1 source for the asynchronous backup group (not shown in the diagram 4200) and the other maintains the SDDF maps to indicate data that has not yet been transferred to the asynchronous backup group. Construction and maintenance of the SDDF maps is described in more detail elsewhere herein.

If, for example, the storage device 4202 contains the R1 volume for the RDF connection with the asynchronous backup group, then the storage device 4204 contains a first SDDF map 4206 and a second SDDF map 4207 for data that has not yet been transferred from the storage device 4202 to the asynchronous backup group. In such a case, the storage device 4202 may also maintain parallel SDDF maps 4208, 4209, where the SDDF map 4208 is identical to the SDDF map 4206 and the SDDF map 4209 is identical to the SDDF map 4207. Note, however, that maintaining the parallel SDDF maps 4208, 4209 may be redundant since the active and inactive buffers of the storage device 4202 contain the actual data that needs to be transferred to the asynchronous backup group and thus could be used to construct the SDDF maps 4208, 4209. In other cases, the SDDF maps 4208, 4209 may be constructed by having the storage device 4204 transfer appropriate information to the storage device 4202.

Figure 73:
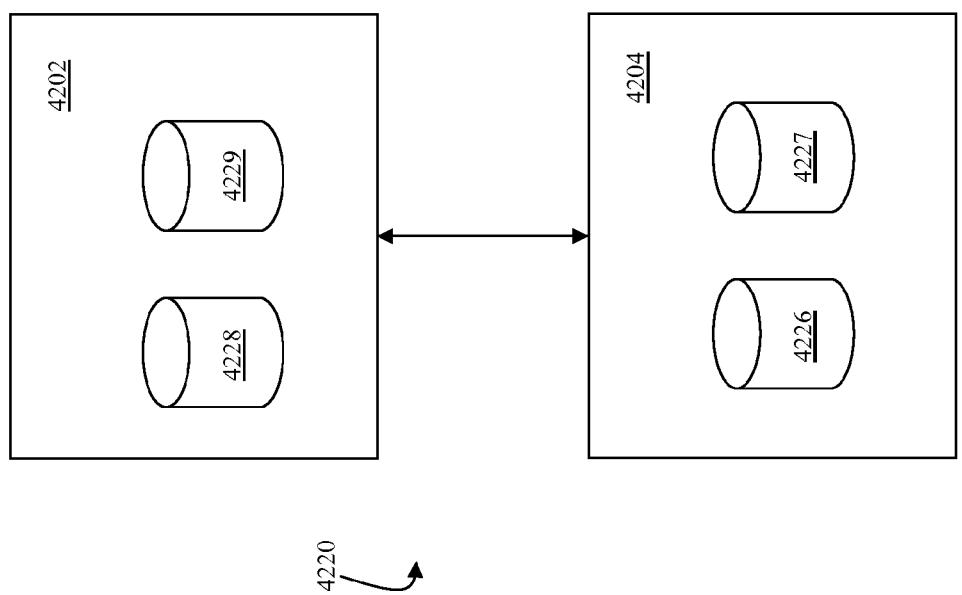
FIG. 73 is a diagram that illustrates an alternative embodiment where storage devices each maintain separate copies of the active and inactive buffers according to the system described herein.

Referring to FIG. 73, a diagram 4220 illustrates another possibility where the storage devices 4202, 4204 each maintain separate copies of the active and inactive buffers. The storage device 4204 contains the active buffer 4226 and the inactive buffer 4227 while the storage device 4202 contains the active buffer 4228 and the inactive buffer 4229. Depending upon the configuration, one of the storage devices 4202, 4204 transmits ordered write data to the asynchronous backup group and one of the storage devices 4202, 4204 transmits synchronous data to the other one of the storage devices 4202, 4204. In an embodiment illustrated by FIG. 73, the storage devices contain corresponding active and inactive ordered write buffers 4226-4229 so that, for example, the buffer 4226 corresponds to the buffer 4228 while the buffer 4227 corresponds to the buffer 4229.

As an example, suppose the system is in a concurrent triangular asynchronous replication configuration with the primary group being associated with the storage device 4202. In such a case, the buffers 4228, 4229 correspond to the active and inactive buffers used to transfer ordered writes from the storage device 4202 to an asynchronous backup group (not shown in FIG. 73). Also in this example, data is transferred synchronously from the storage device 4202 to the storage device 4204. However, the synchronously transferred data includes information useful for reconstructing the active and inactive buffers at the storage device 4204 (e.g., the cycle number is transferred with the synchronously transferred data). Thus, the storage device 4204 may construct the buffer 4226 as a duplicate of the buffer 4228 and may construct the buffer 4227 as a duplicate of the buffer 4229. Note that there may be a mechanism for providing cycle switch information to the appropriate storage device so that a storage device constructing duplicate buffers may know when it is appropriate to discard the inactive buffer, cause the active buffer to become the new inactive buffer, start a new active buffer, etc.

Figure 74:
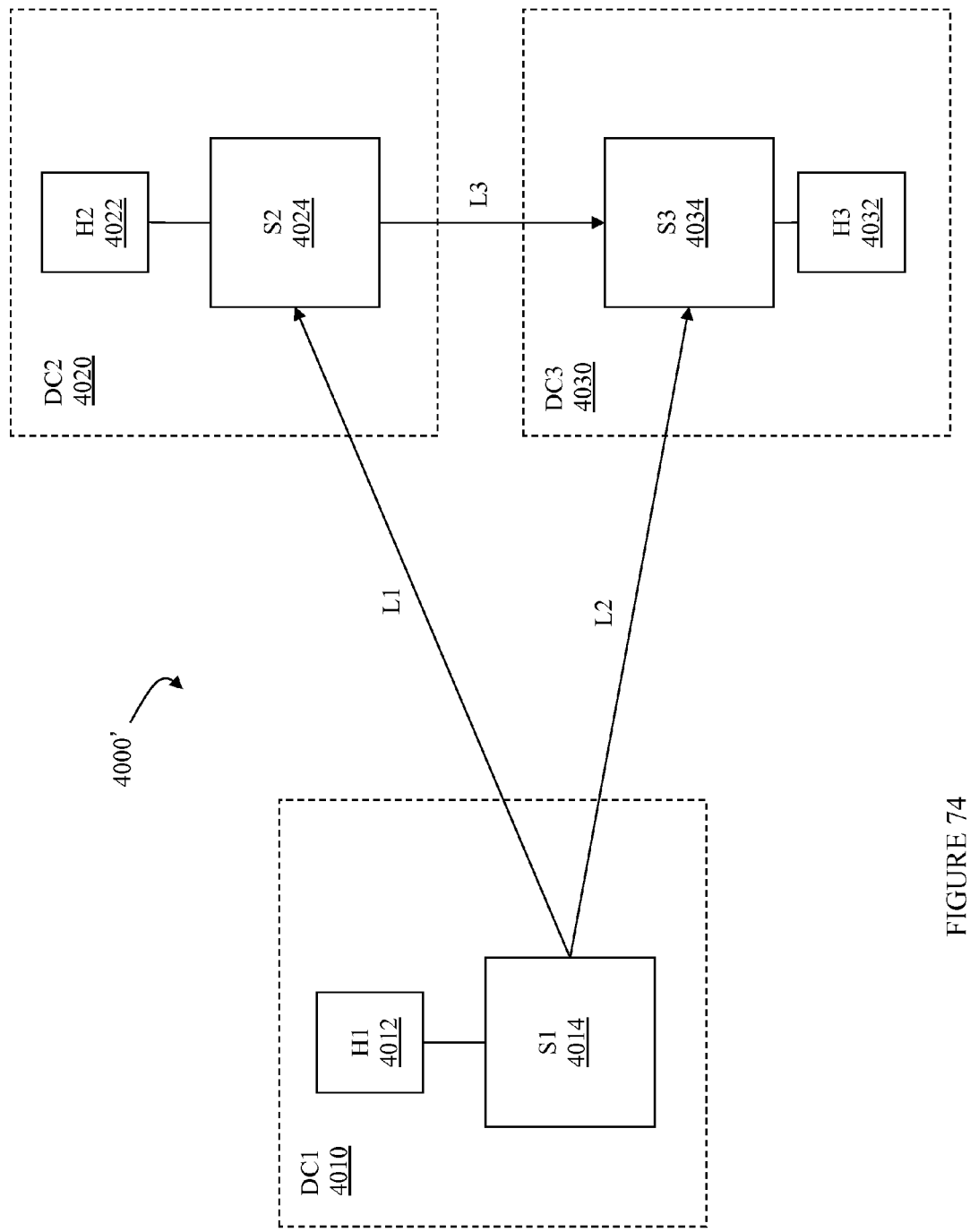
FIG. 74 is a diagram illustrating a system having a primary group, a synchronous backup group, and an asynchronous backup group provided in a cascaded configuration with links therebetween always active according to an embodiment of the system described herein.

Referring to FIG. 74, a system 4000' is like the system 4000 of FIG. 64 except that all three links L1, L2, and L3 are established simultaneously. Such a configuration may be deemed a simultaneous concurrent and cascaded triangular asynchronous replication configuration. As explained in more detail below, in some embodiments all three links L1, L2, and L3 are always active. In other embodiments, only two of the three links are active while the third link is established but not active. A logical device that receives remote mirroring transfers from two possible sources may be deemed an R22 device. Operation of an R22 device is described in more detail elsewhere herein.

In instances where all three links L1, L2, and L3 are always active, then there may be no need to toggle between a concurrent triangular asynchronous replication system and a cascaded triangular asynchronous replication system, especially if duplicate SDDF maps and/or duplicate active and inactive buffers are maintained, as described above. However, in instances where all the links are initially established, but only two are active at any one time, there may be steps performed in connection with toggling between a concurrent triangular asynchronous replication system and a cascaded triangular asynchronous replication system.

Figure 75:
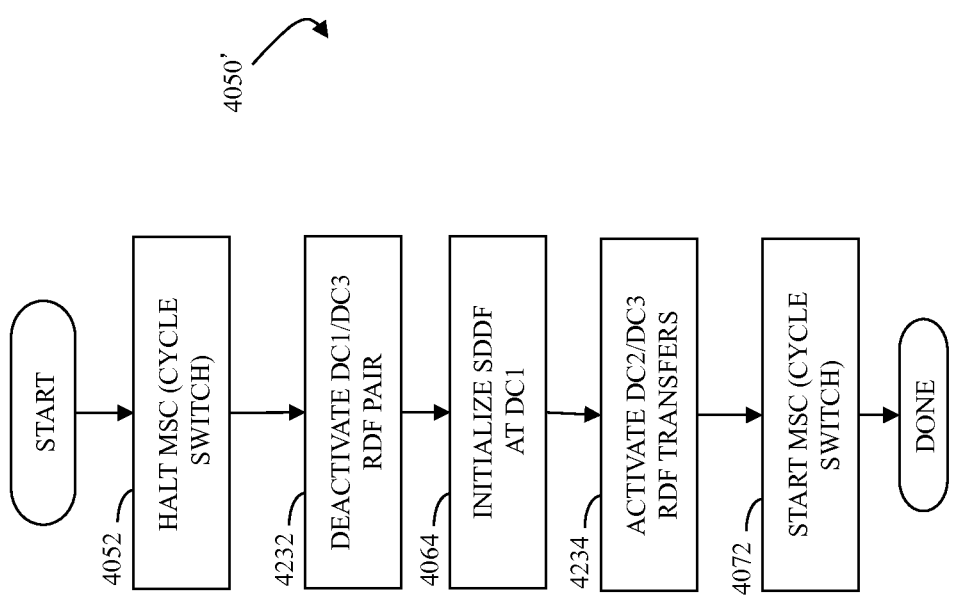
FIG. 75 is a flow chart that illustrates steps performed in connection with transitioning from a concurrent triangular asynchronous replication system to a cascaded triangular asynchronous replication system according to an alternative embodiment of the system described herein.

Referring to FIG. 75, a flow chart 4050' illustrates steps performed in connection with transitioning from a concurrent triangular asynchronous replication system to a cascaded triangular asynchronous replication system using the system 4000' like that of FIG. 74 where only two of the three links are active at any one time. In the case of a transition from a concurrent triangular asynchronous replication system to a cascaded triangular asynchronous replication system, initially L1 and L2 are active. At the end of the transition, L1 and L3 are active.

The flow chart 4050' is like the flow chart 4050 of FIG. 65. Thus, similar steps are provided therein and are not described again. Note, however, that the flow chart 4050' does not contain the steps for creating and destroying RDF relationships. Instead, the flow chart 4050' contains a new step 4232 for deactivating the DC1/DC3 RDF pair and contains a new step 4234 for activating the DC2/DC3 RDF pair.

Figure 76:
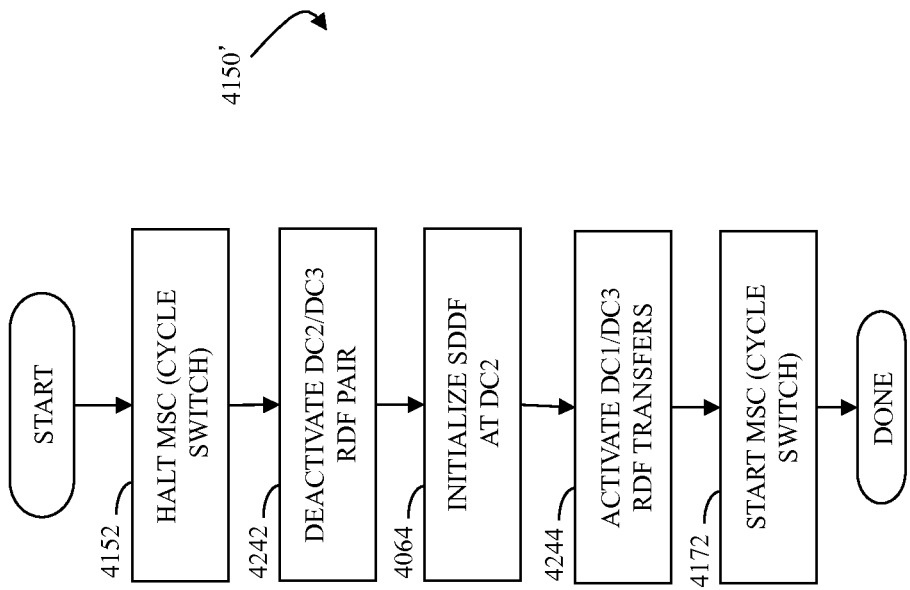
FIG. 76 is a flow chart that illustrates steps performed in connection with transitioning from a cascaded triangular asynchronous replication system to a concurrent triangular asynchronous replication system according to an alternative embodiment of the system described herein.

Referring to FIG. 76, a flow chart 4150' illustrates steps performed in connection with transitioning from a concurrent triangular asynchronous replication system to a cascaded triangular asynchronous replication system using the system 4000' like that of FIG. 74 where only two of the three links are active at any one time. In the case of a transition from a cascaded triangular asynchronous replication system to a concurrent triangular asynchronous replication system, initially L1 and L3 are active. At the end of the process, L1 and L2 will be active. The flow chart 4150' is like the flow chart 4150 of FIG. 70. Thus, similar steps are provided therein and are not described again. Note, however, that the flow chart 4150' does not contain steps for creating and destroying RDF relationships. Instead, the flow chart 4150' contains a new step 4242 for deactivating the DC2/DC3 RDF pair and contains a new step 4244 for activating the DC1/DC3 RDF pair.

Figures 77, 78:
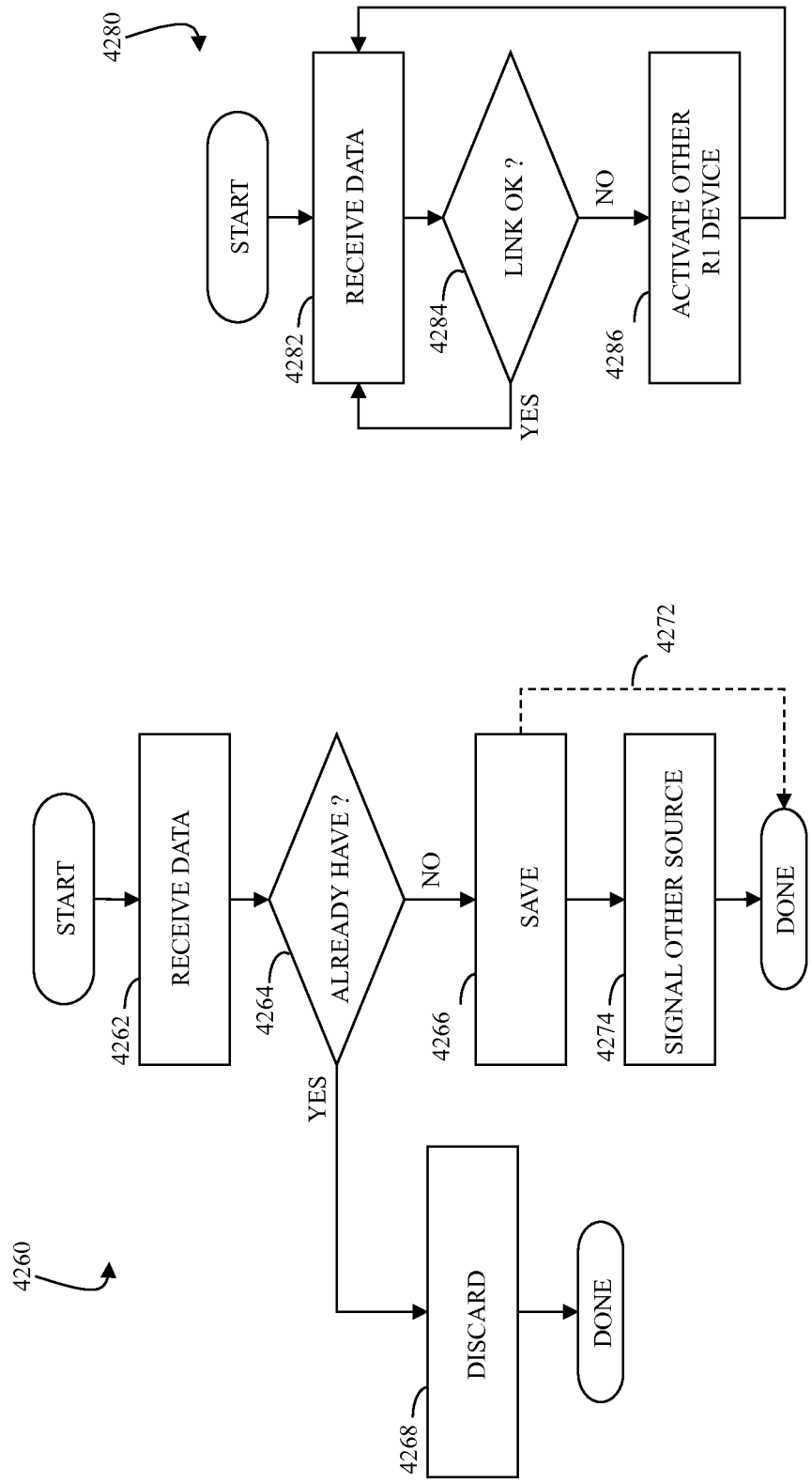
FIG. 77 is a flow chart that illustrates processing performed by an R22 device that receives the same data from two different R1 sources according to an embodiment of the system described herein.
FIG. 78 is a flow chart that illustrates steps performed in connection with an R22 device receiving data from one R1 device and, upon detection of a link failure, causing the other R1 device to be activated according to an embodiment of the system described herein.

Referring to FIG. 77, a flow chart 4260 illustrates processing performed by an R22 device that receives the same data from two different R1 sources. For example, in the system 4000' illustrated by FIG. 74, the third storage device 4034 may receive the same ordered write data from the storage device 4014 and the from storage device 4024. Note that if one of the links L2 or L3 were to fail, the system 4000' would revert to a cascaded triangular asynchronous replication system or a concurrent triangular asynchronous replication system, as appropriate. However, if all the links are operational, and both RDF connections to the R22 device (the third storage device 4034) are active, then the R22 device must handle data from two sources.

Processing for the flow chart 4260 begins at a first step 4262 where the R22 device receives data from one of the R1 devices corresponding to either the first storage device 4014 or the second storage device 4024. Following the step 4262 is a test step 4264 where it is determined if the R22 device already has the same data (i.e., already provided by the other one of the storage devices 4014, 4024). Any of a number of mechanisms may be used to keep track of which data has already been received, including labeling the ordered write data packets according to cycle and the track and sector number for the data and then having the R22 device maintain a list or a table of tracks and sectors for a particular ordered write cycle number. Other appropriate mechanisms may also be used.

If it is determined at the test step 4264 that the R22 device has not already received the data, then control transfers from the step 4264 to a step 4266 where the data is saved at the R22 device (and any appropriate bookkeeping is performed for the test at the step 4264). If it is determined at the test step 4264 that the R22 device already has the received data, then control transfers from the step 4264 to a step 4268 where the data is discarded (not saved). Following the step 4268, processing is complete.

In some embodiments, after data is saved at the step 4266, then processing is complete. This is indicated by an alternative path 4272. However, in other embodiments, it may be advantageous to prevent the other R1 source from sending data that has already been received by the R22 device. For example, there may be monetary charges based on an amount of data transmitted over the links. Accordingly, following the step 4266 is a step 4274 where the R22 device provides a signal to the other R1 source (the one of the storage devices 4014, 4024 that did not send the data) to indicate that the corresponding data does not need to be sent. For example, if at the step 4262 the R22 device receives data for ordered write cycle M, track X, sector Y from the first storage device 4014, then the R22 device may provide a signal to the second storage device 4024 to cause the second storage device 4024 to not send the data for ordered write cycle M, track Y, sector X. In response to receiving the signal, the second storage device 4024 may discard the corresponding packet without sending it.

In some embodiments, the processing at the R1 device for scanning inactive buffers to transmit RDF data from the R1 device to the R22 device may include a check for whether the data has already been received by the R22 device from another R1 device. For example, in the flow chart 940 of FIG. 19, it is possible to add a test step after the step 204 that checks if the R22 has already received the same data from another source. If not, processing would continue with the step 212. Otherwise, control would transfer to the step 216.

In some instances, it may be possible to have the R22 device receive data from a single active R1 device and then, in response to the R22 device detecting a link failure, the R22 device would signal the other R1 device to start sending data (i.e., would cause the other RDF link to be activated).

Referring to FIG. 78, a flow chart 4280 illustrates steps performed in connection with an R22 device receiving data from one R1 device and, upon detection of a link failure, causing the other R1 device to be activated. Processing begins at a first step 4282 where the R22 device receives data. Following the step 4282 is a test step 4284 where it is determined if the link on which the data was sent is operational. Note that the processing at the step 4282 may include a timeout feature that causes control to transfer from the step 4282 to the step 4284 with some type of timeout/indicator being set where the error indicator is examined at the test step 4284.

If it is determined at the test step 4284 that the link between the active R1 device and the R22 device is operational, then control transfers from the test step 4284 back to the step 4282 to receive additional data. Otherwise, control transfers from the test step 4284 to a step 4286 where the other R1 device is activated. Activating the other R1 device at the step 4286 may be performed using any appropriate mechanism, including sending a signal to the R1 device or to another device that controls the R1 device. Following the step 4286, control transfers back to the step 4282, discussed above.

Note that the R21 and R22 devices described above may be extended and combined so that it is possible, for example, to have R222 devices (R2 that receives data from three separate R1 devices) and to have R221 devices (R2 receives data from two different sources and acts as an R1 device to another R2 device). Such extensions and combinations are fairly straight-forward based on the discussion elsewhere herein. Note also that, in the case of a device that acts as an R2 for multiple sources (e.g., an R22 device, an R222 device, etc.), the device may signal receipt of a complete cycle to all R1 devices, even in instances where not all of the R1 relationships are activated. This may be especially useful in instances such as where an inactive R1 device is nevertheless maintaining duplicate active and inactive buffers to prepare for activation at any time.

Figure 79:
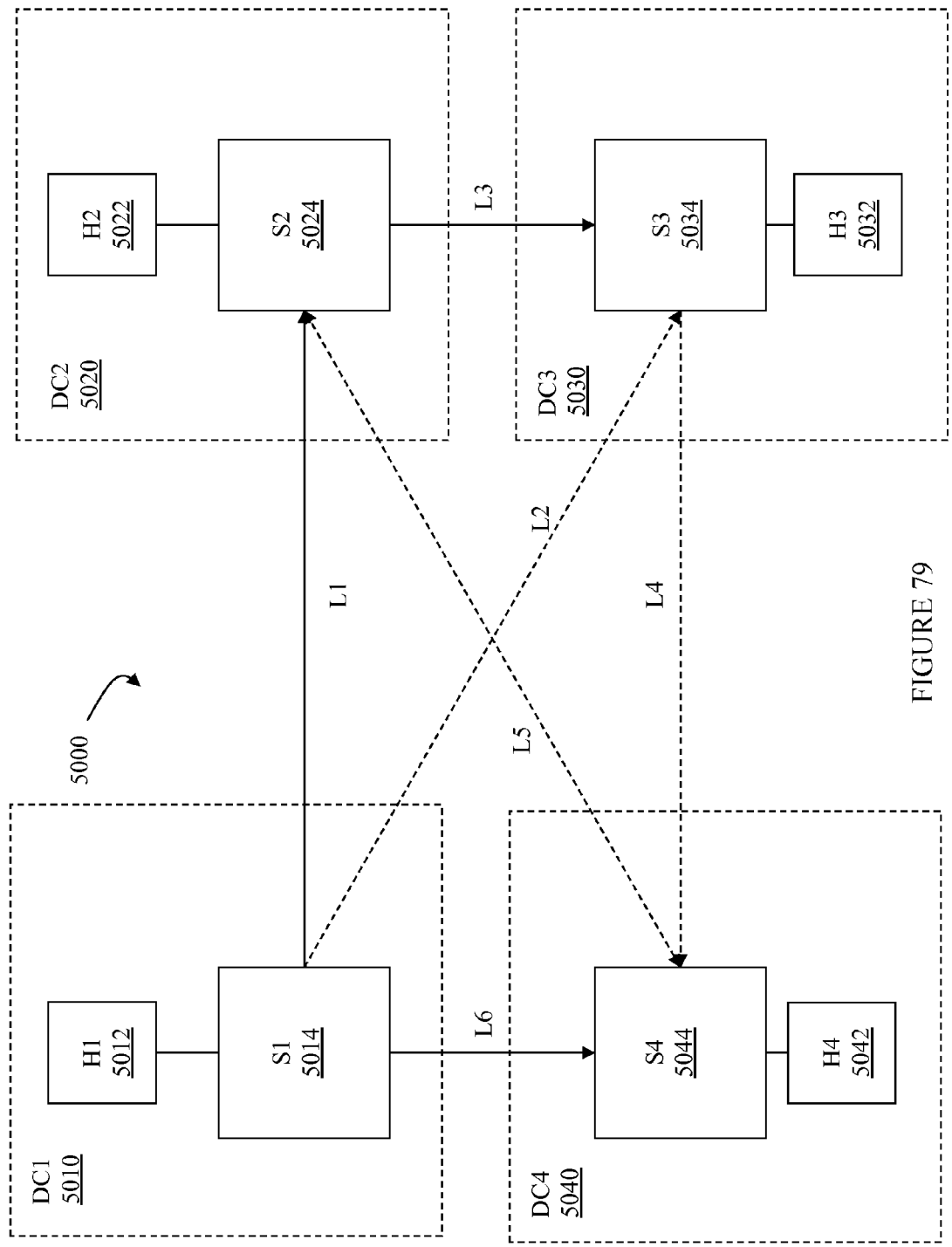
FIG. 79 is a diagram showing a data center, a local destination, and two remote destinations according to an embodiment of the system described herein.

Referring to FIG. 79, a system 5000 includes a first data center 5010 (DC1) having a first host 5012 coupled to a first storage device 5014. The system 5000 also includes a second data center 5020 (DC2) having a second host 5022 coupled to a second storage device 5024, a third data center 5030 (DC3) having a third host 5032 coupled to a third source device 5034, and a fourth data center 5040 (DC4) having a fourth host 5042 coupled to a fourth source device 5044. The data centers 5010, 5020, 5030, 5040 may be geographically dispersed or in the same location. The first storage device 5014 may be coupled to the second storage device 5024 via a link L1, coupled to the third storage device 5034 via a link L2, and coupled to the fourth storage device via a link L6. The second storage device 5024 may also be coupled to the third storage device 5034 via a link L3 and to the fourth storage device via a link L5. The third storage device 5034 may also be coupled to the fourth storage device 5044 via a link L4.

Some or all of the data centers 5010, 5020, 5030, 5040 may each contain a plurality of hosts and/or a plurality of storage devices, all or some of which may work together as a single consistency group. Accordingly, each of the hosts 5012, 5022, 5032, 5042 may represent a plurality of hosts while each of the storage devices 5014, 5024, 5034, 5044 may represent a plurality of storage devices (storage group). Note also that a storage device may include one or more logical volumes so that, for the discussion herein, references to a storage device or storage group may be understood, in appropriate context, to include one or more storage devices and/or one or more logical volumes provided in connection with a storage device.

In an initial configuration, the link L1 may be used for synchronous transfer of data from the first storage device 5014 to the second storage device 5024 while the link L3 may be used for asynchronous transfer of data (ordered writes) from the second storage device 5024 to the third storage device 5034 and the link L6 is used for asynchronous transfer of data from the first storage device 5014 to the fourth storage device 5044. The second storage device 5024 may transfer data to the third storage device 5034 corresponding to data received by the second storage device 5024 from the first storage device 5014. In some embodiments, the links L2, L4, and L5 may not be used initially, but may be activated when necessary or desirable (e.g., in connection with a failover and/or switchover). Thus, the data centers 5010, 5020, 5030 form a cascaded triangular asynchronous configuration as discussed elsewhere herein while the data centers 5010, 5020, 5040 form a concurrent triangular asynchronous replication system.

For the discussion that follows, the term "primary group" may be used to refer to the combination of hosts and storage devices (and/or volumes at the storage devices) at a location (i.e., one of the data centers 5010, 5020, 5030, 5040) that is used for the primary work load being done by the computing system. The term "synchronous backup group" may refer to the combination of hosts and storage devices (and/or volumes at the storage devices) at at least one of the data centers 5010, 5020, 5030, 5040 used to maintain a synchronous remote mirror of the data generated and stored at the primary group site. Similarly, the term "asynchronous backup group" may refer to the combination of hosts and storage devices at at least one of the data centers 5010, 5020, 5030, 5040 used to maintain an asynchronous remote mirror of the data generated at the primary group site.

For the discussion herein, it may be assumed that the primary group is initially provided at the data center 5010, the synchronous backup group at the data center 5020, and asynchronous backup groups at the data center 5030 and at the data center 5040. Note that it is possible for the asynchronous backup groups to be located physically farther from the data source (e.g., the primary group) than is the synchronous backup group. The data center 5030 may be located physically close to the data center 5040 so that a synchronous data transfer relationship may be established between the data centers 5030, 5040 via the link L4. Note also that the hosts 5022, 5032, 5042 at the synchronous backup group and the asynchronous backup groups may not necessarily be initially operational and may only be used when and if one of the backup groups becomes the primary group due to a switchover or failover.

Data is initially generated at the data center 5010 (e.g., by the host 5012) is synchronously transferred to the data center 5020 and is asynchronously transferred to the data center 5040. In addition, upon receipt of the synchronously transferred data, the data center 5020 asynchronously transfers the same data to the data center 5030. Thus, the data centers 5010, 5020, 5040 operate like the concurrent triangular asynchronous replication system 3000 described above while the data centers 5010, 5020, 5030 operate like the cascaded triangular asynchronous replication system 4000 also described above.

An advantage to the system 5000 is that even if one of the asynchronous backup groups 5030, 5040 fails, the system 5000 still maintains a triangular asynchronous replication configuration. For example, if the data center 5030 fails, the remaining data centers 5010, 5020, 5040 maintain a concurrent triangular asynchronous replication configuration. Similarly, if the data center 5040 fails, the remaining data centers 5010, 5020, 5030 maintain a cascaded triangular asynchronous replication configuration.

In an embodiment herein, at least some of the storage devices 5014, 5024, 5034, 5044 maintain SDDF maps as described elsewhere herein in order to facilitate differential resynchronization. Thus, for example, the storage device 5024 may maintain SDDF maps corresponding to data that has been transferred from the storage device 5014 to the storage device 5024 but not yet transferred from the storage device 5014 to the storage device 5044. Other SDDF maps and/or combinations of SDDF maps may be used.

Note also that it may be possible to compensate for any link failures by using a different link. For example, if the link L3 fails, it may be possible to use the link L2 to transfer ordered writes from the data center 5010 to the data center 5030. In such a case, the data centers 5010, 5020, 5030 would form one concurrent triangular asynchronous replication configuration while the data centers 5010, 5020, 5040 form another concurrent triangular asynchronous replication configuration. The storage device 5014 may need to keep two separate sets of active and inactive buffers: one set for ordered writes transfers to the storage device 5034 and one set for ordered writes transfers to the storage device 5044. As another example, if the link L6 fails, it may be possible to use the link L5 to transfer ordered writes from the data center 5020 to the data center 5040. In such a case, the data centers 5010, 5020, 5030 would form one cascaded triangular asynchronous replication configuration while the data centers 5010, 5020, 5040 form another cascaded triangular asynchronous replication configuration. The storage device 5024 may need to keep two separate sets of active and inactive buffers: one set for ordered writes transfers to the storage device 5034 and one set for ordered writes transfers to the storage device 5044.

It is also possible to transition the primary group to either of the data centers 5030, 5040. In such a case, the other one of the data centers 5030, 5040 becomes the new synchronous backup group and one or both of the data centers 5010, 5020 become the new asynchronous backup group(s). The transition may occur due to a planned switchover (e.g., shut down and maintenance of one of the data centers 5010, 5020) or may occur due to a failure of one of the data centers 5010, 5020 and/or one of the links. Note that, in the case of a failure of or switchover from the data center 5010, the workload may be initially transition to the data center 5020 since the data stored thereon is expected to be the most up-to-date. Following the initial transition, the workload may then be transitioned from the data center 5020 to one of the data centers 5030, 5040 in order to provide triangular asynchronous replication.

Figure 80:
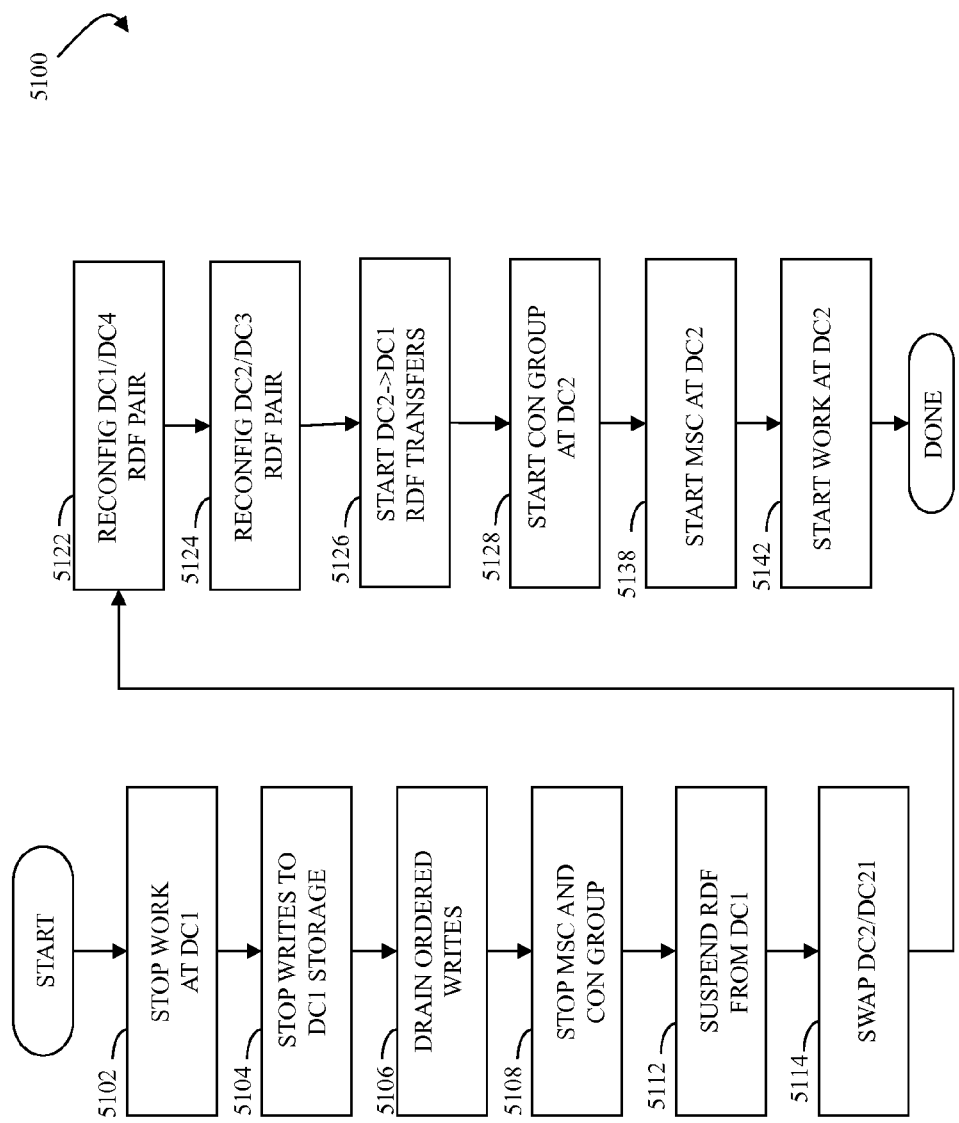
FIG. 80 is a flowchart that illustrates steps performed in connection with a switchover that exchanges the primary group with the synchronous backup group according to an embodiment of the system described herein.

Referring to FIG. 80, a flowchart 5100 illustrates steps performed in connection with a switchover that exchanges the primary group with the synchronous backup group. The processing illustrated by the flowchart 5100 is an example where the primary group is initially located at the data center 5010 and the synchronous backup group is initially located the data center 5020 so that performing the steps illustrated by the flowchart 5100 causes the primary group to be located at the data center 5020 and the synchronous backup group to be located at the data center 5010. Of course, other initial configurations are possible so that, for example, the steps of the flowchart 5100 may be adapted to swap the primary group and the synchronous backup group when the primary group is initially located at the data center 5020 and the synchronous backup group is initially located at the data center 5010.

Processing begins at a first step 5102 where the work being performed at the primary group by the host 5012 (or, as discussed elsewhere herein, a group of hosts) is stopped. Following the step 5102 is a step 5104 where writes being performed to the storage device 5014 (affected volume(s) of the storage device 5014 or, as discussed elsewhere herein, a group of storage devices) are stopped by, for example, making the volume(s) not ready to the host 5012 and/or to any other hosts and/or to any other devices that might perform writes thereto.

Following the step 5104 is a step 5106 where the ordered writes generated by the storage device 5014 in connection with transferring data to the storage devices 5034, 5044 are drained. Draining the ordered writes at the step 5106 involves allowing cycle switching to occur (as discussed elsewhere herein) for a number of cycles (e.g., two or more) even though no new data is being written to the storage device 5014. Eventually, all of the data that was previously written at the storage device 5014 will have been transferred from the storage device 5014 to the storage device 5044 at the data center 5040. It is also expected that all of the data that was synchronously transferred to the storage device 5024 will have been transferred from the storage device 5024 to the storage device 5034 at the data center 5030, but of course the storage device 5014 may perform an appropriate query of the storage device 5024 to confirm.

Following the step 5106 is a step 5108 where multisession control (if any) and consistency group processing (if any) are stopped at the host 5012. Stopping multisession control (MSC) and/or consistency group processing at the host 5012 involves halting the processing that facilitates, for example, synchronization of cycle switching among multiple storage devices, as described in elsewhere herein. Note that once the ordered writes have been drained at the step 5106, there is no longer a need to provide cycle switching. Following the step 5108 is a step 5112 where RDF data transfer operations are suspended. Following the step 5112 is a step 5114 where the R1 and R2 for the RDF connection between the storage device 5014 and the storage device 5024 are swapped using, for example, the dynamic RDF mechanism discussed elsewhere herein.

Following the step 5114 is a step 5122 where the DC1/DC4 RDF pair is reconfigured. Moving the workload from the data center 5010 to the data center 5020 necessitates changing the R1 volume at the storage device 5014 into an R21 volume. Following the step 5122 is a step 5124 where the DC2/DC3 RDF pair is reconfigured since moving the workload necessitates changing the R21 volume at the storage device 5024 into an R1 volume. Following the step 5124 is a step 5126 where the DC2 to DC1 RDF data transfers (synchronous data transfers) are initiated. Following the step 5126 is a step 5128 where a consistency group is started at the data center 5020. As discussed elsewhere herein, a consistency group may be used in cases where the data center 5020 contains multiple storage devices that store coordinated ordered data for a single application and/or group of related applications. Following the step 5128 is a step 5138 where multisession control is begun at the host 5022 at the data center 5020.

Following the step 5138 is a step 5142 where work is begun at the data center 5020. The work begun at the data center 5020 may be identical to or related to (a continuation of) the work that was previously performed at the data center 5010. Following the step 5142, processing is complete. Note that the new configuration of the system is a mirror of the prior configuration with the primary group now being provided at the data center 5020 and the synchronous backup group being provided the data center 5010.

In some instances the primary group may fail, in which case a failover to the data center initially containing the synchronous backup group may be performed (at least initially). As mentioned above, this may be followed by a transition of the primary group to one of the data centers initially used for the asynchronous backup groups.

Figures 81, 82:
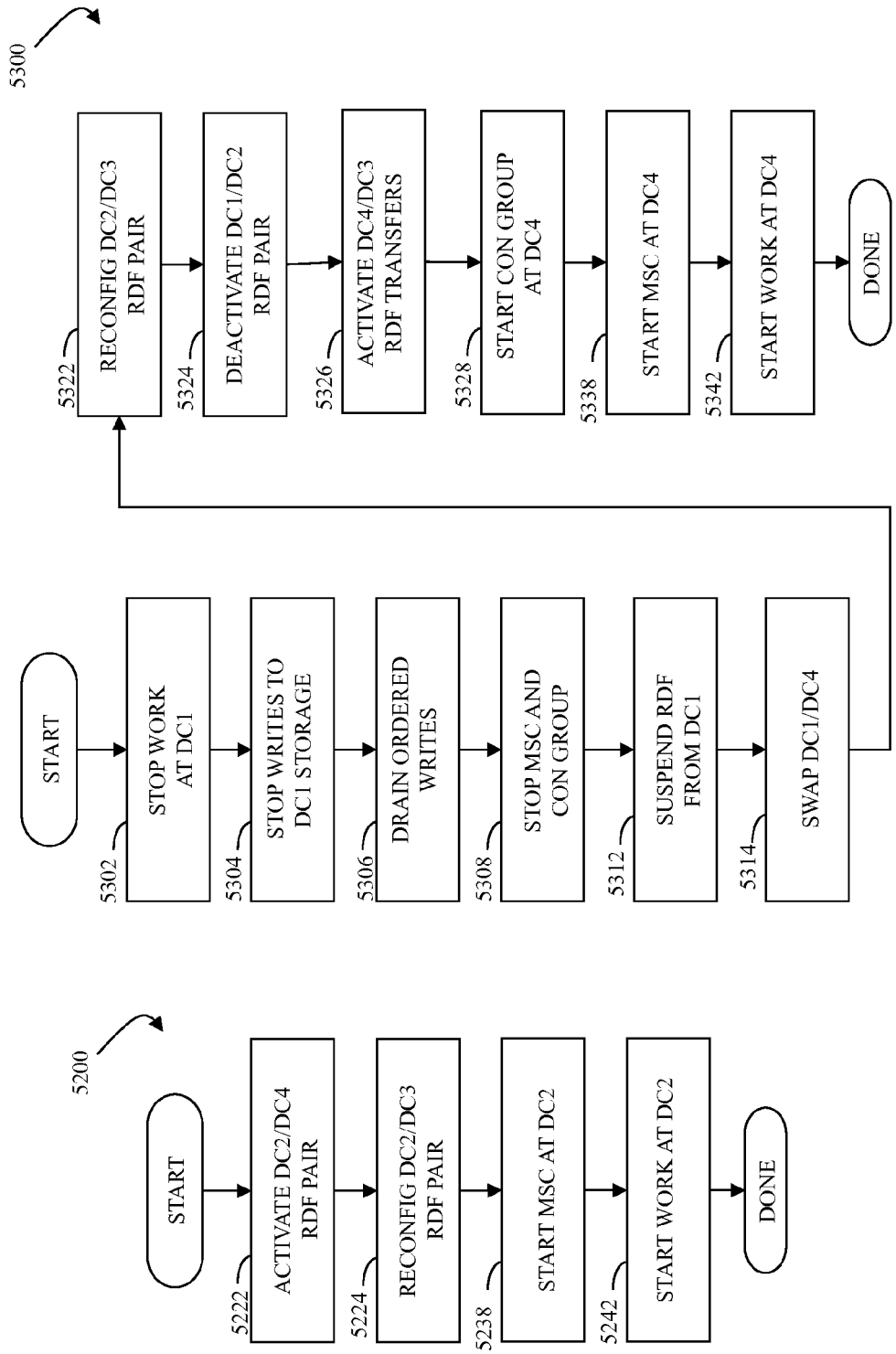
FIG. 81 is a flowchart that illustrates steps performed in connection with a failover where a primary group is restarted at a data center that initially contained a synchronous backup group according to an embodiment of the system described herein.
FIG. 82 is a flowchart that illustrates steps performed in connection with a switchover that exchanges the primary group with one of the asynchronous backup groups according to an embodiment of the system described herein.

Referring to FIG. 81, a flowchart 5200 illustrates steps performed in connection with a failover of the data center 5010 where the primary group is restarted at the data center 5020 that initially contained the synchronous backup group.

Processing begins at a first step 5222 where a DC2/DC4 RDF pair is activated to transfer ordered writes from the data center 5020 to the data center 5040 via the link L5. Following the step 5222 is a step 5224 where the DC2/DC3 RDF pair is reconfigured since having the workload be at the data center 5020 necessitates changing the R21 volume at the storage device 5024 into an R1 volume. Following the step 5224 is a step 5238 where multisession control is begun at the host 5022 at the data center 5020. Following the step 5238 is a step 5242 where work is begun at the data center 5020. The work begun at the data center 5020 may be identical to or related to (a continuation of) the work that was previously performed at the data center 5010. Following the step 5242, processing is complete. Note that the new configuration is not a triangular asynchronous replication configuration since that is no synchronous backup group.

Referring to FIG. 82, a flowchart 5300 illustrates steps performed in connection with a switchover that exchanges the primary group with one of the asynchronous backup groups. The processing illustrated by the flowchart 5300 is an example where the primary group is initially located at the data center 5010, the synchronous backup group is initially located at the data center 5020, and the asynchronous backup groups are initially located the data centers 5030, 5040 so that performing the steps illustrated by the flowchart 5300 causes the primary group to be located at the data center 5040 the synchronous backup group to be located at the data center 5030, and the asynchronous backup groups to be located the data centers 5010, 5020. Of course, other initial configurations are possible so that, for example, the steps of the flowchart 5300 may be adapted to swap the primary group and one of the asynchronous backup groups from any appropriate initial configuration.

Processing begins at a first step 5302 where the work being performed at the primary group by the host 5012 (or, as discussed elsewhere herein, a group of hosts) is stopped. Following the step 5302 is a step 5304 where writes being performed to the storage device 5014 (affected volume(s) of the storage device 5014 or, as discussed elsewhere herein, a group of storage devices) are stopped by, for example, making the volume(s) not ready to the host 5012 and/or to any other hosts and/or to any other devices that might perform writes thereto.

Following the step 5304 is a step 5306 where the ordered writes generated by the storage device 5014 in connection with transferring data to the storage devices 5034, 5044 are drained. Draining the ordered writes at the step 5306 involves allowing cycle switching to occur (as discussed elsewhere herein) for a number of cycles (e.g., two or more) even though no new data is being written to the storage device 5014. Eventually, all of the data that was previously written at the storage device 5014 will have been transferred from the storage device 5014 to the storage device 5044 at the data center 5040. It is also expected that all of the data that was synchronously transferred to the storage device 5024 will have been transferred from the storage device 5024 to the storage device 5034 at the data center 5030, but of course the storage device 5014 may perform an appropriate query of the storage device 5024 to confirm.

Following the step 5306 is a step 5308 where multisession control (if any) and consistency group processing (if any) are stopped at the host 5012. Following the step 5308 is a step 5312 where RDF data transfer operations are suspended. Following the step 5312 is a step 5314 where the R1 and R2 for the RDF connection between the storage device 5014 and the storage device 5044 are swapped using, for example, the dynamic RDF mechanism discussed elsewhere herein.

Following the step 5314 is a step 5322 where the DC2/DC3 RDF pair is reconfigured. Moving the workload from the data center 5010 to the data center 5040 necessitates changing the R21 volume at the storage device 5024 into an R2 volume and changing the R2 volume at the storage device 5034 into an R21 volume. Following the step 5322 is a step 5324 where the DC1/DC2 RDF pair is deactivated. Following the step 5324 is a step 5326 where the DC4 to DC3 synchronous RDF data transfers are activated. Following the step 5326 is a step 5328 where a consistency group is started at the data center 5040. As discussed elsewhere herein, a consistency group may be used in cases where the data center 5040 contains multiple storage devices that store coordinated ordered data for a single application and/or group of related applications. Following the step 5328 is a step 5338 where multisession control is begun at the host 5042 at the data center 5040.

Following the step 5338 is a step 5342 where work is begun at the data center 5040. The work begun at the data center 5040 may be identical to or related to (a continuation of) the work that was previously performed at the data center 5010. Following the step 5342, processing is complete. Note that the new configuration of the system is a mirror of the prior configuration with the primary group now being provided at the data center 5040, the synchronous backup group being provided the data center 5030, and the asynchronous backup groups being provided at the data centers 5010, 5020.

The processing illustrated by the flow chart 5300 may be adapted to situations where one of the primary group or the synchronous back group had initially failed. As mentioned above, in the case of a failure of the primary group, it may be desirable to first transition the primary group to the data center that initially contained the synchronous backup group. Following that, the processing illustrated by the flow chart 5300 may be used to transition the primary group to one of the data centers that initially contained an asynchronous backup group by providing appropriate adaptation that takes into account the absence of one of the data centers (e.g., no need to swap the DC1/DC4 RDF relationship if DC1 no longer exists).

In some instances, it may be desirable to be able to simulate a data recovery scenario without affecting actual data or disrupting ongoing operations. However, simply cloning the RDF volumes would not be adequate since, as described elsewhere herein, data recovery, switchover, and failover scenarios rely on additional data, such as SDDF maps and the active and inactive buffers.

Figure 83:
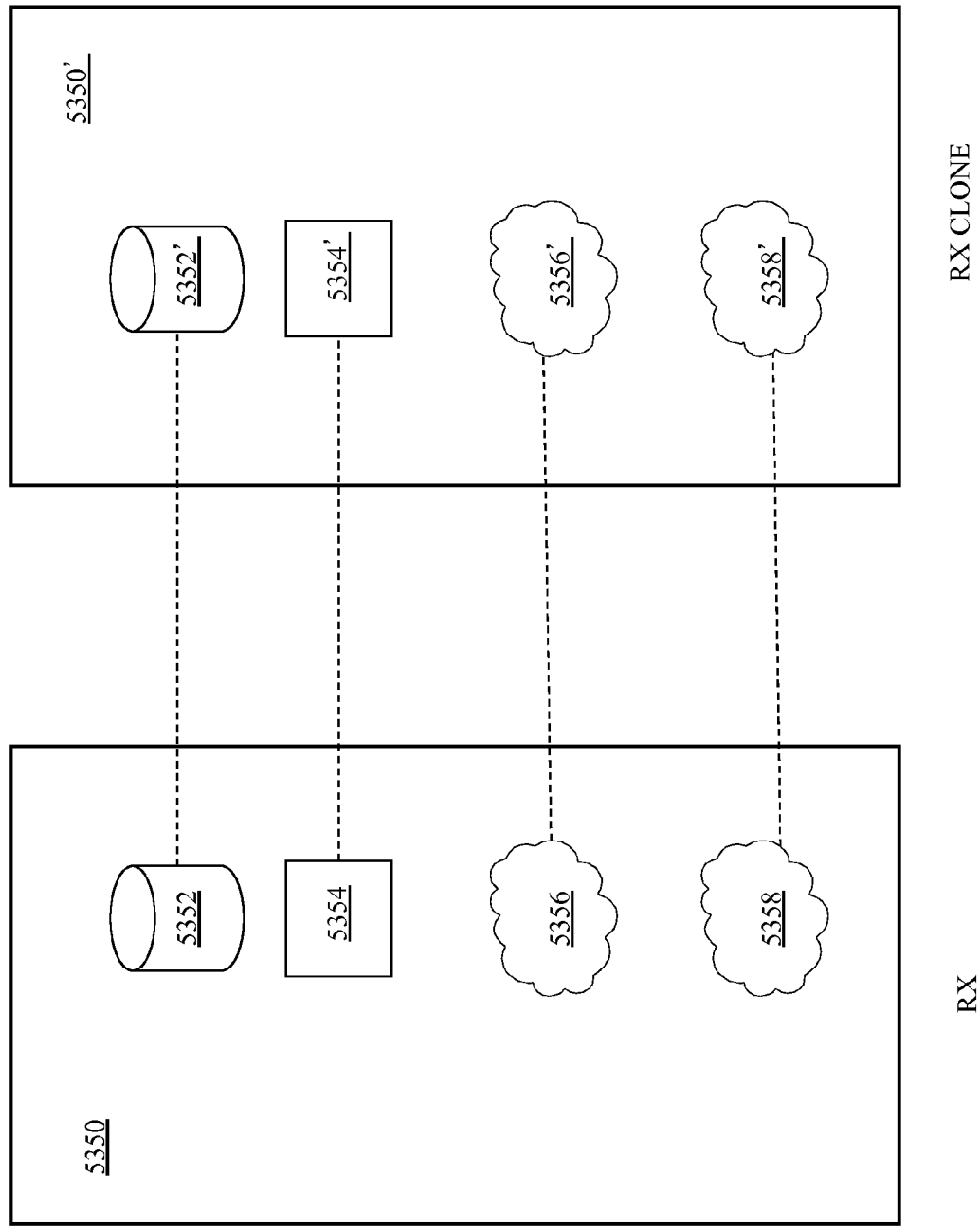
FIG. 83 is a diagram illustrating an RDF device and an RDF clone according to an embodiment of the system described herein.

Referring to FIG. 83, an RDF device 5350 is labeled "RX" to represent any type of RDF device such as an R1 device, an R2 device, an R21 device, etc. The RDF device 5350 includes a logical volume 5352 that contains the data, but also contains one or more SDDF maps 5354, an active buffer 5356, and an inactive buffer 5358. The RDF device 5350 may be cloned to provide an RDF clone 5350' that contains a logical volume clone 5352', SDDF maps clone 5354', an active buffer clone 5356', and an inactive buffer clone 5358'. In operation, each of the RDF volumes of a system may be cloned as illustrated by the RDF device 5350 and the RDF clone 5350'. Then, the recovery/failover/switchover processing described elsewhere herein may be applied to the clones for testing purposes. After testing, the clones may be discarded.

The logical volume clone 5352' may be implemented in a conventional manner using, for example, BCV's or any other appropriate mirroring/split technology. The SDDF maps clone 5354' may be implemented in any number of ways. One possibility is to create and/or activate a second SDDF session every time a first SDDF session is created and/or activated as described herein. For example, when SDDF_1 session is created at the step 1232 the flow chart 1230 of FIG. 27, a clone SDDF_1' session may also be created. Similarly, when the SDDF_1 session is activated at the step 1244, the clone SDDF_1' session would also be activated. Thus, both SDDF sessions, SDDF_1 and SDDF_1', keep track of the same thing.

Cloning the active buffer 5356 and the inactive buffer 5358 may use additional storage space for maintaining the cloned data. As described elsewhere herein, active and inactive buffers are implemented as lists of pointers, COVD's, or similar structures that point to data stored in cache. Thus, it may not be sufficient to simply duplicate the pointers, since it may not be acceptable to operate on actual data that relates to the device 5350. Accordingly, additional cache space may be allocated for maintaining the clone active buffer 5356' and the clone inactive buffer 5358'. Any data that is destaged from the clone buffers 5356', 5358' may be destaged to the clone logical volume 5352'. Construction of the clone buffers 5356', 5358' may be performed by duplicating each slot pointed to by either the active buffer 5356 and/or the inactive buffer 5358 and thereafter mirroring each slot/buffer manipulation. Accordingly, due to performance considerations, it may not be desirable to construct the clone buffers 5356', 5358' until just prior to conducting a recovery/failover/switchover simulation.

Some or all of the volumes may be cloned as described above depending upon the particular simulation being performed. For example, it may be possible to simulate failure of the primary group at DC1 by cloning volumes at DC2 and DC3 without having to clone volumes at DC1. On the other hand, simulation of a failure and subsequent recovery back to DC1 may clone devices at all of the data centers.

Figure 84:
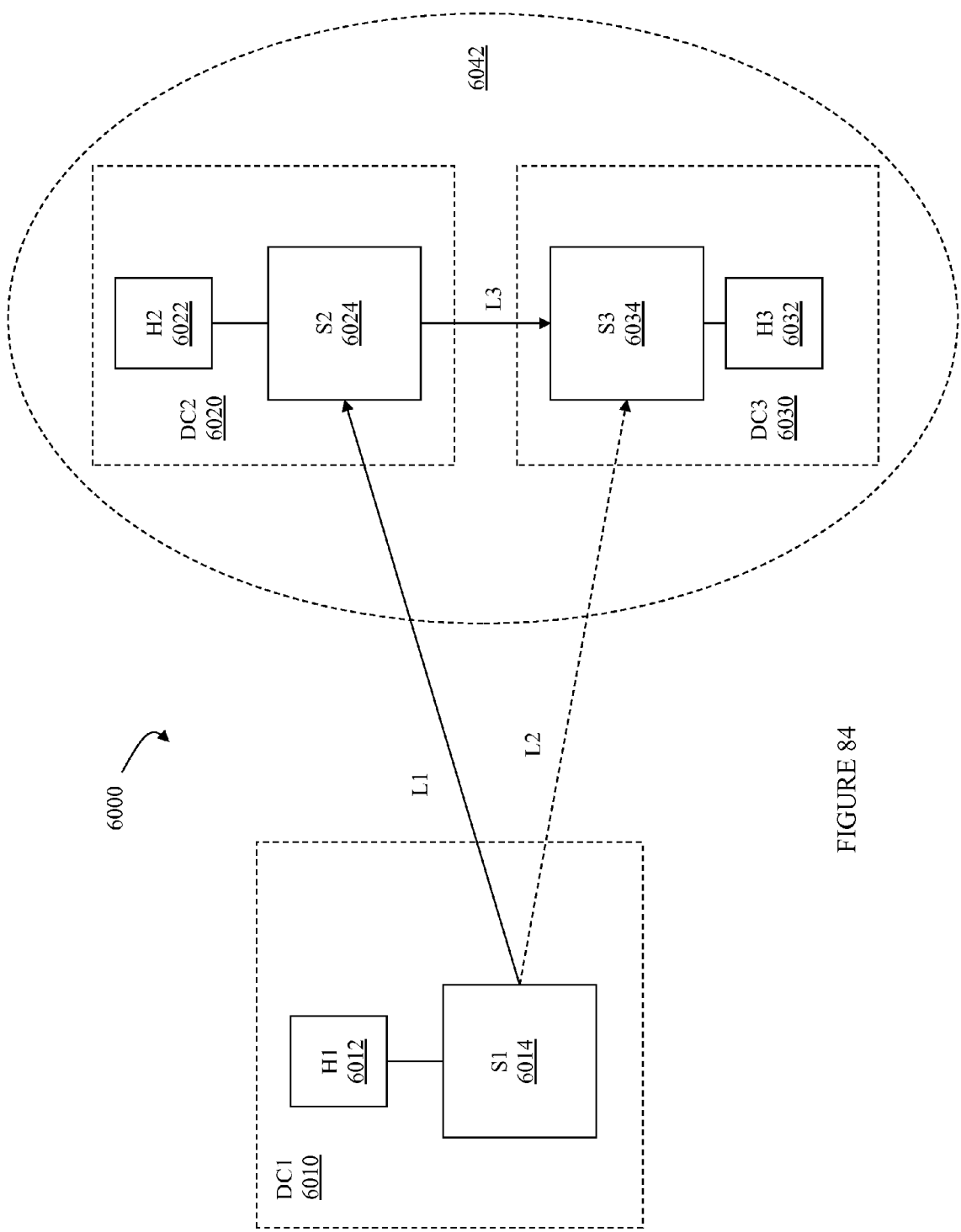
FIG. 84 is a diagram illustrating a system having a primary group, a synchronous backup group, and an asynchronous backup group provided in a cascaded configuration, where the synchronous backup group and the asynchronous backup group form a recovery group, according to an embodiment of the system described herein.

Referring to FIG. 84, a system 6000 is like the system 4000 described above in connection with FIG. 64 and includes a first data center 6010 (DC1) having a first host 6012 coupled to a first storage device 6014. The system 6000 also includes a second data center 6020 (DC2) having a second host 6022 coupled to a second storage device 6024 and a third data center 6030 (DC3) having a third host 6032 coupled to a third source device 6034. The data centers 6010, 6020, 6030, may be geographically dispersed or in the same location. The first storage device 6014 may be coupled to the second storage device 6024 via a link L1 and may be coupled to the third storage device 6034 via a link L2. The second storage device 6024 may also be coupled to the third storage device 6034 via a link L3.

In an embodiment herein, the first data center 6010 may correspond (at least initially) to the source group 1202 of FIG. 26 and/or the source group 1782 of FIG. 42. Thus, the data center 6010 may contain a plurality of hosts and a plurality of storage devices, all or some of which may work together as a single consistency group or not. Similarly, the second data center 6020 may (initially) correspond to the local destination 1204 of FIG. 26. In some cases where significant storage capability is not needed at the data center 6020, the data center 6020 may also (initially) correspond to the minimal storage local destination 1788 of FIG. 42. The data center 6030 may (initially) correspond to the remote destination 1206 of FIG. 26 and/or the remote destination 1786 of FIG. 42.

Thus, some or all of the data centers 6010, 6020, 6030 may each contain a plurality of hosts and/or a plurality of storage devices, all or some of which may work together as a single consistency group. Accordingly, each of the hosts 6012, 6022, 6032 may represent a plurality of hosts while each of the storage devices 6014, 6024, 6034 may represent a plurality of storage devices (storage group). Note also that a storage device may include one or more logical volumes so that, for the discussion herein, references to a storage device or storage group may be understood, in appropriate context, to include one or more storage devices and/or one or more logical volumes provided in connection with a storage device.

In an initial configuration, source data may be generated at the data center 6010 while the data centers 6020, 6030 may be used for backup and recovery in case the data center 6010 fails. The link L1 may be used for synchronous transfer of data from the first storage device 6014 to the second storage device 6024 while the link L3 may be used for asynchronous transfer of data (ordered writes) from the second storage device 6024 to the third storage device 6034.

The second storage device 6024 may transfer data to the third storage device 6034 corresponding to data received by the second storage device 6024 from the first storage device 6014. In some embodiments, the link L2 between the first storage device 6014 and the third storage device 6034 may not be used initially, but may be activated when necessary or desirable (e.g., in connection with a failover and/or switchover).

For the discussion that follows, the term "primary group" may be used to refer to the combination of hosts and storage devices (and/or volumes at the storage devices) at a location (i.e., one of the data centers 6010, 6020, 6030) that is used for the primary work load being done by the computing system. The term "synchronous backup group" may refer to the combination of hosts and storage devices (and/or volumes at the storage devices) at a single one of the data centers 6010, 6020, 6030 used to maintain a synchronous remote mirror of the data generated and stored at the primary group site. Similarly, the term "asynchronous backup group" may refer to the combination of hosts and storage devices at a single one of the data centers 6010, 6020, 6030 used to maintain an asynchronous remote mirror of the data generated at the primary group site.

Initially, the primary group is provided at the data center 6010, the synchronous backup group at the data center 6020, and the asynchronous backup group at the data center 6030. Note that it is possible for the asynchronous backup group to be located physically farther from the data source (i.e., the primary group) than is the synchronous backup group. Note also that the hosts 6022, 6032 at the synchronous backup group and the asynchronous backup group may not necessarily be initially operational and may only be used when and if either of the backup groups becomes the primary group due to a switchover or failover.

The data centers 6010, 6020, 6030 may establish a cascaded RDF relationship where data is initially generated at the data center 6010 (e.g., by the host 6012) and then synchronously transferred to the data center 6020. Upon receipt, the data center 6020 asynchronously transfers the data to the data center 6030. Thus, the cascaded configuration illustrated by the system 6000 is like the concurrent configuration illustrated by the system 3000 in that the data center 6020 (like the data center 3020) contains a synchronously-provided copy of the data and the data center 6030 (like the data center 3030) contains an asynchronously-provided copy of the data. However, the system 6000 is unlike the system 3000 in that the data center 6030 receives the asynchronous data from the data center 6020 while the data center 3030 receives the asynchronous data from the data center 3010.

The data centers 6020, 6030 may be grouped together to form a recovery group 6042. The recovery group 6042 may be a consistency group, discussed elsewhere herein, so that cycle switching for transferring data to the asynchronous data center 6030 is coordinated for a plurality of storage devices. In an embodiment herein, the cycle switching is coordinated at the 6010 where the data is generated.

Figure 85:
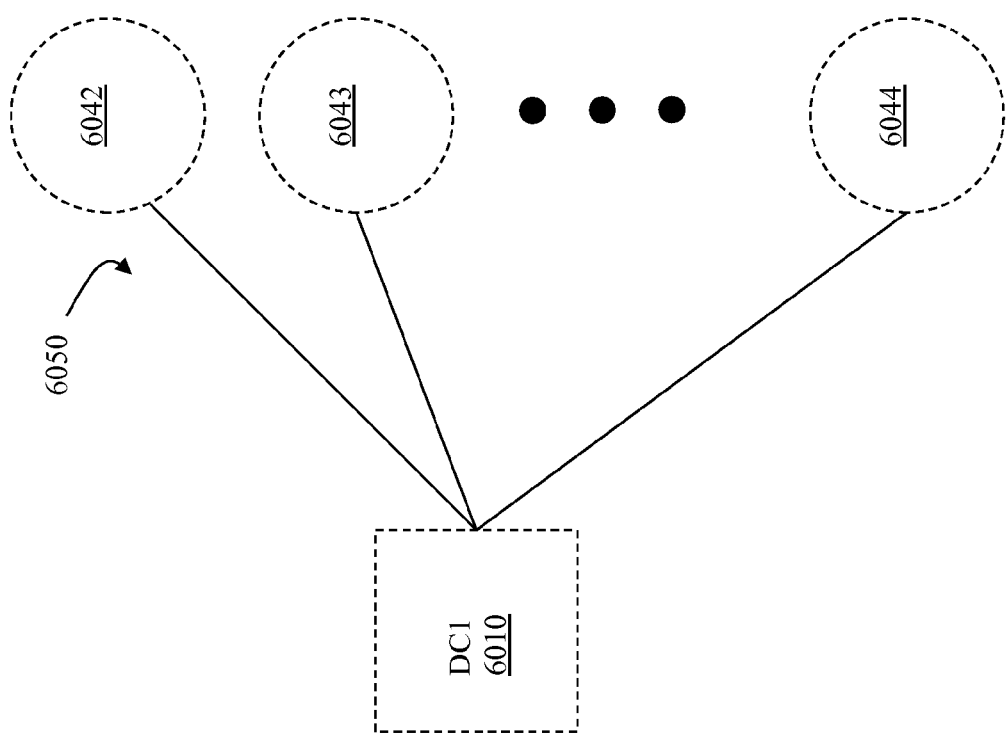
FIG. 85 is a diagram illustrating a system having a primary group coupled to a plurality of recovery groups according to an embodiment of the system described herein.

Referring to FIG. 85, a diagram 6050 shows the data center 6010 coupled to the recovery group 6042 as well as additional recovery groups 6043, 6044. The additional recovery groups 6043, 6044 each include a data center that receives synchronous data from the data center 6010 as well as a data center that receives asynchronous data from the data center 6010. The recovery groups 6042-6044 represent any number of recovery groups coupled to the data center 6010. In an embodiment herein, all or different subsets of the recovery groups 6042-6044 may be controlled by the data center 6010 so that cycle switching therebetween is coordinated. This, for example, if cycle switching between a first one of the recovery groups 6042-6044 and a second one of the recovery groups 6042-6044 is coordinated, then data stored on the first recovery group is consistent with the second recovery group. In such a case, if the data center 6010 failed, it would be possible to restart operations at either the first or the second recovery group, with the other one becoming a backup site. Note that there may be more than one subset of recovery groups and that cycle switching for one or more of the subsets may be independent of cycle switching for other ones of the subsets.

Note that it is possible to have multiple independently consistent subsets so that, for example, a first subset includes N ones of the recovery groups 6042-6044 and a second subset includes M different ones of the recovery groups 6042-6044. The recovery groups in the first subset may be consistent with each other while the recovery groups in the second subset may be consistent with each other. However, the different subsets may cycle switch independently of each other so that, for example, recovery groups in the first subset are not necessarily consistent with recovery groups in the second subset.

Figure 86:
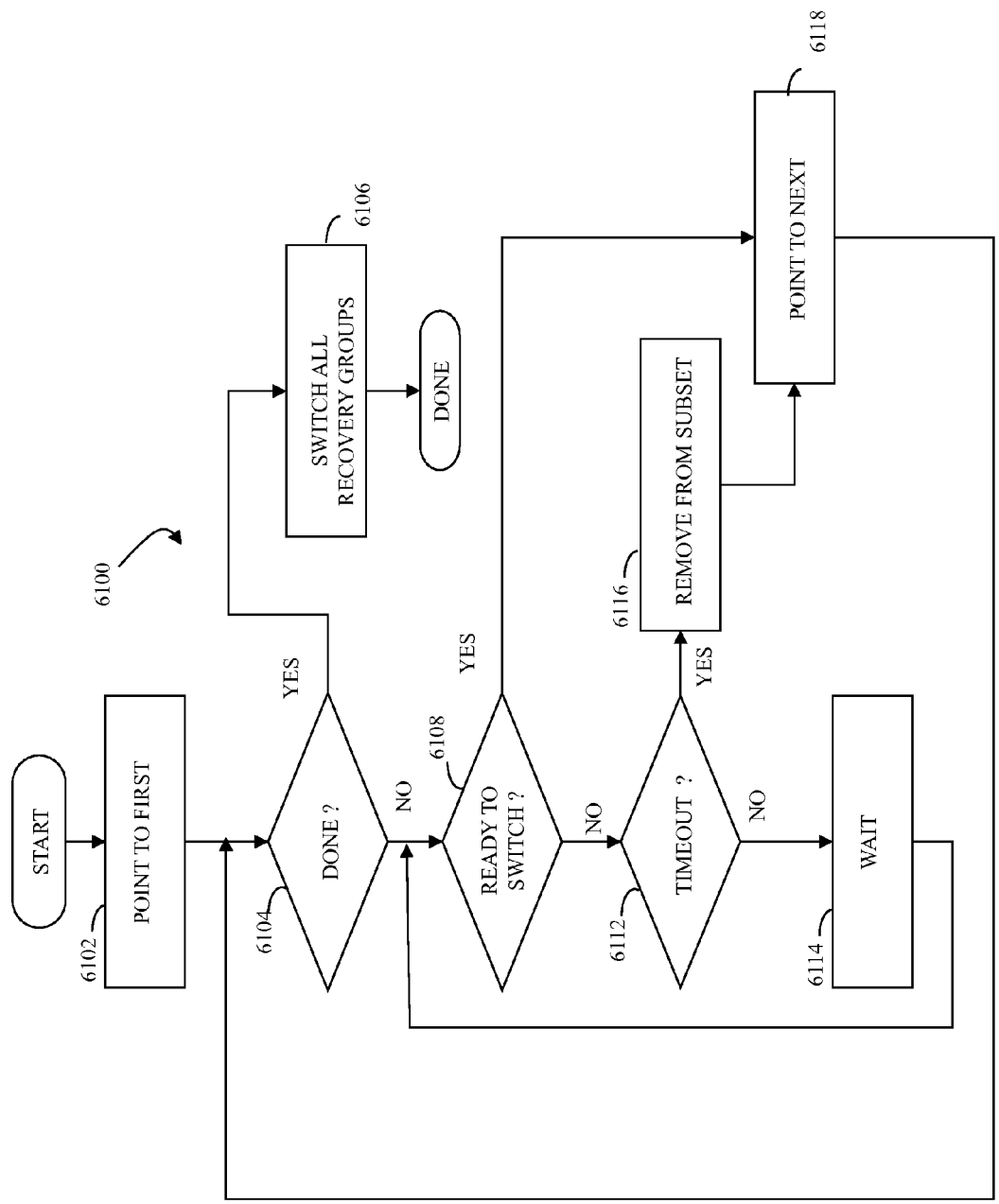
FIG. 86 is a flow chart illustrating coordinating cycle switching for a subset of recovery groups according to an embodiment of the system described herein.

Referring to FIG. 86, a flow chart 6100 illustrates steps performed in connection with coordinating cycle switching for a subset of consistent ones of the recovery groups 6042-6044. Processing begins at a first step 6102 where an iteration counter (pointer), that iterates through all of the recovery groups of the subset, is set to point to the first one of the subset. Following the step 6102 is a test step 6104 where it is determined if all of the recovery groups of the subset have been processed. If so, then control transfers from the test step 6104 to a step 6106 where cycle switching is performed for all of the recovery groups of the subset. In an embodiment herein, the cycle switching may be performed in accordance with processing described elsewhere herein in connection with the flow chart 780 of FIG. 17. Following the step 6106, processing is complete.

If it is determined at the test step 6104 that all of the recovery groups of the subset have not been processed, then control transfers from the test step 6104 to a test step 6108 where it is determined if the particular recovery group indicated by the iteration counter (pointer) is ready to cycle switch. A particular storage device or group of storage devices being ready to cycle switch is discussed in more detail elsewhere herein. If it is determined at the test step 6108 that the particular recovery group indicated by the iteration counter (pointer) is not ready to switch, then control transfers from the test step 6108 to a test step 6112, where it is determined if a timeout has occurred. In an embodiment herein, each of the recovery groups of a particular subset may be given a predetermined amount of time to be ready to cycle switch after which a timeout is deemed to have occurred. Otherwise, a recovery group that cannot be ready to cycle switch in a timely manner would prevent all of the recovery groups of a subset from cycle switching. In an embodiment herein, a timeout period of one minute may be used, although other timeout periods are possible.

If it is determined at the test step 6112 that a timeout has not occurred, then control transfers from the test step 61121 to a step 6114 where the system waits a predetermined amount of time (e.g., text seconds) for the particular recovery group indicated by the iteration counter (pointer) to be ready to cycle switch. Following the step 6114, control transfers back to the step 6108, discussed above, to determine again if the particular recovery group indicated by the iteration counter (pointer) is ready to cycle switch.

If it is determined at the test step 6112 that a timeout has occurred, then control transfers from the test step 6112 to a step 6118 where the particular recovery group indicated by the iteration counter (pointer) is removed from the subset of recovery groups for which coordinated cycle switching is provided. If a particular recovery group is unable to become ready to cycle switch, there may be unexpected delays or failure of one or more components. No matter what the reason, however, it is useful to remove the group from the subset so that cycle switching may be performed for the remaining recovery groups of the subset. Following the step 6116 is a step 6118 where the iteration counter (pointer) is made to point to the next recovery group of the subset (i.e., is incremented). Following the step 6118, control transfers back to the step 6104, discussed above, for another iteration. Note that the step 6118 is also reached from the step 6108 if it is determined at the test step 6108 that the particular recovery group indicated by the iteration counter (pointer) is ready to switch.

Although the system described herein uses tracks as a unit of data for certain purposes, it should be understood that other units of data (including, possibly, variable length units of data) may be used. This also applies to other data structures and data units. In addition, in some instances, the order of steps in the flow charts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system also includes computer software, in a computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A computing system, comprising:
   at least one source data center that generates data;
   a plurality of recovery groups, coupled to the at least one source data center, wherein each of the recovery groups includes an asynchronous data center that receives asynchronous data from the at least one source data center and wherein cycle switching for asynchronous data transfer is coordinated by the at least one source data center for a first subset of recovery groups containing at least two of the recovery groups; and
   a second subset of the recovery groups, different from the first subset, wherein cycle switching for asynchronous data transfer is coordinated by the at least one source data center for the second subset.

2. A computing system, according to claim 1, wherein cycle switching for the second subset is independent of cycle switching for the first subset.

3. A computing system, according to claim 1, wherein coordinating cycle switching for each of the recovery groups includes waiting until all of the recovery groups are ready to switch cycles.

4. A computing system, according to claim 3, wherein a recovery group is removed from the subset in response to the recovery group taking too long to be ready to switch cycles.

5. A computing system, according to claim 1, wherein data written after a first time and before a second time at the at least one source data center is associated with a first chunk of data and wherein data written after the second time at the at least one source data center is associated with a second chunk of data different than the first chunk of data, the at least one source data center providing the first chunk of data to the asynchronous data center while accumulating writes for the second chunk of data.

6. A computing system, according to claim 5, wherein the at least one source data center sends a message to the asynchronous data center and wherein, in response to receiving a reply to the message, the at least one source data center transmits the second chunk of data to the asynchronous data center.

7. A computing system, according to claim 6, wherein the at least one source data center provides an indicator to a synchronous data center that is included with each of the recovery groups, the indicator being provided in connection with receiving the reply from the asynchronous data center.

8. A method of maintaining recovery data, comprising:
   generating data at a source data center;
   asynchronously transferring data to a plurality of asynchronous data centers that are each part of one of a plurality of a first subset of recovery groups coupled to the at least one source data center, wherein the first subset contains at least two of the recovery groups and wherein each of the recovery groups includes at least one of the asynchronous data centers and wherein cycle switching for asynchronous data transfer is coordinated by the at least one source data center for the first subset of the recovery groups; and
   providing a second subset of the recovery groups, different from the first subset, wherein cycle switching for asynchronous data transfer is coordinated by the at least one source data center for the second subset.

9. A method, according to claim 8, wherein cycle switching for the second subset is independent of cycle switching for the first subset.

10. A method, according to claim 8, wherein data written after a first time and before a second time at the at least one source data center is associated with a first chunk of data and wherein data written after the second time at the at least one source data center is associated with a second chunk of data different than the first chunk of data, the at least one source data center providing the first chunk of data to the asynchronous data center while accumulating writes for the second chunk of data.

11. A method, according to claim 10, wherein the at least one source data center sends a message to the asynchronous data center and wherein, in response to receiving a reply to the message, the at least one source data center transmits the second chunk of data to the asynchronous data center.

12. A method, according to claim 11, wherein the at least one source data center provides an indicator to a synchronous data center that is part of one of the plurality of the first subset of recovery groups coupled to the at least one source data center, the indicator being provided in connection with receiving the reply from the asynchronous data center.

13. Computer software, provided in a non-transitory computer-readable medium, that maintains recovery data, the software comprising:
   executable code that generates data at a source data center;
   executable code that asynchronously transfers data to a plurality of asynchronous data centers that are each part of one of a plurality of a first subset of recovery groups coupled to the at least one source data center, wherein the first subset contains at least two of the recovery groups and wherein each of the recovery groups includes at least one of the asynchronous data centers and wherein cycle switching for asynchronous data transfer is coordinated by the at least one source data center for the first subset of the recovery groups; and executable code that provides a second subset of the recovery groups, different from the first subset, wherein cycle switching for asynchronous data transfer is coordinated by the at least one source data center for the second subset.

14. Computer software, according to claim 13, wherein cycle switching for the second subset is independent of cycle switching for the first subset.

15. Computer software, according to claim 13, wherein data written after a first time and before a second time at the at least one source data center is associated with a first chunk of data and wherein data written after the second time at the at least one source data center is associated with a second chunk of data different than the first chunk of data, the at least one source data center providing the first chunk of data to the asynchronous data center while accumulating writes for the second chunk of data.

16. Computer software, according to claim 15, wherein the at least one source data center sends a message to the asynchronous data center and wherein, in response to receiving a reply to the message, the at least one source data center transmits the second chunk of data to the asynchronous data center.

17. Computer software, according to claim 16, wherein the at least one source data center provides an indicator to a synchronous data center that is part of one of the plurality of the first subset of recovery groups coupled to the at least one source data center, the indicator being provided in connection with receiving the reply from the asynchronous data center.

* * * * *